United States Patent [19]

Chari et al.

[11] Patent Number: 6,105,089
[45] Date of Patent: Aug. 15, 2000

[54] DATA MANAGEMENT SYSTEM FOR ADDING OR EXCHANGING COMPONENTS ON A RUNNING COMPUTER

[75] Inventors: Srikumar N. Chari, Cupertino; Kenny L. Bright, Hayward; Bruno Sartirana, Sunnyvale, all of Calif.

[73] Assignee: Micron Electronics, Inc., Nampa, Id.

[21] Appl. No.: 08/942,129

[22] Filed: Oct. 1, 1997

Related U.S. Application Data

[60] Provisional application No. 60/046,310, May 13, 1997.

[51] Int. Cl.$^7$ ................................................. G06F 13/00
[52] U.S. Cl. ........................... 710/103; 710/102; 710/18; 710/129; 713/310; 713/320; 713/324
[58] Field of Search ...................... 395/281–283, 395/828–838, 500, 613, 200.55, 200.56, 200.57, 681; 364/514 A, 514 B, 514 C, 514 R, 240, 240.1; 713/310, 320, 324, 340

[56] References Cited

U.S. PATENT DOCUMENTS

| | | | |
|---|---|---|---|
| 4,999,787 | 3/1991 | McNally et al. | 364/514 |
| 5,123,017 | 6/1992 | Simpkins et al. | 371/15.1 |

(List continued on next page.)

OTHER PUBLICATIONS

Standard Overview, http://www.pc–card.com/stand—overview.html#1, 9 pages, Jun. 1990, "Detailed Overview of the PC Card Standard."

Digital Equipment Corporation, datasheet, 140 pages, 1993, "DECchip 21050 PCI–to–PCI Bridge."

NetFrame Systems Incorporated, News Release, 3 pages, referring to May 9, 1994, "NetFrame's New High–Availability ClusterServer Systems Avoid Scheduled as well as Unscheduled Downtime."

Compaq Computer Corporation, Phenix Technologies, LTD, and Intel Corporation, specification, 55 pages, May 5, 1995, "Plug & Play BIOS Specification."

NetFrame Systems Incorporated, datasheet, Feb. 1996, "NF450FT Network Mainframe."

(List continued on next page.)

*Primary Examiner*—Ayaz R. Sheikh
*Assistant Examiner*—Raymond N Phan
*Attorney, Agent, or Firm*—Knobbe, Martens, Olson and Bear, LLP

[57] ABSTRACT

A data management system supports hot plug operations on a computer by defining, organizing, and maintaining hot plug variables, stored on a computer readable medium, which identify components of a computer that may be involved in hot plug operations, and which also identify capabilities and operational states of those components as well as control their operation and interface to the computer. The hot plug variables identify a component as well as represent states and capabilities of a component, and thus the hot plug variables advantageously operate as commands to predetermined components of a computer which support hot plug operations on the computer. The system generally comprises a plurality of variables to support adding a component to or exchanging components of a computer while the computer runs, as well as hot plug variable data stored in a computer readable medium, the hot plug variable data representing capabilities, characteristics or states of components of the computer, the hot plug variable data related to the plurality of variables. In one embodiment, the system comprises management software running on a client computer, the management software generating requests such as a suspend device driver request, a power off request, a power on request, and a resume device driver request, and sending the requests over a network. In the embodiment, the system further comprises agent software running on a server computer, the agent software responsively recognizing the respective requests to suspend a device driver running on the server computer, to stop power to a component of the server computer, to start power to the server computer, and to resume the device driver.

20 Claims, 10 Drawing Sheets

U.S. PATENT DOCUMENTS

| | | | |
|---|---|---|---|
| 5,210,855 | 5/1993 | Bartol | 395/500 |
| 5,261,044 | 11/1993 | Dev et al. | 345/357 |
| 5,272,584 | 12/1993 | Austruy et al. | 631/58 |
| 5,337,413 | 8/1994 | Lui et al. | 395/275 |
| 5,340,340 | 8/1994 | Hasting et al. | 439/64 |
| 5,379,409 | 1/1995 | Ishikawa | 395/575 |
| 5,386,567 | 1/1995 | Lien et al. | 395/700 |
| 5,471,617 | 11/1995 | Farrand et al. | 395/700 |
| 5,487,148 | 1/1996 | Komorie et al. | 395/182.02 |
| 5,491,796 | 2/1996 | Wanderer et al. | 395/200.09 |
| 5,513,314 | 4/1996 | Kandasamy et al. | 395/182.04 |
| 5,517,646 | 5/1996 | Piccirillo et al. | 395/700 |
| 5,533,198 | 7/1996 | Thorson | 395/200.15 |
| 5,539,883 | 7/1996 | Allon et al. | 395/200.11 |
| 5,546,595 | 8/1996 | Norman et al. | 395/800 |
| 5,555,510 | 9/1996 | Verseput et al. | 364/514 R |
| 5,564,024 | 10/1996 | Pemberton | 395/283 |
| 5,576,946 | 11/1996 | Bender et al. | 364/146 |
| 5,579,491 | 11/1996 | Jeffries et al. | 395/283 |
| 5,581,712 | 12/1996 | Herrman | 395/283 |
| 5,592,610 | 1/1997 | Chittor | 395/182.02 |
| 5,604,873 | 2/1997 | Fite et al. | 395/283 |
| 5,621,892 | 4/1997 | Cook | 395/200.1 |
| 5,632,021 | 5/1997 | Jennings et al. | 395/309 |
| 5,638,289 | 6/1997 | Yamada et al. | 364/489 |
| 5,644,731 | 7/1997 | Liencres et al. | 395/283 |
| 5,651,006 | 7/1997 | Fujino et al. | 370/408 |
| 5,652,892 | 7/1997 | Ugajin | 713/300 |
| 5,655,081 | 8/1997 | Bonnell et al. | 395/200.32 |
| 5,671,441 | 9/1997 | Glassen et al. | 395/828 |
| 5,678,042 | 10/1997 | Pisello et al. | 395/610 |
| 5,684,945 | 11/1997 | Chen et al. | 395/182.18 |
| 5,689,637 | 11/1997 | Johnson et al. | 395/182.22 |
| 5,745,897 | 4/1998 | Perkins et al. | 707/101 |
| 5,751,575 | 5/1998 | Hirosawa et al. | 364/188 |
| 5,754,426 | 5/1998 | Dumais | 364/188 |
| 5,758,103 | 5/1998 | Oh | 395/283 |
| 5,761,085 | 6/1998 | Giorgio | 702/333 |
| 5,761,429 | 6/1998 | Thompson | 395/200.54 |
| 5,764,911 | 6/1998 | Tezuka et al. | 395/200.53 |
| 5,764,913 | 6/1998 | Jancke et al. | 395/200.54 |
| 5,768,541 | 6/1998 | Pan-Ratzlaff | 395/283 |
| 5,774,667 | 6/1998 | Garvey et al. | 395/200.52 |
| 5,781,798 | 7/1998 | Beatty et al. | 395/830 |
| 5,784,576 | 7/1998 | Guthrie et al. | 395/283 |
| 5,787,246 | 7/1998 | Litchtman et al. | 395/200.5 |
| 5,812,750 | 9/1998 | Dev et al. | 395/182.02 |
| 5,826,046 | 10/1998 | Nguyen et al. | 395/309 |
| 5,838,319 | 11/1998 | Guzak et al. | 345/340 |
| 5,901,304 | 5/1999 | Hwang et al. | 395/500 |
| 5,913,037 | 6/1999 | Spofford et al. | 395/200.56 |
| 5,922,051 | 7/1999 | Sidey | 709/223 |

OTHER PUBLICATIONS

NetFrame Systems Incorporated, datasheet, Mar. 1996, "NetFrame Cluster Server 8000."

Joint work by Intel Corporation, Compaq, Adaptec, Hewlett Packard, and Novell, presentation, 22 pages, Jun. 1996, "Intelligent I/O Architecture."

Lockareff, M., HTINews, http://www.hometoys.com/htinews/dec96/articles/loneworks.htm, Dec. 1996, "Loneworks—An Introduction."

Schofield, M.J., http://www.omegas.co.uk/CAN/canworks.htm, Copyright 1996, 1997, "Controller Area Network—How CAN Works."

NRTT, Ltd., http://www.nrtt.demon.co.uk/cantech.html, 5 pages, May 28, 1997, "CAN: Technical Overview."

PCI Special Interest Group, specification, 35 pages, Draft For Review Only, Jun. 15, 1997, "PCI Bus Hot Plug Specification."

Microsoft Corporation, file:///A|/Rem—devs.htm, 4 pages, Copyright 1997, updated Aug. 13, 1997, "Supporting Removable Devices Under Windows and Windows NT."

IBM Technical Disclosure Bulletin, 35(2): 69–74, Jul. 1992, "Serial Channel Synchronizer"

IBM Technical Disclosure Bulletin, 39(7):229–230, Jul. 1996.

DATA MANAGEMENT SYSTEM FOR ADDING OR EXCHANGING COMPONENTS ON A RUNNING COMPUTER

RELATED APPLICATIONS

The subject matter of U.S. patent application entitled "Data Management Method Supporting Hot Plug Operations On A Computer," filed on Oct. 1, 1997, application Ser. No. 08/942,124, and is related to this application.

PRIORITY CLAIM

The benefit under 35 U.S.C. § 119(e) of the U.S. provisional application Ser. No. 60/046,310, entitled "High Performance Network Server System Management Interface," and filed on May 13, 1997, is hereby claimed.

APPENDICES

Appendix A, which forms a part of this disclosure, is a list of commonly owned copending U.S. patent applications. Each one of the applications listed in Appendix A is hereby incorporated herein in its entirety by reference thereto.

Appendix B, which forms part of the disclosure of this patent application, is a copy of the U.S. provisional patent application, 122 pages, filed May 13, 1997, entitled "High Performance Network Server System Management Interface" and assigned Application No. 60/046,310. Page 1, line 7 of the provisional application has been changed from the original to positively recite that the entire provisional application, including the attached documents, forms part of this disclosure.

COPYRIGHT RIGHTS

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention relates to the field of computers and computer software. In particular, the invention relates to managing configurations of computers.

BACKGROUND OF THE INVENTION

In response to organizations' increasing reliance on network-based server computers and the increasing cost of computer downtime, manufacturers developed fault tolerant or redundant systems designed to reduce downtime. Such systems typically use memory back up and redundant components in attempting to provide continuous system operation. Many redundant systems can be found in the prior art.

For example, U.S. Pat. No. 4,607,365 to Greig, et al., discloses a system that automatically selects secondary components as needed to compensate for faults in the system. Similarly, U.S. Pat. No. 4,727,516 to Yoshida, et al. discloses redundant memory arrays and U.S. Pat. Nos. 4,484,275 and 4,378,588 to Katzman et al. teach multiple processors. While those redundant computer systems may prevent a complete server failure in some cases, those systems do not address many causes of computer downtime.

Studies show that a significant percentage of network server downtime is caused by transient faults in the I/O subsystem. These faults may be due, for example, to adapter card firmware, or hardware which does not properly handle concurrent errors, and often causes servers to crash or hang. Diagnosing intermittent errors can be a frustrating and time-consuming process. The result is hours of downtime per failure, while a system administrator discovers the failure, takes some action, and manually reboots the server. The computer systems of the prior art do not provide a computer system manager with the tools needed to keep computers running while failed parts are removed and repaired or while upgrades are performed.

Moreover, even if hardware components of a server computer can withstand being added or removed without shutting down the server computer or making it unavailable, a system manager could not simply remove a piece of hardware and plug in another piece without causing immense disruption of the software. Such a physical swap would cause hundreds or thousands of error conditions every few seconds, likely resulting in corruption of data and possibly even systemwide software failure. Low level software modules, particularly device drivers, must be carefully administered during any change to the hardware components they service. Making matters more difficult, device drivers are among the most complicated and least understood classes of software, few of them alike, but nearly all having arbitrary and arcane command sets.

Without some tool to provide guidance and uniformity, network administrators could only add or remove components to an operating computer by issuing precise sequences of arcane, error-prone commands having difficult-to-remember, numeric-range parameter values, interspersed with a variety of hardware manipulations, with little or no feedback during the entire process to indicate successful progress. Moreover, completely different sets of commands and parameter values may be required to perform hot plug operations on differing components, or on similar components from differing vendors. Both the high possibility of making mistakes and the steep learning curve make manual performance of hot plug operations impractical at best.

Industry focus and cooperation on computer system management has prompted the development of standards for performing routine management operations on computers. Today's standards generally provide databases containing a wide variety of management information needed to carry out many computer system management tasks. While the standard practices used to manage computers are becoming more uniform and effective as growing numbers of computer system managers learn, implement and improve these standards, there has been little if any focus on the area of adding or removing components to a running, operating computer.

SUMMARY OF THE INVENTION

One embodiment of the present invention is a system for managing an addition of a component to a computer. The system comprises: (1) a computer having an expansion slot for connecting to a component; (2) a component which can be connected to the computer; (3) an extended management information base, including a plurality of variables, the variables selected to support adding the component to the computer while the computer runs, the management information base stored on a computer readable medium; and (4) a component add software module stored in executable form on the computer, the component add software module including at least some of the plurality of variables, the component add software module directing instructions to the slot to permit adding the component to the computer while the computer runs.

A further embodiment of the present invention is a system for managing an exchange of components of a computer. The system comprises (1) a computer having an expansion slot for connecting to a component; (2) a first component connected to the expansion slot; (3) an extended management information base, including a plurality of variables, the variables selected to support exchanging the first component with another component while the computer runs, the management information base stored on a computer readable medium; and (4) a component exchange software module stored in executable form on the computer, the component exchange software module including at least some of the plurality of variables, the component add software module directing instructions to the slot to permit exchanging the first component with another component while the computer runs.

Another embodiment of the present invention is a system for managing hot plug data to hot add or hot swap components of a computer. The system comprises: (1) a computer having an expansion slot; (2) a component capable of connecting to the expansion slot; (3) hot plug variable data stored on a computer readable medium, the hot plug variable data corresponding to hot plug variables selected to support adding the component to the computer while the computer runs, removing the component from the expansion slot while the computer runs, and replacing the component connected to the expansion slot with another component while the computer runs; and (4) a component add software module stored in executable form on the computer, the component add software module including or accessing at least some of the hot plug variable data, the component add software module directing instructions to the slot to permit adding the component to the computer while the computer runs.

A still further embodiment of the present invention is a system for controlling hot plug operations on a server computer. The system comprises: (1) a server computer having server-based hot plug MIB variables stored on a computer readable medium; (2) agent software running on the server computer, the agent software responsive to hot plug-related requests to perform hot plug operations on the server computer, the hot plug commands formatted to include a representation of at least one of the hot plug MIB variables, the requests including a request to shut off power to a component of the server computer and a request to start power to a component of the server computer; and (3) a compiled MIB stored on a computer readable medium, the compiled MIB defining for the agent software a structure for each of the hot plug MIB variables, the agent software collecting the hot plug MIB variables by polling components of the computer for characteristic, capability and state information corresponding to the respective structures for each MIB variable.

Another embodiment of the present invention is a system for refreshing hot plug variables. The system comprises: (1) a server computer; (2) a client computer; (3) a network permitting the client computer and the server computer to communicate; (4) hot plug variable data stored on a computer readable medium local to the server computer, the hot plug variable data including existing component variable data identifying at least one component of the server computer; (5) agent software running on the server computer, the agent software polling at least one component of the server computer for new component variable data identifying the at least one component of the server computer, the agent software storing the new component variable data on the computer readable medium to supersede the existing component variable data; and (6) a retrieve data routine running on the client computer at a predetermined time interval, the retrieve data routine generating requests for the hot plug variable data and sending the requests to the agent software over the network, the agent software responding by sending over the network the hot plug variable data which supersedes hot plug variable data stored on a computer readable medium of the client computer.

A further embodiment of the present invention is a system for broadcasting hot plug variables. The system comprises: (1) a server computer; (2) a client computer;

(3) a network permitting the client computer and the server computer to communicate;

(4) hot plug variable data stored on a computer readable medium local to the server computer, the hot plug variable data including existing component variable data identifying at least one component of the server computer; (5) agent software running on the server computer, the agent software polling at least one component of the server computer for new component variable data identifying the at least one component of the server computer, the agent software storing the new component variable data on the computer readable medium to supersede the existing component variable data; and (6) a broadcast routine running on the server computer, the broadcast routine sending the hot plug variable data over the network to the client computer.

A still further embodiment of the present invention is a system for managing hot plug operations. The system comprises: (1) a binary hot plug MIB stored on computer readable media accessible to a server computer, the binary hot plug MIB generated by compiling with a MIB compiler a hot plug MIB module, the hot plug MIB module defining hot plug variables selected to support adding a component to the server computer while the server computer runs, removing a component from the server computer while the server computer runs, and exchanging components of the server computer while the server computer runs, the hot plug variables including a power state variable for regulating the power state of at least one component of the server computer and also including a component state variable for suspending or resuming the operation of at least one component of the server computer; (2) hot plug software running on the server computer and responsive to commands related to variables defined in the binary hot plug MIB; (3) a client computer linked to the server computer by a network, the binary hot plug MIB stored on computer readable medium of the client computer; and (4) hot plug management software running on the client computer, the hot plug management software generating requests to perform hot plug operations, the requests including a request to shut down power to a component of the server computer and a request to start power to a component of the server computer, the requests also including a request to suspend the operation of a component of the server computer and a request to resume the operation of a component of the server computer, each of the requests related to a hot plug variable defined in the binary hot plug MIB, the hot plug management software sending the requests over the network to the hot plug software.

Another embodiment of the present invention is a system for controlling, from a client computer, hot plug operations on a server computer. The system comprises; (1) a client computer; (2) hot plug management software running on the client computer; (3) a server computer having an expansion slot and a component removably connected to the expansion slot; (4) a device driver running on the server computer and servicing the component; (5) hot plug agent software running on the server computer; (6) a compiled MIB defining hot plug variables, the compiled MIB stored on a computer readable medium of the server computer, and a copy of the compiled MIB stored on a computer readable medium of the client computer; (7) server-based hot plug MIB variables stored on a computer readable medium of the server computer; (8) client-based hot plug MIB variables stored on a computer readable medium of the server computer; (9) a suspend component state command generated by the hot plug management software to suspend the operation of the device driver, the suspend component state command related to a component state hot plug variable defined in the compiled MIB, the hot plug management software sending the suspend component state command to the hot plug agent, the hot plug agent responsively recognizing the suspend component state command to suspend operation of the device driver; (10) a power off command generated by the hot plug management software to stop power to the expansion slot, the power off command related to a power state hot plug variable defined in the compiled MIB, the hot plug management software sending the power off command to the hot plug agent, the hot plug agent responsively recognizing the power off command to stop power to the expansion slot; (11) a power on command generated by the hot plug management software to start power to the expansion slot, the power off command related to a power state hot plug variable defined in the compiled MIB, the hot plug management software sending the power on command to the hot plug agent, the hot plug agent responsively recognizing the power on command to start power to the expansion slot; and (12) a resume component state command generated by the hot plug management software to resume the operation of the device driver, the resume component state command related to a component state hot plug variable defined in the compiled MIB, the hot plug management software sending the resume component state command to the hot plug agent, the hot plug agent responsively recognizing the resume component state command to resume operation of the device driver.

A further embodiment of the present invention is a system for controlling hot plug operations. The system comprises: (1) a server computer having an expansion slot and a component removably connected to the expansion slot; (2) a device driver running on the server computer and servicing the component; (3) a database of hot plug commands, the database defining the structure of power state commands for determining or regulating the power state of the expansion slot, the database defining the structure of component state commands for suspending or resuming the operation of the device driver, and the database defining the structure of component commands for configuring or changing the operating condition of the component; and (4) hot plug software running on the server computer, the hot plug software responsively recognizing the power state commands to determine or regulate the power state of the expansion slot, the hot plug software responsively recognizing the component state commands to suspend or resume the operation of the device driver, and the hot plug software responsively recognizing the component commands to configure or change the operating condition of the component.

Still another embodiment of the present invention is a system for updating hot plug data for a component connected to a computer. The system comprises: (1) a compiled hot plug MIB defining hot plug variables for a class of components capable of connecting to a computer; (2) hot plug MIB variables stored in a computer readable medium of the computer, the hot plug MIB variables corresponding to hot plug variables defined in the compiled hot plug MIB; (3) hot plug polling software running on the computer, the hot plug polling software polling a component of the class of components after the component is connected to the computer to obtain hot plug variable data for the component; and (4) hot plug management software running on the computer, the management software updating the hot plug MIB variables to contain the obtained hot plug variable data.

These and other embodiments of the present invention will be readily apparent to those skilled in the art having reference to the detailed description and drawings which follow, the invention not being limited, however, to any particular embodiments disclosed.

DETAILED DESCRIPTION OF THE INVENTION

Figure 1:
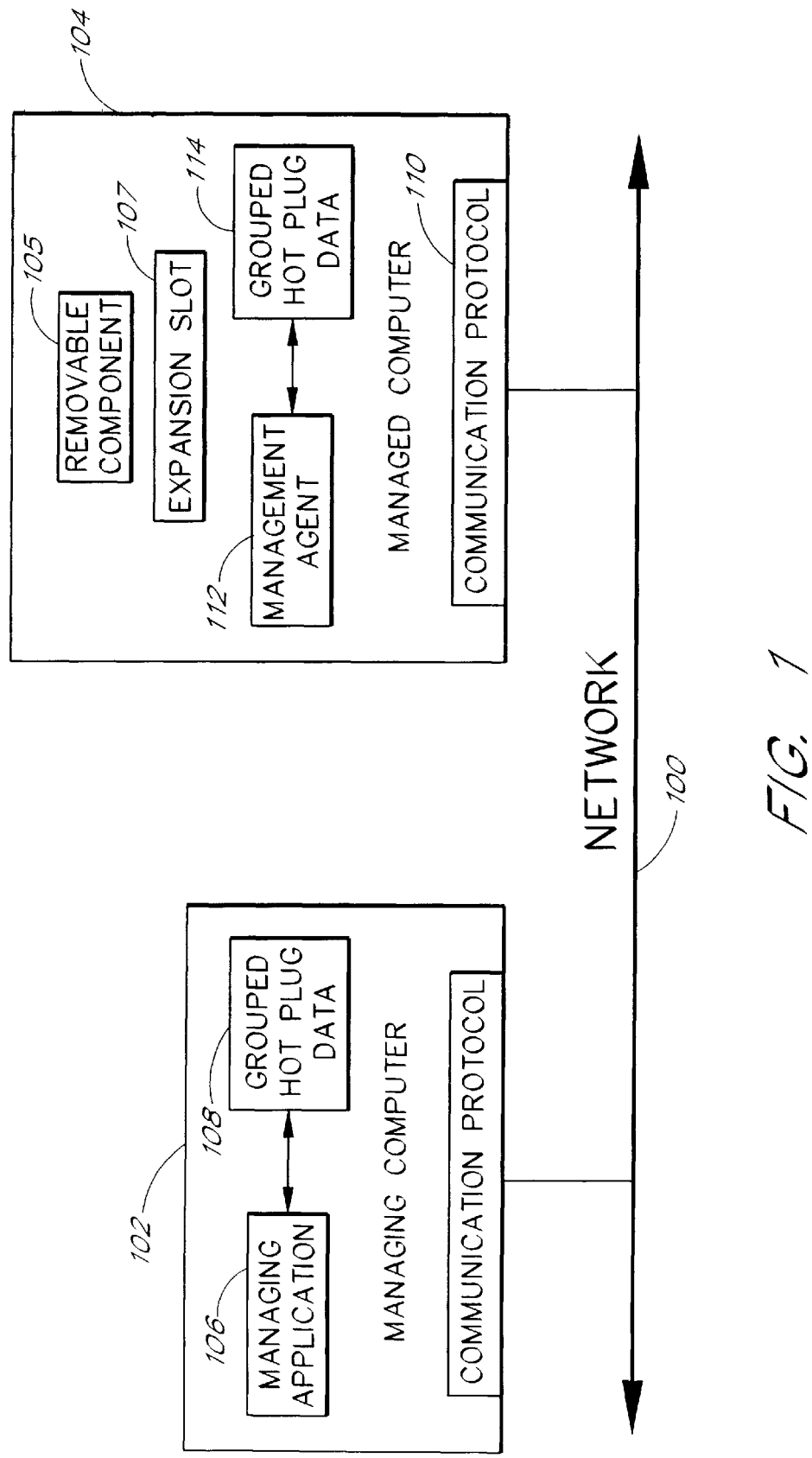
FIG. 1 illustrates a block diagram of a network having a managing computer and a managed computer.

Administrators of centralized server computers need a way to remove failed server components and add functioning components without shutting the servers down. Further, computer system administrators need databases of component information and related management tools to insulate them from the complexities of low level software and to make component add and remove operations uniform, practical and risk free.

The present invention concerns software tools to manage server computers. In particular, the present invention is directed to selecting, acquiring, and maintaining groups of data values for adding or removing components of a computer while that computer is running. The groups of data values permit system managers using system management software tools to identify components of a server computer as well as the capabilities of those components, and also to control the operation of the components and their interface to the server computer.

Generally, the groups of data values correspond to characteristics, capabilities or states of components of a managed server computer which may be added to or removed from a running computer. These components include, but are not limited to, processors, memory, expansion cards, expansion slots, adapter cards, cooling fans, keyboards, monitors, pointing devices, power supplies, I/O ports, floppy disk drives, hard disk drives, cd-rom drives, device drivers, and data files. The characteristics, capabilities or states of certain components may need to be tested, examined or altered by system management software or agent software during a "hot plug" operation. Hot plug operations include hot add operations (i.e., a new component is added to the managed computer without shutting it down, making it unavailable to a user, or halting its execution of instructions) and hot swap operations (i.e., a component is removed and optionally replaced by another component without shutting down the managed computer, making it unavailable to users, or halting its execution of instructions).

The present invention permits a network administrator to manage and control the process of adding and removing computer components while a computer is running. The present invention supports hot plug operations by defining, organizing, and maintaining hot plug variables which identify components of a computer that may be involved in hot plug operations, and which also identify capabilities and operational states of those components as well as control their operation and interface to the computer. Grouping the hot plug variables according to particular components provides efficient access by software modules to convenient subsets of hot plug variables which may be needed to manipulate the operation of a component during a particular hot plug operation. Because the hot plug variables both identify a component as well as represent states and capabilities of a component, the hot plug variables advantageously operate as commands to predetermined components.

In one embodiment, groups of hot plug variables representing components of one computer may be stored in a computer readable medium on a remote computer. By forming requests and commands from the groups of hot plug variables, and by sending these over a network (or some other communication means) to a responsive process running on the first computer, the remote computer advantageously controls hot plug operations on the first computer.

A remote computer, in one embodiment, advantageously retrieves current hot plug variables from another computer by executing, at predetermined time intervals, a retrieve data routine designed to request, retrieve and store hot plug variables. The remote computer thereby maintains current information regarding the status and capabilities of components in a managed computer. In an alternative embodiment, software on a managed computer polls the components of that computer to collect hot plug variable data, stores the hot plug variable data in computer readable media, and, either at predetermined time intervals, or upon sensed configuration changes, causes the hot plug variables to be broadcast to one or more remote computers.

Advantageously, the present invention is consistent with and may extend standard processes widely used to perform computer management tasks. In one such embodiment, the present invention advantageously leverages existing software management tools by defining and organizing hot plug variables according to a hierarchical data storage model called a management information base (MIB). Using the widely implemented MIB model to define and organize hot plug variables allows the present invention to support hot plug operations independent of any particular operating system or computer environment and also facilitates performing hot plug operations remotely, over a network.

Computer management software tools complying with SNMP (Simple Network Management Protocol) standards use MIB-based variables to cooperate in managing computers. These software tools routinely operate over a network, with management software running on a client computer issuing management-related requests to responsive agent software running on a server, and with MIB variables forming the basis of each such request. Thus, extending a MIB to define and organize hot plug MIB variables expands the scope of operations which SNMP management software can control and with which SNMP agent software can cooperate.

In the following description of the invention, a module includes, but is not limited to, software or hardware components which perform certain tasks. Thus, a module may include object-oriented software components, class components, procedures, subroutines, data structures, segments of program code, drivers, firmware, microcode, circuitry, data, data structures, tables, arrays, etc. In addition, those with ordinary skill in the art will recognize that a module can be implemented using a wide variety of different software and hardware techniques.

FIG. 1 illustrates a network 100 that enables a managing computer 102 to exchange data with a managed computer 104. The managed computer 104 includes a removable component 105 and an expansion slot 107 which can accept an additional component.

A managing application 106 software module runs on the managing computer 102. The managing application 106 maintains grouped hot plug data 108 corresponding to characteristics, capabilities or states of components of the managed computer 104. Periodically, the managing application 106 sends a request over the network 100, formatted according to communication protocol 110, to the managed computer 104 seeking current hot plug data.

A management agent 112 software module running on the managed computer 104 receives requests for hot plug data from the network 100. One or more hot plug data acquisition routines in the management agent 112 poll or query various components of the managed computer 104 and interact with device drivers installed on the managed computer 104 to acquire grouped hot plug data 114. The management agent 112 sends the requested current hot plug data values, formatted in accordance with the communication protocol 110, to the managing computer 102. The managing application 106 receives current hot plug data values from the managed computer 104 over the network 100.

A network administrator uses the managing application 106 to control and carry out hot plug (hot add or hot swap) operations performed on the managed computer 104. In preparing to perform a hot plug operation, the network administrator invokes a component browse routine of the managing application 106. The component browse routine extracts data from the grouped hot plug data 108 to display on a computer screen of the managing computer 102 a representation of the removable component 105 and the expansion slot 107 of the managed computer 104.

To perform a hot add operation, the network administrator selects (using a mouse pointer, for example) the displayed representation of the expansion slot 107 of the managed computer 104 and invokes a hot add routine of the managing application 106. The hot add routine accesses the grouped hot plug data 108 to obtain information about the expansion slot 107 such as, for example, its power state (whether power is currently being supplied to the expansion slot 107) and the location of the expansion slot 107 (e.g., one or more identifiers permitting software on the managed computer 104 to unambiguously direct commands to the expansion slot 107).

The hot add routine of the managing application 106 generates and sends, if needed, a request to the managed computer 104 to shut down power to the expansion slot 107. The management agent 112 receive the request over the network 100, shuts down power to the expansion slot 107, verifies the successful completion of the operation and sends response information over the network 100 to the managing computer 102 indicating the successful completion of the requested operation.

The managing application 106 receives the successful completion information and prompts the network administrator to add a component to the managed computer 104. The network administrator then physically inserts a component into the expansion slot 107 and provides input to the managing application 106 indicating that a component has been added to the managed computer 104.

The hot add routine of the managing application 106 uses the grouped hot plug data 108 concerning the expansion slot 107 to generate and send a request to the managed computer 104 to restore power to the expansion slot 107. The management agent 112 receives the request, performs it and sends information to the managing computer 102 indicating that the request completed successfully.

The network administrator may verify operation of the component added to the management computer 104 by generating and sending requests to the managed computer 104 to query, poll or examine the added component and obtain hot plug data concerning the added component. The management agent 112 receives such requests and polls or queries the added component to obtain information such as, for example, a component name, driver number, vendor ID, device ID, operational state, and whether the component can be hot swapped (removed while the computer is still running). The management agent 112 stores the acquired data concerning the added component in the grouped hot plug data on the managed computer 104 and also sends the acquired data to the managing computer 102 over the network 100.

To perform a hot swap operation, the network administrator determines that the removable component 105 of the managed computer 104 should be replaced with another component. The network administrator's determination may be based on an alert condition that the removable component 105 is malfunctioning. The alert condition may be monitored by the managed computer 104 and communicated by the managed computer 104 to the managing computer 102. To remove and replace the removable component 105, the network administrator invokes a hot swap routine.

The hot swap routine accesses the grouped hot plug data 108 to obtain information about the removable component 105 such as, for example, which I/O expansion slot it may occupy, the power state of that expansion slot, and any device driver (or other software module interfacing with the removable component 105). The hot swap routine of the managing application 106 generates and sends a request to the managed computer 104 to suspend operation of the device driver servicing the removable component 105.

The management agent 112 receives the suspend request over the network 100 and issues a call to suspend the target device driver. The management agent 112 sends a response to the managing computer 102 that the device driver has been successfully suspended. The managing application 106 receives the successful suspension response and, as in the hot add operation, generated and sends a request to the managed computer 104 to shut off power to the I/O expansion slot holding the removable component 105. The management agent 112 receives the request to shut off power, performs the request, and sends a successful completion response to the managing computer 102.

The managing application 106 prompts the network administrator to remove the removable component 105 and replace it. The network administrator removes the removable component 105, replaces it with another component. If the new component requires a device driver different than the one that serviced the removable component 105, the network administrator loads (and, if needed, configures) the required device driver. The network administrator provides input to the managing application 106 indicating that the removable component 105 has been removed and replaced with another component.

The managing application 106 generates and sends a request to the managed computer 104 to restore power to the I/O expansion slot holding the replacement component. The management agent 112 receives the request to restore power, restores the power to the target I/O expansion slot, and sends a successful completion response to the managing computer 102. The managing application 106 generates and sends a request to the managed computer 104 to resume the operation of the suspended driver. The management agent 112 receives the request to resume driver operation, issues a call to the driver to resume its operation (begin servicing the replacement component), and sends to the managing computer 102 a successful completion response.

The managing application 106 requests updated hot plug data from the managed computer 104. The management agent 112 receives requests for updated hot plug data, polls and queries components of the managed computer 104 as needed, and returns (over the network 100) the updated hot plug data to the managing computer 102. The managing application 106 examines the updated hot plug data 108 to verify the normal operation of the replacement component.

In accordance with one embodiment of the present invention, the groups of hot plug data values exist as groups of variables, where each variable has a name or identifier, associated attributes (which may include a data type, a description and status information) and associated operations (e.g., read or write) that can be performed on the variable. Such variables may also be known as managed objects. In this embodiment, a network administrator uses management software to access groups of variables to control hot plug operations performed on managed server computers.

Figure 2:
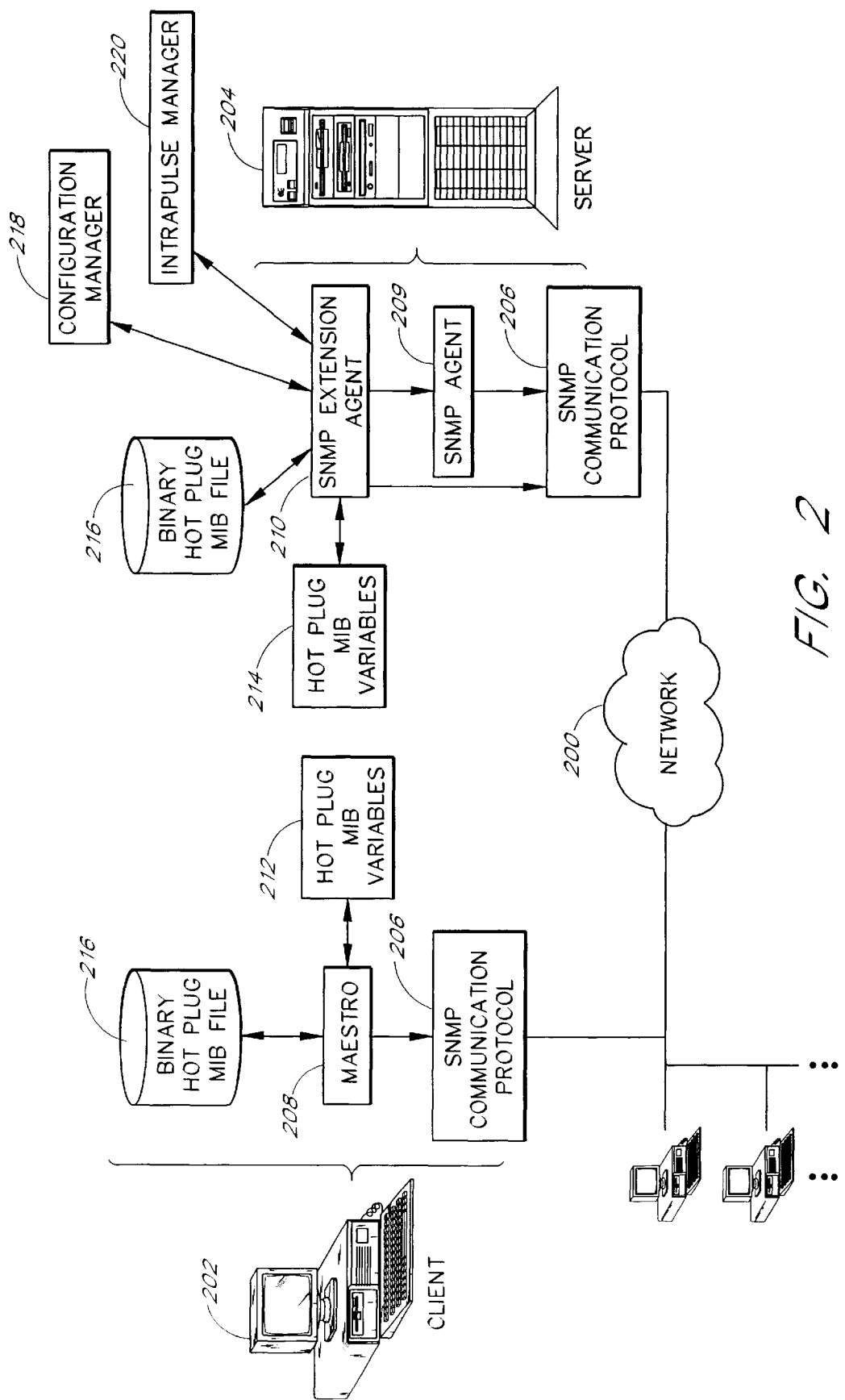
FIG. 2 illustrates a block diagram of a computer network having a client computer and a server computer which communicate to manage the configuration of the server computer.

FIG. 2 illustrates a computer network 200 having a client computer 202 and a server computer 204. In one embodiment, the client computer 202 and the server computer 204 run Windows NT™ operating system software and use one or more Intel Pentium™ processors to process instructions. It will be understood by those of ordinary skill in the art that the invention is not limited by an operating system or a type of processor. More particularly, the server computer 204 may be a NetFRAME ClusterServer 9000 (NF9000) series server computer provided by NetFRAME, Inc. of Milpitas, Calif.

In one embodiment, the client computer 202 and server computer 204 use a communication protocol 206 defined according to SNMP (Simple Network Management Protocol) to communicate with each other over a Windows NT-based network 200. The invention, however, is not limited by any particular network or network protocol. SNMP is well known in the art as a collection of standards and protocols for managing network-based devices. SNMP provides guidelines for requesting, obtaining and transporting management information between network components. (See, for example, Marshall T. Rose, *The Simple Book* (2d ed. 1994)). SNMP became an Internet Standard in 1990, when it was published as RFC1157 (Request For Comments No. 1157). Since then, the SNMP standards and protocols have been updated to support graphical user interfaces, and, so updated, the standards and protocols are referred to as WinSNMP. One embodiment of the present invention uses a WinSNMP product (including protocol stack and libraries) from ACE*COMM of Gaithersburg, Md., which implements WinSNMP in cooperation with Windows NT.

Management software called Maestro 208 runs on the client computer 202. Maestro 208 controls hot plug operations performed on the server computer 204. An SNMP agent 209 runs on the server computer 204. SNMP agents are known in the art. SNMP agents respond to SNMP requests (e.g., SNMP_GET, SNMP_GETNEXT, and SNMP_SET) received from management software, such as Maestro 208.

An SNMP extension agent 210 also runs on the server computer 204. The SNMP extension agent 210 also responds to SNMP requests (e.g., SNMP_GET, SNMP_GETNEXT, and SNMP_SET) received from Maestro 208, but only responds to requests not processed by the SNMP agent 209. Those of ordinary skill in the art will understand generally that SNMP agents may not process certain SNMP requests and, rather, may pass such requests to an SNMP extension agent.

In response to requests generated and sent by Maestro 208 over the network 200, the SNMP extension agent 210 assists in the performance of hot plug operations by acquiring hot plug variable information concerning components of the server computer 204, by sending the acquired hot plug variable information to Maestro 208, and by directing commands to any components of the server computer 204 involved in a hot plug operation as requested by Maestro 208.

The SNMP extension agent 210 communicates with a device driver called configuration manager 218 to acquire information about adapters or device drivers in the server computer 204 or to direct commands or requests to adapter-related components (e.g., device drivers servicing the adapters such as SCSI drivers or ethernet drivers). The SNMP extension agent 210 also communicates with a device driver called Intrapulse manager 220 to acquire information about I/O expansion slots, canisters (removable devices having multiple I/O expansion slots), power supplies and system boards of the server computer 204 or to direct commands or requests to related components such as associated drivers.

In another embodiment, both Maestro 208 and the SNMP extension agent 210 run on the server computer 204. In such an embodiment, a network administrator may invoke Maestro 208 as well as provide input to Maestro 208 from a client computer 202.

Maestro 208 maintains, in a computer readable medium such as random access memory (RAM), hot plug MIB (management information base) variable data 212 relating to characteristics, capabilities or states of components of the server computer 204 which may be involved in a hot plug operation. A MIB generally represents network, device, component and other information in a tree-like framework, specifying hierarchical relationships between the networks, devices, components and other elements.

A hot plug MIB defines a set of hot plug MIB variables and groups those hot plug variables according to the components that are managed during hot plug operations. MIBs are known in the art and are commonly used to define variables for use in managing network-based components or devices using SNMP standards and protocols. (See, for example, Dr. Sidnie Feit, *SNMP A Guide to Network Management* (1995); Mark A. Miller, *Managing Internetworks with SNMP* (1993)).

The SNMP extension agent also maintains, in a computer readable medium such as RAM, hot plug MIB variable data 214 relating to characteristics, capabilities or states of components of the server computer 204. While the set of hot plug MIB variables 212 maintained by Maestro may be the same as the set of hot plug MIB variables 214 maintained by the SNMP extension agent 210, the values of the variables may differ as those maintained on the server computer 204 may have been obtained more recently. In one embodiment, the hot plug MIB variable data 212 on the client computer 202 and the hot plug MIB variable data 214 on the server computer 204 are organized as tables in respective RAM.

Figure 3:
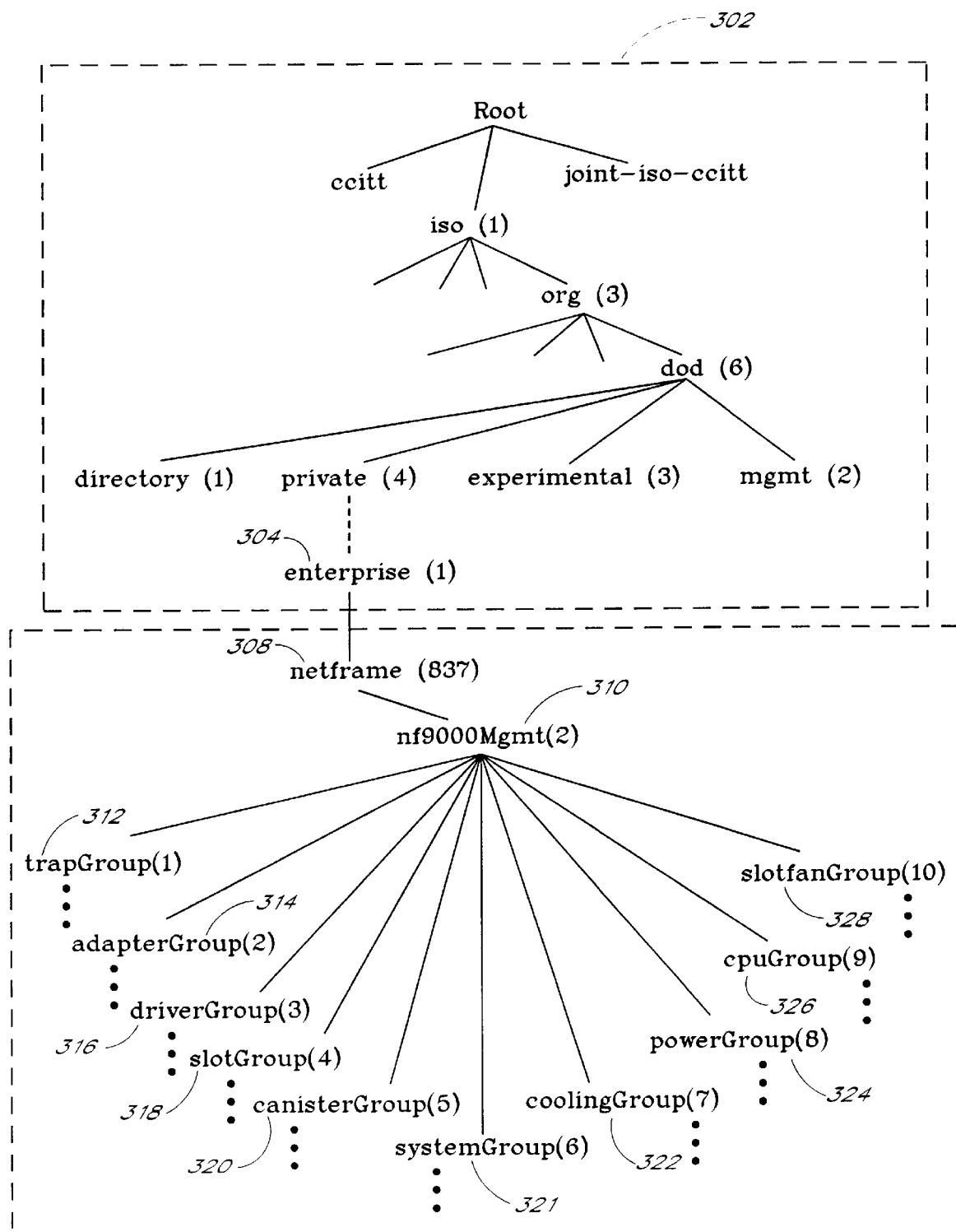
FIG. 3 illustrates a diagram representing the nodes of an extended MIB.

FIG. 3 represents portions of the hierarchical levels of a MIB. The nodes comprising upper levels of a MIB hierarchy 302 are fixed by the SNMP standard, including nodes corresponding to standards setting organizations down through industry-specific organizations down through particular networks and further down through private networks and to individual enterprises. Lower levels, and in particular levels below the "enterprise" node 304, are not defined by the SNMP and may be defined as needed. A portion of a MIB including the levels below the "enterprise" element 304 may be referred to as a subMIB 306.

According to the SNMP standard, the nodes comprising each hierarchical level of a MIB are assigned unique integer values in addition to names. Thus, a target node occupying a lower level in a MIB may be identified by listing in series separated by a "." the number assigned to each node encountered in a downward traversal of the MIB beginning with the highest (or root level) node. Thus, the "enterprise" node 304 may be identified as 1.3.6.4.1 (iso (1), org (3), dod (6), private (4), enterprise (1)).

The subMIB 306 extends the SNMP standard MIB, the extension defining groups of variables that support management operations performed on a server computer, in this case an NF9000 ClusterServer series server computer by NetFRAME, Inc. On the level immediately below the "enterprise" node 304, a "netframe" node 308 represents the highest level of the subMIB 306 extending the SNMP standard MIB. Nodes immediately below the "enterprise" node 304 may be requested from and registered by the Internet Assigned Numbers Authority (IANA) which assigns an integer value to a requested node and registers the name and assigned value.

In FIG. 3, the subMIB 306 defines a "nf9000Mgmt" node 310 at the level immediately below the "netframe" node 308. On the level immediately following the "nf9000Mgmt" node 310, the subMIB 306 defines group nodes corresponding to management related components of the server computer 204: a trapGroup node 312, an adapterGroup node 314, a driverGroup node 316, a slotGroup node 318, a canisterGroup node 320, a systemGroup node 321, a coolingGroup node 322, a powerGroup node 324, a cpuGroup node 326, and a slotFanGroup node 328. Each group node includes MIB variables corresponding to a component of the server computer 204.

MIBs are formally described using an abstract syntax notation set out in ISO 8824. A MIB defining the nodes and group nodes of the subMIB 306 and also defining the MIB variables for each group node follows:

```
15      MIB DEFINITIONS  ::= BEGIN
            IMPORTS
                enterprises,
                Gauge,
                Counter,
20              TimeTicks
                    FROM RFC1155-SMI
                OBJECT-TYPE
                    FROM RFC1212
                DisplayString
25                  FROM RFC1213-MIB;

--
            -- Object Identifiers
            --
30          netframe        OBJECT IDENTIFIER ::=   {enterprises 837}
            nf9000Mgmt      OBJECT IDENTIFIER ::=   {netframe 2} trapGroup       OBJECT IDENTIFIER ::=   {nf9000Mgmt 1}
            adapterGroup    OBJECT IDENTIFIER ::=   {nf9000Mgmt 2}
35          driverGroup     OBJECT IDENTIFIER ::=   {nf9000Mgmt 3}
            slotGroup       OBJECT IDENTIFIER ::=   {nf9000Mgmt 4}
            canisterGroup   OBJECT IDENTIFIER ::=   {nf9000Mgmt 5}
            systemGroup     OBJECT IDENTIFIER ::=   {nf9000Mgmt 6}
            coolingGroup    OBJECT IDENTIFIER ::=   {nf9000Mgmt 7}
40          powerGroup      OBJECT IDENTIFIER ::=   {nf9000Mgmt 8}
            cpuGroup        OBJECT IDENTIFIER ::=   {nf9000Mgmt 9}
            slotFanGroup    OBJECT IDENTIFIER ::=   {nf9000Mgmt 10}

--
45          --  THE TRAP GROUP defines traps.
            --
```

```
        trapCpu TRAP-TYPE
            ENTERPRISE trapGroup
            VARIABLES {
                    cpuNumber
            }
            DESCRIPTION
                "Indicates that the CPU identified by cpuNumber failed
                because of high temperature and/or low power."
            ::= 1
        trapSystemBoardFan TRAP-TYPE
            ENTERPRISE trapGroup
            VARIABLES {
                    coolingFanNumber
            }
            DESCRIPTION
                "Indicates that the speed of the system board fan identified
                by coolingFanNumber dropped below the minimum limit (see
                coolingFanMinSpeed)."
            ::= 2 trapTemperature TRAP-TYPE
            ENTERPRISE trapGroup
            VARIABLES {
                    coolingSensorNumber
            }
            DESCRIPTION
                "Indicates that the temperature sensor identified by cooling
                SensorNumber reported a 'normal' to 'warning' transition
                (i.e., temperature raised above the warning level).
                "
            ::= 3
        trapPowerSupply TRAP-TYPE
            ENTERPRISE trapGroup
            VARIABLES {
                    powerSupplyNumber
            }
            DESCRIPTION
                "Indicates one of the following conditions:
                1.  The power supply identified by powerSupplyNumber has
                    been extracted (NF9000-C only).
                2.  The power supply identified by powerSupplyNumber has
                    been    inserted    (NF9000-C    only).      Check
                    powerSupplyDcState   and   powerSupplyAcState    (if
                    applicable) for abnormal conditions.
                3.  The  AC  state  of  the  power  supply  identified  by
                    powerSupplyNumber is out of tolerance range (NF9000-C
                    only).
                4.  The  DC  state  of  the  power  supply  identified  by
                    powerSupplyNumber is out of tolerance range.
                5.  The  DC  state  of  the  power  supply  identified  by
                    powerSupplyNumber is reported as out of tolerance range
                    because the power supply is not present (NF9000-T
                    only).
                "
            ::= 4 trapCanister TRAP-TYPE
            ENTERPRISE trapGroup
            VARIABLES {
                    canisterNumber
            }
            DESCRIPTION
```

```
            "Indicates that the canister identified by canisterNumber
            has been either extracted or inserted."
        ::= 3 trapAdapter TRAP-TYPE
        ENTERPRISE trapGroup
        VARIABLES {
            adapterNumber
        }
        DESCRIPTION
            "Indicates that the adapter identified by adapterNumber or
            its driver is malfunctioning."
        ::= 6 trapSlotFan TRAP-TYPE
        ENTERPRISE trapGroup
        VARIABLES {
            slotFanNumber
        }
        DESCRIPTION
            "Indicates that the speed of the I/O slot fan identified by
            slotFanNumber   dropped    below    the    minimum     limit
            (slotFanMinSpeed)."
        ::= 7 trapCanisterFan TRAP-TYPE
        ENTERPRISE trapGroup
        VARIABLES {
            canisterName
        }
        DESCRIPTION
            "Indicates  that  the  speed  of  a  fan  in  the  canister
            identified by canisterName has dropped below the minimum
            limit (see canisterFanMinSpeed).
            "
        ::= 8

--
    -- THE ADAPTOR GROUP of objects provides information on the
    -- adapters in the system.
    --
    adapterTable OBJECT-TYPE
        SYNTAX SEQUENCE OF AdapterTableEntry
        ACCESS not-accessible
        STATUS mandatory
        DESCRIPTION
            "This table contains the description of all the adapters in
            the system."
        ::={adapterGroup 1} adapterTableEntry OBJECT-TYPE
            SYNTAX AdapterTableEntry
            ACCESS not-accessible
            STATUS mandatory
            DESCRIPTION
                "This entry contains the description of a hot-swappable
                adapter."
            INDEX {adapterNumber}
        ::={adapterTable 1}

AdapterTableEntry  ::= SEQUENCE {
                    adapterNumber   INTEGER,
                    adapterName  DisplayString,
                    adapterSupportHotSwapHotAdd INTEGER,
```

```
                adapterState INTEGER,
                adapterCommand INTEGER,
                adapterDriverNumber INTEGER,
                adapterBusNumber INTEGER,
                adapterDeviceNumber INTEGER,
                adapterFunctionNumber INTEGER,
                adapterVendorID INTEGER,
                adapterDeviceID INTEGER,
                adapterRevisionID INTEGER,
                adapterBaseClass INTEGER,
                adapterSubClass INTEGER,
                adapterProgrammingInterface INTEGER
        } adapterNumber OBJECT-TYPE
        SYNTAX INTEGER (1..100000)
        ACCESS read-only
        STATUS mandatory
        DESCRIPTION
            "Indicates the number of this adapter."
        ::= {adapterTableEntry 1} adapterName OBJECT-TYPE
        SYNTAX DisplayString (size(0..255))
        ACCESS read-only
        STATUS mandatory
        DESCRIPTION
            "Indicates the unique name of this adapter.  On Windows
            NT, it is available only for hot-swappable adapters."
        ::= {adapterTableEntry 2} adapterSupportsHotSwapHotAdd OBJECT-TYPE
        SYNTAX INTEGER {
                Yes(1),
                No(2)
        }
        ACCESS read-only
        STATUS mandatory
        DESCRIPTION
            "Indicates whether this adapter supports hot swap/hot
            add.
            "
        ::= {adapterTableEntry 3} adapterState OBJECT-TYPE
        SYNTAX INTEGER  {
                Unclaimed(1),
                Unknown(2),
                Failed(3),
                Active(4),
                Suspended(5)
        }
        ACCESS read-only
        STATUS mandatory
        DESCRIPTION
            "Indicates the current state of this adapter and/or its
            driver.

State      Meaning
            --------   ---------
            Unclaimed  No driver is loaded for this adapter, Unknown Two cases are possible:
```

```
                    1)  The adapter supports hot swap, and is not
                        responding to commands.
                    2)  The adapter does not support hot swap. Its
                        actual state cannot be determined.
          Failed    The driver or adapter is malfunctioning.
          Active    The  adapter  and  its  driver  are  working
                    normally.
          Suspended The operations on the adapter have been
                    suspended  by  a  SuspendOperations  or
                    ForceSuspendOperations command."
    ::= {adapterTableEntry 4} adapterCommand OBJECT-TYPE
    SYNTAX INTEGER  {
                Reset(3),
                SuspendOperations(4),
                ForceSuspendOperations(5)
                ResumeOperations(6)
    }
    ACCESS write-only
    STATUS mandatory
    DESCRIPTION
        "Indicates a command to be sent to the adapter.  In
        most cases, it is used for hot-swapping or hot-adding
        a card.

State                   Meaning

Reset                   Causes  the  adapter  to  re-
                                initialize    and    resume
                                operations.
        SuspendOperations       Suspends  all  operations  on
                                this adapter  in  preparation
                                for card swapping.
        ForceSuspendOperations  Forcefully    suspends    all
                                operations on this adapter in
                                preparation for card swap/add.
                                Must be used on the NF9000-C
                                when the canister containing
                                the  adapter  to  swap  (or
                                receiving the adapter to add)
                                contains also adapters that do
                                not support hot swap.  On the
                                NF9000-T it is identical to
                                SuspendOperations.
        ResumeOperations        Resumes the operations on this
                                adapter.   Implies the re-
                                initialization of the card.
    ::= {adapterTableEntry 5} adapterDriverNumber OBJECT-TYPE
    SYNTAX INTEGER
    ACCESS read-only
    STATUS mandatory
    DESCRIPTION
        "Indicates the number of the driver handling this
        adapter.  Can be used to index the driverTable."
    ::= {adapterTableEntry 6} adapterBusNumber OBJECT-TYPE
    SYNTAX INTEGER (0..255)
```

```
            ACCESS read-only
            STATUS mandatory
            DESCRIPTION
                "Indicates the bus number of this adapter."
            ::= {adapterTableEntry 7} adapterDeviceNumber OBJECT-TYPE
            SYNTAX INTEGER (0..31)
            ACCESS read-only
            STATUS mandatory
            DESCRIPTION
                "Indicates the device number of this adapter."
            ::= {adapterTableEntry 8} adapterFunctionNumber OBJECT-TYPE
            SYNTAX INTEGER (0..7)
            ACCESS read-only
            STATUS mandatory DESCRIPTION
                "Indicates the Function number of this adapter."
            ::= {adapterTableEntry 9} adapterVendorID OBJECT-TYPE
            SYNTAX INTEGER (0..65535)
            ACCESS read-only
            STATUS mandatory
            DESCRIPTION
                "Indicates the VendorID for this adapter."
            ::= {adapterTableEntry 10} adapterDeviceID OBJECT-TYPE
            SYNTAX INTEGER (0..65535)
            ACCESS read-only
            STATUS mandatory
            DESCRIPTION
                "Indicates the DeviceID code for this adapter."
            ::= {adapterTableEntry 11} adapterRevisionID OBJECT-TYPE
            SYNTAX INTEGER (0..65535)
            ACCESS read-only
            STATUS mandatory
            DESCRIPTION
                "Indicates the RevisionID code for this adapter."
            ::= {adapterTableEntry 12} adapterBaseClass OBJECT-TYPE
            SYNTAX INTEGER (0..255)
            ACCESS read-only
            STATUS mandatory
            DESCRIPTION
                "Indicates the Base Class code for this adapter."
            ::= {adapterTableEntry 13} adapterSubClass OBJECT-TYPE
            SYNTAX INTEGER (0..255)
            ACCESS read-only
            STATUS mandatory
            DESCRIPTION
                "Indicates the Sub Class code for this adapter."
            ::= {adapterTableEntry 14}
```

```
        adapterProgrammingInterface OBJECT-TYPE
            SYNTAX INTEGER (0..255)
            ACCESS read-only
            STATUS mandatory
            DESCRIPTION
                "Indicates the Programming Interface code for this
                adapter."
            ::= {adapterTableEntry 15}

--
        -- THE DRIVER GROUP of objects provides information on the drivers
        -- in the system.
        -- driverTable OBJECT-TYPE
            SYNTAX SEQUENCE of DriverTableEntry
            ACCESS not-accessible
            STATUS mandatory
            DESCRIPTION
                "This table contains information on drivers for hot-
                swappable adapters."
            ::= {driverGroup 1} driverTableEntry OBJECT-TYPE
            SYNTAX INTEGER {1..100000}
            ACCESS not-accessible
            STATUS mandatory
            DESCRIPTION
                "This entry contains the description of a driver."
            INDEX {driverNumber}
            ::= {driverTable 1}

DriverTableEntry ::= SEQUENCE {
                        driverNumber INTEGER,
                        driverName DisplayString,
                        driverVersion DisplayString,
        } driverNumber OBJECT-TYPE
            SYNTAX INTEGER (1..100000)
            ACCESS read-only
            STATUS mandatory
            DESCRIPTION
                "Indicates the number of this driver."
            ::= {driverTableEntry 1} driverName OBJECT-TYPE
            SYNTAX DisplayString (SIZE(0..255))
            ACCESS read-only
            STATUS mandatory
            DESCRIPTION
                "Indicates the unique name of this driver."
            ::= {driverTableEntry 2} driverVersion OBJECT-TYPE
            SYNTAX DisplayString (SIZE(0..255))
            ACCESS read-only
            STATUS mandatory
            DESCRIPTION
                "Indicates the version of this driver.  It may not
                be available for some drivers."
            ::= {driverTableEntry 3}
```

```
--
-- THE SLOT GROUP of objects provides information on the I/O
-- expansion slots
-- slotTable OBJECT-TYPE
    SYNTAX SEQUENCE of SlotTableEntry
    ACCESS not-accessible
    STATUS mandatory
    DESCRIPTION
        "This table describes the I/O expansion slots in the system.
        It is indexed by (slotgroup#, slot#) pairs."
    ::= {slotGroup 1} slotTableEntry OBJECT-TYPE
    SYNTAX SlotTableEntry
    ACCESS not-accessible
    STATUS mandatory
    DESCRIPTION
        "This entry describes a I/O expansion slot.  A slot is
        identified by the pair (slotgroup#, slot#).
    INDEX {slotGroupNumber, slotNumber}
    ::= {slotTable 1}

SlotTableEntry ::= SEQUENCE {
                    slotGroupNumber INTEGER,
                    slotNumber INTEGER,
                    slotBusNumber INTEGER,
                    slotDeviceNumber INTEGER,
                    slotAdapterPresence INTEGER,
                    slotLocation DisplayString,
} slotGroupNumber OBJECT-TYPE
        SYNTAX INTEGER (1..4)
        ACCESS read-only
        STATUS mandatory
        DESCRIPTION
            "Indicates the number of the slot group this slot
            belongs to.  On the NF9000-C, slotGroupNumber
            coincides with the canisterNumber and can be used
            as an index into the Canister Table."
    ::= {slotTableEntry 1} slotNumber OBJECT-TYPE
        SYNTAX INTEGER (1..8)
        ACCESS read-only
        STATUS mandatory
        DESCRIPTION
            "Indicates the unique logical number of an I/O
            expansion slot in the group identified by
            slotGroupNumber.  It has no relationship with the
            device number."
    ::= {slotTableEntry 2} slotBusNumber OBJECT-TYPE
        SYNTAX INTEGER (0..255)
        ACCESS read-only
        STATUS mandatory
        DESCRIPTION
            "Indicates an I/O expansion bus.  This number
            coincides with the corresponding physical bus
            number."
```

```
        ::= {slotTableEntry 3} slotDeviceNumber OBJECT-TYPE
        SYNTAX INTEGER (0..31)
        ACCESS read-only
        STATUS mandatory
        DESCRIPTION
            "Indicates a physical device number on the bus
            identified by slotBusNumber."
        ::= {slotTableEntry 4} slotAdapterPresence OBJECT-TYPE
        SYNTAX INTEGER  {
                        Present(1),
                        Absent(2)
        }
        ACCESS read-only
        STATUS mandatory
        DESCRIPTION
            "Indicates whether a card is present in this slot."
        ::= {slotTableEntry 5} slotPowerState OBJECT-TYPE
        SYNTAX INTEGER  {
                        On(1),
                        Off(2),
                        Unavailable(3)
        }
        ACCESS read-write
        STATUS mandatory
        DESCRIPTION
            "Indicates the PCI slot power state."
        ::= {slotTableEntry 6} slotLocation OBJECT-TYPE
        SYNTAX DisplayString (SIZE(0.255))
        ACCESS read-only
        STATUS mandatory
        DESCRIPTION
    "Indicates the location of an I/O expansion slot as follows:

NF9000-T:

slotGroupNumber slotNumber     slotLocation
        1            1    'First slot from the left, front view'
        1            2    'Second slot from the left, front view'
        1            3    'Third slot from the left, front view'
        1            4    'Fourth slot from the left, front view'
        1            5    'Fifth slot from the left, front view'
        1            6    'Sixth slot from the left, front view'
        1            7    'Seventh slot from the left, front view'
        1            8    'Eighth slot from the left, front view'

NF9000-C slotGroupNumber slotNumber   slotLocation
    1 or 3           1           'First slot from the top'
    1 or 3           2           'Second slot from the top'
    1 or 3           3           'Third slot from the top'
    1 or 3           4           'Fourth slot from the top'
    2 or 4           1           'First slot from the bottom'
    2 or 4           2           'Second slot from the bottom'
    2 or 4           3           'Third slot from the bottom'
    2 or 4           4           'Fourth slot from the bottom'
```

-27-

```
                    "
            ::= {slotTableEntry 7}

--
    --  THE CANISTER GROUP of objects provides information on the
    --      canisters.
    -- canisterMaximumNumberOfCanisters OBJECT-TYPE
        SYNTAX INTEGER (0..4)
        ACCESS read-only
        STATUS mandatory
        DESCRIPTION
            "Indicates the maximum number of canisters supported by this
            system."
        ::= {canisterGroup 1} canisterTable OBJECT-TYPE
        SYNTAX SEQUENCE OF CanisterTableEntry
        ACCESS not-accessible
        STATUS mandatory
        DESCRIPTION
            "This  table  describes  the  attributes  of  all  the
            canisters in the system."
        ::= {canisterGroup 2} canisterTableEntry OBJECT-TYPE
        SYNTAX CanisterTableEntry
        ACCESS not-accessible
        STATUS mandatory
        DESCRIPTION
            "Describes the attributes of a canister."
        INDEX {canisterNumber}
        ::= {canisterTable 1}

CanisterTableEntry ::= SEQUENCE {
                        canisterNumber INTEGER,
                        canisterName DisplayString,
                        canisterSerialNumber DisplayString,
                        canisterRevisionInfo DisplayString,
                        canisterDescription DisplayString,
                        canisterPowerState INTEGER,
                        canisterLocation DisplayString,
                        canisterFanMinSpeed INTEGER,
                        canisterFanSpeedSetting INTEGER,
                        canisterFan1Speed Gauge,
                        canisterFan1Fault INTEGER,
                        canisterFan2Speed, Gauge,
                        canisterFan2Fault INTEGER
        } canisterNumber OBJECT-TYPE
        SYNTAX INTEGER (1..4)
        ACCESS read-only
        STATUS mandatory
        DESCRIPTION
            "This canister number."
        ::= {canisterTableEntry 1} canisterNumber OBJECT-TYPE
        SYNTAX DisplayString (SIZE(1))
        ACCESS read-only
        STATUS mandatory
        DESCRIPTION
```

```
            "This canister name.  Can be A, B, C or D."
    ::= {canisterTableEntry 2}
    canisterSerialNumber OBJECT-TYPE
        SYNTAX DisplayString (SIZE(0..255))
        ACCESS read-only
        STATUS mandatory
        DESCRIPTION
            "Indicates this canister's serial number."
    ::= {canisterTableEntry 3} canisterRevisionInfo OBJECT-TYPE
    SYNTAX DisplayString 9SIZE(0..255))
    ACCESS read-only
    STATUS mandatory
    DESCRIPTION
        "Indicates the revision number and date of this canister's
        controller."
    ::= {canisterTableEntry 4} canisterDescription OBJECT-TYPE
    SYNTAX DisplayString (SIZE(0..255))
    ACCESS read-only
    STATUS mandatory
    DESCRIPTION
        "Describes this canister."
    ::= {canisterTableEntry 5} canisterPowerState OBJECT-TYPE
    SYNTAX INTEGER {
                On(1),
                Off(2)
    }
    ACCESS read-write
    STATUS mandatory
    DESCRIPTION
        "Indicates the state of this canister's power. This state
        can be changed to drive card or canister hot-swapping, and
        card hot-adding."
    ::= {canisterTableEntry 6} canisterLocation OBJECT-TYPE
    SYNTAX DisplayString (SIZE(0..255))
    ACCESS read-only
    STATUS mandatory
    DESCRIPTION
        "Describes the location of this canister.  The canister
        locations are as follows:

canisterName     canisterLocation

A            'Top left'
                B            'Top right'
                C            'Bottom left'
                D            'Bottom right'
        "
    ::= {canisterTableEntry 7} canisterFanMinSpeed OBJECT-TYPE
    SYNTAX INTEGER (0..255)
    ACCESS read-write
    STATUS mandatory
    DESCRIPTION
        "Indicates the minimum fan speed (in RPS-Revolutions Per
        Second) that causes a fault.  It applies to both fans."
```

-29-

```
                ::= {canisterTableEntry 8} canisterFanSpeedSetting OBJECT-TYPE
                SYNTAX INTEGER {
                            Low(1),
                            High(2)
                }
                ACCESS read-write
                STATUS mandatory
                DESCRIPTION
                    "Indicates the current fan speed setting.  Normally it is
                    low.  If high, it means that the speed of one or both fans
                    dropped below the low limit."
                ::= {canisterTableEntry 9} canisterFan1Speed OBJECT-TYPE
                SYNTAX Gauge
                ACCESS read-only
                STATUS mandatory
                DESCRIPTION
                    "Measured fan #1 speed in RPS (Revolutions Per Second)."
                ::= {canisterTableEntry 10} canisterFan1Fault OBJECT-TYPE
                SYNTAX INTEGER {
                            Yes(1),
                            No(2)
                }
                ACCESS read-only
                STATUS mandatory
                DESCRIPTION
                    "Indicates the current state of fan #1."
                ::= {canisterTableEntry 11} canisterFan2Speed OBJECT-TYPE
                SYNTAX Gauge
                ACCESS read-only
                STATUS mandatory
                DESCRIPTION
                    "Measured fan #2 speed in RPS (Revolutions Per Second)."
                ::= {canisterTableEntry 12} canisterFan2Fault OBJECT-TYPE
                SYNTAX INTEGER {
                            Yes(1),
                            No(2)
                }
                ACCESS read-only
                STATUS mandatory
                DESCRIPTION
                    "Indicates the current state of fan #2."
                ::= {canisterTableEntry 13}

--
            --  The System Group of objects provides general information on the
            --      system.
            --
            systemModel OBJECT-TYPE
                SYNTAX INTEGER {
                            NF9000C(1),
                            NF9000T(2)
                }
                ACCESS read-only
                STATUS mandatory
```

-30-

```
            DESCRIPTION
                "Indicates the current NetFRAME product. NF9000C is the
                Canister version, NF9000t is the Tower version."
            ::= { systemGroup 1 }
        systemBoardSerialNumber OBJECT-TYPE
            SYNTAX DisplayString (SIZE(0..255))
            ACCESS read-only
            STATUS mandatory
            DESCRIPTION
                "The serial number of the system board."
            ::= { systemGroup 2 } systemBackPlaneSerialNumber OBJECT-TYPE
            SYNTAX DisplayString (SIZE(0..255))
            ACCESS read-only
            STATUS mandatory
            DESCRIPTION
                "The serial number of the system board."
            ::= { systemGroup 2} systemBackPlaneSerialNumber OBJECT-TYPE
            SYNTAX DisplayString (SIZE(0..255))
            ACCESS read-only
            STATUS mandatory
            DESCRIPTION
                "The serial number of the system back plane."
            ::= { systemGroup 3 } systemBackPlaneControllerRevisionInfo OBJECT-TYPE
            SYNTAX DisplayString (SIZE(0..255))
            ACCESS read-only
            STATUS mandatory
            DESCRIPTION
            "The revision number and date of the system back plane
            controller."
            ::= { systemGroup 4 } systemBackPlaneControllerDescription OBJECT-TYPE
            SYNTAX DisplayString (SIZE(0..255))
            ACCESS read-only
            STATUS mandatory
            DESCRIPTION
                "Describes the system back plane controller."
            ::= { systemGroup 5 } systemControllerRevisionInfo OBJECT-TYPE
            SYNTAX DisplayString (SIZE(0..255))
            ACCESS read-only
            STATUS mandatory
            DESCRIPTION
                "The revision number and date of Wire Service's Controller
                A, which controls the DIMM detection, the system reset, the
                system board fans, and the LCD."
            ::= { systemGroup 6 } systemControllerADescription OBJECT-TYPE
            SYNTAX DisplayString (SIZE(0..255))
            ACCESS read-only
            STATUS mandatory
            DESCRIPTION
                "Describes the Wire Service's Controller A, which controls
                the DIMM detection, the system reset the system board fans,
                and the LCD."
```

```
                ::= { systemGroup 7 }
        systemControllerBRevisionInfo OBJECT-TYPE
            SYNTAX DisplayString (SIZE(0..255))
            ACCESS read-only
            STATUS mandatory
            DESCRIPTION
                "The revision number and date of Wire Service's Controller
                B, which controls the H/W interface between Wire Service and
                the Operating System."
            ::= { systemGroup 8 }
        systemControllerBDescription OBJECT-TYPE
            SYNTAX DisplayString (SIZE(0..255))
            ACCESS read-only
            STATUS mandatory
            DESCRIPTION
                "Describes Wire Service's Controller B, which controls the
                H/W interface between Wire Service and the Operating
                System."
            ::= { systemGroup 9 }
        systemLogControllerRevisionInfo OBJECT-TYPE
            SYNTAX DisplayString (SIZE(0..255))
            ACCESS read-only
            STATUS mandatory
            DESCRIPTION
                "The revision number and date of the Wire Service's System
                Log Controller."
            ::= { systemGroup 10 }
        systemLogControllerDescription OBJECT-TYPE
            SYNTAX DisplayString (SIZE(0..255))
            ACCESS read-only
            STATUS mandatory
            DESCRIPTION
                "Describes the Wire Service's System Log Controller."
            ::= { systemGroup 11 }
        systemLocalInterfaceControllerRevisionInfo OBJECT-TYPE
            SYNTAX DisplayString (SIZE(0..255))
            ACCESS read-only
            STATUS mandatory
            DESCRIPTION
                "The revision number and date of the Wire Service's Local
                Interface Controller."
            ::= { systemGroup 12 }
        systemLocalInterfaceControllerDescription OBJECT-TYPE
            SYNTAX DisplayString (SIZE(0..255))
            ACCESS read-only
            STATUS mandatory
            DESCRIPTION
                "Describes the Wire Service's Local Interface Controller."
            ::= { systemGroup 13 }
        systemRemoteInterfaceControllerRevisionInfo OBJECT-TYPE
            SYNTAX DisplayString (SIZE(0..255))
            ACCESS read-only
            STATUS mandatory
            DESCRIPTION
                "The revision number and date of the Wire Service's Remote
                Interface Controller."
            ::= { systemGroup 14 }
```

```
systemRemoteInterfaceControllerDescription OBJECT-TYPE
    SYNTAX DisplayString (SIZE(0..255))
    ACCESS read-only
    STATUS mandatory
    DESCRIPTION
        "Describes the Wire Service's Remote Interface Controller."
    ::= { systemGroup 15 } systemState OBJECT-TYPE
    SYNTAX INTEGER {
        OK(1),
        Faulted(2)
    }
    ACCESS read-only
    STATUS mandatory
    DESCRIPTION
        "Indicates the general system state.  If any fault is
        detected in the system, it reports 'Faulted.'  Note that
        this does not necessarily mean a fatal fault."
    ::= { systemGroup 16 } systemDateAndTime OBJECT-TYPE
    --
    -- The syntax "...SIZE(8..11)" may be used instead of the
    -- correct "...SIZE(8|11)" to support certain MIB compilers.
    -- The octet string size is either 8 or 11.
    --

SYNTAX OCTET STRING (SIZE(8..11))
    ACCESS read-only
    STATUS mandatory
    DESCRIPTION
        "Indicates the date and time on this system.

Field   Octets      Contents                    Range 1       1-2         year                        0..2100
        2       3           month                       1..12
        3       4           day                         1..31
        4       5           hour                        0..23
        5       6           minutes                     0..59
        6       7           seconds                     0..60
                            (use 60 for leap-second)
        7       8           deci-seconds                0..9
        8       9           direction from UTC          '+'/'-'
        9       10          hours from UTC              0..11
        10      11          minutes from UTC            0..59

Note that if only local time is known, then timezone
        information (fields 8-10) is not present."
    ::= { systemGroup 17 } systemMemorySize OBJECT-TYPE
    SYNTAX INTEGER
    ACCESS read-only
    STATUS mandatory
    DESCRIPTION
        "Indicates the total main memory size."
    ::= { systemGroup 18 } systemDimmTable OBJECT-TYPE
    SYNTAX SEQUENCE OF SystemDimmTableEntry
    ACCESS not-accessible
    STATUS mandatory
```

```
                DESCRIPTION
                    "Describes the type of DIMMs (Dual In-Line Memory Module)
                    in the system."
                ::= { systemGroup 19 } systemDimmTableEntry OBJECT-TYPE
                SYNTAX SystemDimmTableEntry
                ACCESS not-accessible
                STATUS mandatory
                DESCRIPTION
                    "Describes a DIMM."
                ::= { systemDimmTable 1 }

SystemDimmTableEntry ::= SEQUENCE {
                                    systemDimmNumber INTEGER,
                                    systemDimmCapacity INTEGER,
                                    systemDimmSpeed INTEGER,
                                    systemDimmDataAccessMode INTEGER
            } systemDimmNumber OBJECT-TYPE
                SYNTAX INTEGER (1..16)
                ACCESS read-only
                STATUS mandatory
                DESCRIPTION
                    "Indicates the logical number of this DIMM."
                ::= { systemDimmTableEntry 1 } systemDimmCapacity OBJECT-TYPE
                SYNTAX INTEGER
                ACCESS read-only
                STATUS mandatory
                DESCRIPTION
                    "Indicates the DIMM capacity in megabytes."
                ::= { systemDimmTableEntry 2 } systemDimmSpeed OBJECT-TYPE
                SYNTAX INTEGER (0..70)
                ACCESS read-only
                STATUS mandatory
                DESCRIPTION
                    "Indicates the DIMM speed in nanoseconds."
                ::= { systemDimmTableEntry 3 } systemDimmDataAccessMode OBJECT-TYPE
                SYNTAX INTEGER {
                            FastPage(1),
                            FastPageWithEDO(2)
                }
                ACCESS read-only
                STATUS mandatory
                DESCRIPTION
                    "Indicates the DIMM data access mode."
                ::= { systemDimmTableEntry 4 } systemOsName OBJECT-TYPE
            SYNTAX INTEGER {
                        WindowsNT(1),
                        Netware(2)
            }
            ACCESS read-only
            STATUS mandatory
            DESCRIPTION
                "Indicates the name of the server operating system."
```

```
            ::= { systemGroup 20 }
        systemLicense OBJECT-TYPE
            SYNTAX OCTET STRING (SIZE(1))
            ACCESS read-only
            STATUS mandatory
            DESCRIPTION
                "Indicates the type of liense currently active.

Octet No.   Value       Meaning
                1           0           Hot swap and hot add are not supported
                1           1           Hot swap and hot add are supported."
            ::= { systemGroup 21 }

--
        -- THE COOLING GROUP provides information on system board fans and
        -- temperature sensors.
        -- coolingFansGeneralFaulted OBJECT-TYPE
            SYNTAX INTEGER {
                            On(1),
                            Off(2)
            }
            ACCESS read-only
            STATUS mandatory
            DESCRIPTION
                "Indicates whether any one system board fan has failed."
            ::= { coolingGroup 1 } coolingFanMinSpeed OBJECT-TYPE
            SYNTAX INTEGER (0..255)
            ACCESS read-write
            STATUS mandatory
            DESCRIPTION
                "Indicates the minimum fan speed (in RPS-Revolutions Per
                Second) that causes a fault."
            ::= { coolingGroup 2 } coolingFanSpeedSetting OBJECT-TYPE
            SYNTAX INTEGER {
                            Low(1),
                            High(2)
            }
            ACCESS read-write
            STATUS mandatory
            DESCRIPTION
                "Indicates the current fan speed setting.  Normally it is
                low.  If High, it means that the speed of one or more fans
                dropped below the low limit."
            ::= { coolingGroup 3 } coolingMaximumNumberOfSystemFans OBJECT-TYPE
            SYNTAX INTEGER (1..6)
            ACCESS read-only
            STATUS mandatory
            DESCRIPTION
                "Indicates the maximum  number of system fans in this
                product."
            ::= { coolingGroup 4 } coolingFanTable OBJECT-TYPE
            SYNTAX SEQUENCE OF CoolingFanTableEntry
            ACCESS not-accessible
```

```
              STATUS mandatory
              DESCRIPTION
                  "Describes the programmable fans on the system board."
              ::= { coolingGroup 5 }
      coolingFanTableEntry OBJECT-TYPE
              SYNTAX CoolingFanTableEntry
              ACCESS not-accessible
              STATUS mandatory
              DESCRIPTION
                  "Describes a programmable fan."
              INDEX { coolingFanNumber }
              ::= { coolingFanTable 1 }

CoolingFanTableEntry ::= SEQUENCE {
                                          coolingFanNumber INTEGER,
                                          coolingFanSpeed Gauge,
                                          coolingFanFault INTEGER,
                                          coolingFanLocation DisplayString
              } coolingFanNumber OBJECT-TYPE
              SYNTAX INTEGER (1..6)
              ACCESS read-only
              STATUS mandatory
              DESCRIPTION
                  "Unique logical fan number within this system."
              ::= { coolingFanTableEntry 1 } coolingFanSpeed OBJECT-TYPE
              SYNTAX Gauge
              ACCESS read-only
              STATUS mandatory
              DESCRIPTION
                  "Measured fan speed in RPS (Revolutions Per Second)."
              ::= { coolingFanTableEntry 2 } coolingFanFault OBJECT-TYPE
              SYNTAX INTEGER {
                              Yes(1),
                              No(2)
              }
              ACCESS read-only
              STATUS mandatory
              DESCRIPTION
                  "Indicates the current state of this fan."
              ::= { coolingFanTableEntry 3 } coolingFanLocation OBJECT-TYPE
              SYNTAX DisplayString (SIZE(0..255))
              ACCESS read-only
              STATUS mandatory
              DESCRIPTION
                  "Indicates where this fan is located to allow the user to
                  physically reach it in case of malfunction."

The fan locations for the NF9000-C are as follows:

coolingFanNumber    coolingFanLocation
                  1                   'First from the right, rear view'
                  2                   'second from the right, rear view'
                  3                   'Third from the right, rear view'
                  4                   'Fourth from the right, rear view'
```

-36-

```
                    5                       'Fifth from the right, rear view'
                    6                       'Sixth from the right, rear view'

The fan locations for the NF9000-T are as follows:

coolingFanNumber    coolingFanLocation
                    1                       'First from the top, front view'
                    2                       'Second from the top, front view'
                    3                       'Third from the top, front view'
                    4                       'Fourth from the top, front view'
                    5                       'First from the top, rear view'
                    6                       'Second from the top, rear view'
                "
        ::= { coolingFanTableEntry 4 } coolingAlertTemperature OBJECT-TYPE
    SYNTAX INTEGER (0..255)
    ACCESS read-write
    STATUS mandatory
    DESCRIPTION
        "Indicates at which temperature Celsius the system should
        generate an alert.  Note that the alert is generated if any
        sensor detects this temperature or higher, regardless of its
        location."
    ::= { coolingGroup 6 } coolingShutdownTemperature OBJECT-TYPE
    SYNTAX INTEGER (0..255)
    ACCESS read-write
    STATUS mandatory
    DESCRIPTION
        "Indicates at which temperature Celsius the Wire Service
        should shut the system down.  Note that the shutdown is
        performed if any sensor detects this temperature, regardless
        of its location."
    ::= { coolingGroup 7 } coolingMaximumNumberOfTemperatureSensors OBJECT-TYPE
    SYNTAX INTEGER (1..5)
    ACCESS read-only
    STATUS mandatory
    DESCRIPTION
        "Indicates the maximum number of system temperature sensors
        in this product."
    ::= { coolingGroup 8 } coolingTemperatureSensorTable OBJECT-TYPE
    SYNTAX SEQUENCE OF CoolingTemperatureSensorTableEntry
    ACCESS not-accessible
    STATUS mandatory
    DESCRIPTION
        "Describes the state of the temperature sensors in the
        system."
    ::= { coolingGroup 9 } coolingTemperatureSensorTableEntry OBJECT-TYPE
    SYNTAX CoolingTemperatureSensorTableEntry
    ACCESS not-accessible
    STATUS mandatory
    DESCRIPTION
        "Describes the state of a temperature sensor."
    INDEX { coolingSensorNumber }
    ::= { coolingTemperatureSensorTable 1 }
```

-37-

```
CoolingTemperatureSensorTableEntry ::= SEQUENCE {
                                coolingSensorNumber INTEGER,
                                coolingSensorTemperature Gauge,
                                coolingSensorLocation DisplayString
} coolingSensorNumber OBJECT-TYPE
    SYNTAX INTEGER (1..5)
    ACCESS read-only
    STATUS mandatory
    DESCRIPTION
        "Unique logical temperature sensor number within this
system."
    ::= { coolingTemperatureSensorTableEntry 1 } coolingSensorTemperature OBJECT-TYPE
    SYNTAX Gauge
    ACCESS read-only
    STATUS mandatory
    DESCRIPTION
        "Indicates the temperature Celsius measured by this
    sensor."
    ::= { coolingTemperatureSensorTableEntry 2 } coolingSensorLocation OBJECT-TYPE
    SYNTAX DisplayString (SIZE(0..255))
    ACCESS read-only
    STATUS mandatory
    DESCRIPTION
        "Indicates where this sensor is located to allow the
        user to identify the physical area showing a
        temperature problem.  The sensor locations are as
        follows:

Sensor Number    Location on the NF9000-C
        1                'Component No. U15, on back plane'
        2                'Component No. U16, on back plane'
        3                'Component No. U69, on system board'
        4                'Component No. U68, on system board'
        5                'Component No. U67, on system board'

Sensor Number    Location on the NF9000-T
        1                'Component No. U15, on I/O board'
        2                'Component No. U16, on I/O board'
        3                'Component No. U69, on system board'
        4                'Component No. U68, on system board'
        5                'Component No. U67, on system board'
        "
    ::= { coolingTemperatureSensorTableEntry 3 }

--
-- THE POWER GROUP provides information on the power supplies.
--
powerSystemBoard5VoltLine OBJECT-TYPE
    SYNTAX INTEGER
    ACCESS read-only
    STATUS mandatory
    DESCRIPTION
        "Indicates the current voltage of the +5V power line
        multiplied by 100."
    ::= { powerGroup 1 } powerSystemBoard3_3VoltLine OBJECT-TYPE
    SYNTAX INTEGER
```

```
            ACCESS read-only
            STATUS mandatory
            DESCRIPTION
                "Indicates the current voltage of the +3.3V power line
                multiplied by 100."
        ::= { powerGroup 2 } powerSystemBoard12VoltLine OBJECT-TYPE
        SYNTAX INTEGER
        ACCESS read-only
        STATUS mandatory
        DESCRIPTION
            "Indicates the current voltage of the +12V power line
            multiplied by 100."
        ::= { powerGroup 3 } powerSystemBoardNeg12VoltLine OBJECT-TYPE
        SYNTAX INTEGER
        ACCESS read-only
        STATUS mandatory
        DESCRIPTION
            "Indicates the current voltage of the -12V power line
            multiplied by 100."
        ::= { powerGroup 4 } powerSwitch OBJECT-TYPE
        SYNTAX INTEGER {
                        On(1),
                        Off(2)
        }
        ACCESS read-write
        STATUS mandatory
        DESCRIPTION
            "Indicates the state of the main output from the power
            supplies.  Setting this switch to Off turns off the power
            to the entire system, except for the Wire Service."
        ::= { powerGroup 5 } powerSystemResetSwitch OBJECT-TYPE
        SYNTAX INTEGER {
                        Reset(3)
        }
        ACCESS write-only
        STATUS mandatory
        DESCRIPTION
            "Requests a system reset."
        ::= { powerGroup 6 } powerSupplyMaximumNumberOfPowerSupplies OBJECT-TYPE
        SYNTAX INTEGER (1..3)
        ACCESS read-only
        STATUS mandatory
        DESCRIPTION
            "Indicates the maximum number of power supplies supported
            by this system."
        ::= { powerGroup 7 } powerSupplyTable OBJECT-TYPE
        SYNTAX SEQUENCE OF PowerSupplyTableEntry
        ACCESS not-accessible
        STATUS mandatory
        DESCRIPTION
            "This table contains information on all the power supplies
            in the system."
```

```
        ::= { powerGroup 8 } powerSupplyTableEntry OBJECT-TYPE
        SYNTAX PowerSupplyTableEntry
        ACCESS not-accessible
        STATUS mandatory
        DESCRIPTION
            "Describes a power supply."
        INDEX { powerSupplyNumber }
        ::= { powerSupplyTable 1 }

PowerSupplyTableEntry ::= SEQUENCE {
                                        powerSupplyNumber INTEGER,
                                        powerSupplySerialNumber
                                        DisplayString,
                                        powerSupplyDcState INTEGER,
                                        powerSupplyAcState INTEGER,
                                        powerSupplyLocation DisplayString
    } powerSupplyNumber OBJECT-TYPE
        SYNTAX INTEGER (1..4)
        ACCESS read-only
        STATUS mandatory
        DESCRIPTION
            "Uniquely identifies this power supply within the
            system."
    ::= { powerSupplyTableEntry 1 } powerSupplySerialNumber OBJECT-TYPE
        SYNTAX DisplayString (SIZE(0..255))
        ACCESS read-only
        STATUS mandatory
        DESCRIPTION
            "Indicates the serial number of this power supply."
        ::= { powerSupplyTableEntry 2 } powerSupplyDcState OBJECT-TYPE
        SYNTAX INTEGER {
                    OK(1),
                    OutOfRange(2),
                    OutOfRangeOrAbsent(3)
    }
        ACCESS read-only
        STATUS mandatory
        DESCRIPTION
            "Indicates the state of the D/C power from this power
            supply.  The NF9000-C returns OK or OutOfRange, while
            the NF9000-T returns OK or OutOfRangeOrAbsent.  The
            latter value may indicate a failure or an absent power
            supply."
        ::= { powerSupplyTableEntry 3 } powerSupplyAcState OBJECT-TYPE
        SYNTAX INTEGER {
                            OK(1),
                            OutOfRange(2),
                            Unavailable(3)
    }
        ACCESS read-only
        STATUS mandatory
        DESCRIPTION
            "Indicates the state of the A/C power to this power
            supply."
```

-40-

```
            ::= { powerSupplyTableEntry 4 } powerSupplyLocation OBJECT-TYPE
        SYNTAX DisplayString (SIZE(0..255))
        ACCESS read-only
        STATUS mandatory
        DESCRIPTION
            "Describes the location of this power supply.  The
            power supply locations on the NF9000-C are as follows:
            'Top receptacle', 'Bottom receptacle.'

The power supply locations on the NF9000-T are as
    follows:
            'Bottom     receptacle,'    'Middle    receptacle,'    'Top
    receptacle'
            "
        ::= { powerSupplyTableEntry 5 }

--
-- THE CPU GROUP of objects provides information on the system
-- CPUs.
-- cpuBusToCoreRatio OBJECT-TYPE
    SYNTAX DisplayString (SIZE(1..6))
    ACCESS read-only
    STATUS mandatory
    DESCRIPTION
        "Indicates the Bus-to-CPU frequency ratio."

Ratio   CPU Speed (MHz)
        1/2     133
        1/3     200
        1/4     266
        2/5     166
        2/7     233
        "
    ::= { cpuGroup 1 } cpuClockFrequency OBJECT-TYPE
    SYNTAX INTEGER (133..266)
    ACCESS read-only
    STATUS mandatory
    DESCRIPTION
        "Indicates the CPU's clock frequency in MHz."
    ::= { cpuGroup 2 } cpuMaximumNumberOfCpus OBJECT-TYPE
    SYNTAX INTEGER (1..4)
    ACCESS read-only
    STATUS mandatory
    DESCRIPTION
        "Indicates the maximum number of CPUs supported by this
        system."
    ::= { cpuGroup 3 } cpuTable OBJECT-TYPE
    SYNTAX SEQUENCE OF CpuTableEntry
    ACCESS not-accessible
    STATUS mandatory
    DESCRIPTION
        "This table describes the CPU's attributes and state."
    ::= { cpuGroup 4 }
```

```
cpuTableEntry OBJECT-TYPE
    SYNTAX CpuTableEntry
    ACCESS not-accessible
    STATUS mandatory
    DESCRIPTION
        "Describes a CPU."
    INDEX { cpuNumber }
    ::= { cpuTable 1 }

CpuTableEntry ::= SEQUENCE {
                    cpuNumber INTEGER
                    cpuNumber INTEGER
    } cpuNumber OBJECT-TYPE
        SYNTAX INTEGER {1..4}
        ACCESS read-only
        STATUS mandatory
        DESCRIPTION
            "Indicates a unique CPU number in the system."
        ::= { cpuTableEntry 1 } cpuState OBJECT-TYPE
        SYNTAX INTEGER {
                    UnknownFailure(1),
                    Normal(2),
                    TemperatureFailure(3),
                    PowerFailure(4)
        }
        ACCESS read-only
        STATUS mandatory
        DESCRIPTION
            "Indicates whether this CPU has failed, and the cause
            of the failure."
        ::= { cpuTableEntry 2 }

--
-- THE SLOT FAN GROUP of objects provides information on the
-- NF9000-T I/O slot fans.  The slotFanTable is empty for the
-- NF9000-C.
-- slotFanMaximum NumberOfFans OBJECT-TYPE
    SYNTAX INTEGER (0..2)
    ACCESS read-only
    STATUS mandatory
    DESCRIPTION
        "Indicates the maximum number of I/O slot fans supported by
        this system.  The NF9000-C supports 0 I/O slot fans."
    ::= { slotFanGroup 1 } slotFanTable OBJECT-TYPE
    SYNTAX SEQUENCE OF SlotFanTableEntry
    ACCESS not-accessible
    STATUS mandatory
    DESCRIPTION
        "Describes the programmable fans on the system board."
    ::= { slotFanGroup 2 } slotFanTableEntry OBJECT-TYPE
        SYNTAX SlotFanTableEntry
        ACCESS not-accessible
        STATUS mandatory
        DESCRIPTION
```

```
            "Describes a programmable fan."
        INDEX { slotFanNumber }
        ::= { slotFanTable 1 }

SlotFanTableEntry ::= SEQUENCE {
                                    slotFanNumber INTEGER,
                                    slotFanMinSpeed INTEGER,
                                    slotFanSpeedSetting INTEGER,
                                    slotFanSpeed Gauge,
                                    slotFanFault INTEGER,
                                    slotFanLocation DisplayString
    }
    slotFanNumber OBJECT-TYPE
        SYNTAX INTEGER (1..2)
        ACCESS read-only
        STATUS mandatory
        DESCRIPTION
            "Indicates the number of this fan."
        ::= { slotFanTableEntry 1 } slotFanMinSpeed OBJECT-TYPE
        SYNTAX INTEGER (0..255)
        ACCESS read-write
        STATUS mandatory
        DESCRIPTION
            "Indicates the minimum fan 2 speed (in RPS-Revolutions
            Per Second) that causes a fault."
        ::= { slotFanTableEntry 2 } slotFanSpeedSetting OBJECT-TYPE
        SYNTAX INTEGER {
                        Low(1),
                        High(2)
        }
        ACCESS read-write
        STATUS mandatory
        DESCRIPTION
            "Indicates the current fan speed setting.  Normally it
            is low.  If High, it means that one of the other I/O
            slot fans speed is below the minimum limit."
        ::= { slotFanTableEntry 3 } slotFanSpeed OBJECT-TYPE
        SYNTAX Gauge
        ACCESS read-only
        STATUS mandatory
        DESCRIPTION
            "Measured this fan speed in RPS (Revolutions Per
            Second)."
        ::= { slotFanTableEntry 4 } slotFanFault OBJECT-TYPE
        SYNTAX INTEGER {
                        Yes(1),
                        No(2)
        }
        ACCESS read-only
        STATUS mandatory
        DESCRIPTION
            "Indicates the current state of this fan."
        ::= { slotFanTableEntry 5 } slotFanLocation OBJECT-TYPE
        SYNTAX DisplayString (SIZE(0..255))
```

```
            ACCESS read-only
            STATUS mandatory
            DESCRIPTION
                "Indicates where this fan is located to allow the user
                 to physically reach it in case of malfunction.
                 The fan locations are as follows (unchecked):

slotFanNumber    slotFanLocation
            1                'Front view of I/O board, first from the left'
            2                'Front view of I/O board, second from the left'
                             "
            ::= { slotFanTableEntry 6 }
END
```

MIBs thus specify variables hierarchically in groups, each group generally corresponding to a managed, network-based component that may be subject to software control or interrogation. Descriptions of exemplary groups of MIB variables follow:

The Trap Group

The trap group includes MIB variables corresponding to alerts to the network administrator. MIB Variables of the trap group facilitate alerts monitored by one or more software modules running on a server computer 204. Monitored alerts include, for example, CPU failure, fan failure, temperature warning, power supply failure, insertion/extraction of power supplies and canisters, adapter malfunctions, and I/O slot power changes.

The Adapter Group

The adapter group includes MIB variables representing adapters in a server computer 204. Each I/O card may have one or more adapters or multifunction cards. The adapters represented include those that support hot swap. The adapter group includes variables to control the state of an adapter to permit hot swap or hot add operations. Variables corresponding to configuration information for identifying each adapter are also included as are variables providing links to the slot and driver groups.

The Driver Group

The driver group includes MIB variables representing the device drivers associated with adapters. The MIB variables in the driver group represent the name and version of the device drivers. This group may also include variables identifying the location of loadable device driver files, variables identifying instructions for loading device drivers, and variables identifying instructions for configuring device drivers.

The Slot Group

The slot group includes MIB variables representing I/O expansion slots in a server computer 204. The MIB variables in the slot group represent the capability of various expansion slots to be powered off or on either individually or on a per canister basis (a canister is a device containing multiple expansion slots). Information on the availability (whether in a canister or currently occupied by a card) and power state of expansion slots is also represented by the MIB variables of this group.

The Canister Group

The canister group includes MIB variables representing canisters and their components. Each canister has multiple expansion slots. The canister group MIB variables represent information on each canister, including the respective name, serial number, revision number, type, power state, location, and fans.

The System Group

The system group includes MIB variables representing information related to the server computer 204. For example, serial numbers, description, and revision data for hardware components are represented by MIB variables in this group, as well as information about memory, system time and date.

The Cooling Group

The cooling group includes MIB variables representing the devices used to cool the server computer's 204 components. The MIB variables in this group include information about system board fans and temperature sensors.

The Power Group

The MIB variables in the power group represent information about power supplies (e.g., serial number, DC state, AC state, and location), physical power switches, the reset button, and voltage sensors on the system board.

The CPU Group

The cpu group includes MIB variables representing information about system CPUs such as clock frequency, bus-to-core ratio, as well as CPU state.

The Slot Fan Group

The MIB variables in the slot fan group represent information about I/O expansion slot cooling fans.

Software modules such as Maestro 208 and the SNMP extension agent 210 incorporate groups of MIB variables for use in managing network-based components. That incorporation process generally begins with designing a MIB and then compiling it to produce a binary MIB file.

Figure 4:
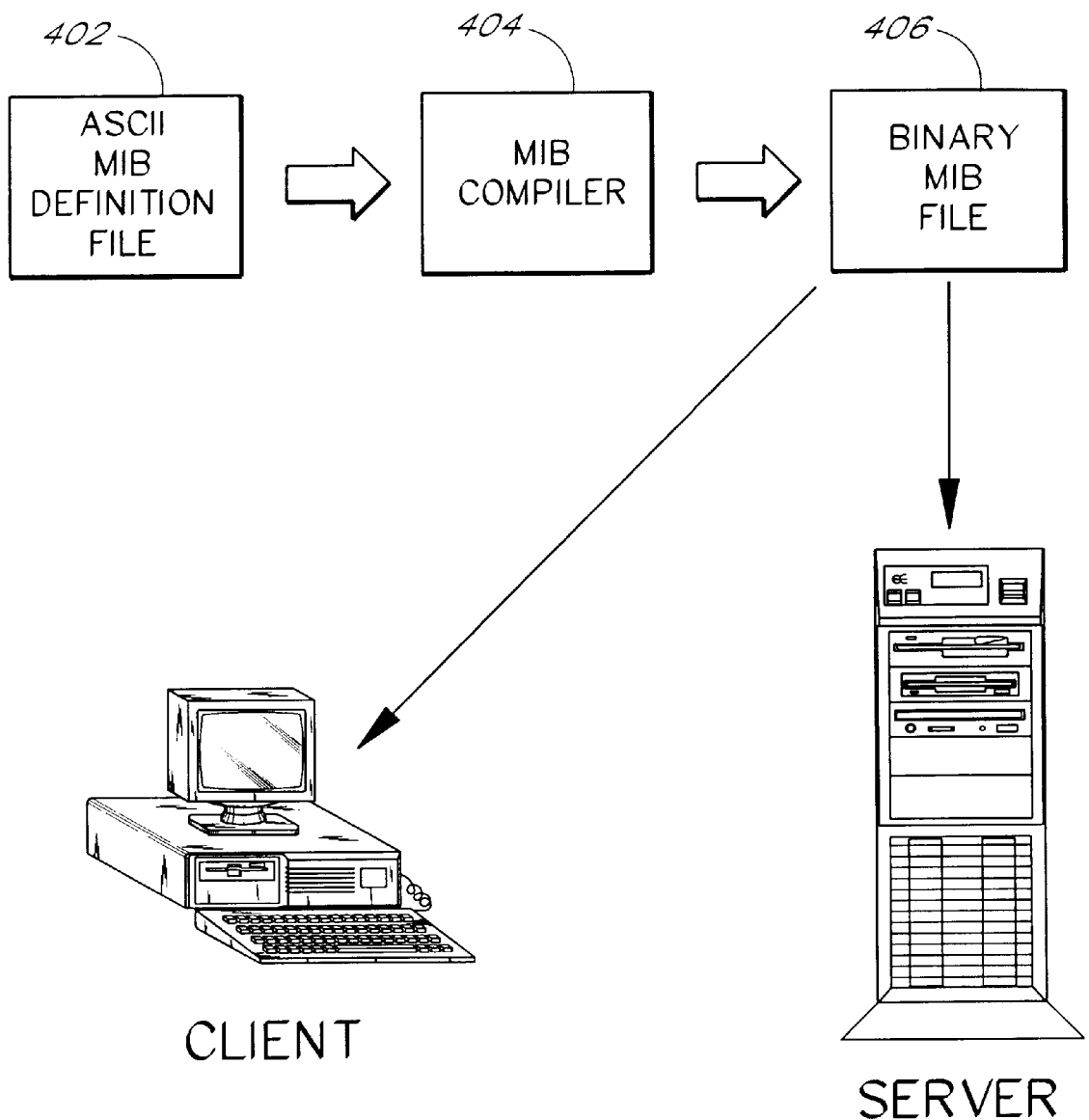
FIG. 4 illustrates a block diagram representing the process of compiling and distributing a MIB.

FIG. 4 represents a block diagram illustrating the process of creating and distributing a binary MIB file. After identifying a set of variables corresponding to characteristics, capabilities or states of network-based components which might need to be accessed, acquired or altered to perform desired management operations, a MIB designer generally prepares a MIB definition file 402 containing a formal, syntactically correct MIB specification (sometimes referred to as a MIB module). The MIB specification defines various attributes for each variable according to the ISO 8824 standard which provides generally that each variable have an OBJECT-TYPE identifier (or variable name), a SYNTAX specification (or data type such as integer, string, etc.), and an ACCESS descriptor (e.g., whether the variable may be written or is read-only).

The MIB designer inputs the MIB definition file (typically an ASCII text file) into a MIB compiler 404. MIB compilers are known in the art. Products such as IBM's NetView/ 6000™ or Hewlett-Packard's Openview Network Node Manager™ provide MIB compilers. The MIB compiler 404 reads and processes the ASCII MIB definition file 402 and produces a binary MIB file 406 as output. In one embodiment, the binary MIB file is called a "MIB.INI" file. A network administrator copies the binary MIB file 406 to local computer storage media such as a hard disk drive of each client computer 202 and server computer 204 attached to the network 200.

After one or more groups of MIB variables are defined (at least given names and data type specifications), a programmer may design a software module like Maestro 208 which can use the defined MIB variables to manage network-based components by forming SNMP requests including the MIB variables and sending those requests to managed components.

A programmer may also design a software module to be responsive to SNMP requests that are based on certain defined MIB variables. Generally, SNMP agent modules respond to SNMP requests using MIB variables fixed by standard. Software modules responsive to SNMP requests based on newly defined MIB variables are sometimes called SNMP extension agents which cooperate with an SNMP agent, the SNMP extension agent responding only to SNMP requests not processed by the SNMP agent.

Management software modules, like Maestro 208, generate and send SNMP requests, and agent software modules, like the SNMP extension agent 210, receive and respond to SNMP requests. The format of an SNMP request includes a request (or message) type (i.e., GET_REQUEST, GET_ NEXT_REQUEST, SET_REQUEST) and a variable/value pair.

The variable in the variable/value pair corresponds to a

MIB variable (which may be called an object identifier). The value in the variable/value pair represents storage space for a data value which may be ignored or may contain a value represented by the variable. In the case of a request of type GET_REQUEST or GET_NEXT_REQUEST, a management software module generally seeks information from a managed computer (or component or device), the specific information identified by the variable, and the value may be ignored when such a request is transmitted. The managed computer will ascertain the information sought, store the discovered information in the storage space for the value and send the response to the management software module.

In one embodiment, an example of a variable/value pair for an SNMP request of type GET_REQUEST is (1.3.6.1.4.1.837.2.4.1.1.6.2.1, 0). In this example, the variable represents the following node pathway: iso, org, dod, internet, private, enterprise, netframe, nf9000mgmt, slot-Group, slotTable, slotTableEntry, slotPowerState, slotGroupNumber2, slotNumber1. The value (the second member of the variable/value pair) is 0 on transmission, but the management software may expect the value to be supplied by an SNMP agent module running on the managed computer which sends to the management software a response message having a format similar to that of the request. In one embodiment, a management software module, like Maestro 208, may send the example SNMP request to a server computer to request the power state (whether power is supplied or not) of the first I/O expansion slot in the second group (or canister) of I/O expansion slots. In a corresponding response message, the same variable may be sent, along with a value=1 (e.g. power to the slot is ON) by an SNMP agent module to the management software module.

In the case of a request of type SET_REQUEST, the value represents an actual value to be assigned to some component or device indicated by the variable. In one embodiment, an example of a variable/value pair for an SNMP request of type SET_REQUEST is (1.3.6.1.4.1.837.2.4.1.1.6.2.1, 1). A management software module like Maestro 208 might send this example SNMP request to cause power to be supplied to the first expansion slot of the second expansion slot group. The value 1 corresponds to power state ON, and the request type, SET_REQUEST, indicates to receiving agent software, such as the SNMP extension agent 210, that the component identified by the variable is to be set according to the value (e.g., 1). Accordingly, the agent software takes steps to power the identified slot.

Generally, a programmer designs software functions or routines which request MIB variable information, or which use or acquire MIB variable information in communicating directly with hardware components, with system services, or with drivers. Those of ordinary skill in the art will appreciate that, in one embodiment, the MIB variables represented in a binary MIB file are exposed to programmer-designed modules or routines and that the routines are registered with an SNMP service.

Software modules designed and developed to use MIB variables can be written in a wide variety of programming languages, such as C, C++, or Pascal, and such software modules may or may not be arranged in an object-oriented format. The present invention is not limited by a programming language. Some MIB compilers assist the development of software modules using MIB variables by automatically generating skeletal outlines of software code, including data declarations corresponding to MIB variables, that will be needed to set or obtain values in a managed device. Those of ordinary skill will appreciate that, in one embodiment, an SNMP extension agent may be designed to respond to requests concerning particular MIB variable by generating, in C programming language terms, a large switch block which simply associates groups of programming language instructions with case statements corresponding to MIB variables. In this embodiment, program execution may efficiently branch based simply on MIB variables.

In the embodiment illustrated in FIG. 2, a MIB extended to define groups of variables for hot plug operations (a hot plug MIB) is compiled to generate a binary hot plug MIB file. The hot plug MIB includes hot plug group nodes: trapGroup node 312, adapterGroup node 314, driverGroup node 316, slotGroup node 318, and canisterGroup node 320. The binary hot plug MIB file exposes to Maestro 208 and to the SNMP extension agent 210 the variables within each hot plug group. The variables defined in the hot plug groups are described below.

Trap Information

While some hot plug operations are routine and preventive in nature, other hot plug operations are performed in response to failures or pending failures of components of the server computer 204. If and when alerted that a failure has occurred or is pending, a network administrator can quickly take action to learn the precise cause of the failure and then remedy the failure. The hot plug MIB variables defined in the trapGroup 312 provide information useful in identifying faulty components of a server computer 204.

The following diagram represents the hot plug MIB variables defined in the trapGroup 312.

| | trapGroup |
|---|---|
| 1 | trapCpu |
| 2 | trapSystemBoardFan |
| 3 | trapTemperature |
| 4 | trapPowerSupply |
| 5 | trapCanister |
| 6 | trapAdapter |
| 7 | trapSlotFan |
| 8 | trapCanisterFan |

The trapCpu variable reports the number of a failed CPU. This number can be used to index another variable (e.g., a cpuTable) to retrieve more information on the failed CPU.

The trapSystemBoardFan variable reports the number of a failed system Board fan, indicating that a fan speed dropped below the minimum limit allowed. The fan number represented by this variable can be used to index another variable (e.g. a coolingFanTable variable) to retrieve more information on the failed fan.

The trapTemperature variable reports the number of a temperature sensor that detected a "normal" to "warning" transition (i.e., the temperature raised above the threshold "warning" level which, in one embodiment, is defined by the variable coolingAlertTemperature in the Cooling Group).

The trapPowerSupply variable reports the number of a power supply that has been extracted/inserted or that has detected an AC/DC failure. In one embodiment, this number can be used to index another variable (e.g., a powerSupplyTable variable) to retrieve more information on the power supply that caused this trap.

The trapCanister variable reports the name of a canister that has been either extracted or inserted. The trapAdapter variable reports the number of an adapter that is malfunctioning. In one embodiment, this number can be used to index another variable (e.g., an adapterTable variable) to retrieve more information on the related adapter.

The trapSlotFan variable reports the number of an I/O slot fan that failed (i.e., dropped below a threshold minimum speed). The fan number represented by this variable can be used to index another variable (e.g., a slotFanTable variable) to retrieve more information on the failed fan.

The trapCanisterFan variable reports the name of a canister whose cooling system failed (i.e., the speed of at least one of the canister's fans dropped below the threshold minimum speed).

Adapter Information

In one embodiment, a hot plug MIB includes an adapterGroup node 314 which defines and groups variables used for performing hot plug operations involving adapters of the server computer 204. Certain information may be very useful in determining whether and how to perform hot plug operations on adapters.

For example, not all adapters support hot plug procedures. Thus, before performing a hot plug procedure on a particular adapter, it may be useful to determine whether the adapter supports a hot plug procedure. It may also be useful to determine the state of an adapter (e.g., failed, malfunctioning, working normally, or suspended) and also to identify the commands an adapter responds to (e.g., suspend, resume, reset, etc.). Also, identifying the physical bus connected to an adapter and which device driver is servicing an adapter may expedite hot plug operations on an adapter. Hot plug MIB variables of the adapter group conveniently represent that and other information and make such information easily accessible to software modules such as Maestro 208 and the SNMP extension agent 210 which control hot plug operations on adapters of a server computer 204.

The following diagram represents the hot plug MIB variables defined in the adapterGroup 314.

| | | | adapterGroup |
|---|---|---|---|
| 1 | adapterTable | | |
| | 1 | adapterTableEntry | |
| | | 1 | adapterNumber |
| | | 2 | adapterName |
| | | 3 | adapterSupportsHotSwapHotAdd |
| | | 4 | adapterState |
| | | 5 | adapterCommand |
| | | 6 | adapterDriverNumber |
| | | 7 | adapterBusNumber |
| | | 8 | adapterDeviceNumber |
| | | 9 | adapterFunctionNumber |
| | | 10 | adapterVendorId |
| | | 11 | adapterDeviceId |
| | | 12 | adapterRevisionId |
| | | 13 | adapterBaseClass |
| | | 14 | adapterSubClass |
| | | 15 | adapterProgrammingInterface |

The adapterTable variable describes all adapters in the server computer 204, while the adapterTableEntry variable describes each adapter. The adapterNumber variable provides a unique logical number of a particular adapter, and in each case may be an integer greater than one which serves as an index into the adapterTable.

The adapterName variable specifies a unique name of an adapter in a ASCII character string format (the string would be empty when a name is not available). The adapterSupportsHotSwapHotAdd is an integer variable indicating whether a particular adapter supports (if value=1) or does not support (if value=2) hot swap or hot add operations.

The adapterState variable, another integer variable, indicates the current state of a particular adapter (1=unclaimed (no driver loaded for the adapter), 2=unknown (adapter not responsive or does not support hot plug operations, in either case no commands should be sent to the adapter), 3=failed (driver or adapter is malfunctioning), 4=active (driver and adapter are working normally), 5=suspended (the adapter's operation has been suspended)).

The adapterCommand variable, also an integer, indicates the commands that may be sent to an adapter (1=reset (causes adapter to re-initialize and resume operations), 2=suspend (suspends operations of the adapter in preparation for hot add or hot swap), 3=forcesuspend (forcefully suspends operations of the adapter in preparation for hot add or hot swap), 4=resume (causes adapter to resume operations)).

The adapterDriverNumber variable indicates the logical number of the driver handling a particular adapter, and may be an integer useful for indexing into the driverTable to retrieve attributes of a driver. The adapterBusNumber indicates a bus number for a particular adapter and, in one embodiment, represents a physical PCI number.

The adapterDeviceNumber variable indicates a device number of a particular adapter and may, in one embodiment, represent a physical PCI device number. The adapterFunctionNumber variable provides a function number of a particular adapter and may represent a PCI function number in one embodiment. The adapterVendorID variable indicates a vendor identification code for a particular adapter which may comply with a PCI vendor identification format. The adapterDeviceID variable indicates a device identification code for a particular adapter which, in one embodiment, may represent a PCI device identification code.

The adapterRevisionID variable indicates a revision identification code for a particular adapter and, in one embodiment, may represent a PCI revision identification code. The adapterBaseClass variable identifies a Base Class code for a particular adapter and may, in one embodiment be a PCI Base Class code. The adapterSubClass variable identifies a Sub Class code for a particular adapter and may represent a PCI Sub Class code in one embodiment. The adapterProgrammingInterface variable represents a Programming Interface code for a particular adapter and, in one embodiment, represents a PCI programming Interface code.

It will be readily appreciated by those of ordinary skill in the art that differently named MIB variables having different value ranges may be used to represent information useful for performing hot plug operations on adapters in a server computer.

Driver Information

Device drivers govern the exchange of information (provide an interface) between some hardware components of a server computer and software modules running on the server computer. Device drivers may also poll (test or examine values or characteristics of) hardware, send commands to hardware, or set parameters affecting operation of hardware. In one embodiment, device drivers may suspend or resume their interaction with a hardware component and may be requested to do so during hot plug operations. Suspend and resume states of device drivers are described in greater detail in the U.S. patent application entitled "HOT ADD OF DEVICES SOFTWARE ARCHITECTURE" invented by Mehrdad Khalili, Mallik Arjunan Mahalingam, John Reed, and Walter Wallach, filed along with the present application on Oct. 1, 1997. Hot plug MIB variables in the driverGroup 316 include information useful for identifying a driver servicing a particular hardware component (e.g., an adapter in one embodiment).

The following diagram represents the hot plug MIB variables defined in the driverGroup 316 representing information about drivers useful in performing hot plug operations.

| | | driverGroup | |
|---|---|---|---|
| 1 | driverTable | | |
| | 1 | driverTableEntry | |
| | | 1 | driverNumber |
| | | 2 | driverName |
| | | 3 | driverVersion |

The driverTable variable describes attributes of device drivers servicing components which may be involved in hot plug operations performed on a server computer. The driverTable variable may be populated differently depending on an operating system. For example, under the Windows NT™ operating system, the table may include information for drivers servicing hardware components (e.g., adapters) which support hot plug operations.

The driverTableEntry variable contains attributes of particular device drivers, including driverNumber, driverName, and driverVersion. The driverNumber variable represents the unique logical number of a driver and, in one embodiment represents an integer value which can be used as an index into the driverTable variable. The driverName variable is an ASCII character string representing a unique name of a driver. The driverVersion variable identifies the version of a driver in the form of an ASCII string. Because different versions of device drivers may behave differently, it may be useful to identify the version number of a device driver servicing a hardware component (e.g., an adapter) to adjust interaction with the driver. It will be understood by those of ordinary skill that differently named MIB variables with different ranges of values may represent driver information useful to perform hot plug operations.

Slot Information

To perform hot plug operations on components (such as adapters) interacting with I/O expansion slots, various information about the expansion slots may be useful. For example, software modules such as Maestro 208 or the SNMP extension agent 210 which control hot plug operations related to expansion slots may favorably use information indicating whether an expansion slot is occupied (e.g., an adapter is inserted into the slot), whether power is being supplied to a slot, what value (numeric or otherwise) should be used to identify a slot, and which bus operations may be suspended during a hot plug operation involving a particular slot. Hot plug MIB variables in the slotGroup 318 represent that and other information about I/O expansion slots useful in performing hot plug operations on devices interacting with the expansion slots.

The following diagram represents the hot plug MIB variables defined in the slotGroup 318 representing information about I/O expansion slots useful in performing hot plug operations.

| | | slotGroup | |
|---|---|---|---|
| 1 | slotTable | | |
| | 1 | SlotTableEntry | |
| | | 1 | slotGroupNumber |
| | | 2 | slotNumber |
| | | 3 | slotBusNumber |
| | | 4 | slotDeviceNumber |
| | | 5 | slotAdapterPresence |

-continued

| | | slotGroup | |
|---|---|---|---|
| | | 6 | slotPowerState |
| | | 7 | slotLocation |

The slotTable variable describes all I/O expansion slots in a server computer 204. The slotTableEntry variable describes particular I/O expansion slots. In one embodiment, the slotTable defines information about PCI slots. A PCI slot may be identified by paired values corresponding to bus number and device number.

The slotGroupNumber variable (the first entry of the slotTableEntry variable) represents a group of slots to which a single slot may belong. In one embodiment, a server computer 204 has only one group of I/O expansion slots, and thus the slotGroupNumber may have a value of one. In another embodiment, a server computer may have groups of slots where each group corresponds to a canister and each canister has multiple (e.g., 4) I/O expansion slots. In such an embodiment, the slotGroupNumber identifies the canister (or group of I/O expansion slots) to which a slot belongs. The slotGroupNumber variable, in one embodiment, can also be used as an index into the canisterTable (described below).

The slotNumber variable indicates a logical slot number identifying a slot within a group of slots (e.g. a value of 3 may correspond to the third slot in a four-slot canister). The slotBusNumber variable represents a value identifying the bus on which a particular slot resides and, in one embodiment, may represent a physical PCI bus number. The slotDeviceNumber variable represents the device number of a particular slot and, in one embodiment, may represent the physical PCI device number.

The slotAdapterPresence variable indicates whether an adapter is present in a particular slot and, in one embodiment, the slotAdapterPresent variable is an integer (e.g., 1=card present in slot, 2=no card present in slot).

The slotPowerState variable indicates whether a particular slot has power. In one embodiment the slotPowerState variable is an integer (e.g., 1=power to slot is on, 2=power to slot is off, 3=unavailable (used for example when slots are grouped in canisters and the canisters, rather than the individual slots, are optionally powered)).

The slotLocation variable indicates the physical location of a particular I/O expansion slot, in one embodiment according to paired integer values corresponding respectively to slot group number and logical slot number (e.g., (2,4) identifies the fourth slot in the second group of slots). One of ordinary skill in the art will recognize that differently named MIB variables having ranges of values differing from those described above may represent information about I/O expansion slots useful in performing hot plug operations.

Canister Information

The canisterGroup node 320 defines hot plug MIB variables representing information useful in performing hot plug operations on server computers which organize I/O expansion slots into canisters such that each canister contains multiple I/O expansion slots. The canisterGroup 320 hot plug MIB variables include information describing, for example, the maximum number of canisters in a server computer, the name of a canister (corresponding to a name which may visibly and readably appear on the canister), the power state of the canister (which generally supplies power to all hardware components, such as adapters, occupying slots of the canister), and the physical location of the canister.

The following diagram represents the hot plug MIB variables defined in the canisterGroup 320 representing information about canisters holding multiple I/O expansion slots, such information being useful in performing hot plug operations involving hardware components connected to the expansion slots.

| | | canisterGroup |
|---|---|---|
| 1 | canisterMaximumNumberOfCanisters | |
| 2 | canisterTable | |
| | 1 | canisterTableEntry |
| | | 1 canisterNumber |
| | | 2 canisterName |
| | | 3 canisterSerialNumber |
| | | 4 canisterRevisionInfo |
| | | 5 canisterDescription |
| | | 6 canisterPowerState |
| | | 7 canisterLocation |
| | | 8 canisterFanMinSpeed |
| | | 9 canisterFanSpeedSetting |
| | | 10 canisterFan1Speed |
| | | 11 canisterFan1Fault |
| | | 12 canisterFan2Speed |
| | | 13 canisterFan2Fault |

The canisterMaximumNumberOfCanisters variable indicates the maximum number of canisters supported by a system. In one embodiment, a server computer can hold at most four canisters while, in another embodiment, a server computer has no (0) canisters.

The canisterTable variable describes the attributes of all the canisters in the system, while the canisterTableEntry variable describes a particular canister. The canisterNumber variable represents a unique number (e.g., an integer) identifying a canister. The canisterName variable comprises an ASCII character string identifying a canister (e.g., "A" or "B"). The canisterSerialNumber variable represents the serial number of a canister.

The canisterRevisionInformation variable indicates the revision number and date of the canister's controller. The canisterDescription variable provides an ASCII character string containing a short description of a canister. The canisterPowerState variable indicates whether the canister has power (e.g., an integer value where 1=canister has power, 2=canister has no power).

The canisterLocation variable describes the physical location of a canister. For example, in one embodiment wherein the canisters are located in quadrants, "A" denotes the top left canister location, "B" denotes the top right canister location, "C" denotes the bottom left canister location, and "D" denotes the bottom right canister location.

The canisterFanMinSpeed variable represents a minimum fan speed in revolutions per second below which a fault condition occurs. The canisterFanSpeedSetting variable indicates the current fan speed in revolutions per second. In one embodiment, the canisterFanSpeedSetting is an integer where 1=low speed and 2=high speed.

In an embodiment where each canister of a server computer contains two cooling fans, the canisterFanOneSpeed variable represents the current speed of fan number one in revolutions per second. The canisterFanOneFault variable indicates the current state of fan number one (e.g., 1=fan faulted, 2=fan OK). Like the canisterFanOneSpeed variable, the canisterFanTwoSpeed variable represents the current speed of fan number two in revolutions per second. The canisterFanTwoFault variable indicates whether fan number two is operating or has faulted. One of ordinary skill will understand that hot plug MIB variables which represent information about canisters useful in hot plug operations may have names or value ranges different r=from the canister hot plug MIB variables defined above. Moreover, one of ordinary skill will recognize that many techniques exist for defining and grouping variables and that the present invention is not limited by a MIB or the MIB format.

Figure 5:
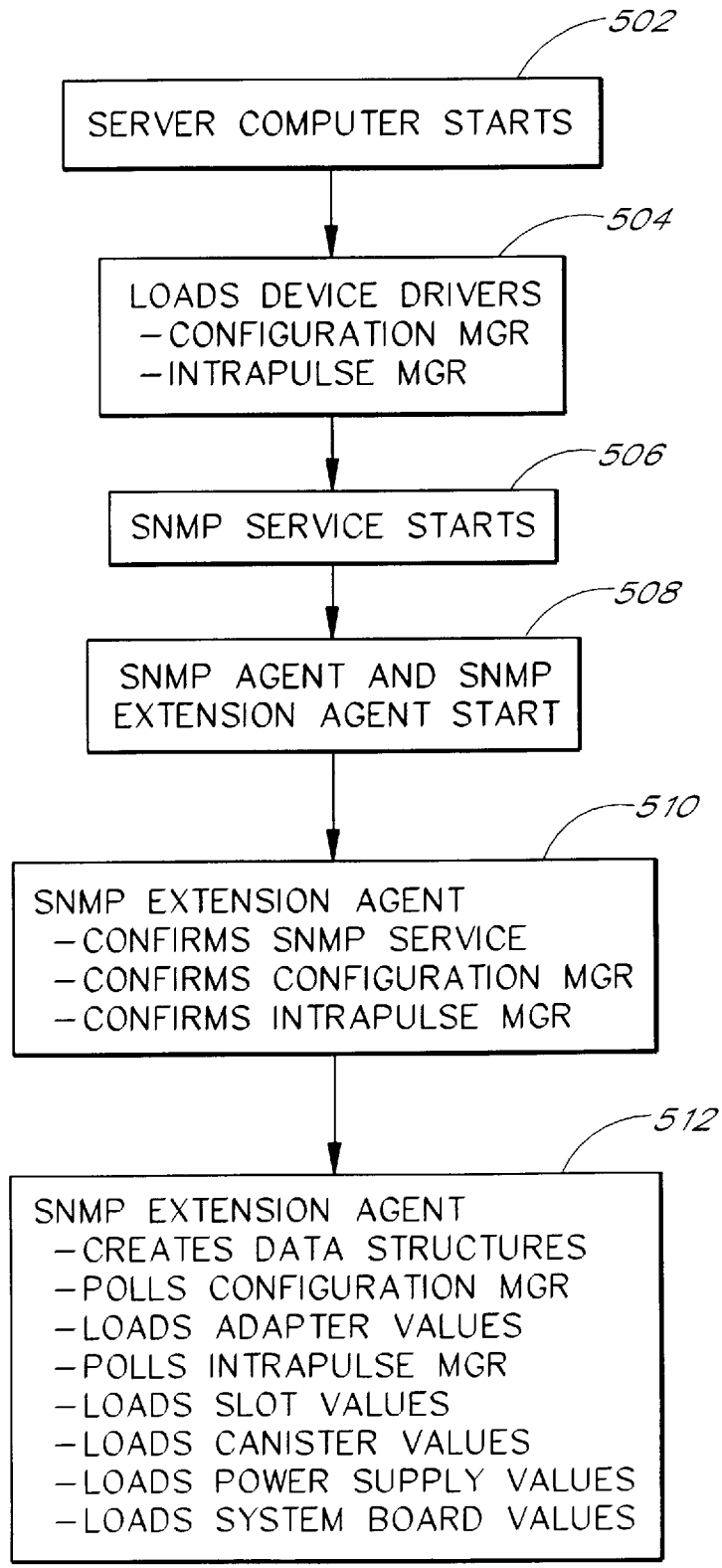
FIG. 5 illustrates one sequence of steps performed to acquire hot plug MIB variables for a server computer.

FIG. 5 illustrates steps to create hot plug MIB variables 214 maintained by the SNMP extension agent 210. In a first step 502, the server computer 204 starts. The server computer 204 is typically started (powered on) by a network administrator.

In another step 504, the operating system software running on the server computer 204 loads device drivers, including configuration manager 218 and Intrapulse manager 220. In a further step 506, SNMP service starts. In a still further step 508, SNMP agent 209 and SNMP extension agent 210 start.

In a step 510, the SNMP extension agent 210 confirms that the SNMP service is running on the server computer 204. In the step 510, the SNMP extension agent also confirms that the configuration manager 218 and Intrapulse manager 220 are also running on the server computer 204. In one embodiment, if any of the SNMP service, the configuration manager 218 or the Intrapulse manager 220 are not running, the SNMP extension agent will cause a message to be displayed warning a network administrator that the SNMP extension agent 210 has detected that certain other software is not running (the message may also indicate the name of the software module), the message may also suggest that the network administrator load or start a software module.

In a further step 512, the SNMP extension agent 210 creates data structures corresponding to hot plug MIB variables 214. Initially, the data structures are not populated with values corresponding to hot plug MIB variables. The SNMP extension agent 210 calls the configuration manager 218 requesting adapter and driver data. The configuration manager which, in one embodiment, communicates with the BIOS (basic input/output system) of the server computer 204, polls the adapters in the server computer 204 and determines associated drivers and provides to the SNMP extension agent 210 data values relating to adapters and drivers in the server computer 204. In the step 512, the SNMP extension agent 210 loads the adapter and driver values received from the configuration manager 218 into the data structures created earlier.

The SNMP extension agent 210, in the step 512, calls the Intrapulse manager 220 requesting information about I/O expansion slots, canisters, power supplies, and system boards. The Intrapulse manager 220 which, in one embodiment, communicates with the BIOS of the server computer 204, polls the slots, canisters, power supplies and system boards of the server computer 204 and provides to the SNMP extension agent 210 data values corresponding to each of those components. The SNMP extension agent 210 then loads the I/O expansion slot data, the canister data, the power supply data, and the system board data into the data structures. Thus the SNMP extension agent 210 acquires hot plug MIB variables 214 shortly after the server computer 204 starts. One of ordinary skill will recognize that the SNMP extension agent 210 may call device drivers differing from those described above to request information related to hot plug MIB variables and will also recognize that such device drivers may poll hardware components differing from those described above. The present invention is thus not limited by device drivers or polled hardware components.

Maestro 208 maintains hot plug MIB variables 212 by periodically executing a retrieve_data routine. In one embodiment, a software timer provided by an operating system produces a timer event at a predetermined time interval. Such software timers are known in the art and the present invention is not limited by a software timer. The retrieve_data routine responds to the timer event by executing. Thus, the retrieve_data routine may execute at predetermined time intervals. The retrieve_data routine generates and sends SNMP requests (e.g., requests of type GET_REQUEST or GET_NEXT_REQUEST specifying particular hot plug MIB variables) over the network 200 to the server computer 204. In one embodiment, each request generated and sent by the retrieve_data routine seeks one MIB variable value. The SNMP extension agent 210 receives the requests, polls or queries the components identified by MIB variables in the requests, and sends response messages to the client computer 102. In one embodiment, each response message includes the value of one MIB variable. Maestro 208 receives the requests and updates the hot plug MIB variables 212.

By executing the retrieve_data routine at predetermined time intervals, Maestro 208 ensures that the hot plug MIB variables 212 are current. One of ordinary skill in the art will appreciate, however, that the degree to which the hot plug MIB variables 212 are current relates to the time interval between executing the retrieve_data routine. In one embodiment, the time interval may be changed by a user.

In another embodiment, the retrieve_data routine runs on the server computer 204 and executes periodically to refresh the hot plug MIB variables 214 stored in computer readable media on the server computer 204. Moreover, at periodic intervals, a broadcast_hot_plug_MIB_data routine periodically executes on the server computer 204. The broadcast_hot_plug_MIB_data routine causes hot plug MIB variable data to be refreshed on client computers. In one embodiment, SNMP agent software running on a server computer 204 periodically generates a TRAP_Hot_Plug_Variables message. In another embodiment, SNMP agent software generates a TRAP_Hot_Plug_Variable message in response to configuration changes affecting the components of a server computer 204. While TRAP requests typically correspond to alert conditions, the SNMP agent software generates a TRAP_Hot_Plug_Variable message to signal a refresh event for hot plug MIB variables. In this embodiment, the SNMP agent software sends the TRAP_Hot_Plug_Variable message to one or more client computers. A client computer receives the TRAP_Hot_Plug_Variable request and, in response, executes the retrieve_data routine to refresh the hot plug MIB variables 212.

In an alternative embodiment, a management software module runs on the server computer 204 and issues an execute retrieve request to one or more client computers, requesting that the client computer 202 execute a retrieve_data routine. An SNMP agent module on the client computer receives the execute retrieve request and executes the retrieve_data routine on the client computer. The retrieve_data routine retrieves and stores hot plug MIB variables 212 as described above. Those of ordinary skill in the art will appreciate that other methods exist for periodically broadcasting hot plug MIB variable data from a server computer 204 to a client computer 202.

In still another embodiment, the network administrator directs Maestro 208 to execute the retrieve_data routine. It will be appreciated by those of ordinary skill that manual executions of the retrieve_data routine may be combined with timed execution of the retrieve_data routine.

Figure 6:
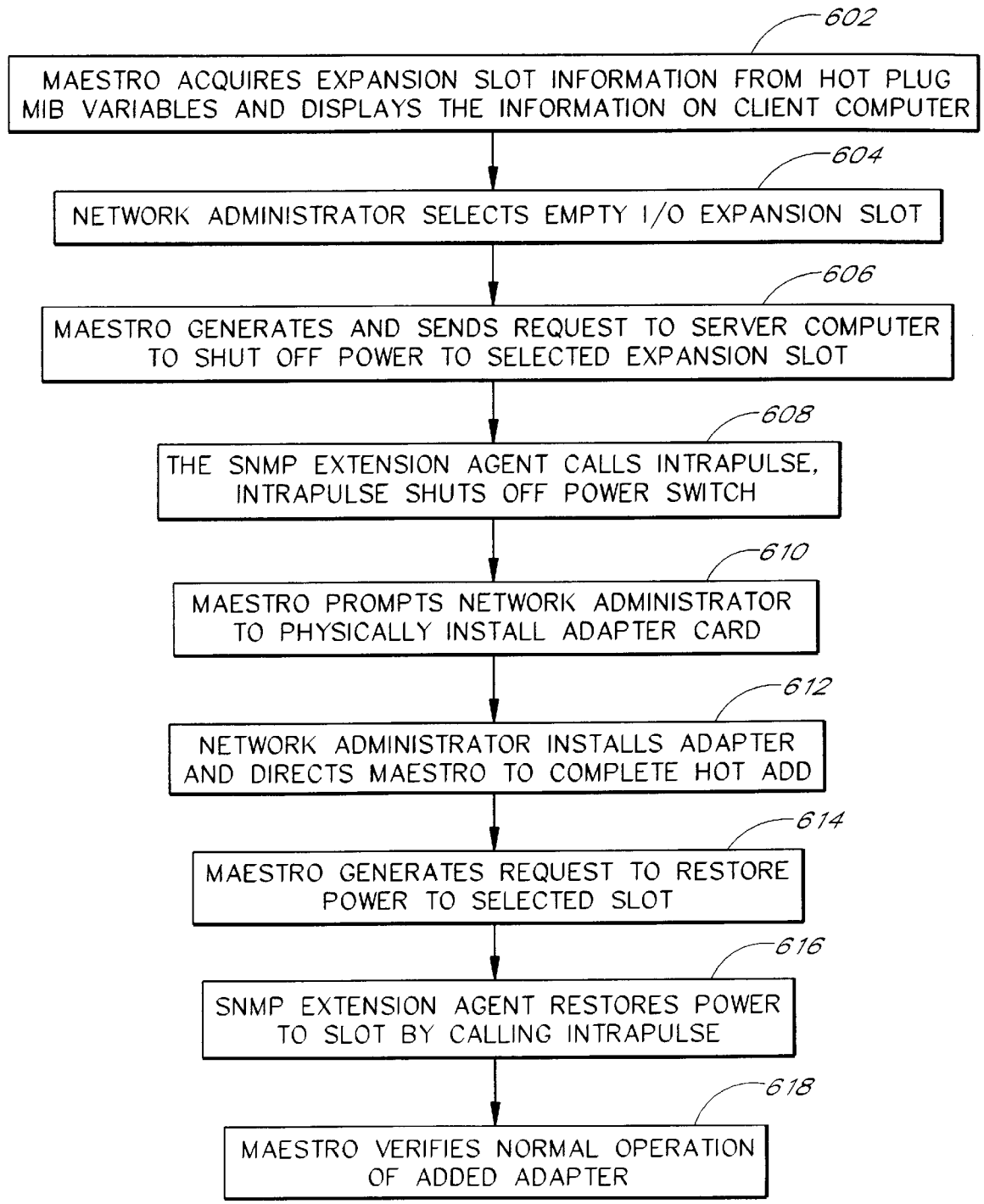
FIG. 6 illustrates one sequence of steps performed to hot plug an adapter to a server computer.

FIG. 6 illustrates steps performed in hot adding an adapter card to an I/O expansion slot of a server computer 204 which does not use canisters. In a first step 602, Maestro 208 accesses I/O expansion slot information from the hot plug MIB variables 212 and displays information identifying empty expansion slots (i.e., expansion slots currently not holding an adapter card or other device) to a network administrator on a computer monitor of the client computer 202. The displayed expansion slot information corresponds to the current configuration of the server computer 204.

Figure 7:
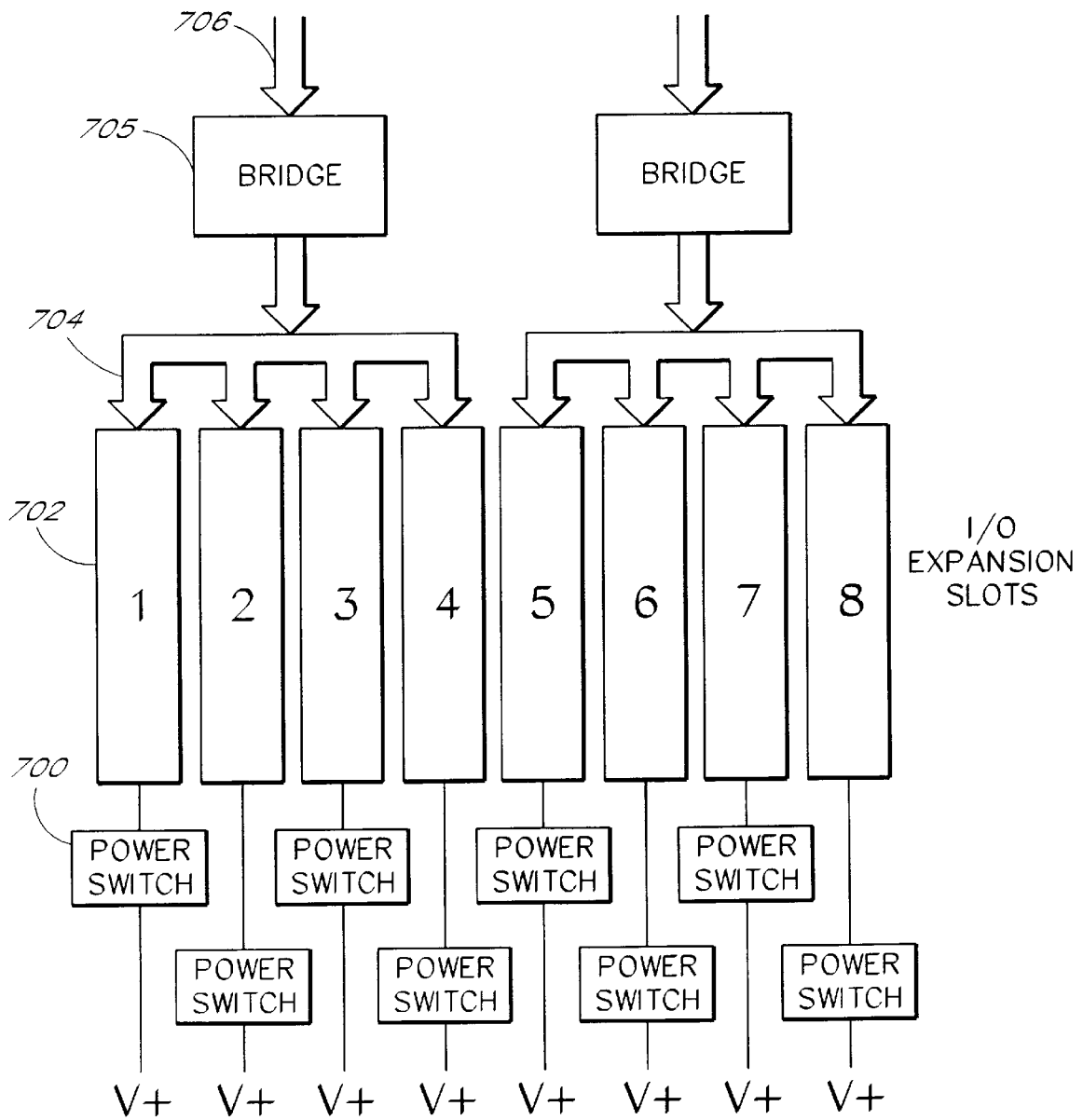
FIG. 7 illustrates an I/O expansion slot arrangement and bus configuration of a server computer.

FIG. 7 illustrates an I/O expansion slot arrangement and bus configuration for the server computer 204. The server computer 204 has eight I/O expansion slots 702. Each I/O expansion slot 702 connects to a slot bus 704 which connects through a bridge 705 to a main bus 706. A power switch 700 regulates voltage provided to each I/O expansion slot 702.

As shown in FIG. 7, one embodiment assigns to each I/O expansion slot 702 a unique number from 1–8. Thus, each I/O expansion slot 702 is uniquely identified to permit software, firmware, or a network administrator to unambiguously direct commands or queries to a desired I/O expansion slot 702. The SNMP extension agent 210 may direct commands or queries to an I/O expansion slot 702.

A software module, including the SNMP extension agent 210, may also control the power switch 700 by issuing power down or power up commands to the switch respectively causing the power switch 700 to start or stop providing voltage to the I/O expansion slot 702. Alternatively, a manual switch may control the power to each slot.

Each I/O expansion slot 702 may accept a card or adapter. The card or adapter may comprise any type of computer adapter. In one embodiment, an I/O expansion slot 702 accepts a device control card (e.g., a SCSI adapter). In another embodiment, the I/O expansion slot 702 accepts a network communication card (e.g., an ethernet adapter card).

The slot bus 704 channels the input and output of data to and from an adapter card in the I/O expansion slot 702. In one embodiment, the slot bus 704 is configured to operate under the PCI (peripheral component interconnect) standard. However, the present invention is not limited by any bus.

In a step 604 (See FIG. 6), the network administrator views the displayed information regarding empty I/O expansion slots and selects an empty I/O expansion slot 702 in which to hot add an adapter card. The network administrator then directs Maestro 208 to initiate the hot add operation. In a further step 606, Maestro 208 uses the slotPowerState MIB variable to generate an SNMP request (or simply request) of the type SET_REQUEST to shut off the power to the selected slot. In one embodiment, the request includes the MIB variable of 1.3.6.1.4.1.837.2.4.1.1.6.1.3 (referencing the power state of the third I/O expansion slot of the first (and only) group of eight slots) and the value of 2 (power state: OFF) to request that power be shut off to the third I/O expansion slot of the server computer 204. In the step 606, Maestro issues the request to the server computer 204 over the network 200.

In a further step 608, the SNMP extension agent 210 receives the request to shut off power to the selected I/O expansion slot. The SNMP extension agent calls the Intrapulse manager 220 and passes to it a parameter identifying the selected slot and a value corresponding to the desired power state (i.e., shut off power). The Intrapulse manager 200 accesses memory reserved for the selected slot (in one embodiment, reserved memory is accessed using a fixed base address plus an offset indicated by the passed identification parameter), and the Intrapulse manager 200 alters the value of a register in the accessed memory area, the alteration causing a power switch 700 connected to the selected I/O expansion slot to shut off power to the slot. The Intrapulse manager 220 returns a completion code to the SNMP extension agent 210 which, in turn, transmits a completion response message to the client computer 202.

In still a further step 610, Maestro receives the completion response message and prompts the network administrator (e.g., by displaying a message on the monitor of the client computer) to physically install the adapter in the selected I/O expansion slot of the server computer 204. In a next step 612, the network administrator installs the adapter card in the selected I/O expansion slot. The network administrator loads and configures a device driver to service the added adapter if such a driver is not already loaded and configured on the server computer 204. In another embodiment, the MIB variables include information matching a device driver to the added adapter as well as information to load and to configure the device driver, thus permitting Maestro 208, rather than the network administrator, to load and configure a device driver to service the added adapter. The network administrator then directs Maestro 208 to complete the hot add operation (e.g., by using a mouse to click a command button displayed by Maestro 208 and labelled "OK" or "Next").

In a step 614, Maestro generates a request to restore power to the selected slot, the request including, in one embodiment, the MIB variable 1.3.6.1.4.1.837.2.4.1.1.6.1.3 (again referencing the power state of the third I/O expansion slot of the first group of eight slots) and the value of 1 (power state: ON) to request that power be resumed to the third I/O expansion slot of the server computer 204. Maestro 208 sends the request over the network 200 to the server computer 204.

In another step 616, the SNMP extension agent 210 receives the request to restore power to the I/O expansion slot and calls the Intrapulse manager 220 passing it parameters identifying the slot and the desired power state. Intrapulse manager 220 alters the appropriate register, restoring power to the slot. The SNMP extension agent 210 generates a completion response message and sends it to the client computer 202.

In a step 618, Maestro 208 executes the retrieve_data routine to update the hot plug MIB variables. After the retrieve_data routine finishes, Maestro 208 examines the hot plug MIB variable adapterState (now updated and stored locally in computer readable media of the client computer 102) to verify that the added adapter and its driver are operating normally. In one embodiment, the adapterState variable is 1.3.6.1.4.1.837.2.2.1.1.4.3 (referencing the state of the adapter and driver for adapter number 3). The value corresponding to this variable may indicate that the adapter and its device driver are operating normally (e.g., value=4) whereupon Maestro 208 notifies the network administrator that the hot add operation completed successfully. If the value corresponding to the adapterState variable indicates other than successful completion, Maestro 208 notifies the network administrator that the hot add operation was not successful. The network administrator can take remedial action, including performing a hot swap operation as described below.

Figure 8:
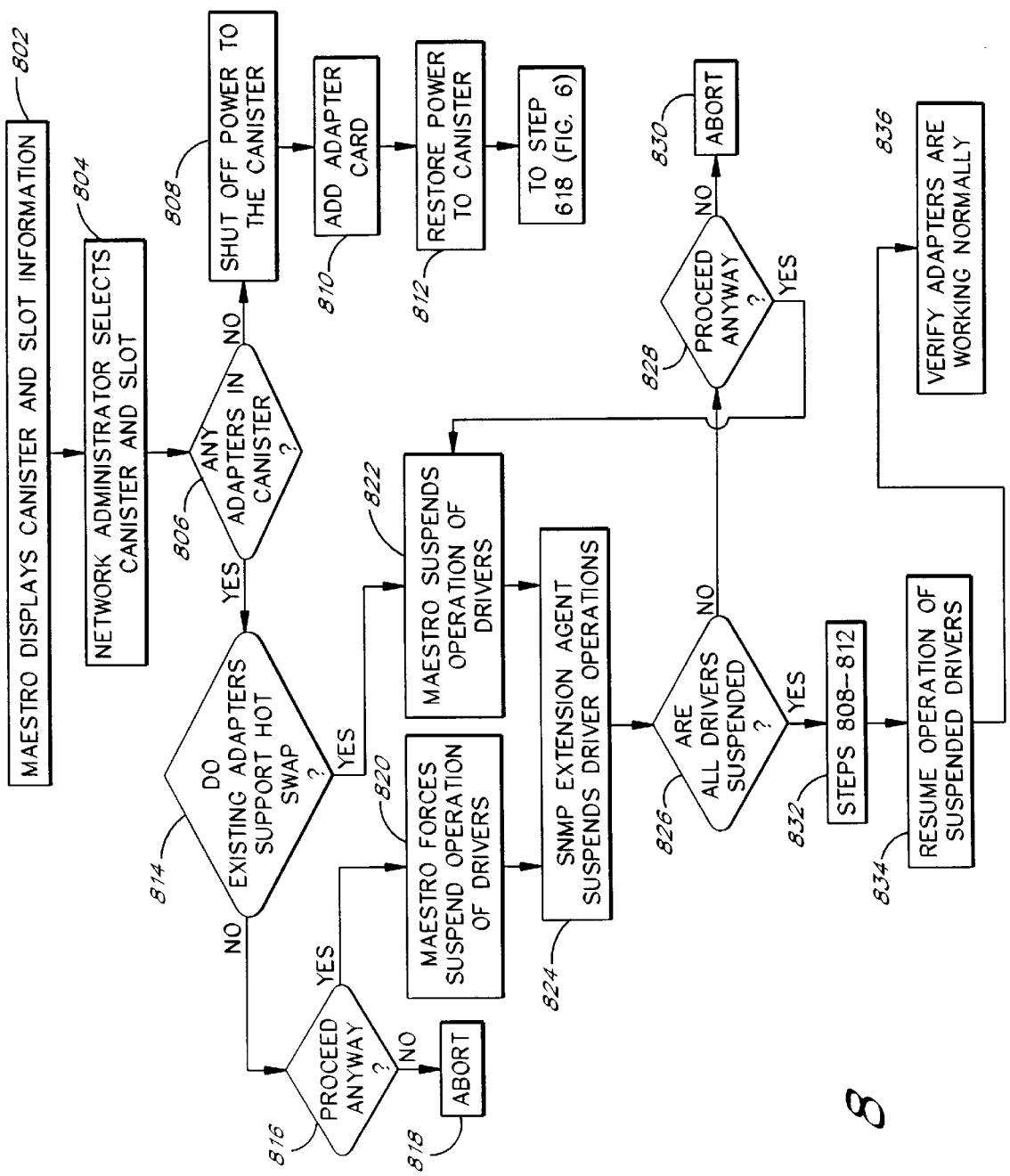
FIG. 8 illustrates one sequence of steps performed to hot plug an adapter to a server computer having canisters.

FIG. 8 illustrates steps performed in hot adding an adapter card to a server computer 204 having canisters (i.e., in one embodiment, a canister has multiple I/O expansion slots, the slots not capable of being powered down individually, the canister is removable and power to the canister may be set on or off by software or by physical manipulation). In a first step 802, Maestro 208 displays on a computer monitor of the client computer 202, viewed by a network administrator, I/O expansion slot and canister information extracted from hot plug MIB variables 212.

Figure 9:
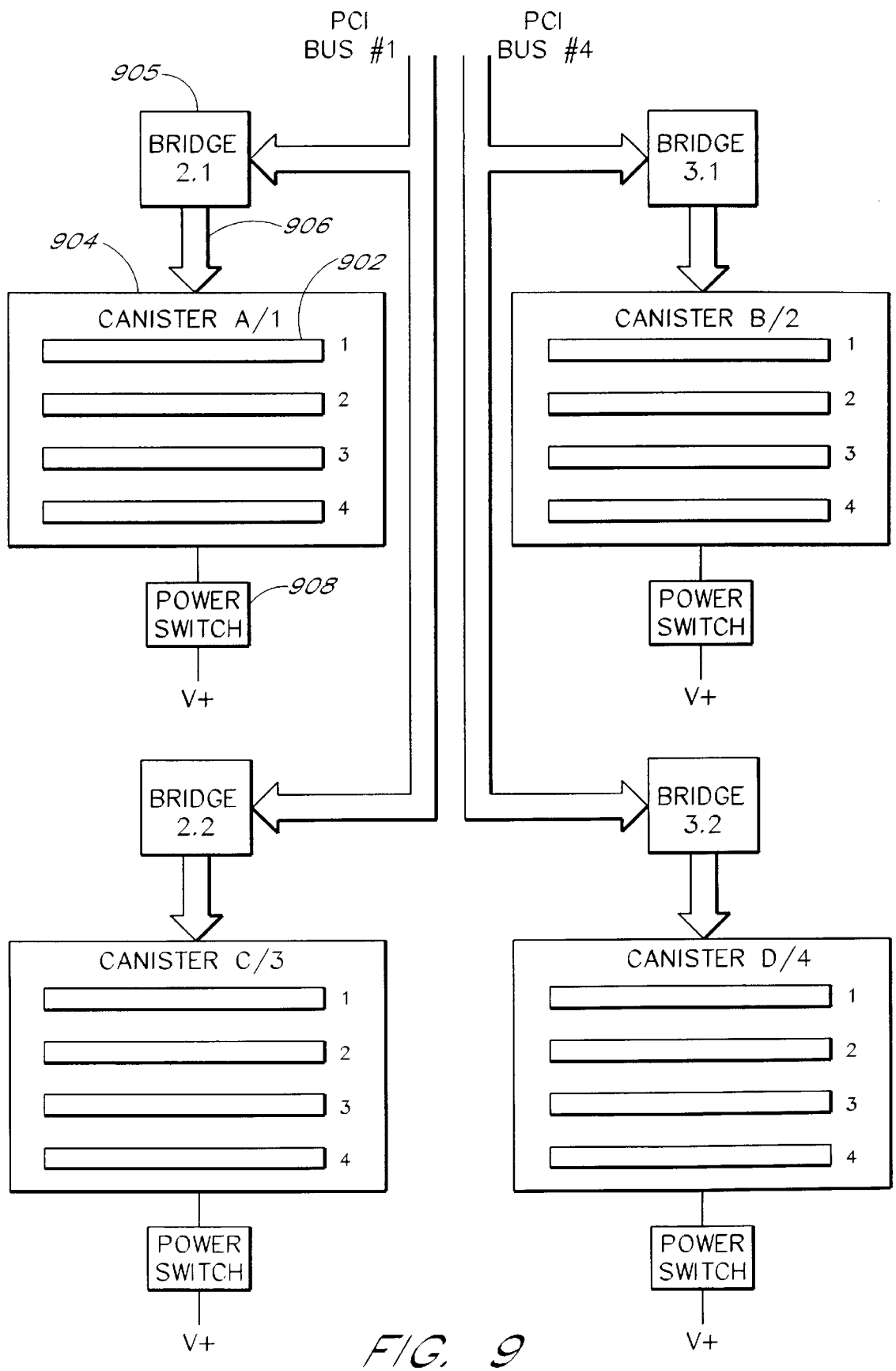
FIG. 9 illustrates an I/O expansion slot arrangement and bus configuration of a server computer having canisters.

FIG. 9 illustrates an I/O expansion slot arrangement and bus configuration for a server computer having four canisters 904, each of which supports up to 4 I/O expansion slots 902. Each slot 902 may accept a card or adapter. A slot bus (not shown) connects each slot to a canister bus 906. The canister bus 906 provides input and output for adapters in any of the four I/O expansion slots 902 in the canister 904. The canister bus 906 and a main bus 900 connect at a bridge 905. The bridge 905 distributes data from the main bus 900 to each of the canister buses 906.

In one embodiment, the four canisters are named "A", "B", "C", and "D" respectively, starting with "A" at the upper-left corner and proceeding in a clockwise rotation. Each slot is numbered 1–4 respectively, moving from top-to-bottom in a canister. The named canisters and numbered slots provide unique identification for software modules to address the canisters and slots. A power switch 908 regulates power to a canister 904, each canister 904 having a power switch 908. The power switch 908 can be controlled by software.

In a next step 804 (see FIG. 8), the network administrator selects a canister and an empty I/O expansion slot within the canister in which to hot add an adapter. (e.g., the third slot in the second canister). In a next step 806, Maestro 208 determines whether any adapters currently exist in the selected canister. Maestro 208 makes this determination by accessing the slotAdapterPresence variable (e.g., 1.3.6.1.4.1.837.2.4.1.1.5.2.n, which references a variable representing the status of occupancy of a slot in the second canister, and where n represents the number of the slot 1–4 within the second canister). Maestro 208 examines the slotAdapterPresence for each slot in the canister. If, in the step 806, Maestro 208 determines there are no adapters currently in any slots of the selected canister, then, in a step 808, Maestro 208 generates a request to shut off the power to the selected canister. Maestro 208 uses the canisterPowerState MIB variable (e.g., 1.3.6.1.4.1.837.2.5.2.1.6.2— referencing the power state of the second canister) and a value =2 (i.e., Power OFF) to generate the request. Maestro 208 sends the power shutoff request over the network 200 to the server computer 204.

The SNMP extension agent 210 receives the power shutoff request. The SNMP extension agent 210 calls the Intrapulse manager 220 passing parameters identifying the selected canister and indicating the desired state of power to the canister (i.e., shut off). The Intrapulse manager 220 accesses reserved memory corresponding to registers related to the canisters in the server computer 204 and sets the value of a register in that reserved memory, the setting of the register causing power to be shut off to the selected (e.g., second) canister. The Intrapulse manager 220 returns a successful completion code. The SNMP extension agent 210 sends a successful completion response message to the client computer 202.

In a next step 810, Maestro 208 prompts the network administrator to add an adapter to the selected empty I/O expansion slot of the selected canister. The network administrator then physically adds an adapter to the selected slot of the selected canister. The network administrator loads a device driver for the adapter on the server computer 204 if the device driver is not already on the server computer 204, and the network administrator configures the device driver to service the adapter if the device is not already configured to do so. One of ordinary skill in the art will recognize that Maestro 208 (or other management software module) may, with an appropriate set of hot plug MIB variables, determine a device driver for the adapter, locate that device driver, load the device driver if it is not already loaded, and configure the device driver to service the adapter if it is not already so configured. The network administrator then indicates to Maestro 208 that an adapter card has been added.

In a further step 812, Maestro 208 generates a request to restore power similar to the power shutoff request generated in the step 808, different only in that the power state is requested to be on. Thus, the value of 1 (i.e., power ON) is combined with the canisterPowerState MIB variable (e.g., 1.3.6.1.4.1.837.2.5.2.1.6.2) to generate an SNMP request of the type SET_REQUEST. Maestro 208 sends the request to the server computer 204. The SNMP extension agent 210 receives the power on request and calls the Intrapulse manager 220 to restore power to the canister. When Maestro 208 receives the completion message indicating that power has been resumed to the canister, the verification step 618 as described in relation to FIG. 6, is performed.

If, in the step 806, Maestro 208 determines that at least one adapter exists in the selected canister, then Maestro 208 accesses the hot plug MIB variables 212 to determine whether all adapters existing in the canister support hot swap operations. Maestro 208 accesses the MIB variable adapterSupportHotSwapHotAdd (e.g., 1.3.6.1.4.1.837.2.2.1.1.3.n where n=logical number of adapter, referencing the capability of an adapter to support hot swap operations) to determine, in a further step 814, whether each adapter in the canister supports hot swap operations.

If at least one adapter does not support hot swap, then Maestro 208, in a step 816, warns the network administrator that one of the adapters in the canister does not support hot swap operations. Maestro 208 then, in the step 816, queries the network administrator whether to proceed anyway. If the network administrator decides not to proceed, then, in a step 818, the hot add process aborts.

If, in the step 816 the network administrator decides to proceed, then, in a step 820, Maestro 208 generates a request to force suspended operation of device drivers servicing the adapters existing in the selected canister. Maestro 208 uses the hot plug MIB variable adapterCommand (e.g., 1.3.6.1.4.1.837.2.2.1.1.5.n where n is the logical number of the selected adapter) and the value 3 (Force Suspend) to issue the force suspended operations request. Note, that under some operating systems, such as Windows NT, an adapter may be hot swapped when a device driver servicing the adapter can be suspended and resumed.

If, in the step 814, Maestro 208 determines that all adapters existing in the selected canister support hot swap operations, then, in a step 822, Maestro 208 uses the adapterCommand MIB variable to generate a request to suspend operation of any driver servicing any existing adapter in the selected canister. In a further step 824, the SNMP extension agent 210 receives the request to suspend operations and calls the configuration manager 218 to suspend operation of any drivers servicing existing adapters in the selected canister.

In a step 826 Maestro 208 generates one or more requests using the adapterState MIB variable to determine whether all drivers were suspended. Maestro 208 sends the requests to the server computer 204. The SNMP extension agent 210 receives the requests, makes respective calls to the configuration manager 218, and determines whether drivers servicing adapters in the selected canister were suspended, and generates response messages indicating whether drivers were suspended and sends those response messages to the client computer 202.

If, in the step 826, Maestro 208 determines from the response message sent by the SNMP extension agent 210, that all drivers were not suspended, then in a next step 828, Maestro 208 warns the network administrator that all drivers were not suspended and queries the network administrator whether to proceed anyway. If, in the step 828, the network administrator determines not to proceed, then in a further step 830, the hot add process aborts.

If, in the step 828, the network administrator decides to proceed anyway, then Maestro 208 again, in the step 822, issues requests to suspend device drivers servicing adapters in the selected canister. The steps 822–826 loop a minimum of five times as long as Maestro 208 determines that at least one device driver has not been suspended. At the end of the fifth iteration through the steps 822–826, Maestro 208, in the step 828, again warns the network administrator that not all device drivers were suspended. Programmatic branching from the step 828 repeats as described above.

If, in the step 826, all drivers were suspended, then in a step 832 the steps as described in 808–812 are performed. In a next step 834, Maestro 208 generates a request to resume operations on the suspended drivers. To generate that request, Maestro 208 utilizes the hot plug MIB variable adapterCommand. Maestro 208 sends the resume operations request to the server computer 204.

The SNMP extension agent 210 receives the resume operation request and calls the configuration manager 218 requesting that drivers associated with the adapters in the canister be resumed. The configuration manager 218 returns a successful completion code upon resuming the operation of the suspended drivers. The SNMP extension agent 210 sends a successful completion response message to the client computer 202. In a step 836, Maestro 208 verifies that the adapters in the selected canister are working normally according to the procedures described in step 618 (see FIG. 6) performed for each adapter in the selected canister.

Those of ordinary skill in the art will appreciate that the steps described in relation to FIG. 8 also perform hot swap operations on a server computer having canisters, the steps modified, however, as follows: steps 806–812 are not performed, and thus the step 814 of determining whether the adapters in the selected canister support hot swap operations occurs immediately after the step 804 wherein the network administrator selects a canister and I/O expansion slot with respect to which the hot swap operation will be performed.

Figure 10:
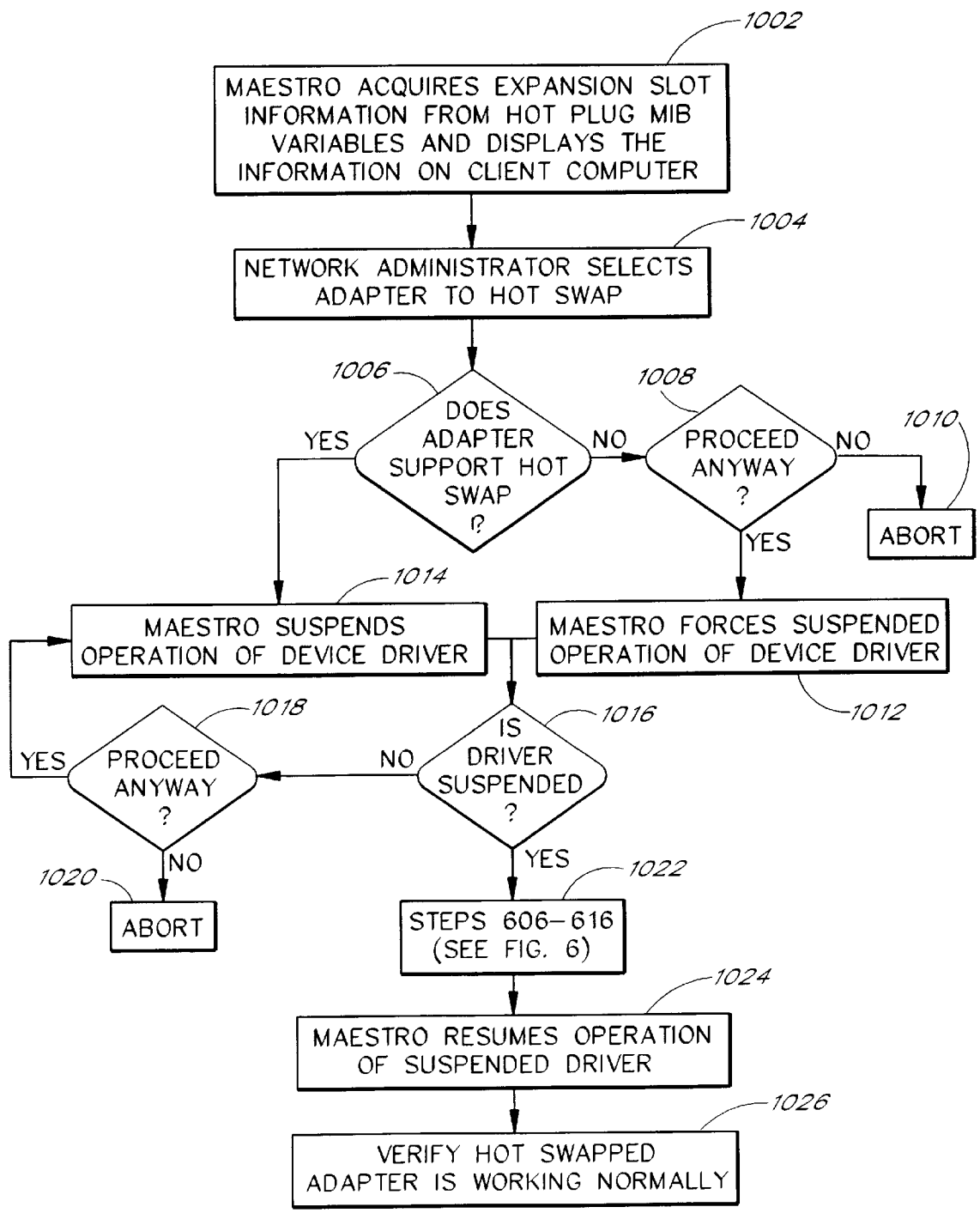
FIG. 10 illustrates one sequence of steps performed to hot swap an adapter to a server computer having canisters.

FIG. 10 illustrates steps performed to hot swap an adapter in a server computer that does not have canisters. In a first step 1002, Maestro 208 accesses adapter and I/O expansion slot information from the hot plug MIB variables 212 and displays information identifying the adapter cards in I/O expansion slots. The displayed information corresponds to the current configuration of the server computer 204.

In a next step 1004, the network administrator selects an adapter to hot swap. In a further step 1006, Maestro 208 accesses the hot plug MIB variable adapterSupportHotSwapHotAdd (e.g., 1.3.6.1.4.1.837.2.2.1.1.3.n where n=logical number of adapter, referencing the capability of an adapter to support hot swap operations) to determine whether the selected adapter supports hot swap operations. If the adapter does not support hot swap operations, then in a further step 1008, Maestro 208 warns the network administrator that the adapter does not support hot swap operations and queries the network administrator whether to proceed anyway. If, in the step 1008, the network administrator decides not to proceed, then, in a step 1010, the hot swap procedure aborts.

If, in the step 1008, the network administrator decides to proceed, then, in a further step 1012, Maestro 208 generates a request to force suspended operation of the device driver servicing the selected adapter. Maestro 208 uses the hot plug MIB variable adapterCommand (e.g., 1.3.6.1.4.1.837.2.2.1.1.5.n where n is the logical number of the selected adapter) and the value 3 (Force Suspend) to issue the force suspended operations request. The SNMP extension agent 210 receives the request and performs the force suspend operation by calling the configuration manager 218. The configuration manager 218 returns a completion code, and the SNMP extension agent 210 sends a successful completion response message to the client computer 202.

If, in the step 1006, Maestro 208 determines that the adapter does support hot swap operations, then, in a step 1014, Maestro 208 uses the adapterCommand hot plug MIB variable to generate a request to suspend operation of the device driver servicing the selected adapter. The SNMP extension agent 210 receives the request and calls the configuration manager 218 to perform the suspension. The SNMP extension agent 210 sends a successful completion response message to the client computer 202.

In a further step 1016, Maestro 208 uses the hot plug MIB variable adapterState to determine whether the adapter was suspended. Maestro 208 sends the request to the server computer 204 where the SNMP extension agent 210 receives the request and calls the configuration manager 218. The configuration manager 218 tests the state of the device driver and returns a code to the SNMP extension agent 210 indicating the state of the device driver (e.g., suspended or operating). The SNMP extension agent 210 generates a response message indicating whether the device driver is suspended and sends the response message to the client computer 202.

In the step 1016, if Maestro determines that the device driver was not suspended (by examining the response message), then, in a next step 1018, Maestro 208 warns the network administrator that the device driver was not suspended and queries the network administrator whether to proceed anyway. If, in the step 1018, the network administrator determines not to proceed, then, in a next step 1020, the hot swap procedure aborts.

If, in the step 1018, the network administrator determines to proceed even though the device driver was not suspended, the steps 1014 and 1016 loop a minimum of five times as long as Maestro 208 determines that the device driver has not suspended. Programmatic branching repeats at step 1018 as described above.

If Maestro 208 determines, in the step 1016, that the device driver was suspended, then, in a step 1022, each of the steps 606–616 (See FIG. 6) is performed (describing detailed steps for shutting down power to the selected I/O expansion slot, placing an adapter in the expansion slot, and restoring power to the selected I/O expansion slot; the only difference being that after power shuts off to the I/O expansion slot, the existing adapter is removed before placing a different adapter in the expansion slot).

In a step 1024, Maestro generates a request to resume operations on the suspended device driver. Maestro 208 uses the adapterCommand MIB variable to generate that request. Maestro 208 sends the request to the server computer 204. The SNMP extension agent receives the resume operation request and calls the configuration manager 218 to resume operation of the identified device driver. The configuration manager 218 returns a successful completion code upon resuming the operation of the driver. The SNMP extension agent 210 sends a successful completion response message to the client computer 202. In a step 1026, Maestro 208 verifies that the newly added adapter and device driver are working normally according to the procedure described in step 618 (see FIG. 6).

This invention may be embodied in other specific forms without departing from the essential characteristics as described herein. The embodiments described above are to be considered in all respects as illustrative only and not restrictive in any manner. The scope of the invention is indicated by the following claims rather than by the foregoing description. Any and all changes which come within the meaning and range of equivalency of the claims are to be considered within their scope.

Substitute page of specification pursuant to 37 C.F.R. §1.125(b)(2)

Appendix A

Incorporation by Reference of Commonly Owned Applications

The following patent applications, commonly owned and filed October 1, 1997, are hereby incorporated herein in their entirety by reference thereto:

| | Title | Application No. | Attorney Docket No. |
|---|---|---|---|
| 5 | | | |
| | "System Architecture for Remote Access and Control of Environmental Management" | 08/942,160 | MNFRAME.002A1 |
| 10 | "Method of Remote Access and Control of Environmental Management" | 08/942,215 | MNFRAME.002A2 |
| | "System for Independent Powering of Diagnostic Processes on a Computer System" | 08/942,410 | MNFRAME.002A3 |
| 15 | "Method of Independent Powering of Diagnostic Processes on a Computer System" | 08/942,320 | MNFRAME.002A4 |
| | "Diagnostic and Managing Distributed Processor System" | 08/942,402 | MNFRAME.005A1 |
| 20 | "Method for Managing a Distributed Processor System" | 08/942,448 | MNFRAME.005A2 |
| | "System for Mapping Environmental Resources to Memory for Program Access" | 08/942,222 | MNFRAME.005A3 |
| | "Method for Mapping Environmental Resources to Memory for Program Access" | 08/942,214 | MNFRAME.005A4 |
| 25 | "Hot Add of Devices Software Architecture" | 08/942,309 | MNFRAME.006A1 |
| | "Method for The Hot Add of Devices" | 08/942,306 | MNFRAME.006A2 |
| | "Hot Swap of Devices Software Architecture" | 08/942,311 | MNFRAME.006A3 |
| 30 | "Method for The Hot Swap of Devices" | 08/942,457 | MNFRAME.006A4 |
| | "Method for the Hot Add of a Network Adapter on a System Including a Dynamically Loaded Adapter Driver" | 08/943,072 | MNFRAME.006A5 |

Substitute page of specification pursuant to 37 C.F.R. §1.125(b)(2)

| | Title | Application No. | Attorney Docket No. |
|---|---|---|---|
| | "Method for the Hot Add of a Mass Storage Adapter on a System Including a Statically Loaded Adapter Driver" | 08/942,069 | MNFRAME.006A6 |
| 5 | "Method for the Hot Add of a Network Adapter on a System Including a Statically Loaded Adapter Driver" | 08/942,465 | MNFRAME.006A7 |
| | "Method for the Hot Add of a Mass Storage Adapter on a System Including a Dynamically Loaded Adapter Driver" | 08/962,963 | MNFRAME.006A8 |
| 10 | "Method for the Hot Swap of a Network Adapter on a System Including a Dynamically Loaded Adapter Driver" | 08/943,078 | MNFRAME.006A9 |
| 15 | "Method for the Hot Swap of a Mass Storage Adapter on a System Including a Statically Loaded Adapter Driver" | 08/942,336 | MNFRAME.006A10 |
| | "Method for the Hot Swap of a Network Adapter on a System Including a Statically Loaded Adapter Driver" | 08/942,459 | MNFRAME.006A11 |
| 20 | "Method for the Hot Swap of a Mass Storage Adapter on a System Including a Dynamically Loaded Adapter Driver" | 08/942,458 | MNFRAME.006A12 |
| | "Method of Performing an Extensive Diagnostic Test in Conjunction with a BIOS Test Routine" | 08/942,463 | MNFRAME.008A |
| 25 | "Apparatus for Performing an Extensive Diagnostic Test in Conjunction with a BIOS Test Routine" | 08/942,163 | MNFRAME.009A |
| | "Configuration Management Method for Hot Adding and Hot Replacing Devices" | 08/941,268 | MNFRAME.010A |
| 30 | "Configuration Management System for Hot Adding and Hot Replacing Devices" | 08/942,408 | MNFRAME.011A |
| | "Apparatus for Interfacing Buses" | 08/942,382 | MNFRAME.012A |
| | "Method for Interfacing Buses" | 08/942,413 | MNFRAME.013A |
| | "Computer Fan Speed Control Device" | 08/942,447 | MNFRAME.016A |
| 35 | "Computer Fan Speed Control Method" | 08/942,216 | MNFRAME.017A |

Substitute page of specification pursuant to 37 C.F.R. §1.125(b)(2)

| | Title | Application No. | Attorney Docket No. |
|---|---|---|---|
| | "System for Powering Up and Powering Down a Server" | 08/943,076 | MNFRAME.018A |
| | "Method of Powering Up and Powering Down a Server" | 08/943,077 | MNFRAME.019A |
| 5 | "System for Resetting a Server" | 08/942,333 | MNFRAME.020A |
| | "Method of Resetting a Server" | 08/942,405 | MNFRAME.021A |
| | "System for Displaying Flight Recorder" | 08/942,070 | MNFRAME.022A |
| | "Method of Displaying Flight Recorder" | 08/942,068 | MNFRAME.023A |
| | "Synchronous Communication Interface" | 08/943,355 | MNFRAME.024A |
| 10 | "Synchronous Communication Emulation" | 08/942,004 | MNFRAME.025A |
| | "Software System Facilitating the Replacement or Insertion of Devices in a Computer System" | 08/942,317 | MNFRAME.026A |
| 15 | "Method for Facilitating the Replacement or Insertion of Devices in a Computer System" | 08/942,316 | MNFRAME.027A |
| | "System Management Graphical User Interface" | 08/943,357 | MNFRAME.028A |
| | "Display of System Information" | 08/942,195 | MNFRAME.029A |
| 20 | "Data Management Method Supporting Hot Plug Operations on a Computer" | 08/942,124 | MNFRAME.031A |
| | "Alert Configurator and Manager" | 08/942,005 | MNFRAME.032A |
| | "Managing Computer System Alerts" | 08/943,356 | MNFRAME.033A |
| | "Computer Fan Speed Control System" | 08/940,301 | MNFRAME.034A |
| 25 | "Computer Fan Speed Control System Method" | 08/941,267 | MNFRAME.035A |
| | "Black Box Recorder for Information System Events" | 08/942,381 | MNFRAME.036A |
| 30 | "Method of Recording Information System Events" | 08/942,164 | MNFRAME.037A |
| | "Method for Automatically Reporting a System Failure in a Server" | 08/942,168 | MNFRAME.040A |

Substitute page of specification pursuant to 37 C.F.R. §1.125(b)(2)

| Title | Application No. | Attorney Docket No. |
|---|---|---|
| "System for Automatically Reporting a System Failure in a Server" | 08/942,384 | MNFRAME.041A |
| "Expansion of PCI Bus Loading Capacity" | 08/942,404 | MNFRAME.042A |
| "Method for Expanding PCI Bus Loading Capacity" | 08/942,223 | MNFRAME.043A |
| "System for Displaying System Status" | 08/942,347 | MNFRAME.044A |
| "Method of Displaying System Status" | 08/942,071 | MNFRAME.045A |
| "Fault Tolerant Computer System" | 08/942,194 | MNFRAME.046A |
| "Method for Hot Swapping of Network Components" | 08/943,044 | MNFRAME.047A |
| "A Method for Communicating a Software Generated Pulse Waveform Between Two Servers in a Network" | 08/942,221 | MNFRAME.048A |
| "A System for Communicating a Software Generated Pulse Waveform Between Two Servers in a Network" | 08/942,409 | MNFRAME.049A |
| "Method for Clustering Software Applications" | 08/942,318 | MNFRAME.050A |
| "System for Clustering Software Applications" | 08/942,411 | MNFRAME.051A |
| "Method for Automatically Configuring a Server after Hot Add of a Device" | 08/942,319 | MNFRAME.052A |
| "System for Automatically Configuring a Server after Hot Add of a Device" | 08/942,331 | MNFRAME.053A |
| "Method of Automatically Configuring and Formatting a Computer System and Installing Software" | 08/942,412 | MNFRAME.054A |
| "System for Automatically Configuring and Formatting a Computer System and Installing Software" | 08/941,955 | MNFRAME.055A |
| "Determining Slot Numbers in a Computer" | 08/942,462 | MNFRAME.056A |
| "System for Detecting Errors in a Network" | 08/942,169 | MNFRAME.058A |
| "Method of Detecting Errors in a Network" | 08/940,302 | MNFRAME.059A |

Substitute page of specification pursuant to 37 C.F.R. §1.125(b)(2)

| Title | Application No. | Attorney Docket No. |
|---|---|---|
| "System for Detecting Network Errors" | 08/942,407 | MNFRAME.060A |
| "Method of Detecting Network Errors" | 08/942,573 | MNFRAME.061A |

5

Appendix B

Copy of Provisional Application

This Appendix B, which forms part of the disclosure of this patent application, is a copy of the U.S. provisional patent application, 122 pages, filed May 13, 1997, entitled "High Performance Network Server System Management Interface" and assigned Application No. 60/046,310. Page 1, line 7 of the provisional application has been changed from the original to positively recite that the entire provisional application, including the attached documents, forms part of this disclosure.

TMC Object Class Services

The following are the services for the TMC object classes.

NFCoordinationMgr

| Services | Messages | Destination Objects |
|---|---|---|
| *Request to start a new thread* | Enter_End_Event_Handle | *NFCoordinationObject* |
| | End_Terminate_Event_Handle | *NFCoordinationObject* |
| | Enter_Thread_Function | *NFCoordinationObject* |
| | Create_Thread | <Windows Function> |
| | Enter_Thread_ID | *NFCoordinationObject* |
| *Request to Terminate a thread* | | (processed within the object) |

NFCoordinationObject

| Services | Messages | Destination Objects |
|---|---|---|
| Enter Timer ID | | (processed within the object) |
| Enter End Event Handle | | (processed within the object) |
| Enter Terminate Event Handle | | (processed within the object) |
| Enter Thread Function | | (processed within the object) |

NFTimerMgr

| Services | Messages | Destination Objects |
|---|---|---|
| *Request to start a new timer* | Enter_Timer_ID | *NFTimerObject* |
| | Enter_Timer_Function | *NFTimerObject* |
| *Received a clock event* | | (processed within the object) |

Provisional Patent Application 6391-711:

Title: HIGH PERFORMANCE NETWORK SERVER SYSTEM MANAGEMENT INTERFACE

Invs: Srikumar Chari
Kenneth Bright
Bruno Sartirana

The following documents are attached and form part of this disclosure:

1. *Maestro Recovery Manager Analysis - Problem Statement*, pp. 1-10.

2. *Remote Interface Board Specification*, Revision 2 13-000072-01, June 21, 1996, pp. 1-11.

3. *Maestro 2 System Management Functional Specifications*, pp. 1-14.

4. *Untitled starts with "Introduction"*, pp. 1-37.

5. *Maestro 2.0 Object Oriented Design*, pp. 1-30.

6. *Maestro 2.0 Object Oriented Analysis*, pp. 1-29.

7. *NF9000 MIB*, pp. 1-81.

A set of software libraries that can be reconstituted and reformed to manage different components of a host, different hosts, and other components. Tools to construct a user interface from a management information base MIB, and for automatically generating an interface with a resource compiler from the MIB.

Multiple Node Service Processor Network

A means is provided by which individual components of a system are monitored and controlled through a set of independent, programmable microcontrollers interconnected through a network. Further means are provided to allow access to the microcontrollers and the interconnecting network by software running on the host processor.

Fly-by-wire

A means is provided by which all indicators, push buttons and other physical control means are actuated via the multiple node service processor network. No indicators, push buttons or other physical control means are physically connected to the device which they control, but are connected to a microcontroller, which then actuates the control or provides the information being monitored.

Self-Managing Intelligence

A means is provided by which devices are managed by the microcontrollers in a multiple node service processor network by software running on one or more microcontrollers, communicating via the interconnecting network. Management of these devices is done entirely by the service processor network, without action or intervention by system software or an external agent.

Flight Recorder

A means is provided for recording system events in a non-volatile memory, which may be examined by external agents. Such memory may be examined by agents external to the network interconnecting the microcontrollers.

Replicated components: no single point of failure

A means is provided by which no single component failure renders the monitoring and control capability of the system inoperable.

Extension by serial or modem gateway

A means is provided allowing an external agent to communicate with the microcontrollers by extending the interconnecting network beyond the physical system.

Software means are provided to monitor and/or control a system using a remote agent. Means are provided for implementing an extension to the interconnecting network, converting protocols between media and communicating with and directing the microcontroller, and the state managed by those microcontrollers.

The following provisional patent applications, commonly owned and filed on the same day as the present application, are related to the present application and are incorporated by reference:

COMPUTER SYSTEM HARDWARE INFRASTRUCTURE FOR HOT PLUGGING MULTI-FUNCTION PCI CARDS WITH EMBEDDED BRIDGES (6391-704); invented by:

Don Agneta
Stephen E.J. Papa
Michael Henderson
Dennis H. Smith
Carlton G. Amdahl
Walter A. Wallach COMPUTER SYSTEM HARDWARE INFRASTRUCTURE FOR HOT PLUGGING SINGLE AND MULTI-FUNCTION PC CARDS WITHOUT EMBEDDED BRIDGES (6391-705); invented by:

Don Agneta
Stephen E.J. Papa
Michael Henderson
Dennis H. Smith
Carlton G. Amdahl
Walter A. Wallach ISOLATED INTERRUPT STRUCTURE FOR INPUT/OUTPUT ARCHITECTURE (6391-706); invented by:

Dennis H. Smith
Stephen E.J. Papa

THREE BUS SERVER ARCHITECTURE WITH A LEGACY PCI BUS AND MIRRORED I/O PCI BUSES (6391-707); invented by:

Dennis H. Smith
Carlton G. Amdahl
Don Agneta

HOT PLUG SOFTWARE ARCHITECTURE FOR OFF THE SHELF OPERATING SYSTEMS
(6391-708); invented by:

Walter A. Wallach
Mehrdad Khalili
Mallikarunan Mahalingam
John Reed

REMOTE SOFTWARE FOR MONITORING AND MANAGING ENVIRONMENTAL
MANAGEMENT SYSTEM (6391-709); invented by:

Ahmad Nouri

REMOTE ACCESS AND CONTROL OF ENVIRONMENTAL MANAGEMENT SYSTEM
(6391-710); invented by:

Karl Johnson
Tahir Sheik

HIGH PERFORMANCE NETWORK SERVER SYSTEM MANAGEMENT INTERFACE
(6391-711); invented by:

Srikumar Chari
Kenneth Bright
Bruno Sartirana

CLUSTERING OF COMPUTER SYSTEMS USING UNIFORM OBJECT NAMING AND
DISTRIBUTED SOFTWARE FOR LOCATING OBJECTS (6391-712); invented by:

Walter A. Wallach
Bruce Findley

MEANS FOR ALLOWING TWO OR MORE NETWORK INTERFACE CONTROLLER CARDS TO APPEAR AS ONE CARD TO AN OPERATING SYSTEM (6391-713); invented by:

Walter A. Wallach
Mallikarunan Mahalingam

HARWARE AND SOFTWARE ARCHITECTURE FOR INTER-CONNECTING AN ENVIRONMENTAL MANAGEMENT SYSTEM WITH A REMOTE INTERFACE (6391-714); invented by:

Karl Johnson
Walter A. Wallach
Dennis H. Smith
Carl G. Amdahl

SELF MANAGEMENT PROTOCOL FOR A FLY-BY-WIRE SERVICE PROCESSOR (6391-715); invented by:

Karl Johnson
Walter A. Wallach
Dennis H. Smith
Carl G. Amdahl

Remote

Interface Board

Specification

Revision 2
13-000072-01
June 21, 1996

Tahir Sheikh
NetFRAME Systems, Inc.

Index

| | |
|---|---|
| Overview | 3 |
| Interconnect | 4 |
| Power | 5 |
| Mechanical | 6 |
| Enclosure | 8 |
| Environment | 9 |

Overview:

This board is an interface between Raptor Wire Services and an external modem. The system status and commands are passed through the RS232 connection at the modem side to the Wire Services bus, the I2C bus, controlled through an on board PIC16C65. The I2C signals are translated by the PIC16C65 into an eight signal RS232 protocol and passed through a voltage level translator LT1133A, with baud capable of reaching the speed of 120k. A 25 pin D-Sub connector resides on the other side of the voltage level translator.

The system status storage is through a 32Kx8 SRAM, with an external lath for latching the higher addressing bits of the data RAM. A signal powered EPROM is used for storing board ID information.

The board is powered through 7.5V and 700mA supply unit, and is an alternative source for the bias powered partition of the Wire Services. The bias powered block includes an NV-RAM and a PIC16C65 which are resident on the Raptor back plane. The power source is regulated through a high frequency switching regulator.

1.0 Features
The designed features are as follows:

1.1 I2C Interface
The two wires interface is brought from the Raptor and passed to the PIC16C65 using an RJ45. A bus extender 82B715 is connected between the external interface to the local I2C bus. Port C bit 3 is the clocking bit, and Port C bit 4 is the data line.

1.2 RS232 Protocol
The communication with the modem is based on the RS232. Microcontroller PIC16C65 is used to generate the receive and the transmit signals, where the signal levels are transposed to the RS232 levels by the LT1133A. The 3 transmit signals, RTS, SOUT and DTR are from Port A bits 2, 3 and 4, where as the 5 receive signals are from two ports, DCD, DSR from Port C 1,0 and SIN, CTS and RI from Port A 5, 0, 1.

The 25 pin RS232 pin connection is used instead a 9 pin connector, since this type of connector is more common than the other. All the extra pins are no connect except the pins 1 and 7, where pin 1 is chassis ground and pin 7 is a signal ground.

The connection through LT1133A can be run up to 120k Baud and is ESD protected to +/- 10kV.

The short voltage at the output can be +/- 30V and is isolated to the forward direction only.

1.3 PIC16C65 and 32Kx8
A 32Kx8 SRAM is available for storage and transfer between the internal Wire Services and the external remote interface. Port D is the address port, while an external 74ABT374 is for expanding the address range to 15 bits. Port B is the data bus for the bi-directional data interconnect. Port E is for the SRAM enable, output tristate and the write control signals.

The PIC16C65 is designed for a frequency of 12MHz. An LED is also connected to the Port C bit 5.

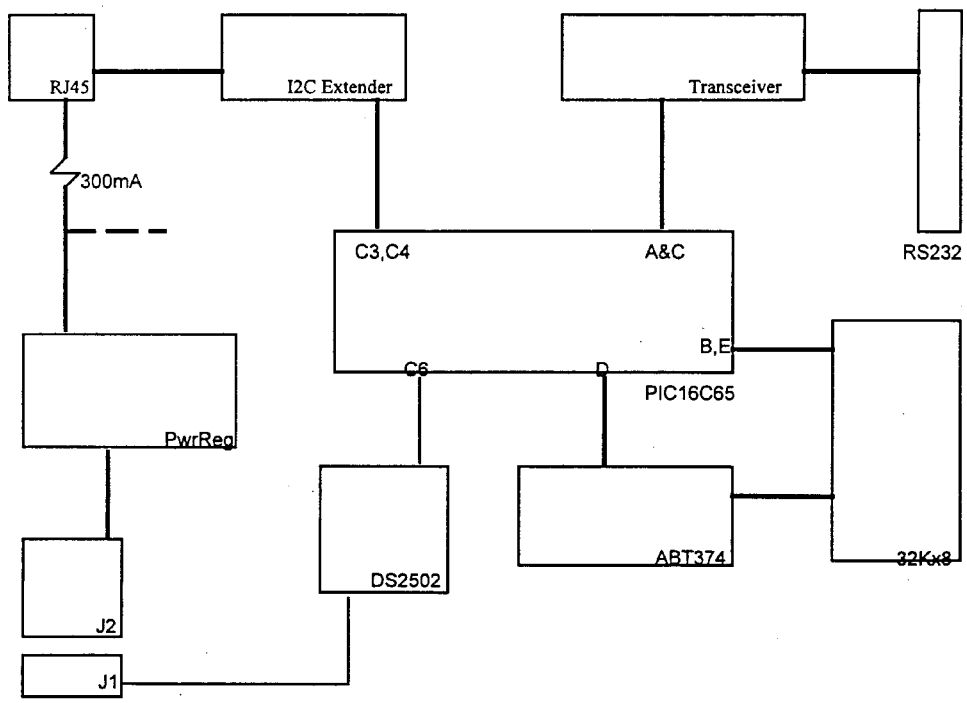

Figure 1: Remote Interface Interconnect
1.4 Serial ID EPROM
DS2502 is for storing board ID, connected to PIC16C65 Port C bit 6. The programming is handled through a jumper applied through connector J1. DS2502 is a signal powered, retaining the charge into a capacitor, sourced through the data line.

2.1 Alternative Power Source
The board is powered through 7.5V and 700mA (or 800mA which ever available) supply unit. After regulating the supply, it is an alternative source for the bias powered partition of the Raptor Wire Services. The bias powered block includes an NV-RAM and a PIC16C65 which are resident on the Raptor back plane.

The power source is regulated through a high frequency switching regulator based on Linear Technology LT1376. The input to the regulator circuitry is off a wall mounted adapter. The regulated output is consumed locally and 300mA are sourced to the Raptor Wire Services through a fuse and an RJ45 P1.

2.2 Power Consumption
The following is an average estimated power consumption with the board running at a base frequency of 12MHz.

| | | |
|---|---|---|
| PIC16C65 | Microcontroller | 30mA |
| 82B715 | I2C Extender | 10mA |
| 32Kx8 | SRAM | 80mA |
| LT1133A | Transceiver | 70mA |
| 374 | Latch | 30mA |
| | Misc. | 60mA |
| | | 280mA |
| | Alt. Source | 300mA |

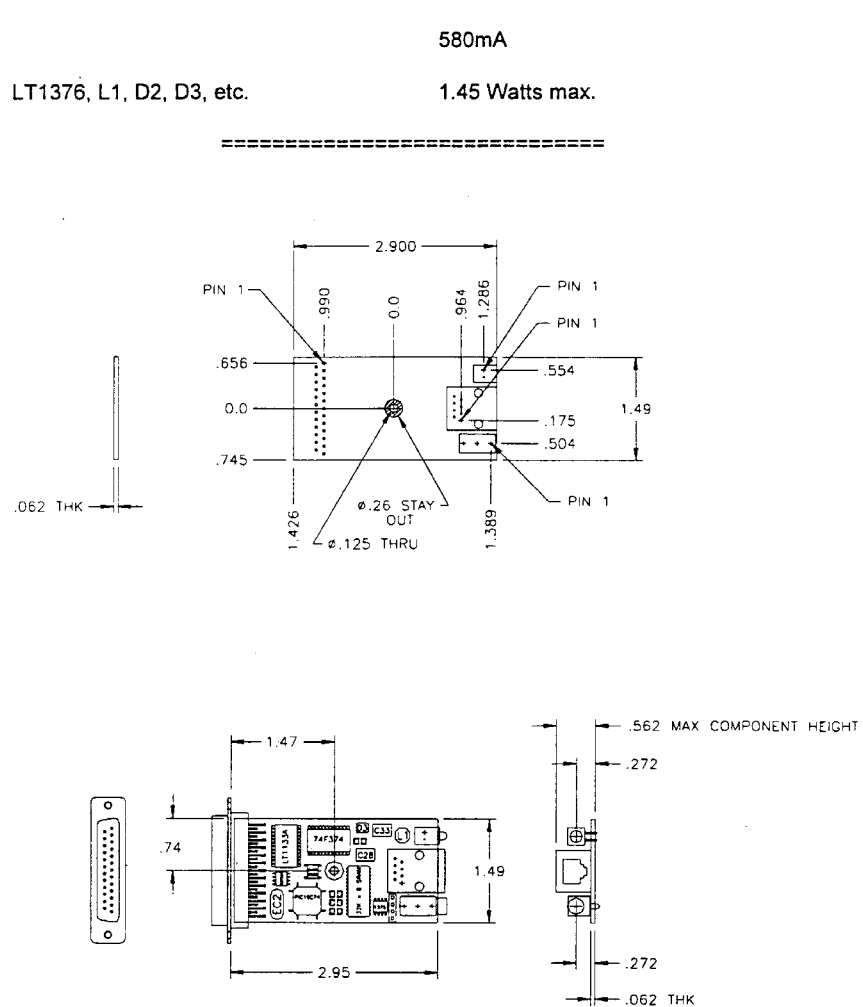
Figure 2: Mechanical Orientation

2.3 Board Layout

The board is based on controlled impedance of 60 Ohms +/- 10%, with 6 layers and test points for all signals. The width is restricted by the dimension of the RS232 due to the mounting constrains. The board is dual sided with active components kept on the top side only.

The high frequency bypass is kept with .1uf and .001uf, where the charge storage is kept by two 33uf and two 1uf capacitors.

The location and mounting of the power connector and the LED are kept such that the both sides of the cabinet are identical, therefore interchangeable.

3: Enclosure
The enclosure is planned to be Injection Molded Aluminum, a side view is in figure 3. Aluminum instead of plastic is selected due to the regulator heat, and EMI shielding.

The board connects at three locations between the top and the bottom enclosures. Two locations are based on the clamp shell design at the D-Sub and the RJ45, two opposite ends of the enclosure. The third location is a mounting hole in the center of the enclosure.

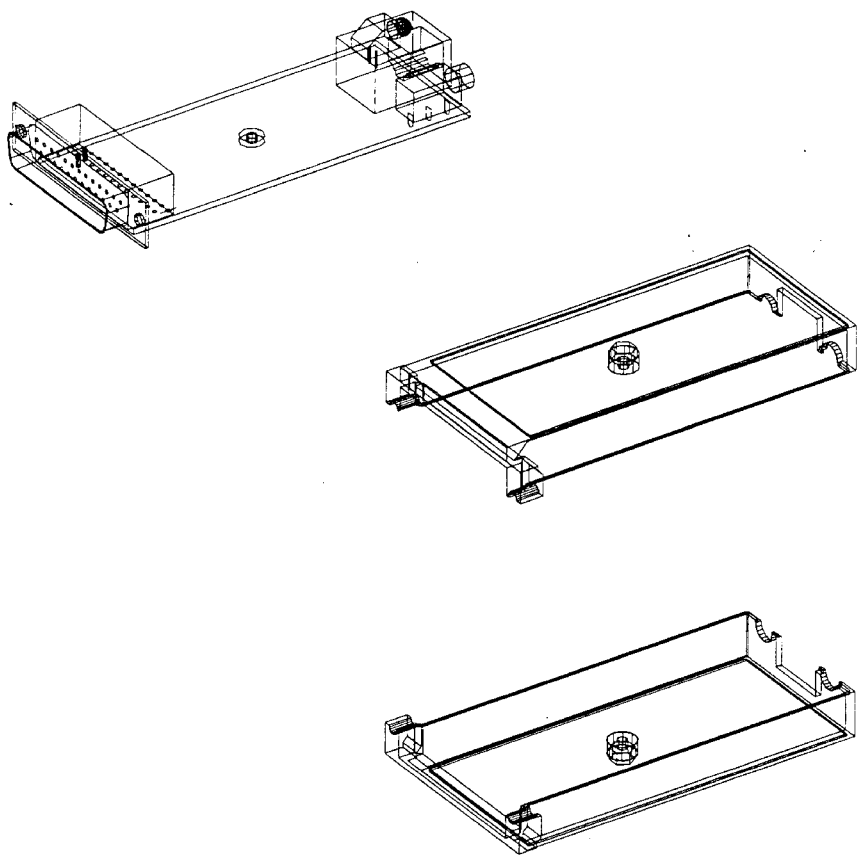
Figure 3: Board and Enclosure Isometric View
4.0 Environment
The environmental specification is based on assumptions:
The environment is Ground Fixed.
The "Quality Level of II" is used.
Bellcore Method I, Parts Count Method, Case 2 for prediction.
Burn-in time 120 hours.
Operated at 40C and 50% rated electrical stress.

4.1 Environmental Specification:

MEAN TIME BETWEEN FAILURE
*2.445250e+06 Hours*
This number is calculated based on the Bellcore Technical Reference TR-NWT-000332, Reliability Prediction Procedure for Electronic Equipment, Issue 4, September 1992.

ALTITUDE
  Operating      -100 to 10,000 feet
  Non-Operating  -100 to 40,000 feet

HUMIDITY
  Operating      10% to 80% R.H., Maximum Gradient 10% per hour
  Non-Operating  5% to 90% R.H., Maximum Gradient 10% per hour

TEMPERATURE (ambient)
  Operating      10 to 40 degrees C    Maximum Gradient 10 degrees C per hour
  Non-Operating  -40 to 70 degrees C
                 Maximum Gradient 10 degrees C per hour

SHOCK
  Operating
    Magnitude      2 G's (peak)
    Duration 11 ms
    Waveform       Half Sine Non-Operating
    Magnitude      10 G's (peak)
    Duration 11 ms
    Waveform       Half Sine

VIBRATION
  Operating
    Frequency Range 5 to 500 Hz
    Magnitude       0.010 inch peak to peak    displacement
    Acceleration    0.20 G's peak Non-Operating
    Frequency Range 5 to 500 Hz
    Magnitude       0.010 inch peak to peak displacement
    Acceleration    0.50 G's peak

DROP (PACKAGED)
ASTM D4169

ELECTRICAL

| | |
|---|---|
| Nominal Line | 115 VAC or 230 VAC @ 50/60 Hz autoranging |
| Line Deviation | 90-130 VAC & 180-256 VAC @ 47-63 Hz |
| Line Transient/Surge Susceptibility | 1.25 x highest rated nominal voltage or 300 Vrms, whichever is less, for 1 second. |

ELECTRO-MAGNETIC COMPATIBILITY

FCC, Class A under FCC Rule 15, Subpart B, conducted and radiated.

Canadian Radio Interference Regulations, C.R.C., c.1374, Sec. 2, as amended in The Canadian Gazette, Part II, Vol. 122, No. 20, dated Sept. 28, 1988.

European EMC Directive (89/336/EEC) CISPR 22 (Class B).

IEC 801-2:1984 8 kV air discharge

IEC 801-3:1984 3 V/m, 27-500 MHz

IEC 801-4:1988 1 kV mains, 500 V other.

SAFETY AGENCIES
UL, CSA, VDE, JIS

Electrostatic Discharge

| | | |
|---|---|---|
| Air Discharge | 2.5 to 5.0KV | no errors allowed |
| | 5.1 to 10.0 KV | recoverable errors through system allowed |
| | 10.0 to 20.0KV | recoverable errors through power cycling allowed |
| Contact Discharge | 0 to 8.0KV | recoverable errors through power cycling allowed |

Maestro Recovery M ger
Analysis - Problem S. ent

Problem Statement

◆ Introduction

Maestro Recovery Manager(MRM) is a software which locally or remotely manage a Raptor when a server is down or up, operating system died, LAN communication failed, or other server components failed.

User will be able to manage the server in very simple, usable, and friendly GUI environment. MRM use modem for remote and serial communication port for local to communicate with server for diagnostic and recovery.

Primary role of remote management is diagnosing and restoring service as quickly as possible in case of a service failure.

System administrator, LAN administrator in customer shop and NetFrame Technical support will be primary user for the system.

◆ Requirement Sources

MRM requirements comes from the following

1 - Focus Group (Customer Support and Training.)
2 - User Walkthrough held by MRM team and Customer Support in Dec 96
3 - Down System Management Road map (96)
    This road map is preliminary road map combined with Up System Management road map.
4 - MRM Road Map 97-98
    This Road Map presented to Engineering Council Meeting on Mar 10, 1997.

5 - Raptor System, A Bird's Eye View.
6 - Raptor Wire Service Architecture

The following requirements have been identified for MRM

◆ Support Remote Management for Diagnostic and Recovery

Remote Management cover remote access to the Raptor Out Of Band management features. Remote Management will use Out of Band ,Control Diagnostic and Monitor Subsystem (CDM) remote management to cover the other high value added remote management functions. primary role of remote management is diagnosing and restoring service as quickly as possible in case of service failure.

NetFrame System
Ahmad Nouri
Confidential

Maestro Recovery Manager
Analysis - Problem Management

♦ Support Remote Management ... (continue)

The control of Raptor is completely "Fly By Wire" - i.e. no physical switch directly controls any function and no indicator is directly controlled by system hardware. All such functions referred to as "Out of Band " functions are controlled through a CDM. CDM basic functions are available so long as A/C power is available at the input to any of the power supplies.

CDM Subsystem supervises or monitors the following system features.

- Power supplies - Presence, status, A/C good, Power on/off and output voltage.

- Environment - Ambient and exhaust temperatures, Fan speed, speed control, Fan fault and overtemp indicators.

- Processor - CPU Presence, Power OK, Overtemp and Fault, NMI control, System reset, Memory type/ location and Bus/Core speed ratio.

- I/O - I/O canister insertion/removal and status indicator , PCI card presence, PCI card power and smart I/O processor Out Of Band control.

- Historical - Log of all events, Character mode screen image, and Serial number ♦ Support for Object Oriented Graphic User Interface
OO-GUI is graphic user interface with the following characteristic.

- User task oriented
  It uses tasks which user familiar and daily working with. User does not need to learn the tasks.

- User objects
  It uses objects which user working with during her or his daily work.

- Simplicity and useablity
  It is very simple to use and does not need long learning period.

- Point and click with context sensitive help
  Context sensitive help and point and click will help user to be very productive and get any information he needs on specific object or field or subject.

- Drag and drop
  Drag and Drop capability works with user object very well to accomplish the tasks.

NetFrame System
Ahmad Nouri
Confidential

Maestro Recovery Mger
Analysis - Problem nent

---

◆ Release Requirements (MRM V2.0, 4Q96)

Maestro Recovery Manager (MRM ) will support the following features locally through serial port and Wire Service Remote Interface card on the Raptor16.

MRM provide user friendly GUI with point and click capability to perform the following tasks which reviewed and accepted by the Focus Group for 4Q96 release.

- Power On /Off
  MRM support Power On/Off the server.
  User can do this task by right mouse click on the server object in the screen and see the result.

- Display Flight Recorder.
  While the server is working , Wire Service record all the server information in the 64K NVRAM. After the server failed, MRM will display the system log recorded in the NVRAM. User can evaluate the information and find the cause for the server failure. This can be done by right mouse click on the Flight Recorder object in the screen.

- System Reset

MRM support rebooting the server by right mouse click on the server object in the screen. This is warm reboot of the server and works as pushing the "reset" button on the server.

- Save

MRM will support saving Flight Recorder data, so user can send the file to the technical support for further diagnostic and recovery. It also can save the response for any Wire Service command failure.

- On Line help
  MRM will support online help contains overview, Getting Started, MRM tasks, Diagnostic and Recovery, and BIOS help.

- B0 back plane support

MRM will support the server with B0 back plane . Server with B0 back plane display wrong time stamp. MRM uses NetWare 4.11 Operating system time stamp to display correct time stamp.

---

NetFrame System
Ahmad Nouri
Confidential

Maestro Recovery M ger
Analysis - Problem S. nent

♦ Release Requirements (MRM V2.1, 1Q97)

Maestro Recovery Manager (MRM) will support Raptor16 Phase 2 for next release as follow. This release will delivered to customer by NetFrame Customer Support on CD.

MRM V2.1

MRM V 2.1 will support the MRM V2.0 plus the following new features for next release.

- User Walkthrough Requirements held on Dec 17, 1996
- Recovery and Diagnostic help.
  This help enable the user to display help based on message source or severity (fatal error, error, warning, ). In each case the help inform the user the cause for the error and what steps to take to solve the problem.

- C0 /E18 back plane support

- New C0 back plane Wire Service, Diagnostic, and BIOS message structure

NetFrame System
Ahmad Nouri
Confidential

Maestro Recovery Manager
Analysis - Problem Statement

---

◆ Release Requirements (MRM V2.2 , 2Q97)

MRM V2.2 for Raptor 16

MRM V2.2 will support MRM V2.1 plus the following new features.

- Remote connection via modem

MRM supports remote connection to an NF9000-16 via an external modem. MRM needs one external modem for client side and one external modem for the server side. The client modem can be installed and set up via the Windows NT/95 standard control panel/Modems installation. The server side modem has to be set up and connected to the server. Details of installation and setup for the modem are provided in the NF9000 Maestro Recovery Manager Installation Guide.
    MRM does not support internal modems.
    The following external Hayes compatible modems have been tested and worked with MRM.

* Client Modem
        US Robotics Sportster 33.6 Fax modem
        ZOOM fax MODEM V.34X 33.6
    * Server Modem
        ZOOM fax MODEM V.34X 33.6

- System Status

MRM supports retrieve and update of the system status components.
    System status comprised of the following components.

* Power Supplies

The following information will be displayed for this feature.

1. Presence
        2. Status(ACOK, DCOK)
        3. Power On/off
        4. Output voltage (Analog measure of main supply + VREF)

---
NetFrame System
Ahmad Nouri
Confidential

Maestro Recovery Manager
Analysis - Problem Statement

* Temperatures

We will support four types of temperature for 5 sensors and display Operating (10 -35 degree C) and None-operating (-40 to 70 degree C).

1. Temperature of all sensors
    2. Warning temperature
    3. Shutdown temperature
    4. System over temp

* Fans

There are different type of fans in the system such as system fan and canister fan. All of them have the common following characteristics.

5. Speed (speed data)
    6. Control (LOLIM, can be set to LOW or HIGH)
    7. Fault (LED, Bits)

* Processors

There are 4 CPU in the Raptor16 with the following parameters.

1. CPU presence
    2. CPU Power OK
    3. System over temp
    4. System Fault
        If system over temp or CPU internal error or system power failure.
        then wire service report System Fault
    5. CPU Error
        If internal CPU error occurred, then report CPU error 6. CPU NMI control
    7. System Board Bus/Core speed ratio

* I/O Canisters

There are four canisters available

1. I/O canister (insertion, removal)
        This shows presence bits for canister.
    2. PCI cards
        This reflect PCI card slots [1-4] presence
    3. PCI card power
        This controls canister PCI slot power

---

NetFrame System
Ahmad Nouri
Confidential

Maestro Recovery M...er
Analysis - Problem S... ient

* Serial Numbers

This is the last known serial data for the following server parts

1. Back plane
    2. Canister 1-4
    3. Remote Interface (not implemented)
    4. System Board
    5. Power supply 1-2

* Revisions

MRM will support the following chips revision

1. Back Plane
    2. System board
    3. Power Supply 1- 2
    4. Canisters 1- 4
    5. Local Interface
    6. Remote Interface

- Context-sensitive Help

All elements in the window such as icon, entry field, push button, and radio button have context-sensitive help. This help contains the following type.

* What's this

It shows description of each elements in the window which it is not disabled. This can be accomplished by right mouse click on each element in the window.

* Help push button.

This display general help for all windows.

* F1 Key

The key displays the help for any entry field in the window.

- Print

MRM supports printing of flight recorder based on all messages, warning & errors, and errors with one type of font.

NetFrame System
Ahmad Nouri
Confidential

Maestro Recovery Manager
Analysis - Problem Statement

- Password

Wire Service password is originally set by Manufacturing to "NETFRAME" (case sensitive) for every NF9000-16 server.
    MRM provides a password changing mechanism for the Wire Service system. For security purposes, MRM only allows the password to be changed via the local serial port connection and not via the remote connection

- Support B0/E18 on NT4.0 server

MRM supports B0/E18 configurations by utilizing a time stamp software component which resides on the NT4.0 server.

Installation instructions for the time stamp are provided in the NTReadMe file on a floppy disk packaged with MRM.

MRM requires the NetFRAME NT Value Add software to operate.

The NetFRAME NT Value Add software will automatically install the time stamp for you. If you have not installed NetFRAME NT Value Add, then you need to install the time stamp provided for you on the NTSup floppy disk.

- Support for InstallShield

InstallShield setup software is used to install MRM on the client workstation.

- Delivery

MRM package contains the following.

* NF9000 Maestro Recovery Manager CD release.
      This CD contains MRM software and documentation.
    * Two support floppy disks for NF9000-16 B0 back plane for NT and NetWare.
    * Boxes contain above items, Remote Interface Card, adapter, cables, and documentation.

- Dependency

MRM version 2.2 depends on the following items:

- Remote Interface chip provided by Wire Service(Firm Ware) department.
    - Remote Interface card provided by Hardware Engineering department.
    - Remote Interface boxes, cables, and power adapters provided by Manufacturing.

---

NetFrame System
Ahmad Nouri
Confidential

Maestro Recovery M...er
Analysis - Problem S...ment

♦ Release Requirements (MRM V2.2, 2Q97)

MRM V2.2 for Raptor 8
MRM V2.2 for Raptor 8 has the same features as MRM v2.2 for Raptor16 with the following different.

- Support for C0 back plane and F18 BIOS
- System Status

The following components of System Status are different from MRM V2.2 for Raptor16.

* Power Supplies
        1. User can not turn off and on specific power supply.
        2. Raptor 8 has three power supply.
        3. There are no DC (OK, BAD) for Raptor8.
        4. AC for all power supplies are good all the times.

* Fans
        1. Four system board fans in front
        2. Two system board fans (Storage fans) in back
        3. Group A and group B sharing two fans.

* I/O Groups
        1. Group A contains 4 PCI card slots
        2. Group B contains 4 PCI card slots.

* Serial Numbers
        1. Serial number for Group A and B fans are the same.
        2. There is serial number for power supply # 3.

* Revisions
        1. Group A and B fans have the same revision.
        2. There is revision for power supply #3

Maestro Recovery Manager
Analysis - Problem Statement

- Delivery

MRM package contains the following.

* NF9000 Maestro Recovery Manager CD release.
      This CD contains MRM software and documentation.

* Boxes contain above items, Remote Interface Card, adapter, cables, and documentation.

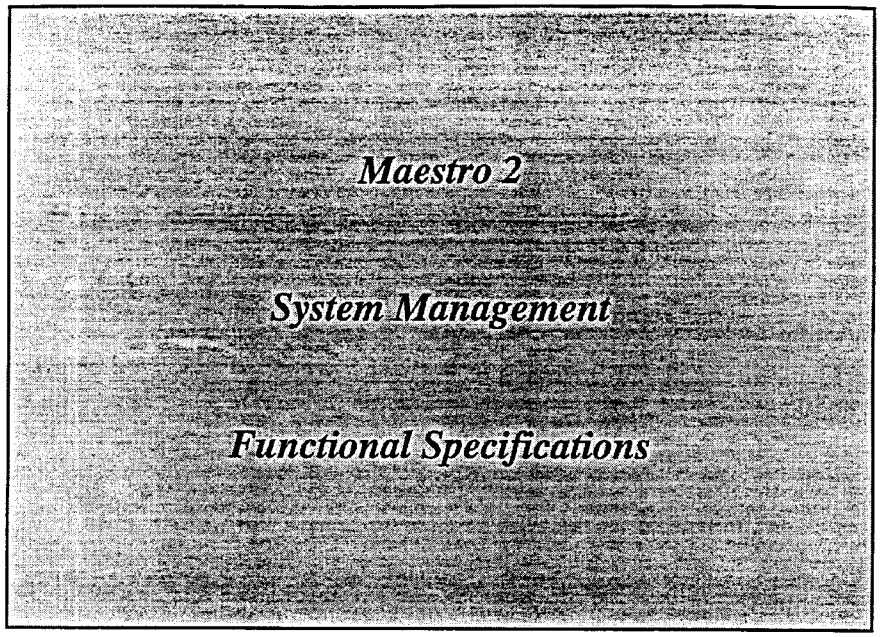

Table of Contents

TABLE OF CONTENTS ........................................................................................................ 2

OVERVIEW .......................................................................................................................... 3

NETWORK MAP ................................................................................................................... 4
    DISCOVERY ........................................................................................................................ 4
        *Automatic Discovery* ................................................................................................ 4
        *Display Styles* ......................................................................................................... 4
    PERSISTENT SERVER LIST .................................................................................................. 4

SERVER MANAGEMENT ..................................................................................................... 5
    SERVER MANAGEMENT WINDOW ...................................................................................... 5
        *MIB Navigation* ...................................................................................................... 6
        *Viewing MIB Data* .................................................................................................. 6

ALERT MANAGEMENT ....................................................................................................... 7
    ALERT CONFIGURATION .................................................................................................... 7
        *Adding/Deleting notification* .................................................................................. 7
        *Notification mechanism* .......................................................................................... 7

HOT ADD AND SWAP .......................................................................................................... 9
    HOT ADD/SWAP OF LAN AND SCSI CARDS ...................................................................... 9
        *Hot Add/Swap dialog box* ....................................................................................... 9
        *Hot Add/Swap Mechanism* ...................................................................................... 9
    HOT ADD OF STORAGE DEVICES ...................................................................................... 10

LOG MANAGER .................................................................................................................. 11
    LOG MANAGER WINDOW ................................................................................................ 11
    LOG CONFIGURATION ..................................................................................................... 11

APPLICATION INPUT / OUTPUT ..................................................................................... 13
    DISK INPUT AND OUTPUT ............................................................................................... 13
        *Creating a new file* ............................................................................................... 13
        *Saving a file* ......................................................................................................... 13
        *Opening a file* ...................................................................................................... 13
    PRINTING ......................................................................................................................... 13
        *Server Information* ............................................................................................... 13
        *Network Map* ....................................................................................................... 13
        *Log* ....................................................................................................................... 13

NetFRAME
Proprietary and Confidential

Overview

Maestro 2.0 is an application that will run under Windows 95/NT. It will allow the user to manage the NetFRAME CS 9000 server. It will sport a Windows 95/NT user interface and will allow the user to manage the NetFRAME CS 9000 server through the network via SNMP.

Maestro will conform to user interface guidelines for Windows 95/NT and will use industry standard high level networking protocols like SNMP. Maestro 2 will empower the user through a graphical user interface. The user will be able to access most of the functionality through point-n-click methods.

Maestro is a multiple document interface (MDI) application. It will provide the user with the following windows

- Network Map window
  This window contains a list of the CS 9000 servers present on the network. There will only be one instance of this window.

- Server Management Window
  Users can open a window into each of the CS 9000 servers present in the network map. This window provides all the functionality to control and manage the servers

- Log Management Window
  Maestro 2.0 logs all important events. This window provides an interface into the log. Users will be able to browse the log through this window.

In addition to the windows mentioned above, Maestro will use several dialog boxes for Hot Add/Swap, Alert Management and for user set-able options. The application will allow the user to save information about the server, network map and their custom options. It will also allow the user to print information displayed in the application NetFRAME
Proprietary and Confidential

Network Map

Maestro 2.0 presents the user with a list of the CS 9000 servers present on the network. This eliminate the need to remember the name of the server or its network address. The following is the network map window.

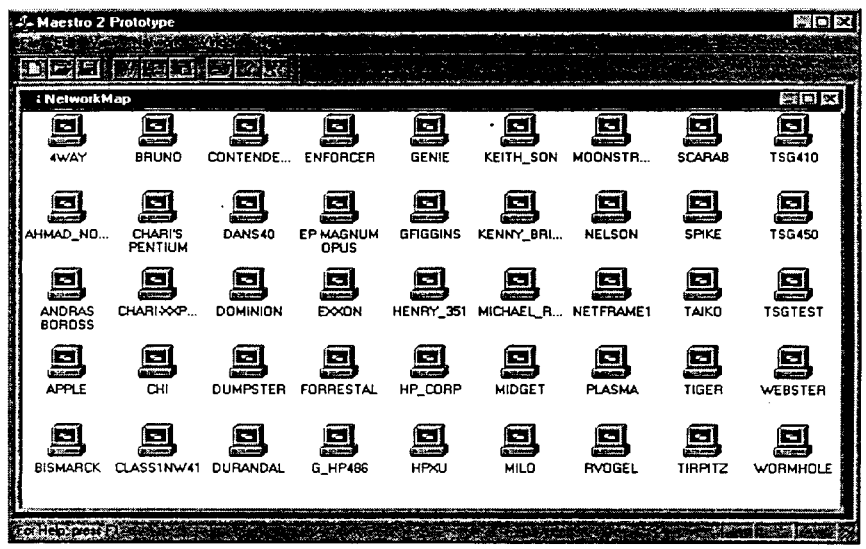

Discovery

Automatic Discovery

Maestro 2.0 is geared to automatically discover the servers on the network. By default, it discovers the servers every 120 minutes. This is a user set-able parameter and can be changed according to preference. The user can override the automatic discovery and configure the discovery to be in response to an explicitly issued command. The discovery is carried out through a background task and thereby doesn't block the main application from use.

Display Styles

Users can change the display style in the network map window. The choices are *Large Icons* (shown above), *Small Icons* and *Details*. The Details mode contains, in addition to the name, the network address of the servers.

NetFRAME
Proprietary and Confidential

Persistent Server List

The network map window automatically saves the network map window information to the disk. It will be stored in the directory in which the Maestro 2.0 application suite is installed.

Server Management

The server management functionality enables the user to "browse" through the contents of the NetFRAME CS 9000 SNMP Management Information Base (MIB). The MIB is essentially a representation of all the components of the CS 9000 server including hardware and software. The MIB is broadly into the following sections:

- Overall system section
- Cooling section
- Power section
- Software and Firmware section
- Wire Services section
- CPU section
- Fixed Bus section
- Swap-able bus section The data available in these sections will be presented in the form of dialog box windows. Users can use the mouse to navigate through these section. The CS 9000 MIB also supports many commands under the sections mentioned above. It is through these commands that the user will be able to control and manage the operation of the server. The MIB is described in detail in the CS 9000 MIB document.

Server Management Window

Each NetFRAME CS 9000 is represented by a server management window. All server management functions will be provided through this window. The window is split into two parts - the left part will be used for navigating the MIB sections mentioned above and the right part will contain the data made available through the MIB.

The following figure is a server management window.

NetFRAME
Proprietary and Confidential

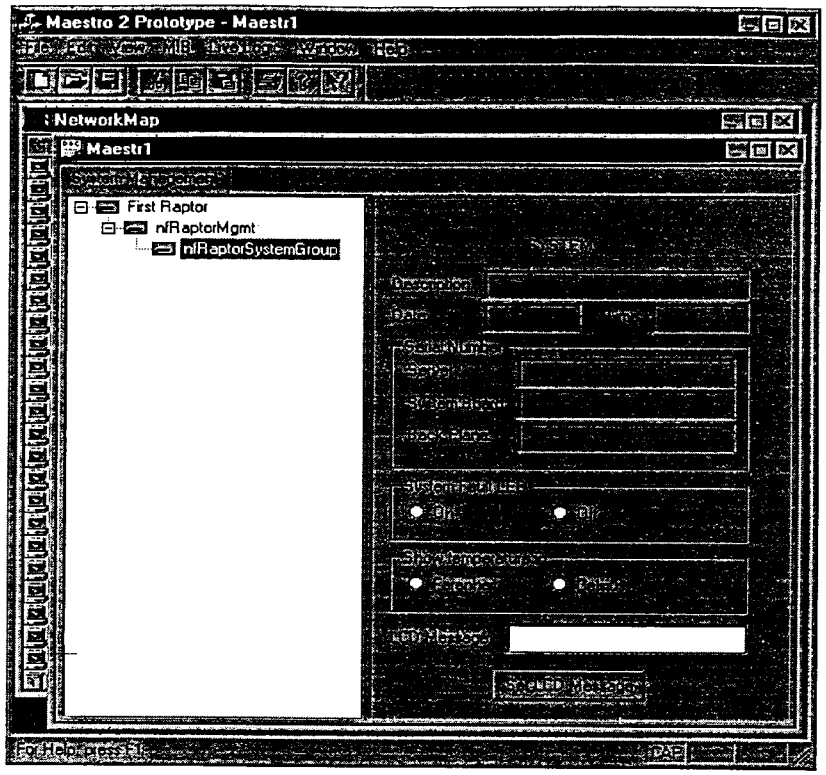

MIB Navigation

Users will be able to navigate the MIB through the Windows 95/NT tree control shown on the left side of the window. The root level of the tree will be the name of the server and all the sections will be "child" branches of the root. If a section has subsections or contains more than one occurrence of one type of device, for e. g., fans in the cooling section, it will contain "child" branches for the subsection or occurrence.

Viewing MIB Data

Typically, when the user selects a section that contains data, for e. g., the *nfRaptorSystemGroup*, a dialog box type window is displayed on the right side with the information. In the event the section supports commands, for example, changing the temperature units to Fahrenheit or Celsius, they are displayed in white. Standard Windows 95/NT control will be used for the commands and users can operate them intuitively.

If the user selects a section that is further divided into subsections or contains more than one occurrence of one type of device, then the names of the subsection or the occurrence of the device is displayed on the right.

Alert Management

Maestro 2.0 and the CS 9000 MIB support SNMP traps. Users will be able to receive alerts in response to traps generated by CS 9000 SNMP agents on the servers. The CS 9000 MIB supports different kinds of alerts and the user can manage this list through the Alert management window. The following is the alert management window:

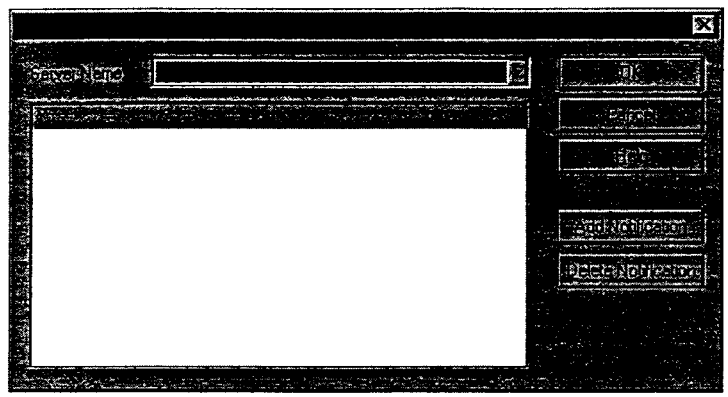

Alert Configuration

The window shown above will contain the list of names of the servers (same as network map) and the alerts supported. Users can either configure the alerts for to be specific for each server or use one configuration for all the servers. Alert notification can be requested or removed through this window.

Adding/Deleting notification

Users can request notification for an alert by selecting the server and alert and clicking *Add Notification*. At this point, another dialog box is displayed for the user to specify the type of notification required. If the user no longer requires notification they can disable notification for the alert through *Delete Notification*.

Notification mechanism

Users can choose the type of the alert notification. Regardless of the mechanism chosen by the user, every alert that Maestro 2.0 receives will be logged. The following notification mechanism options are available.

- Dialog box
  In this case, a blocking dialog box with a detailed description of the alert and will be displayed. Typically, this is used for serious problems that have occurred on the server, for e. g., a failed network card. The following is the window that will be displayed when Maestro receives an alert.

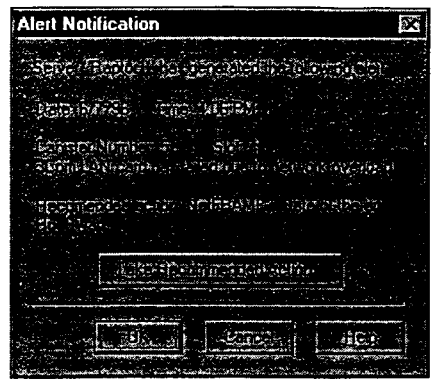
- Log alert
  Users can choose to just log an alert by selecting this option. The log can later be read through the Log Manager window.
NetFRAME
Proprietary and Confidential
*NetFRAME Systems Confidential*
*Srikumar Chari*

Hot Add and Swap

Maestro 2 will support hot swap and add of LAN and SCSI cards, and hot add of storage devices. Users can perform a hot swap when there is a problem with a particular LAN or SCSI card. Typically, this operation will be in response to an alert received by Maestro. A hot add operation is performed when the user wants to add a LAN or SCSI card to a canister or to add a Disk, CD drive or Tape drive.

Hot Add/Swap of LAN and SCSI cards

Hot Add/Swap dialog box

Maestro 2 will display a dialog box similar to the one shown below to interact with the user for a hot swap and hot add operation. The dialog box will contain relevant information about the device being swapped or added. The dialog also contains a set of sequential steps which it will go through to complete the hot add/swap operation. By issuing the *Start* command, the user can initiate the hot add/swap process as mentioned below.

Hot Add/Swap Mechanism

Maestro 2.0 initiates the following steps to perform a hot add/swap operation:

- Check for unsupported cards in the canister
  If the canister contains unsupported cards, Maestro will warn the user that it could experience problems in trying to complete the hot add/swap operation. At this point the user could ignore the warning and continue or abort the hot add/swap operation.

- Unload drivers associated with the canister
  This step could cause an error if the canister contains unsupported cards.

- Turn power off for the canister

- Asks the user to add/swap a card

- Turn power on for the canister

- Check for unsupported cards in the canister

- Reset the drivers associated with the canister
  This step could cause an error if the canister contains unsupported cards.

After each step, Maestro will indicate the success by adding a √ mark. If Maestro encounters an error, a detailed description of the error will be displayed.

Hot Add of Storage Devices

Hot add for storage devices like disks, CD's and tapes is different from cards. Users can hot add a storage device through Maestro 2. When the user selects the command to add a storage device, Maestro 2 will display a dialog to perform the following sequential steps:

1. Wait for the user add the storage device

2. Issue a command to the operating system to scan for new devices

Log Manager

Log Manager Window

Maestro 2.0 maintains a log of events like the alerts received, unsuccessful login attempts, etc. Users can browse this log through the window shown below.

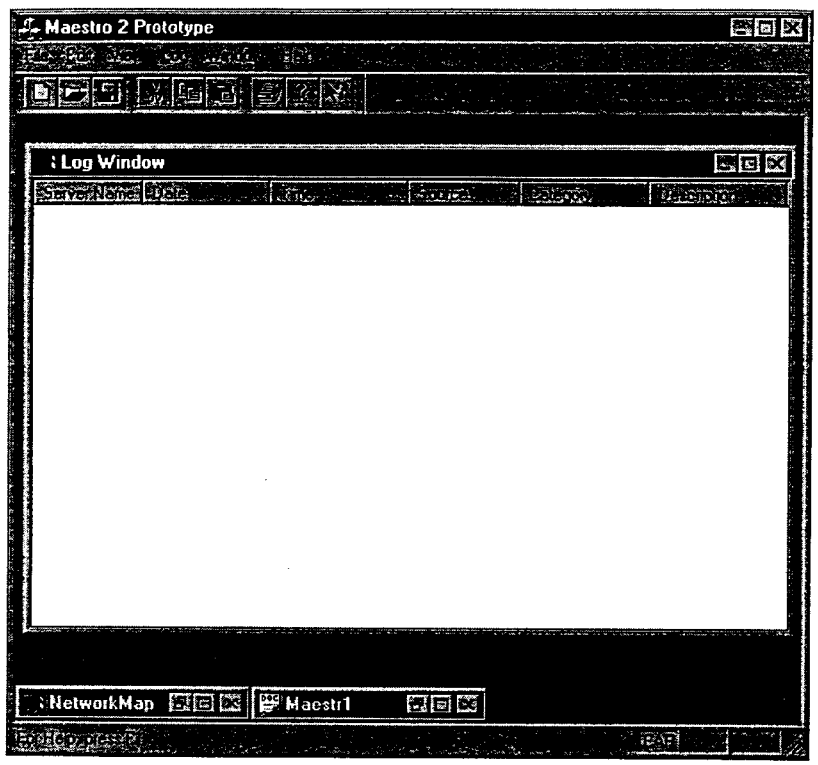

Log Configuration

Users will be able to control the size of the log and also the log clean up process. They can configure the log through the dialog box shown below.

NetFRAME
Proprietary and Confidential

*Maestro 2.0 Functional Specifications*

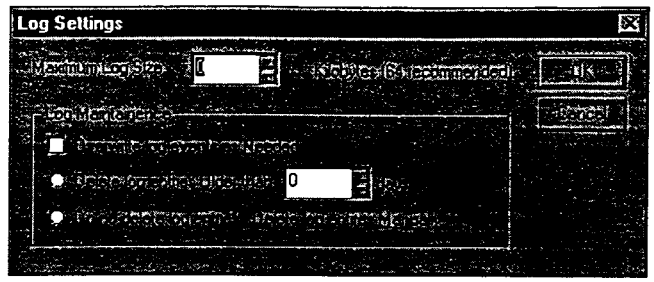

Application Input / Output

Maestro 2.0 provides different forms of input and output. Users can save file to disk and open file from disk, and print information about a server.

Disk Input and Output

Users can save files to disk or read files from disk just as they would a text document. Maestro 2.0 will support standard commands such as creating a new file, opening a file and saving a file.

Creating a new file

Users can create a file by double clicking on a server in the Network Map window. This will create a server management window. At this point, Maestro 2.0 will start retrieving server information and populate the window. The name of the file will be the same as that of the server.

Users can also create a file by using the File-New command. Maestro 2.0 will ask the user to enter the name of a server and it attempt to communicate with the server. Upon success, it opens a server information window. The name of the file will be the name provided by the user.

Saving a file

Maestro 2.0 allows the user to save information about a server to disk. The information saved will include the MIB data and options for the server. If the file is being saved for the first time, Maestro prompts the user to enter a file name. Standard Windows 95/NT dialog boxes will be used to interact with the user.

Opening a file

Users can open a file previously saved through the File - Open command. A standard File - Open dialog box will be displayed and users can navigate the file system through this dialog box to find specific files.

Maestro 2.0 also allows a user to open a file by double clicking on a server in the Network Map window. When the user double clicks on a server, Maestro will determine whether the user has saved a file containing information about the server. If the user has saved a file, Maestro opens a server information window and populates the window with information contained in the file.

Printing

Users can print the following through Maestro 2.0

Server Information
The contents of the Server information window is printed.

Network Map
Maestro will print a list of the CS 9000 servers in the network. The network addresses of the server will also be included in the report.

Log

*Maestro 2.0 Functional Specifications*

The contents of the log window can also be printed. In the case of the log window, the user will have an option to specify the log entries to be printed.

NetFRAME
Proprietary and Confidential

Introduction

Maestro Recovery Manager (MRM) can manage the server when it's down, communication fails, or server objects fail to operate (e.g. fan failure). Use Maestro Recovery Manager when a server failure is detected or when you want to monitor, recover or diagnose the server.

MRM is comprised of the three following components:

Server

The Server component is used to monitor the server's power, power on the server, power off the server, or reset the server. To open the server, click {bmc lft-serv.BMP} in the left pane.

Flight Recorder

The Flight Recorder component is used to retrieve the contents of the server's message log. The information can be saved to a text file or printed and sent to your system administrator or NetFRAME Technical Support for further analysis. To open the Flight Recorder, click {bmc lft-flt.BMP} in the left pane.

System Status

The System Status component is used to monitor individual server components, their attributes, and their status. System Status contains information on power supplies, temperature measurements, fans, processors, I/O canisters, serial numbers, and product revisions. To open System Status, click {bmc lft-stat.BMP} in the left pane.

---

{button ,Alink(WORK, , , )} Related Topics

Logging on

Before viewing a server's operational status, component status, or message log, log on to the server. To log on to a server, complete the following procedure:

1 Start Maestro Recovery Manager (MRM). The Logon screen is displayed.
2 Enter the server password.
3 Select the serial port used to connect to the server or modem.
4 To connect to the server using a serial connection, select Serial Connection
5 To connect to the server using a modem, select Modem Connection

Note

- The password is case-sensitive.

Logging on (continued) - serial

1 Confirm the serial cable is properly connected.
2 Click OK. The Connection status window is displayed.
3 If the connection is successful, the MRM main window is displayed. If the connection fails, an error message is displayed.

Logging on (continued)- modem

1 Enter the server phone number in the Dial field.
2 Confirm the modem is on and properly connected.
3 Click OK. The Dialing Properties property page is displayed. Select the appropriate options for this connection and click OK. The Connection status window is displayed.
4 If the connection is successful, the MRM main window is displayed. If the connection fails, an error message is displayed.

Server Window

The Server window is used to monitor server power, power on servers, power off servers, and reset servers. Select from the following:

{button ,JumpId(mrm.HLP>(w95sec),Querying_the_Server_Power_Status)} Querying the Server Power Status
{button ,JumpId(mrm.HLP>(w95sec),Powering_On_the_Server)} Powering On the Server
{button ,JumpId(mrm.HLP>(w95sec),Powering_Off_the_Server)} Powering Off the Server {button ,JumpId(mrm.HLP>(w95sec),Resetting_the_Server)} Resetting the Server {button ,Alink(WINS, , , )} Related Topics Overview: Working with the Server Maestro Recovery Manager (MRM) is used to monitor server power, power on servers, power off servers, reset servers, and change server passwords. Select from the following:
{button ,JumpId(mrm.HLP>(w95sec),Querying_the_Server_Power_Status)} Querying the Server Power Status
{button ,JumpId(mrm.HLP>(w95sec),Powering_On_the_Server)} Powering On the Server
{button ,JumpId(mrm.HLP>(w95sec),Powering_Off_the_Server)} Powering Off the Server
{button ,JumpId(mrm.HLP>(w95sec),Resetting_the_Server)} Resetting the Server
{button ,JumpId(mrm.HLP>(w95sec),Changing_the_Server_Password)} Changing the Server Password {button ,Alink(WORK, , , )} Related Topics Querying the Server Power Status When working with a server, it is important to know if the server is powered on. To check the power status of a server, complete the following procedure:
1   Click {bmc lft-serv.BMP} in the left pane of the main window. The Server window is displayed.
2   Click Query. The power status is displayed above the Query button.
3   To turn the server on, click Power On.
4   To turn the server off, click Power Off.
5   To reset the server or perform a warm boot, click System Reset.

{button ,Alink(PWR, , , )} Related Topics

Powering On the Server

Maestro Recovery Manager (MRM) can remotely power the server on or off. To turn the server on, complete the following procedure:
1   Click {bmc lft-serv.BMP} in the left pane of the main window. The Server window is displayed.
2   Click Query. The power status is displayed above the Query button.
3   If the server is currently powered down, click Power On. A confirmation message is displayed.
4   Click Yes. MRM reports whether the procedure was successful.
5   To return to the System window, click OK. To review the command sent to the server and the response received, click Details.

Tip

- To quickly power the server on, right-click the Server icon and select Power On from the pop-up menu.

{button ,Alink(PWR, , , )} Related Topics

Powering Off the Server

Maestro Recovery Manager (MRM) can remotely power the server on or off. To turn the server off, complete the following procedure:
1   Click {bmc lft-serv.BMP} in the left pane of the main window. The Server window is displayed.
2   Click Query. The power status is displayed above the Query button.
3   If the server is currently powered on, click Power Off. A confirmation message is displayed.
4   Click Yes. MRM reports whether the procedure was successful.
5   To return to the System window, click OK. To review the command sent to the server and the response received, click Details.

Tip

- To quickly power the server off, right-click the Server icon and select Power Off from the pop-up menu.

---

{button ,Alink(PWR, , , )} Related Topics

Resetting the Server

Maestro Recovery Manager (MRM) can remotely reset (warm boot) the server. To reset the server, complete the following procedure:
1. Click {bmc lft-serv.BMP} in the left pane of the main window. The Server window is displayed.
2. Click System Reset. A confirmation message is displayed.
3. Click Yes. MRM reports whether the procedure was successful.
4. To return to the System window, click OK. To review the command sent to the server and the response received, click Details.

Tip

- To quickly reset the server, right-click the Server icon and select System Reset from the pop-up menu.

---

{button ,Alink(PWR, , , )} Related Topics

Changing the Server Password

To change the server password, complete the following procedure:
1. Select Change Password from the Server menu. The Change Password dialog box is displayed.
2. Enter the current password in the Old Password field.
3. Enter a new password.
4. Retype the new password.
5. Click OK. The password is updated.

Notes

- The password is case-sensitive.
- The server password cannot be changed through a modem connection. You must be connected to the server through a serial connection.

Tip

- To quickly change the password, right-click the Server icon and select Change Password from the pop-up menu.

Overview: Working with the Flight Recorder

The Flight Recorder is used to retrieve the contents of the server's message log, whether the server is running or not. This information includes the Time Stamp, the Severity, the Message Source, and the Message text of each event.

To open the Flight Recorder, click {bmc lft-flt.BMP} in the left pane of the main window. Then, download the most current information.

This information can be saved or printed and sent to your system administrator or NetFRAME Technical Support for further analysis.

---

{button ,Alink(WORK, , , )} Related Topics

Flight Recorder Window

The Flight Recorder is used to retrieve the contents of the server's message log, whether the server is running or not. This information includes the Time Stamp, the Severity, the Message Source, and the Message text of each event.

To open the Flight Recorder, click {bmc lft-flt.BMP} in the left pane of the main window. Then, download the most current information.

This information can be saved or printed and sent to your system administrator or NetFRAME Technical Support for further analysis.

---

{button ,Alink(WINS, , , )} Related Topics

Downloading the Flight Recorder Message Log

When you first open the Flight Recorder Message Log, no information is displayed. To download the message log, complete the following procedure:

1. Click {bmc lft-flt.BMP} in the left pane of the main window. The Flight Recorder window is displayed.
2. Click Download. A confirmation message, showing the amount of time needed to complete the download, is displayed.
3. Click Yes. Maestro Recovery Manager (MRM) begins downloading the information. To cancel downloading, click Cancel.
4. To save the message log as a text file, click Save.
5. To print the message log, click Print.

Note

- MRM does not continuously monitor the server. For example, if an event occurred after the message log was downloaded, it would not be displayed in the Flight Recorder window. The message log may be downloaded at any time and as often as necessary.

Tip

- To quickly download the Flight Recorder Message Log, right-click the Flight Recorder Icon and select which messages you want to view.

{button ,Alink(FLT, , , )} Related Topics

Saving the Message Log as a Text File

To save the message log as a text file, complete the following procedure:

1. Click {bmc lft-flt.BMP} in the left pane of the main window. The Flight Recorder window is displayed.
2. Download the most current information.
3. Click Save. The Save As dialog box is displayed.
4. Select a file name and location.
5. Click OK. The message log is saved as a text file.

{button ,Alink(FLT, , , )} Related Topics

Printing the Message Log

To print the message log, complete the following procedure:

1. Click {bmc lft-flt.BMP} in the left pane of the main window. The Flight Recorder window is displayed.
2. Download the most current information.
3. To configure printer settings, select Page Setup from the Server menu.
4. Click Print. The Print dialog box is displayed.
5. Click OK.

{button ,Alink(FLT, , , )} Related Topics

Overview: Working with System Status

The System Status window is used to display the status of server components. To open System Status, click {bmc lft-stat.BMP} in the left pane of the main window. The System Status window is displayed.

To view the status of a server component, double-click its icon. The components that can be monitored by System Status include:

| | |
|---|---|
| {bmc ico-pwr.BMP} | Power Supplies |
| {bmc ico-temp.BMP} | Temperature |
| {bmc ICO-FAN8.SHG} | Fans (NF9000-8) |
| {bmc ico-fans.BMP} | Fans (NF9000-16) |
| {bmc ico-cpu.BMP} | Processor |

| | |
|---|---|
| {bmc ICO-IO8.SHG} | I/O Groups (NF9000-8) |
| {bmc ICO-IO16.SHG} | I/O Canisters (NF9000-16) |
| {bmc ico-ser.BMP} | Serial Numbers |
| {bmc ico-revv.bmp} | Revisions |

{button ,Alink(WORK, , , )} Related Topics

System Status Window

The System Status window is used to monitor server components. To open System Status, click {bmc lft-stat.BMP} in the left pane of the main window. The System Status window is displayed.

To view the status of a server component, double-click its icon. The components that can be monitored by System Status include:

| | |
|---|---|
| {bmc ico-pwr.BMP} | Power Supplies |
| {bmc ico-temp.BMP} | Temperature |
| {bmc ICO-FAN8.SHG} | Fans (NF9000-8) |
| {bmc ico-fans.BMP} | Fans (NF9000-16) |
| {bmc ico-cpu.BMP} | Processor |
| {bmc ICO-IO8.SHG} | I/O Groups (NF9000-8) |
| {bmc ICO-IO16.SHG} | I/O Canisters (NF9000-16) |
| {bmc ico-ser.BMP} | Serial Numbers |
| {bmc ico-revv.bmp} | Revisions |

{button ,Alink(WINS, , , )} Related Topics

System Status: Power Supplies

This window displays power supply status information. To obtain current information, click Refresh. This information includes:

Present

Indicates the power supply is installed and present.

A.C.

Indicates whether the power supply is receiving A.C. power.

D.C.

Indicates whether the power supply is supplying D.C. voltage.

Power

Indicates the server is On or Off.

Output Voltages

Indicates the power (in volts) generated by each power supply line.

Note

- Power Supply #3 is for the NF9000-8 only.

{button ,Alink(SYSSTAT, , , )} Related Topics

System Status: Temperature

This window displays information about the operational temperatures of the server. To obtain current temperature information, click Refresh. To apply any changes made in this window, click Update.

Temperature Sensor 1

Indicates the temperature measured by Sensor 1.

Temperature Sensor 2

Indicates the temperature measured by Sensor 2.

Temperature Sensor 3
Indicates the temperature measured by Sensor 3.

Temperature Sensor 4
Indicates the temperature measured by Sensor 4.

Temperature Sensor 5
Indicates the temperature measured by Sensor 5.

Warning Level
Shows the temperature warning level (default 55 degrees Celsius). When any temperature sensor measures this level or higher, a warning is issued. To change the warning level, enter a new temperature and click Update.

Shutdown Level
Shows the temperature shutdown level (default 70 degrees Celsius). When any temperature sensor measures this level or higher, the server is automatically shut down. To change the shutdown level, enter a new temperature and click Update.

Show Temp in Degrees
Select whether the temperatures are in Celsius or Fahrenheit.

System Overtemp?
Indicates whether the server temperature is above the Warning threshold.

---

{button ,Alink(SYSSTAT, , , )} Related Topics

System Status: Fans

This window displays server and group fan status information. To obtain current status information, click Refresh.

The information that appears in this window includes:

Location
Indicates the location of the fan. Options include System Board and Groups A or B.

Fans 1-6 (System Board), 1-2 (Group)
Indicates the location of the fan. For information on the physical location, click here {bmc SHORTCUT.BMP}

Speed
Displays the fan operating speed (in RPM).

Speed Control
Indicates the fan is operating at High or Low speed.

Fault Indicator LED
Indicates the Fan Fault LED on the server enclosure is On or Off.

Fault
Indicates whether the fan failed.

Low-speed Fault Threshold Speed
Displays the low-speed fault threshold speed. When a fan drops below this speed, the fan is reported as failed. To change failure level, enter a new speed (in RPM) and click Update. The speed must be entered in increments of 60 (e.g., 60, 120, 180, etc.).

Note

- To view status information on a specific group of fans, change their speed, or modify the speed at which they are considered failed, double-click the fan group's icon.

---

{button ,Alink(SYSSTAT, , , )} Related Topics

System Status: Fans

This window displays server and canister fan status information. To obtain current status information, click Refresh.

The information that appears in this window includes:

Location
Indicates the location of the fan. Options include System Board and Canisters A through D.

Fans 1-6 (System Board), 1-2 (Canister)
Indicates the location of the fan. For information on the physical location, click here {bmc SHORTCUT.BMP}

Speed
Displays the fan operating speed (in RPM).

Speed Control
Indicates the fan is operating at High or Low speed.

Fault Indicator LED
Indicates the Fan Fault LED on the server enclosure is On or Off.

Fault
Indicates whether the fan failed.

Low-speed Fault Threshold Speed
Displays the low-speed fault threshold speed. When a fan drops below this speed, the fan is reported as failed. To change failure level, enter a new speed (in RPM) and click Update. The speed must be entered in increments of 60 (e.g., 60, 120, 180, etc.).

Note

- To view status information on a specific group of fans, change their speed, or modify the speed at which they are considered failed, double-click the fan group's icon.

{button ,Alink(SYSSTAT, , , )} Related Topics

System Board Fans

This window displays information about the status of the system board fans. To obtain current information, click Refresh. To apply any changes made in this window, click Update.

Fans 1-6
Indicates the location of the fan. For information on the physical location, click here {bmc SHORTCUT.BMP}

Speed
Displays the fan operating speed (in RPM).

Fault
Indicates whether the fan failed.

Low-speed Fault Threshold Speed
Displays the low-speed fault threshold speed. When a system board fan drops below this speed, the fan is reported as failed. To change failure level, enter a new speed (in RPM) and click Update. The speed must be entered in increments of 60 (e.g., 60, 120, 180, etc.).

Speed Control
Indicates the fans are operating at High or Low speed. To change the speed, select High or Low and click Update.

Fault Indicator LED
Indicates the Fan Fault LED on the server enclosure is On or Off.

{button ,Alink(SYSSTAT, , , )} Related Topics

Group X Fans

This window displays information about the status of the fans in the selected group. To obtain current information, click Refresh. To apply any changes made in this window, click Update.

Fans 1-2
Indicates the location of the fan. For information on the physical location, click here {bmc SHORTCUT.BMP}

Speed
Indicates the fan operating speed (in RPM).

Fault
Indicates whether the fan failed.

Low-speed Fault Threshold Speed
Displays the low-speed fault threshold speed. When a fan in the selected canister drops below this speed, the fan is reported as failed. To change failure level, enter a new speed (in RPM) and click Update. The speed must be entered in increments of 60 (e.g., 60, 120, 180, etc.).

Speed Control
Indicates the fans are operating at High or Low speed. To change the speed, select High or Low and click Update.

Fault Indicator LED
Indicates the Fan Fault LED on the server enclosure is On or Off.

{button ,Alink(SYSSTAT, , , )} Related Topics

Canister X Fans

This window displays information about the status of the fans in the selected canister. To obtain current information, click Refresh. To apply any changes made in this window, click Update.

Fans 1-2
Indicates the location of the fan. For information on the physical location, click here {bmc SHORTCUT.BMP}

Speed
Indicates the fan operating speed (in RPM).

Fault
Indicates whether the fan failed.

Low-speed Fault Threshold Speed
Displays the low-speed fault threshold speed. When a fan in the selected canister drops below this speed, the fan is reported as failed. To change failure level, enter a new speed (in RPM) and click Update. The speed must be entered in increments of 60 (e.g., 60, 120, 180, etc.).

Speed Control
Indicates the fans are operating at High or Low speed. To change the speed, select High or Low and click Update.

Fault Indicator LED
Indicates the Fan Fault LED on the server enclosure is On or Off.

{button ,Alink(SYSSTAT, , , )} Related Topics

System Status: Processor

This window displays processor status information. To obtain current information, click Refresh. This information includes:

CPU 1-4
Indicates the location of the CPU. For information on the physical location, refer to the NetFRAME hardware documentation.

Present
Indicates whether the CPU is installed.

Power
Indicates whether the system is receiving power.

Overtemp
Indicates whether the system is running above operating temperature.

Error
Indicates whether a CPU internal error occurred.

NMI Control
Indicates whether NMI control is active or inactive.

Any Fault?
Indicates whether faults or errors occurred on any installed processors.

Bus/Core Speed Ratio
Indicates the server's Bus/Core speed ratio, a relative indicator of processor performance.

{button ,Alink(SYSSTAT, , , )} Related Topics

CPU X Status

This window displays status information for the selected CPU. To obtain current information, click Refresh. To apply any changes made in this window, click Update.

Present
When selected, the CPU is installed.

Power
Indicates whether the system is receiving power.

Overtemp
Indicates whether the system is running above operating temperature.

Error
Indicates whether a CPU internal error occurred.

NMI Control
Indicates NMI control is active or inactive.

{button ,Alink(SYSSTAT, , , )} Related Topics

System Status: I/O Groups (NF9000-8)

This window displays I/O group status information. To obtain current information, click Refresh. This information includes:

PCI 1-4
Indicates whether a peripheral card is installed in the specified PCI slot.

PCI Power
Indicates whether the canister's PCI bus is receiving power.

{button ,Alink(SYSSTAT, , , )} Related Topics

System Status: I/O Canisters (NF9000-16)

This window displays I/O canister status information. To obtain current information, click Refresh. This information includes:

Status
Indicates the canister is inserted or removed.

PCI 1-4
Indicates whether a peripheral card is installed in the specified PCI slot.

PCI Power
Indicates whether the canister's PCI bus is receiving power.

---

{button ,Alink(SYSSTAT, , , )} Related Topics

System Status: Serial Numbers

This window lists the serial numbers of the processor board, backplane, canisters, power supplies, and remote interface. To obtain current information, click Refresh.

---

{button ,Alink(SYSSTAT, , , )} Related Topics

System Status: Revisions

This window displays server component revision information. To obtain current information, click Refresh.

---

{button ,Alink(SYSSTAT, , , )} Related Topics

Fan Locations

Select from the following:
{button ,JumpId(mrm.HLP,Fan_Locations_NF9000_16_System_Board)} NF9000-16 System Board Fans
{button ,JumpId(mrm.HLP,Fan_Locations_NF9000_16_Canister)} NF9000-16 Canister Fans
{button ,JumpId(mrm.HLP,Fan_Locations_NF9000_8)} NF9000-8 Fans

Fan Locations: NF9000-16 (System Board)

For fan information, click the fans below:
{bmc 9000-16.bmp}

Fan Locations: NF9000-16 (Canister)

Each canister in the NF9000-16 has two fans. The fan closest to the rear of the canister is Fan #2. The other is Fan #1.

Fan Locations: NF9000-8

For fan information, click the fans below:
{bmc 9000-8.bmp}

Note

- There are two fans located at the rear of the NF9000-8. The top fan is System Board Fan #5; the lower fan is System Board Fan #6.

# When selected, the Flight Recorder lists all messages, including:

---

All_Messages $ All Messages

Unknown
Informational
Warning
Recoverable Error
Fatal Error

*$ When selected, the Flight Recorder only lists error (recoverable and fatal) and warning messages.

*$ When selected, the Flight Recorder only lists error (recoverable and fatal) messages.

Time Stamp

Displays the time of the messages in the local time zone of the client running Maestro Recovery Manager.

Severity

Displays the message's severity. These include:
- Unknown
- Informational
- Warning
- Recoverable Error
- Fatal Error

Message

Displays the actual message. For more information on the message and steps to correct any errors, click Help Topics and locate the message in the Diagnostics and Recovery Messages book.

Message Source

Displays the source of the message (e.g. Wire Services, Diagnostics, BIOS).

Query

Checks the power status of the server (On or Off).

System Board Fan #1

System Board Fan #2

System Board Fan #3

System Board Fan #4

System Board Fan #5

---

* Warnings_and_Errors_Only
$ Warnings and Errors Only
* Error_Only
$ Error Only

System Board Fan #6

Canister Fan #1

Canister Fan #2

Group Fan #1

Group Fan #2

Starting Maestro Recovery Manager (MRM)

To start MRM, click Start, point to Programs, point to NetFRAME Maestro Recovery Manager, and click Recovery Manager.

Fan X of System Board Failure

The specified fan is running below the threshold value.

Level of Severity - Recoverable Error

Source of Message - Wire Services

Possible Problem

The fan is running below its threshold value or has failed.

What to do

Replace the fan. For information on replacing the fan, refer to the NetFRAME hardware documentation. For information on fan location, click here {bmc SHORTCUT.BMP}.

Reset System

Indicates the system was reset at the specified time.

Level of Severity - Informational

Source of Message - Wire Services

System CPU X Fault

The specified CPU failed.

Level of Severity - Fatal Error

Source of Message - Wire Services

Possible Problem

The specified CPU failed.

What to do

Replace the CPU. For information on replacing the CPU, refer to the NetFRAME hardware documentation.

Flash System BIOS

Indicates the BIOS was flashed or updated at the specified time.

Level of Severity - Informational

Source of Message - Wire Services

Install Power Supply X

Indicates the specified power supply was installed into the server at the specified time.

Level of Severity - Informational

Source of Message - Wire Services

Disconnect Power Supply X

Indicates the specified power supply was disconnected or removed from the server at the specified time.

Level of Severity - Informational

Source of Message - Wire Services

ACOof PS X Changed

The status of the specified power supply's AC power changed from Bad to OK or from OK to Bad. If the power supply changed from Bad to OK, this is strictly informational and not a problem. If a power supply changes from OK to Bad, the level of severity increases to Recoverable Error. If all power supplies change from OK to Bad, the level of severity increases to Fatal Error.

Level of Severity - Informational (possibly Recoverable Error, possibly Fatal)

Source of Message - Wire Services

Possible Problem #1

The power supply is not plugged in or the power source is not good.

What to do

Confirm the cables are properly connected and test the power source with a lamp or device which is known to be working.

Possible Problem #2

The power supply failed.

What to do

Replace the power supply. For information on replacing the power supply, refer to the NetFRAME hardware documentation.

DCOof PS X Changed

The status of the specified power supply's DC power changed from Bad to OK or from OK to Bad. If the power supply changed from Bad to OK, this is strictly informational and not a problem. If a power supply changes from OK to Bad, the level of severity increases to Recoverable Error. If all power supplies change from OK to Bad, the level of severity increases to Fatal Error.

Level of Severity - Informational (possibly Recoverable Error, possibly Fatal)

Source of Message - Wire Services

Possible Problem

The power supply failed.

What to do

Replace the power supply. For information on replacing the power supply, refer to the NetRAME hardware documentation.

Install Canister X

Indicates the specified canister was installed into the server at the specified time.

Level of Severity - Informational

Source of Message - Wire Services

Disconnect Cannister X

Indicates the specified canister was disconnected or removed from the server at the specified time.

Level of Severity - Informational

Source of Message - Wire Services

Temperature Sensor X exceeds warning threshold

The warning threshold temperature was exceeded and detected by the specified sensor.

Level of Severity - Recoverable Error

Source of Message - Wire Services

Possible Problem #1

One or more fans failed.

What to do

Check for fan failure messages. If you received any, see system board fan failures or canister fan failures. Physically check and replace any failed cabinet fans.

Possible Problem #2

The ambient temperature of the room may be too high.

What to do

If this message is received during business hours, turn up the Air Conditioning or check the room's air circulation. If this message is received after hours (e.g. weekends, nights), the climate control systems may be set to shut off during these times. If the message is consistently received during a specific time of the day, the system may be located by a window receiving direct sun.

Temperature Sensor X exceeds shutdown threshold

The shutdown threshold temperature was exceeded and detected by the specified sensor. The system is shut down.

Level of Severity - Fatal

Source of Message - Wire Services

Possible Problem #1

One or more fans failed..

What to do

Check for fan failure messages. If you received any, see system board fan failures or canister fan failures. Physically check and replace any failed cabinet fans.

Possible Problem #2

The ambient temperature of the room may be too high.

What to do

If this message is received during business hours, turn up the Air Conditioning or check the room's air circulation. If this message is received after hours (e.g. weekends, nights), the climate control systems may be set to shut off during these times. If the message is consistently received during a specific time of the day, the system may be located by a window receiving direct sun.

System Power ON

Indicates the server was turned ON.

Level of Severity - Informational

Source of Message - Wire Services

System Power OFF

Indicates the server was turned ON.

Level of Severity - Informational

Source of Message - Wire Services

Fan X of Canister X Failure

The specified fan is running below the threshold value.

Level of Severity - Recoverable Error

Source of Message - Wire Services

Possible Problem

The fan is running below its threshold value or has failed.

What to do

Replace the fan. For information on replacing the fan, refer to the NetFRAME hardware documentation. For information on fan location, click here {bmc SHORTCUT.BMP}.

DIMM Confg Error

Indicates one or more of the DIMMs are mismatched.

Level of Severity - Fatal Error

Source of Message - Diagnostics

Possible Problem

One or more of the DIMMs is mismatched.

What to do

Shut down the server. Rearrange the DIMMs so they are not mismatched.

Locked Test Failed

Indicates failure of the multiprocessor bus lock function. Two processors cannot access the same memory area at the same time.

Level of Severity - Fatal Error

Source of Message - Diagnostics

Possible Problem

System board failure.

What to do

Contact an Authorized NetFRAME Service Provider for a system board replacement.

Mix Compare Error Msg

Indicates a checksum cache error.

Level of Severity - Fatal Error

Source of Message - Diagnostics

Possible Problem

Cache failure.

What to do

Contact an Authorized NetFRAME Service Provider for a system board replacement.

CPU Cache Error

Indicates a CPU error. CPUs are tested for 10 seconds each during startup.

Level of Severity - Fatal Error

Source of Message - Diagnostics

Possible Problem #1

CPU failure.

What to do

Replace the specified CPU

Possible Problem #2

System board failure.

What to do

Contact an Authorized NetFRAME Service Provider for a system board replacement.

Slave Compare Error CPU X

Slave CPU detected an error in the transfer of information from the Master.

Level of Severity - Fatal Error

Source of Message - Diagnostics

Possible Problem #1

CPU failure.

What to do

Replace the specified CPU. For information on replacing the CPU, refer to the NetFRAME hardware documentation.

Slave CPU Failed CPU X

The specified Slave CPU failed.

Level of Severity - Fatal Error

Source of Message - Diagnostics

Possible Problem

Slave CPU failure.

What to do

Replace the specified CPU. For information on replacing the CPU, refer to the NetFRAME hardware documentation.

Uncorrectable Memory Error

Indicates an ECC uncorrectable memory error.

Level of Severity - Fatal Error

Source of Message - Diagnostics

Possible Problem

Memory failure.

What to do

Replace the failed memory.

Correctable Memory Error

Indicates an ECC correctable memory error. This message only appears if you selected stop-on-error in Diagnostic mode.

Level of Severity - Fatal Error

Source of Message - Diagnostics

Possible Problem

Because the server uses error-correction, this is not a problem.

What to do

No action is necessary.

Intrapulse Event

The LCD screen reports wire services events. For more information on the specific message, refer to the Wire Services section of Diagnostics and Recovery.

Level of Severity - varies

Source of Message - Diagnostics

CPU NMI Errors CPU X

Specifies internal parity errors in the specified CPU.

Level of Severity - Fatal Error

Source of Message - Diagnostics

Possible Problem

CPU failure.

What to do

Replace the specified CPU. For information on replacing the CPU, refer to the NetFRAME hardware documentation.

APParity Error

Indicates an error in the Intel Orion chipset.

Level of Severity - Fatal Error

Source of Message - Diagnostics

Possible Problem

Orion chipset failure.

What to do

Contact an Authorized NetFRAME Service Provider for a system board replacement.

RPParity Error

Indicates an error in the Intel Orion chipset.

Level of Severity - Fatal Error

Source of Message - Diagnostics

Possible Problem

Orion chipset failure.

What to do

Contact an Authorized NetFRAME Service Provider for a system board replacement.

Correctable Error on P6 Bus

Indicates an error on the P6 Bus.

Level of Severity - Fatal Error

Source of Message - Diagnostics

Possible Problem

System board failure.

What to do

Contact an Authorized NetFRAME Service Provider for a system board replacement.

Uncorrectable Error on P6 Bus

Indicates an error on the P6 Bus.

Level of Severity - Fatal Error

Source of Message - Diagnostics

Possible Problem

System board failure.

What to do

Contact an Authorized NetFRAME Service Provider for a system board replacement.

P6 Protocol Violation

Indicates an error in the Intel Orion chipset.

Level of Severity - Fatal Error

Source of Message - Diagnostics

Possible Problem

Orion chipset failure.

What to do

Contact an Authorized NetFRAME Service Provider for a system board replacement.

PCI Parity Error

A parity error occurred on the PCI bus.

Level of Severity - Fatal Error

Source of Message - Diagnostics

Possible Problem #1

A recently added PCI card failed.

What to do

Remove and re-insert the card. If this message continues to appear, replace the card. If the new card still generates this error message, contact an Authorized NetFRAME Service Provider for the latest compatibility information.

Possible Problem #2

A PCI card failed.

What to do

Remove and re-insert each card. If this message continues to appear, remove each card and test until you locate the failed card. Replace the card. If the new card still generates this error message, contact an Authorized NetFRAME Service Provider for the latest compatibility information.

Possible Problem #3

Bad connections between the system board and the PCI card.

What to do

Problems #1 and #2 tested the card-to-bus and the canister-to-backplane connections. To test the system board-to-backplane connection, remove and replace the system board. If the problem persists, contact an Authorized NetFRAME Service Provider for a system board, backplane, or canister replacement.

AERRParity Error

Indicates an error in the Intel Orion chipset.

Level of Severity - Fatal Error

Source of Message - Diagnostics

Possible Problem

Orion chipset failure.

What to do

Contact an Authorized NetFRAME Service Provider for a system board replacement.

BERRParity Error

Indicates an error in the Intel Orion chipset.

Level of Severity - Fatal Error

Source of Message - Diagnostics

Possible Problem

Orion chipset failure.

What to do

Contact an Authorized NetFRAME Service Provider for a system board replacement.

Memory Data Error

Indicates bad data generated from the memory test.

Level of Severity - Fatal Error

Source of Message - Diagnostics

Possible Problem #1

Improperly seated memory.

What to do

Remove and replace the memory.

Possible Problem #2

Memory failure

What to do

Replace the memory. For information on replacing the memory, refer to the NetFRAME hardware documentation.

Mix Compare Error CPU X

Indicates a CPU cache memory error.

Level of Severity - Fatal Error

Source of Message - Diagnostics

Possible Problem #1

CPU failure.

What to do

Replace the specified CPU. For information on replacing the CPU, refer to the NetFRAME hardware documentation.

PCI Wrt Error

Indicates bad data generated when information written to the PCI Bus does not match the information returned.

Level of Severity - Fatal Error

Source of Message - Diagnostics

Possible Problem #1

A recently added PCI card failed.

What to do

Remove and re-insert the card. If this message continues to appear, replace the card. If the new card still generates this error message, contact an Authorized NetFRAME Service Provider for the latest compatibility information.

Possible Problem #2

A PCI card failed.

What to do

Remove and re-insert each card. If this message continues to appear, remove each card and test until you find the failed card. Replace the card. If the new card still generates this error message, contact an Authorized NetFRAME Service Provider for the latest compatibility information.

Possible Problem #3

Bad connections between the system board and the PCI card.

What to do

Problems #1 and #2 tested the card-to-bus and the canister-to-backplane connections. To test the system board-to-backplane connection, remove and replace the system board. If the problem persists, contact an Authorized NetFRAME Service Provider for a system board, backplane, or canister replacement.

Timer/APIC Failed

Indicates a CPU timer failure.

Level of Severity - Fatal Error

Source of Message - Diagnostics

Possible Problem

Chipset timer failure.

What to do

Replace the specified CPU. For information on replacing the CPU, refer to the NetFRAME hardware documentation.

Timer Stopped

Indicates a CPU timer failure.

Level of Severity - Fatal Error

Source of Message - Diagnostics

Possible Problem

Chipset timer failure.

What to do

Replace the specified CPU. For information on replacing the CPU, refer to the NetFRAME hardware documentation.

Lock Test Error

See Lock Failed.

LCD Write Error

Indicates a Wire Services error while writing to the LCD display.

Level of Severity - Fatal Error

Source of Message - Diagnostics

Possible Problem #1

A Wire Services problem occured.

What to do

Reset Wire Services by completely shutting down the server. For information on shutting down the server, refer to the NetFRAME hardware documentation.

Possible Problem #2

A PIC may have failed.

What to do

Depending on the location of the PIC, you may need to replace the system board or the backplane. Contact an Authorized NetFRAME Service Provider for a system board or backplane replacement.

IP Write Error

Interpulse Write Error. Indicates an error sending information to Wire Services.

Level of Severity - Fatal Error

Source of Message - Diagnostics

Possible Problem #1

A Wire Services problem occurred.

What to do

Reset Wire Services by <u>completely</u> shutting down the server. For information on shutting down the server, refer to the NetFRAME hardware documentation.

Possible Problem #2

A PIC may have failed.

What to do

Depending on the location of the PIC, replace the system board or the backplane. Contact an Authorized NetFRAME Service Provider for a system board or backplane replacement.

IP Read Error

Interpulse Read Error. Indicates an error receiving information from Wire Services.

Level of Severity - Fatal Error

Source of Message - Diagnostics

Possible Problem #1

A Wire Services problem occurred.

What to do

Reset Wire Services by <u>completely</u> shutting down the server. For information on shutting down the server, refer to the NetFRAME hardware documentation.

Possible Problem #2

A PIC may have failed.

What to do

Depending on the location of the PIC, replace the system board or the backplane. Contact an Authorized NetFRAME Service Provider for a system board or backplane replacement.

No Canister

Indicates a missing canister. This message only appears if you selected stop-on-error in Diagnostic mode.

Level of Severity - Warning

Source of Message - Diagnostics

Possible Problem

This is not a problem.

What to do

No action is necessary.

Diag Start

Indicates the start of the Diagnostics procedure.

Level of Severity - Informational

Source of Message - Diagnostics

Diag Stop

Indicates the end of the Diagnostics procedure.

Level of Severity - Informational

Source of Message - Diagnostics

Initialize Option ROM Error

Level of Severity - Fatal Error

Source of Message - BIOS

Possible Problem #1

Improper booting.

What to do

Restart system.

Possible Problem #2

Possible error with BIOS or system board.

What to do

Contact an Authorized NetFRAME Service Provider.

Interrupt Handler Error

Level of Severity - Fatal Error

Source of Message - BIOS

Possible Problem #1

Improper booting.

What to do

Restart system.

Possible Problem #2

Possible error with BIOS or system board.

What to do

Contact an Authorized NetFRAME Service Provider.

Pending Interrupt Error

Level of Severity - Fatal Error

Source of Message - BIOS

Possible Problem #1

Improper booting.

What to do

Restart system.

Possible Problem #2

Possible error with BIOS or system board.

What to do

Contact an Authorized NetFRAME Service Provider.

Shutdown Error

Level of Severity - Fatal Error

Source of Message - BIOS

Possible Problem #1

Improper booting.

What to do

Restart system.

Possible Problem #2

Possible error with BIOS or system board.

What to do

Contact an Authorized NetFRAME Service Provider.

Unknown Error

Level of Severity - Fatal Error

Source of Message - BIOS

Possible Problem #1

Improper booting.

What to do

Restart system.

Possible Problem #2

Possible error with BIOS or system board.

What to do

Contact an Authorized NetFRAME Service Provider.

Troubleshooting BIOS Problems

When the system will not boot and you suspect a BIOS error, use Maestro to view the BIOS Power-On-Self-Test (POST) procedure and whether the server stopped during POST.

Troubleshooting BIOS is done by using the stop-on-error method: the error occurred where the BIOS stopped. For example, if the system is locked and the most current BIOS entry reads Enable CPU Cache, the server was unable to enable the CPU cache.

For a listing of the POST procedure, see BIOS POST Procedure.

BIOS POST Procedure

The following table lists the BIOS POST (Power On Self Test) procedure.

| Event Code (Hex) | Event Description |
| --- | --- |
| 02 | Verify Real Mode |
| 04 | Get CPU type |
| 06 | Initialize System Hardware |
| 08 | Initialize chipset registers with initial POST values |
| 09 | Set in POST flag |
| 0A | Initialize CPU registers |
| 0B | Enable CPU cache |
| 0C | Initialize caches to initial POST values |
| 0E | Initialize I/O |
| 10 | Initialize power management |
| 11 | Load alternate registers with initial POST values |
| 14 | Initialize keyboard controller |
| 16 | BIOS ROM check |
| 17 | Initialize external cache Before memory autosize |
| 18 | Initialize timer |
| 1A | DMA controller initialization |
| 1C | Reset programmable interrupt controller |
| 20 | Test DRAM refresh |
| 22 | Test keyboard controller |
| 24 | Set ES segment register to 4GB |
| 28 | Autosize DRAM |
| 2A | Clear 512K base RAM |
| 2C | Test 512K base address lines |
| 2E | Test first 512K of RAM |
| 2F | Initialize external cache Before memory shadowing |
| 32 | Computer CPU speed |
| 34 | Test CMOS RAM |
| 38 | Shadow the system BIOS |
| 3A | Autosize cache |
| 3C | Configure advanced chipset registers |
| 3D | Load alternate registers with CMOS values |
| 42 | Initialize interrupt vectors 0 through 77h to the BIOS general interrupt handler |
| 46 | verify the ROM copyright notice |
| 47 | Initialize PCI Option ROM manager |
| 48 | Check video configuration against CMOS |
| 49 | Initialize PCI bus and devices |
| 4A | Initialize all video adapters in system |
| 4C | Shadow video BIOS ROM |
| 50 | Display CPU type and speed |
| 52 | Test keyboard |
| 54 | Initialize keystroke clicker if enabled in Setup |
| 58 | Test for unexpected interrupts |

| | |
|---|---|
| 5A | Display prompt "Press F2 to enter SETUP" |
| 5B | Disable CPU cache |
| 5C | Test RAM between 512K and 640K |
| 60 | Test extended memory |
| 62 | Test extended memory address lines |
| 64 | Jump to UserPatch 1 |
| 66 | Configure advanced cache registers |
| 68 | Enable external and CPU cache |
| 6A | Display external cache size on the screen |
| 6C | Display shadow message |
| 6E | Display non-disposable segments |
| 70 | Display error messages |
| 72 | Check for configuration errors |
| 74 | Test real-time clock |
| 76 | Check for keyboard error |
| 7C | Set up hardware interrupt vector |
| 7E | The coprocessor initialization test |
| 80 | Disable on board I/O ports |
| 82 | Test and identify RS 232 ports |
| 84 | Test and identify parallel ports |
| 86 | Re-initialize on board I/O port |
| 88 | Initialize BIO data area |
| 8A | Initialize extended BIO data area |
| 8B | Setup interrupt vector and present bit in equipment byte |
| 8C | Initialize floppy controller |
| 8F | Get total ATA drivers in the system |
| 90 | Initialize hard-disk controller |
| 92 | Jump to UserPatch 2 |
| 94 | Disable A20 address line |
| 95 | Check and initial CD-ROM driver |
| 96 | Cleat huge ES segment register |
| 98 | Search for BIOS ROM extensions |
| 9C | Setup power management |
| 9E | Enable hardware interrupt |
| 9F | Check the total fdisks (ATA and SCSI) in the system |
| A0 | Verify that the system clock is interrupting |
| A2 | Setup Numlock indicator |
| A4 | Initialize typematic rate |
| A8 | Erase F2 key prompt |
| AA | Scan for F2 key stroke |
| AE | Clear in-POST flag |
| B0 | Check for error |
| B2 | POST done - prepare to boot operating system |
| B4 | One quick beep |
| BA | Initialize the DMI header and sub-structures |
| BC | Clear parity-error latch |
| BE | If BCP option is enabled, clear the screen before booting |
| BF | Check virus and backup reminders |
| C0 | Try boot with INT 19 |

Multi Message Format Sample

Messages that appear together:

- Message XXXXX
- Message YYYYY
- Message ZZZZZ

Possible Problem 1 information

What to do information

Closes this dialog box.

Indicates whether System Board Fan 1 failed.

Displays the speed (in RPM) of System Board Fan 1.

Indicates whether System Board Fan 2 failed.

Displays the speed (in RPM) of System Board Fan 2.

Indicates whether the enclosure's Fan Fault Indicator LED is On or Off.

Shows the fan failure level. To change failure level, enter a new speed (in RPM) and click Update. The speed must be entered in increments of 60 (e.g., 60, 120, 180, etc.).

When selected, the system board fans are running at high speed. To change the speed of the fans to low, select Low and click Update.

When selected, the system board fans are running at low speed. To change the speed of the fans to high, select High and click Update.

Applies any changes made to the server.

Closes this dialog box without changing the password.

Enter the old password.

---

IDH_ABOUTBOX_OK
IDH_CANISTER_FANS_1_FAULT
IDH_CANISTER_FANS_1_SPEED
IDH_CANISTER_FANS_2_FAULT
IDH_CANISTER_FANS_2_SPEED
IDH_CANISTER_FANS_FAULT_INDICATOR_LED
IDH_CANISTER_FANS_LOW_SPEED_FAULT_THRESHOLD_SPEED
IDH_CANISTER_FANS_SPEED_CONTROL_HIGH
IDH_CANISTER_FANS_SPEED_CONTROL_LOW
IDH_CANISTER_FANS_UPDATE
IDH_CHANGE_PASSWORD_CANCEL
IDH_CHANGE_PASSWORD_NEW_PASSWORD

Changes the password and closes the dialog box.

Enter a new password. The password is case-sensitive.

Reenter the new password. The password is case-sensitive and must be entered exactly as above.

Opens a dialog box that lists the command issued to the server and the response received.

Closes this dialog box.

Closes Maestro Recovery Manager without connecting to the server.

Enter the server phone number.

Enter the server phone number.

Enter the server phone number.

Opens the help topic for this dialog box.

Select this option to connect to the server using a modem.

Connects to the server using the selected options.

Enter the server password. The password is case-sensitive.

Select a serial port.

Select this option to connect to the server using a serial cable.

Cancels downloading.

---

IDH_CHANGE_PASSWORD_OK
IDH_CHANGE_PASSWORD_OLD_PASSWORD
IDH_CHANGE_PASSWORD_RETYPE_NEW_PASSWORD
IDH_COMMAND_COMPLETE_DETAILS
IDH_COMMAND_COMPLETE_OK
IDH_CONNECTION_CANCEL
IDH_CONNECTION_DIAL_AREA_CODE
IDH_CONNECTION_DIAL_NUMBER
IDH_CONNECTION_DIAL_PREFIX
IDH_CONNECTION_HELP
IDH_CONNECTION_MODEM_CONNECTION
IDH_CONNECTION_OK
IDH_CONNECTION_PASSWORD
IDH_CONNECTION_PORT
IDH_CONNECTION_SERIAL_CONNECTION
IDH_DOWNLOADING_CANCEL

* Downloads the server's current message log.

* Displays the server messages including the time of the event, the severity of the error, the message source, and a description of the message. For more information about the message, select Help Topics from the Help menu and locate the error message in the Diagnostics and Recovery Messages book.

* Prints the message log. To configure the page layout and printer settings, select Page Layout from the Server menu.

* Saves the message log as a text file.

* Opens the CPU 1 window where you can view the status of CPU 1.

* Opens the CPU 2 window where you can view the status of CPU 2.

* Opens the CPU 3 window where you can view the status of CPU 3.

* Opens the CPU 4 window where you can view the status of CPU 4.

* Opens the Fans window where you can view the attributes and status of canister and system board fans.

* Opens the Canister Fans window where you can view the attributes and status of the fans installed in Canister A.

* Opens the Canister Fans window where you can view the attributes and status of the fans installed in Canister B.

* Opens the Canister Fans window where you can view the attributes and status of the fans installed in Canister C.

* Opens the Canister Fans window where you can view the attributes and status of the fans installed in Canister D.

* Opens the System Board Fans window where you can view the attributes and status of the system board fans.

* Opens the Flight Recorder window where you can view the message log.

* Opens the I/O Canisters window where you can view canister status and contents.

---

* IDH_FLIGHT_RECORDER_DOWNLOAD
* IDH_FLIGHT_RECORDER_LIST
* IDH_FLIGHT_RECORDER_PRINT
* IDH_FLIGHT_RECORDER_SAVE
* IDH_ICON_CPU_1
* IDH_ICON_CPU_2
* IDH_ICON_CPU_3
* IDH_ICON_CPU_4
* IDH_ICON_FANS
* IDH_ICON_FANS_CANISTER_A
* IDH_ICON_FANS_CANISTER_B
* IDH_ICON_FANS_CANISTER_C
* IDH_ICON_FANS_CANISTER_D
* IDH_ICON_FANS_SYSTEM_BOARD
* IDH_ICON_FLIGHT_RECORDER

Select a Maestro Recovery Manager component to open.

Opens the Power Supplies window where you can view the operational status of installed power supplies.

Opens the Processors window where you can view the attributes and status of installed processors.

Opens the Revisions window where you can view the revisions of installed server components.

Opens the Serial Numbers window where you can view the serial numbers of installed components.

Opens the Server window where you can query the server's power status, power up the server, power down the server, or reset the server.

Opens the System Status window where you can view the attributes and status of installed server components.

Opens the Temperatures window where you can view the temperatures measured by the server's sensors and configure the Warning and Shutdown thresholds.

When selected, Power Supply 1 is not receiving A.C. power.

When selected, Power Supply 1 is receiving A.C. power.

When selected, Power Supply 1 is not supplying D.C. voltage.

When selected, Power Supply 1 is supplying D.C. voltage.

Indicates whether Power Supply 1 is installed and present.

When selected, Power Supply 2 is not receiving A.C. power.

When selected, Power Supply 2 is receiving A.C. power.

IDH_ICON_IO_CANISTERS
IDH_ICON_NF9000
IDH_ICON_POWER_SUPPLIES
IDH_ICON_PROCESSORS
IDH_ICON_REVISIONS
IDH_ICON_SERIAL_NUMBERS
IDH_ICON_SERVER_COMMANDS
IDH_ICON_SYSTEM_STATUS
IDH_ICON_TEMPERATURES
IDH_POWER_SUPPLIES_1_AC_BAD
IDH_POWER_SUPPLIES_1_AC_OK
IDH_POWER_SUPPLIES_1_DC_BAD
IDH_POWER_SUPPLIES_1_DC_OK
IDH_POWER_SUPPLIES_1_PRESENT
IDH_POWER_SUPPLIES_2_AC_BAD
IDH_POWER_SUPPLIES_2_AC_OK

*When selected, Power Supply 2 is not supplying D.C. voltage.

*When selected, Power Supply 2 is supplying D.C. voltage.

*Indicates whether Power Supply 2 is installed and present.

*When selected, Power Supply 3 is not receiving A.C. power.

*When selected, Power Supply 3 is receiving A.C. power.

*When selected, Power Supply 3 is not supplying D.C. voltage.

*When selected, Power Supply 3 is supplying D.C. voltage.

*Indicates whether Power Supply 3 is installed and present.

*Displays the analog measurement of the negative 12 volt supply line.

*Displays the analog measurement of the positive 12 volt supply line.

*Displays the analog measurement of the 3 volt supply line.

*Displays the analog measurement of the 5 volt supply line.

*When selected, the server power is Off.

*When selected, the server power is Off.

*Refreshes the power supply status information.

*Displays the analog measurement of the A/D voltage reference.

---

* IDH_POWER_SUPPLIES_2_DC_BAD
* IDH_POWER_SUPPLIES_2_DC_OK
* IDH_POWER_SUPPLIES_2_PRESENT
* IDH_POWER_SUPPLIES_3_AC_BAD
* IDH_POWER_SUPPLIES_3_AC_OK
* IDH_POWER_SUPPLIES_3_DC_BAD
* IDH_POWER_SUPPLIES_3_DC_OK
* IDH_POWER_SUPPLIES_3_PRESENT
* IDH_POWER_SUPPLIES_N12V
* IDH_POWER_SUPPLIES_P12V
* IDH_POWER_SUPPLIES_P3V
* IDH_POWER_SUPPLIES_P5V
* IDH_POWER_SUPPLIES_POWER_OFF
* IDH_POWER_SUPPLIES_POWER_ON
* IDH_POWER_SUPPLIES_REFRESH
* IDH_POWER_SUPPLIES_VREF

Displays the Bus/Core speed ratio, a relative system board performance indicator.

Indicates whether any CPU errors occurred.

Indicates whether any processors failed.

No help topic is associated with this item.

When selected, NMI Control is active.

When selected, NMI Control is inactive.

Indicates whether the system is running above operating temperature.

Indicates whether the system is receiving power.

When selected, the processor is present.

Refreshes the processor status information.

Applies any changes made to the server.

Indicates the command sent to the server and the response received.

Closes this dialog box.

Saves this information as a text file. The text file can be sent to your system administrator or NetFRAME Technical Support for further analysis.

Lists the revision of the backplane.

Lists the revision of Canister A.

---

IDH_PROCESSOR_BUS_TO_CORE_SPEED_RATIO
IDH_PROCESSOR_ERROR
IDH_PROCESSOR_FAULT
IDH_PROCESSOR_MEMORY_TYPE
IDH_PROCESSOR_NMI_ACTIVE
IDH_PROCESSOR_NMI_INACTIVE
IDH_PROCESSOR_OVERTEMP
IDH_PROCESSOR_POWER
IDH_PROCESSOR_PRESENT
IDH_PROCESSOR_REFRESH
IDH_PROCESSOR_UPDATE
IDH_RESPONSE_DUMP_LIST
IDH_RESPONSE_DUMP_OK
IDH_RESPONSE_DUMP_SAVE
IDH_REVISIONS_BACKPLANE

* Lists the revision of Canister B.
* Lists the revision of Canister C.
* Lists the revision of Canister D.
* Lists the revision of the local interface.
* Lists the revision of Power Supply 1.
* Lists the revision of Power Supply 2.
* Lists the revision of Power Supply 3.
* Refreshes revision information.
* Lists the revision of the remote interface.
* Lists the revision of the system board.
* Lists the serial number of the backplane.
* Lists the serial number of the Canister A.
* Lists the serial number of the Canister B.
* Lists the serial number of the Canister C.
* Lists the serial number of the Canister D.
* Lists the serial number of the Power Supply 1.

---

* IDH_REVISIONS_CANISTER_A
* IDH_REVISIONS_CANISTER_B
* IDH_REVISIONS_CANISTER_C
* IDH_REVISIONS_CANISTER_D
* IDH_REVISIONS_LOCAL_INTERFACE
* IDH_REVISIONS_POWER_SUPPLY_1
* IDH_REVISIONS_POWER_SUPPLY_2
* IDH_REVISIONS_POWER_SUPPLY_3
* IDH_REVISIONS_REFRESH
* IDH_REVISIONS_REMOTE_INTERFACE
* IDH_REVISIONS_SYSTEM_BOARD
* IDH_SERIAL_NUMBERS_BACKPLANE
* IDH_SERIAL_NUMBERS_CANISTER_A
* IDH_SERIAL_NUMBERS_CANISTER_B
* IDH_SERIAL_NUMBERS_CANISTER_C
* IDH_SERIAL_NUMBERS_CANISTER_D

* Lists the serial number of the Power Supply 2.

* Lists the serial number of the Power Supply 3.

* Lists the serial number of the processor board.

* Refreshes the serial number information.

* Lists the serial number of the remote interface.

* Turns the server off.

* Turns the server on.

* Reports the server's current power status (On or Off).

* Resets the server (warm boot).

* Indicates whether System Board Fan 1 failed.

* Displays the speed (in RPM) of System Board Fan 1.

* Indicates whether System Board Fan 2 failed.

* Displays the speed (in RPM) of System Board Fan 2.

* Indicates whether System Board Fan 3 failed.

* Displays the speed (in RPM) of System Board Fan 3.

* Indicates whether System Board Fan 4 failed.

* IDH_SERIAL_NUMBERS_POWER_SUPPLY_1
* IDH_SERIAL_NUMBERS_POWER_SUPPLY_2
* IDH_SERIAL_NUMBERS_POWER_SUPPLY_3
* IDH_SERIAL_NUMBERS_PROCESSOR_BOARD
* IDH_SERIAL_NUMBERS_REFRESH
* IDH_SERIAL_NUMBERS_REMOTE_INTERFACE
* IDH_SERVER_COMMANDS_POWER_OFF
* IDH_SERVER_COMMANDS_POWER_ON
* IDH_SERVER_COMMANDS_QUERY_POWER_STATUS
* IDH_SERVER_COMMANDS_SYSTEM_RESET
* IDH_SYSTEM_BOARD_FANS_1_FAULT
* IDH_SYSTEM_BOARD_FANS_1_SPEED
* IDH_SYSTEM_BOARD_FANS_2_FAULT
* IDH_SYSTEM_BOARD_FANS_2_SPEED
* IDH_SYSTEM_BOARD_FANS_3_FAULT
* IDH_SYSTEM_BOARD_FANS_3_SPEED

Displays the speed (in RPM) of System Board Fan 4.

Indicates whether System Board Fan 5 failed.

Displays the speed (in RPM) of System Board Fan 5.

Indicates whether System Board Fan 6 failed.

Displays the speed (in RPM) of System Board Fan 6.

Indicates the Fan Fault LED is On or Off.

Shows the fan failure level. To change failure level, enter a new speed (in RPM) and click Update.

Refreshes the system board fans status information.

When selected, the system board fans are running at high speed. To change the speed of the fans to low, select Low and click Update.

When selected, the system board fans are running at low speed. To change the speed of the fans to high, select High and click Update.

Applies any changes made to the server.

Refreshes the temperature status information.

Indicates the temperature measured by Sensor 1.

Indicates the temperature measured by Sensor 2.

Indicates the temperature measured by Sensor 3.

---

IDH_SYSTEM_BOARD_FANS_4_FAULT
IDH_SYSTEM_BOARD_FANS_4_SPEED
IDH_SYSTEM_BOARD_FANS_5_FAULT
IDH_SYSTEM_BOARD_FANS_5_SPEED
IDH_SYSTEM_BOARD_FANS_6_FAULT
IDH_SYSTEM_BOARD_FANS_6_SPEED
IDH_SYSTEM_BOARD_FANS_FAULT_INDICATOR_LED
IDH_SYSTEM_BOARD_FANS_LOW_SPEED_FAULT_THRESHOLD_SPEED
IDH_SYSTEM_BOARD_FANS_REFRESH
IDH_SYSTEM_BOARD_FANS_SPEED_CONTROL_HIGH
IDH_SYSTEM_BOARD_FANS_SPEED_CONTROL_LOW
IDH_SYSTEM_BOARD_FANS_UPDATE
IDH_TEMPERATURES_REFRESH
IDH_TEMPERATURES_SENSOR_1
IDH_TEMPERATURES_SENSOR_2
IDH_TEMPERATURES_SENSOR_3

* Indicates the temperature measured by Sensor 4.

* Indicates the temperature measured by Sensor 5.

* Shows the temperature shutdown level. When the temperature of the server reaches this level, the server is automatically shut down. To change the level, enter a new temperature and click Update.

* When selected, the server is not over temperature.

* When selected, the server is over temperature.

* Applies any changes made to the server.

* Shows the temperature warning level. When the temperature of the server reaches this level, a warning is issued. When the server reaches the Shutdown level, the server automatically shuts down. To change the Warning level, enter a new temperature and click Update.

* Refreshes the canister status information.

* When selected, the canister is installed.

* Opens help for the window.

* Lists the revision of Group A.

* Lists the revision of Group B.

* Lists the serial number of the I/O Board.

* Refreshes the I/O Groups (NF9000-8) or I/O Canister (NF9000-16) information.

* Refreshes the fan information.

---

* IDH_TEMPERATURES_SENSOR_4
* IDH_TEMPERATURES_SENSOR_5
* IDH_TEMPERATURES_SHUTDOWN_LEVEL
* IDH_TEMPERATURES_SYSTEM_OVERTEMP_NO
* IDH_TEMPERATURES_SYSTEM_OVERTEMP_YES
* IDH_TEMPERATURES_UPDATE
* IDH_TEMPERATURES_WARNING_LEVEL
* IDH_CANISTER_FANS_REFRESH
* IDH_CANISTER_FANS_CANISTER_PRESENT
* IDH_HELP_ON_HELP
* IDH_REVISIONS_GROUP_A
* IDH_REVISIONS_GROUP_B
* IDH_SERIAL_NUMBERS_IO_BOARD
* IDH_IO_SUMMARY_REFRESH
* IDH_FANS_SUMMARY_REFRESH

*When selected, the temperature settings are shown in Celsius. To display the temperature settings in Fahrenheit, select the Fahrenheit button.

*When selected, the temperature settings are shown in Fahrenheit. To display the temperature settings in Celsius, select the Celsius button.

---

*IDH_TEMPERATURES_CELSIUS
*IDH_TEMPERATURES_FAHRENHEIT

*Maestro 2.0*

*Object Oriented Design*

Introduction

So far we the analysis has taken into consideration any of the implementation, platform and performance issues into consideration. These issues are taken into consideration as we move into Object Oriented Design (OOD). The OOD phase has four main phases:

- Problem Domain Component
  In this phase we specify the platform on which we are going to implement this system. Also, it will address some specific issues related to the Raptor server, WinSNMP library and the TAPI library.

- Human Interaction Component
  Here we design the user interface and necessary object classes to support this interface.

- Task Management Component
  Performance, multithreading and similar issues have not been taken into account. This phase will identify areas where there are performance bottlenecks and try to provide some solutions.

- Data Management Component
  This phase deals storage of the data contained in the object classes.

The following paragraphs identify the platform and the development environment.

Maestro 2.0 Platform

Operating Environment

Maestro 2.0 is targeted for Windows 95 and Windows NT 4.0. Both these provide adequate support in areas such as graphical user interface, networking, telephony and inter-process communication (OLE and other mechanisms). Maestro 2.0 can easily provide the desired functionality in these environments.

External Support

Windows 95 does not support SNMP communications and while Windows NT 4.0 supports SNMP communication, it does not adhere to WinSNMP standards. For this reason, we have chosen the WinSNMP protocol stack and libraries of American Computing and Electronics Corporation (ACEC) to provide the WinSNMP support required for Raptor.

Development Environment

Visual C++ 4.0

Maestro 2.0 will be developed using Microsoft's Visual C++ 4. Visual C++ provides a rich set of application framework, container (arrays, lists, etc.) and communication object classes. These object classes are collectively referred to as Microsoft Foundation Classes. We will utilize MFC in creating the object classes for Maestro 2.0. This *does not* tie us into MFC, we could use some other application framework at a later time.

External Libraries

MFC does not provide support for WinSNMP, therefore as decided earlier, we will be using the ACEC WinSNMP protocol stack, libraries and tools. The tools include a MIB compiler, which will used by the MIB Management classes.

Problem Domain Component

The following are some of the changes that need to be made to accommodate the requirements mentioned in the previous section.

CObject

This MFC object class will be the base class of the object classes in Maestro. This approach allows us to take advantage of services provided by MFC, such as serialization, container classes, etc. If we choose to use a different application framework or class library the changes will be localized to this class.

Help service

Maestro 2.0 is required to provide online help. It is convenient to have a help function in each object class. This way we can easily provide context sensitive help and also any changes made to the help content will be localized.

Save service

A system like Maestro 2.0 warrants persistent objects. It is clear that each object must know how to save itself. This service can encapsulate all the details pertaining to the class.

*NFMonitor* object class

This new class is introduced with a view to monitor the execution of Maestro. It can keep unsuccessful login attempts or unauthorized usage of Maestro, etc. The object class will have an instance connection to *NFLogManager*. All monitored events will be logged and can be browsed through the log manager. This object class does not contain any attributes. However, it enables the system to handle a new event

| Event | Response |
| --- | --- |
| Incorrect Password entered | Process incorrect password entered |

The response to this event is as below

| Services | Messages | Destination Objects |
| --- | --- | --- |
| (Incorrect Password entered) | Add_Log_Entry | NFLogManager |

*NFSnmpWindow* object class

WinSNMP requires that a window handle be associated with every SNMP session handle. This window will receive Windows messages when data is ready or other such significant events. In Maestro 2.0, this window will not have a user interface and will always be hidden. Due to its linkage with the *NFSnmp* object class and the significance of receiving SNMP data, it is appropriate to establish another event for the system.

This object class does not contain significant attributes. It will only respond to the event mentioned below.

| Event | Response |
|---|---|
| SNMP Data received | Process SNMP data received |

It responds the event by sending a message to the *NFSnmp* object class.

| Services | Messages | Destination Objects |
|---|---|---|
| (SNMP Data received) | Get_SNMP_Data (new function added to *NFSnmp*) | NFSnmp |

Based on all the changes mentioned above, the following is the object model in the problem domain component.

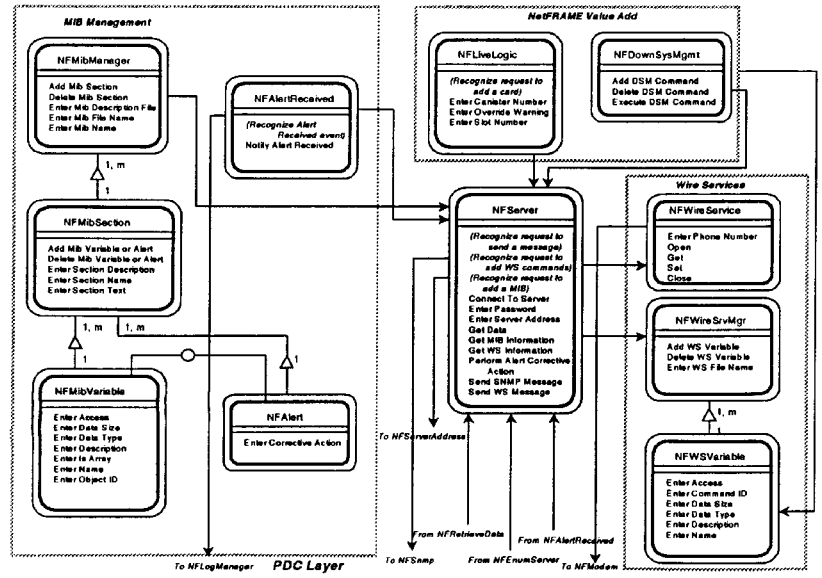

*Maestro 2.0 Object Oriented Design*     5

Human Interaction Component

In this phase we create a prototype of the proposed interface. With the prototype as a reference we define the user interface object classes required. The look and feel of the interface presented in this document is preliminary and will be changed over the course of the development. The changes and other usability details will be covered in the *Maestro 2.0 User Interface* document. The following sections deal with the new object classes that need to be introduced.

The object classes do not cover the contents of the windows themselves. Instead the focus is on the parent windows. The following sections also discuss the relationship between the object classes in problem domain component and the human interaction component.

The following are the human interaction component classes

| Object Class Name | Description |
|---|---|
| CAlertFlashWnd | This window is displayed when a server receives an alert or trap notification. This window will be implemented as a dialog box in Windows 95 / NT. |
| CAlertManagerWnd | This window will allow the user to specify the alerts for which notification is required. By default, all alerts will be notified and logged. This window will be implemented as a dialog box in Windows 95 / NT |
| CChildFrame | This window will contain information about a server. It can perceived as being a "window" into the server. The window will change the application menu to include commands specific to this window |
| CLiveLogicWnd | This user can perform a hot swap/add of either a LAN or SCSI card. |
| CLogManagerWnd | This window will allow the user to browse through the event log. The window will change the application menu to include commands specific to this window. |
| CLogSettingsWnd | This window can be executed through the *CLogManagerWnd* to specify parameters for log clean up, log buffer growth, etc. |
| CMaestro2Document | The application will use the MFC document/view architecture. Each *CchildFrame* will have be associated to an instance of this class. The document will contain the raw data that will interpreted by the server window. |
| CMainFrame | This window is the main window of the application. The main frame will contain many *CChildFrame* window, one *CLogManagerWnd* window and one *CNetworkMapWnd* |

| Object Class Name | Description |
|---|---|
|  | window. All commands that have an application wide will be handled by the main frame. |
| CMaestro2View | Following the MFC document/view architecture, we created this view to the main view inside a *CChildFrame* window. This will in turn contain a Windows 95/NT tab control that presents the user will the "System Management" and "Down System Management" functionality. |
| CMIBSectionView | This window will display a graphical representation of the MIB managed by the application. It will be a child of the tab control in the *CMainView*. |
| CNetworkMapWnd | This window will display images for the results of the network server enumeration. The window will change the application menu to add commands specific to this window. |
| CUserOptionsWnd | This window will allow the user to customize the options for the application. This window will be implemented as a dialog box. |

HIC Object Model
The following is the windows' hierarchy. The relationships depict the parent-child window relationships and have nothing to do with object class relationships.
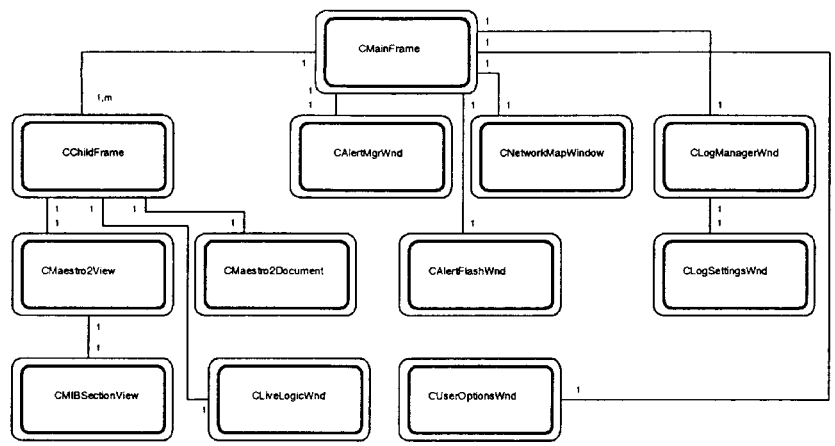
*User Interface Object Class Hierarchy*

HIC User Interface Proposal

The following are preliminary user interface proposals for the various windows.

CAlertFlashWnd

This window is displayed when a server receives an alert.

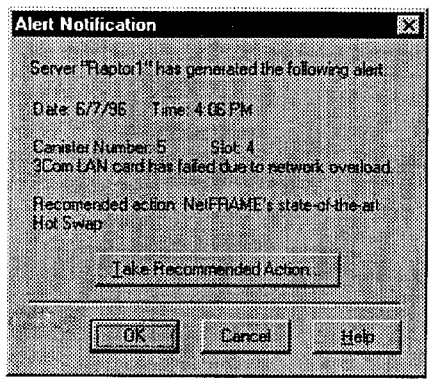

CAlertManagerWnd

The user can specify the alerts for which notification is required or remove the notification for alerts already specified. By default, all alert will be notified.

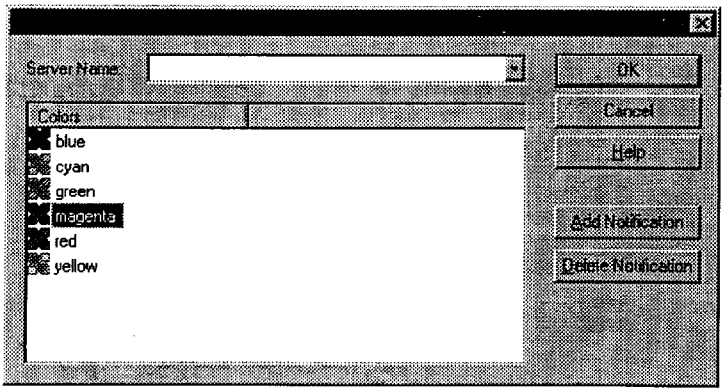

CChildFrame
This window is merely a frame window within which other windows are created. The window created within the child frame is the CMaestro2View.
CLiveLogic
This window is displayed when the user wants to hot swap/add either a LAN or a SCSI card.
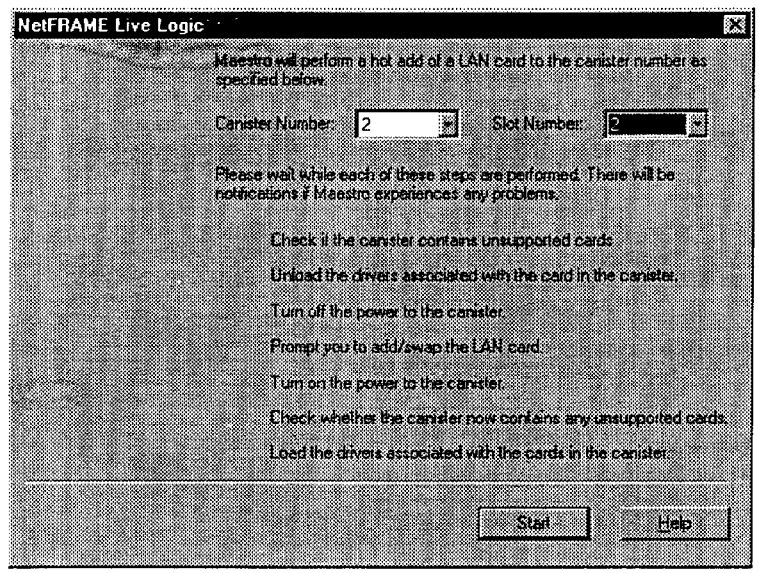

CLogManagerWnd
This window will display the log entries made by different sources of the Maestro 2.0 application.
CLogSettingsWnd
The user can change the settings for the *CLogManagerWnd* through this dialog box.
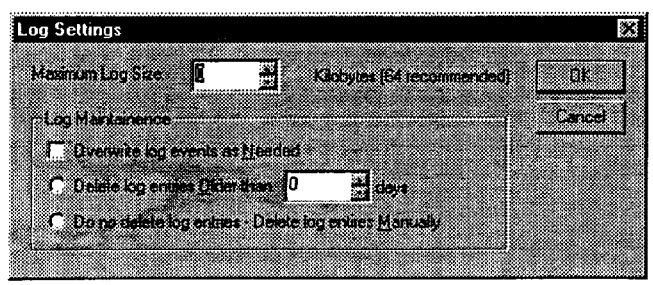
CMaestro2Document This object class has no user interface component. It's exists to act has as the liaison between the problem domain component object classes and human interface component object classes.

CMaestro2View

This window will occupy the entire client area of the *CChildFrame* window. It will contain a tab control that has "tab pages" for the functionality such as System Management, Down System Management, etc. The System Management tab page will contain a splitter window that splits the tab page into two. The left side of the tab page will contain a *CMIBSectionView* and the right side will change according to the selection on the left side.

CMainFrame

This window is the main window of the application. It is a standard Windows 95/NT overlapped window.

CMIBSectionView
This window will contain a Windows 95/NT tree control that represents the NetFRAME Raptor MIB. It will be the left side of the splitter window in the *CMaestro2View*. Users will be able to browse the tree and look at details of the each item. This window will drive the window displayed in the right side of the splitter in *CMaestro2View*.
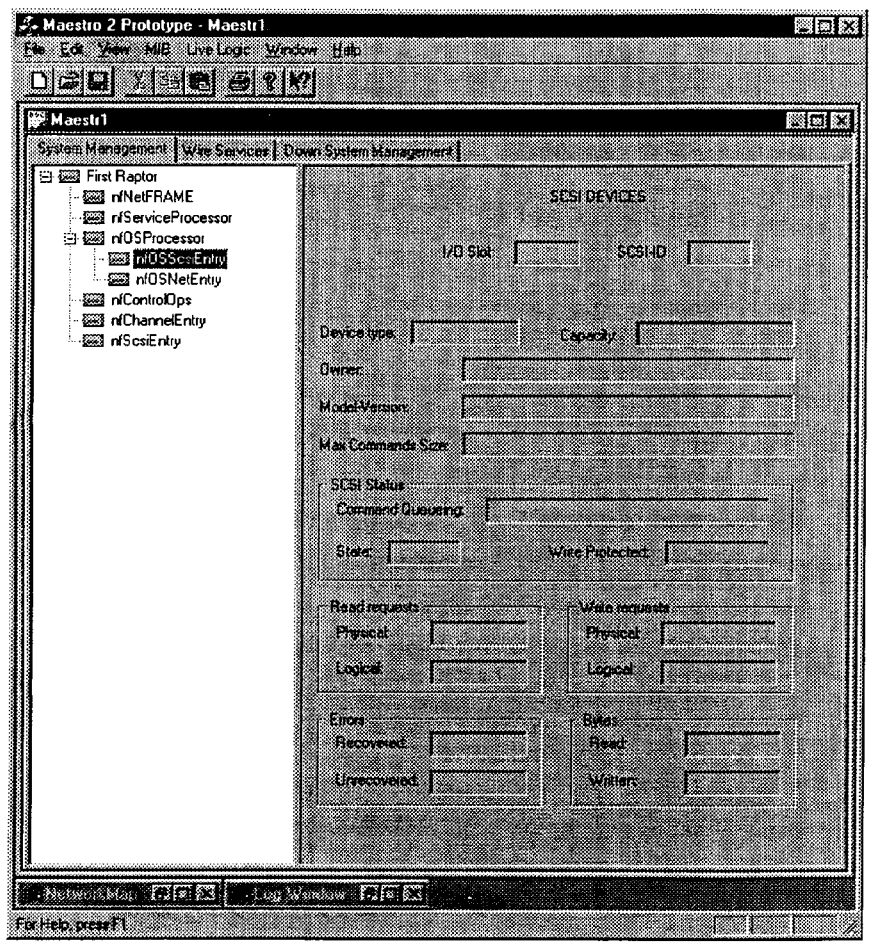

CNetworkMapWnd
This window displays images for servers discovered during the server enumeration process.
CUserOptionsWnd
TBD

Task Management Component

In this phase we identify the event and clock driven tasks in the system. Where possible and meaningful, Maestro 2.0 will use the multitasking abilities of Windows 95/NT. While MFC provides several object classes for multithreading, there are no classes to handle the custom coordination functions between the child threads and the main thread. Also, timer events are sent only to a window, so a our analysis object classes cannot directly receive the timer events. This section also goes on to introduce two new classes to handle some of shortcomings and custom functionality required.

Clock Driven Events

The following are event and clock driven tasks in Maestro 2.0

SNMP Data ready

This task will be handled by the *NFSnmpWindow* class. The *NFSnmpWindow* class works in concert with *NFSnmp* object class. Whenever the *NFSnmpWindow* receives any data it signals the *NFSnmp* object class to retrieve the data.

Time to discover network

This clock driven event must be handled by the *NFEnumServer* object class. Essentially, it will need to set a Windows 95/NT timer and go to "sleep". When it receives the clock event, it starts the network discovery. Since *NFEnumServer* itself cannot receive any clock events, a new class must be introduced.

Time to retrieve data

This clock driven event must be handled by the *NFRetrieveData* object class. Since *NFRetrieveData* itself cannot receive any clock events, a new class must be introduced.

Time to review log entries

This clock driven event must be handled by the *NFLogManager* object class. When it receives the clock event, it starts deleting the log entries. Since *NFLogManager* itself cannot receive any clock events, a new class must be introduced. The frequency of this option can be set by the user through the *CLogSettingsWnd* window.

Multitasking Events

The following events/tasks require the use of child threads.

Data retrieval

Given that an SNMP MIB can be extremely large, all data retrieval operations will be carried out by a child thread.

Network Discovery

Corporate networks can comprise multiples of hundred servers. To avoid locking up the system Maestro 2.0 will use child threads to actual discover the server.

TMC Events

Recognition of the event and clock driven tasks, introduce the following new events that the system must handle.

| Event | Response |
|---|---|
| Received Timer Event | Process timer event |
| Request to start a new thread | Create new thread |
| Request to terminate a thread | Terminate the thread. |
| Request to start a timer | Create a timer |

TMC Object classes

To encapsulate recognition of the TMC events and relevant data we introduce the following classes.

| Object Class Name | Description |
|---|---|
| NFTimerMgr | This object class interacts with the main window of the application, the main frame, to create and manage timers used by the other object classes. |
| NFCoordinationMgr | This object class coordinates the execution of the child threads and the main thread. |
| NFCoordinationObject | This object class encapsulates data and functions required to represent a multithreaded operation. |
| NFTimerObject | This object class encapsulates data and functions required to represent a clock event. |

TMC Object Class Attributes

The following are the attributes for the TMC object classes

NFCoordinationMgr

| Attribute | Description |
|---|---|
| Coordination_Objects | The coordination objects that this object class must manage. |

NFCoordinationObject

| Attribute | Description |
|---|---|
| Thread_ID | The ID of the thread created. |
| End_Event_Handle | A Windows 95/NT event handle (result of *CreateEvent*) that signifies the end of the execution of the thread. |
| Terminate_Event_Handle | A Windows 95/NT event handle (result of *CreateEvent*) that signifies the informs the thread to terminate itself. |
| Thread_Function | This attribute is a pointer to function that will serve as the starting point for the thread. |

NFTimerMgr

| Attribute | Description |
|---|---|
| Main_Wnd | Under the Windows family of operating systems, timer events are only sent to a window. This is the window that will receive the event. In response, this window will call a function in this object class. |
| Timer_Objects | The timer objects that this object class will manage. |
|  |  |
|  |  |

NFTimerObject

| Attribute | Description |
|---|---|
| Timer_ID | The ID of the timer created. |
| Timer_Function | A pointer to a function that will react to the timer event. |

NFTimerObject

| Services | Messages | Destination Objects |
|---|---|---|
| Enter Timer ID | | (processed within the object) |
| Enter Timer Function | | (processed within the object) |

Data Management Component

Maestro 2.0 will use the serialization functionality of MFC to store the data to the disk. There is no database support for Maestro 2.

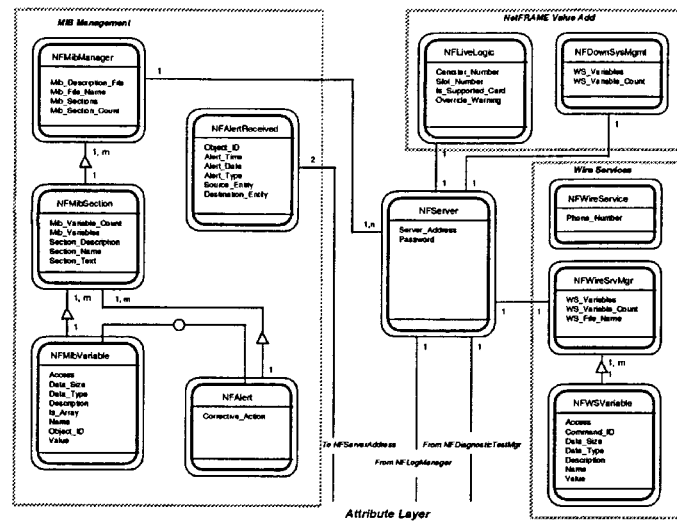
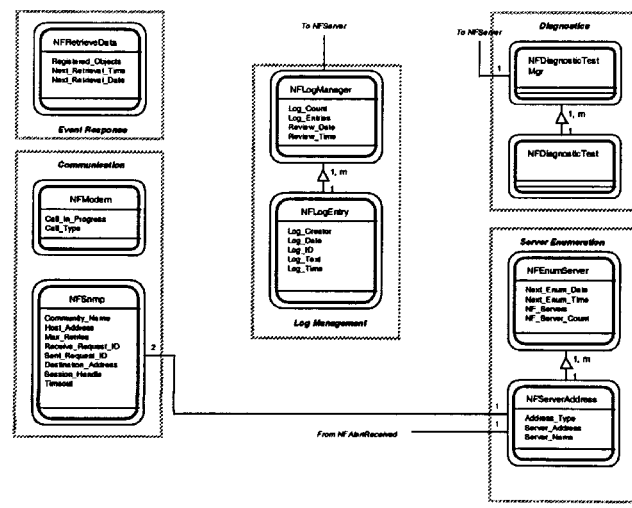

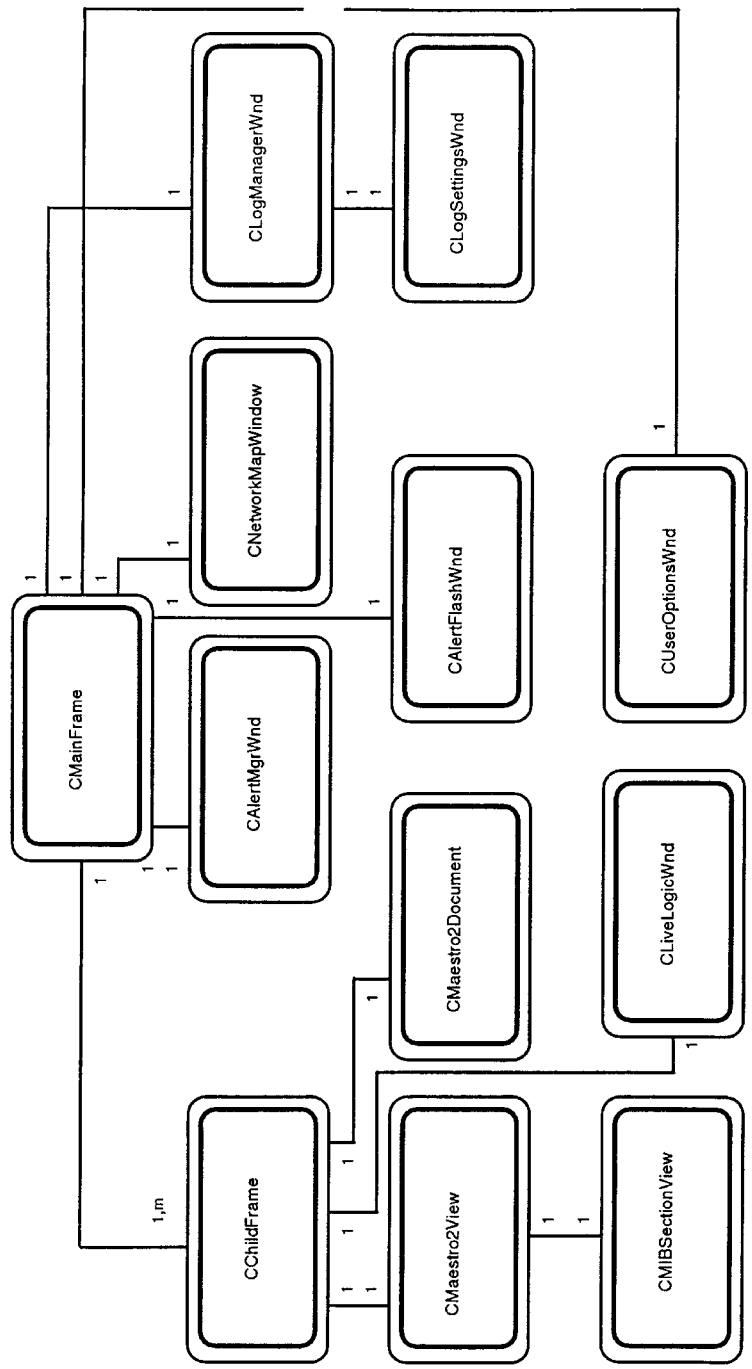
*User Interface Object Class Hierarchy*

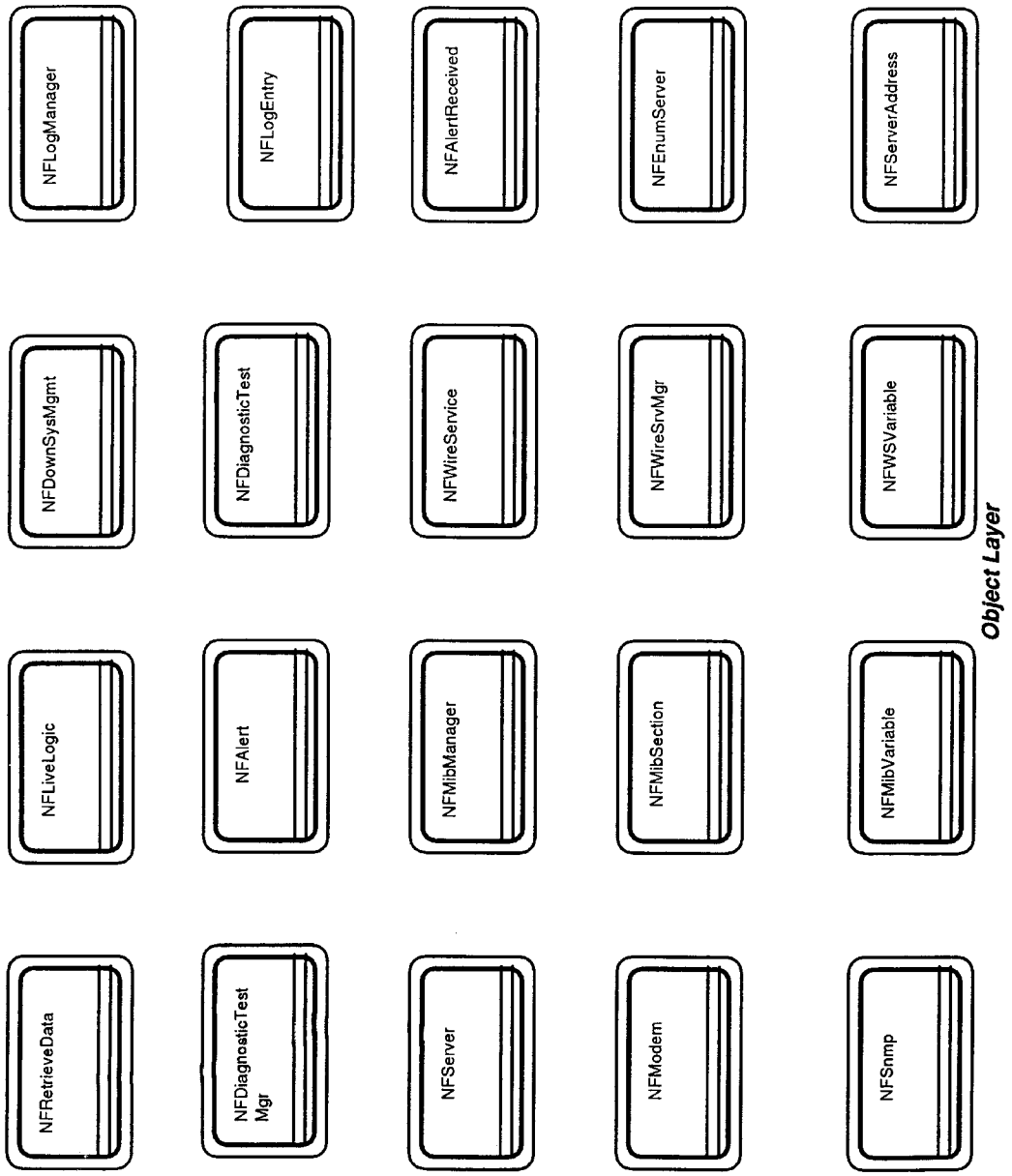

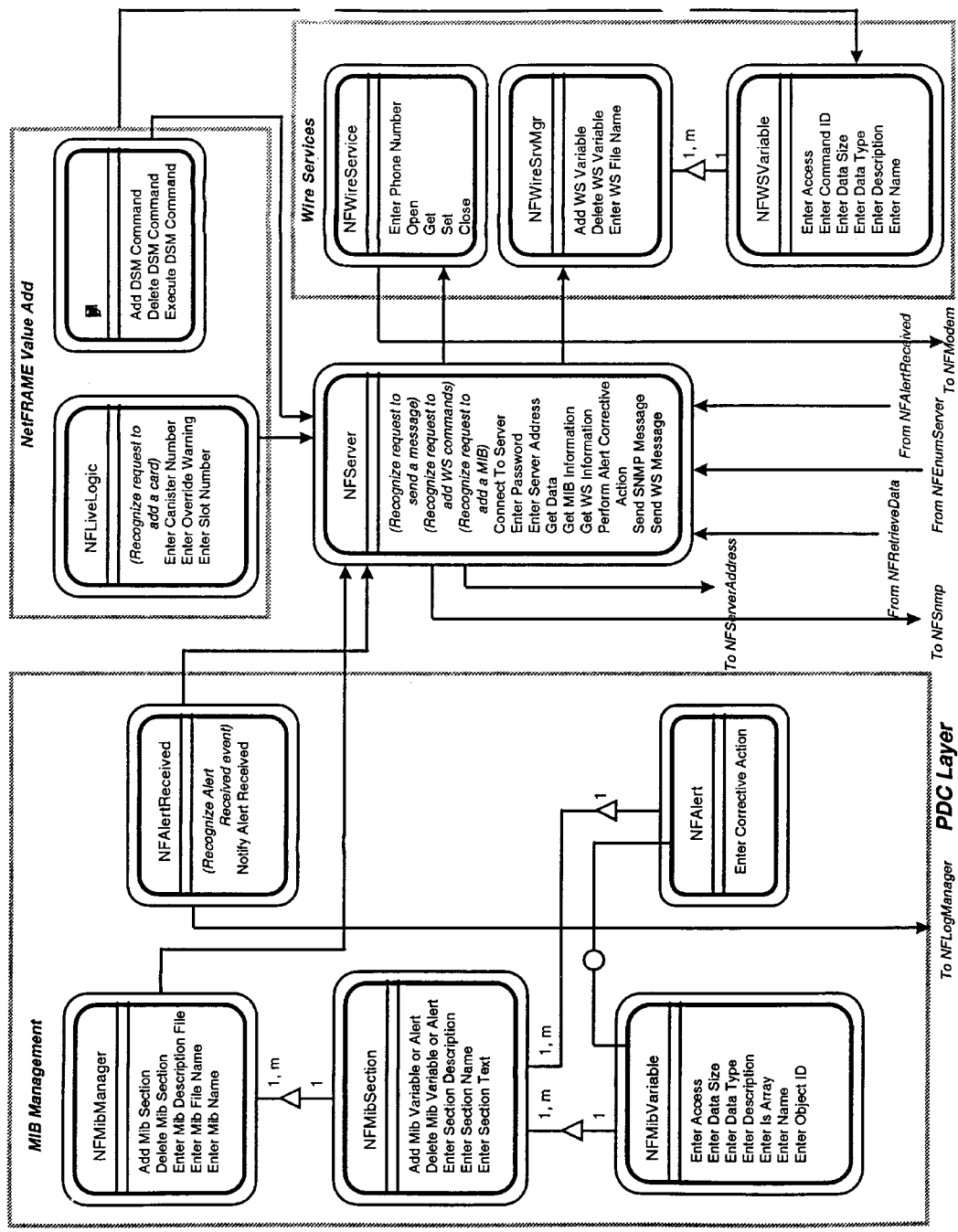

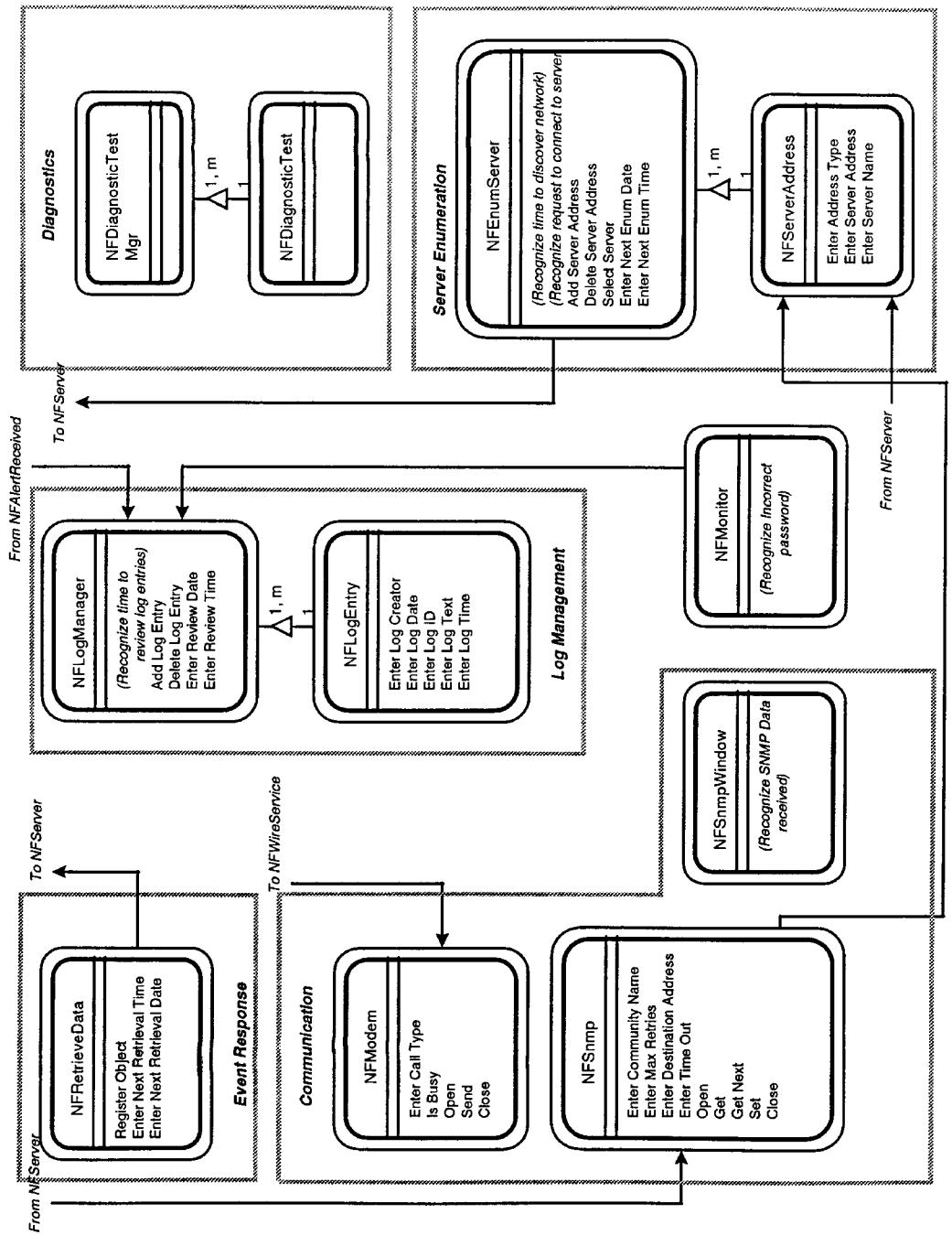

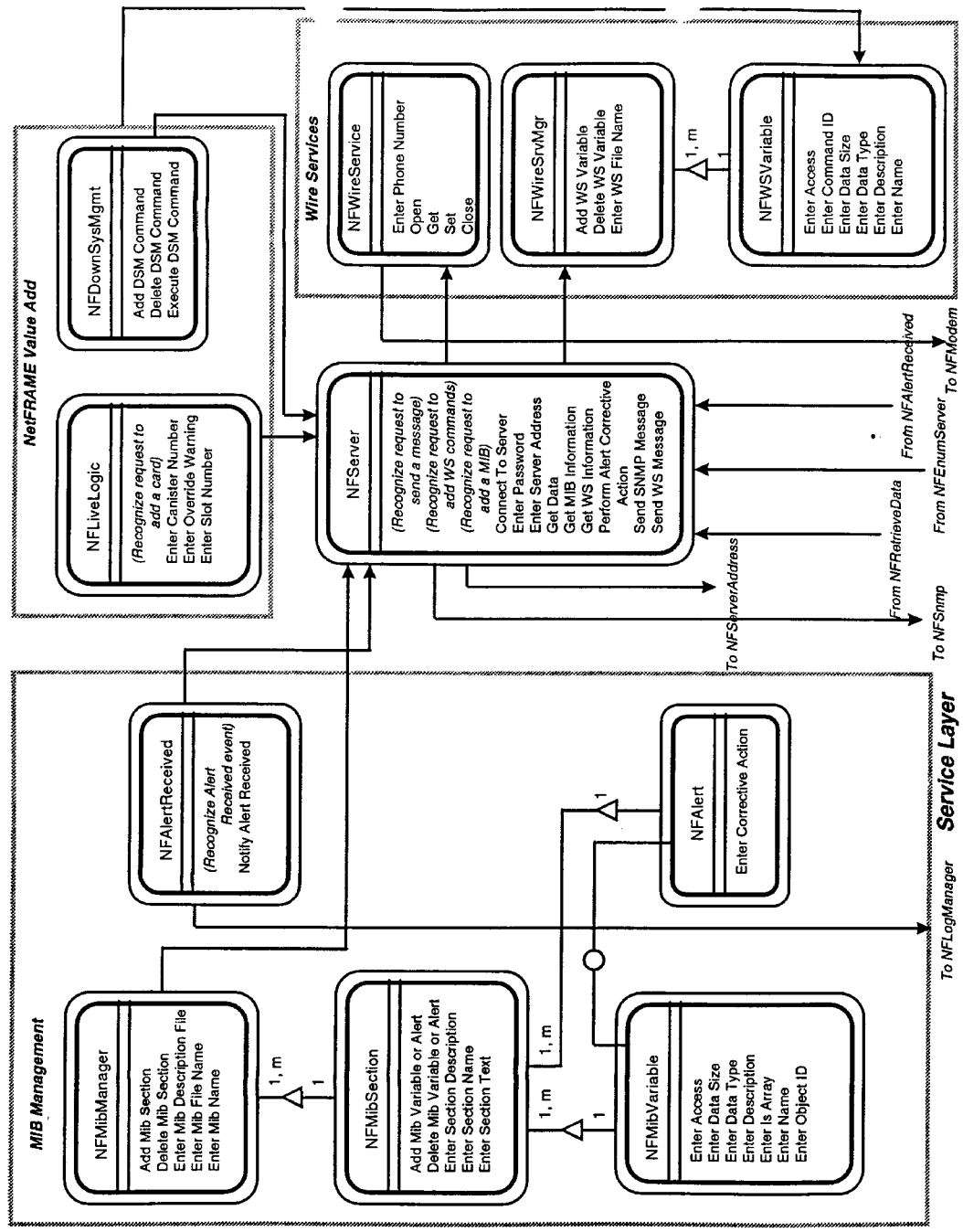

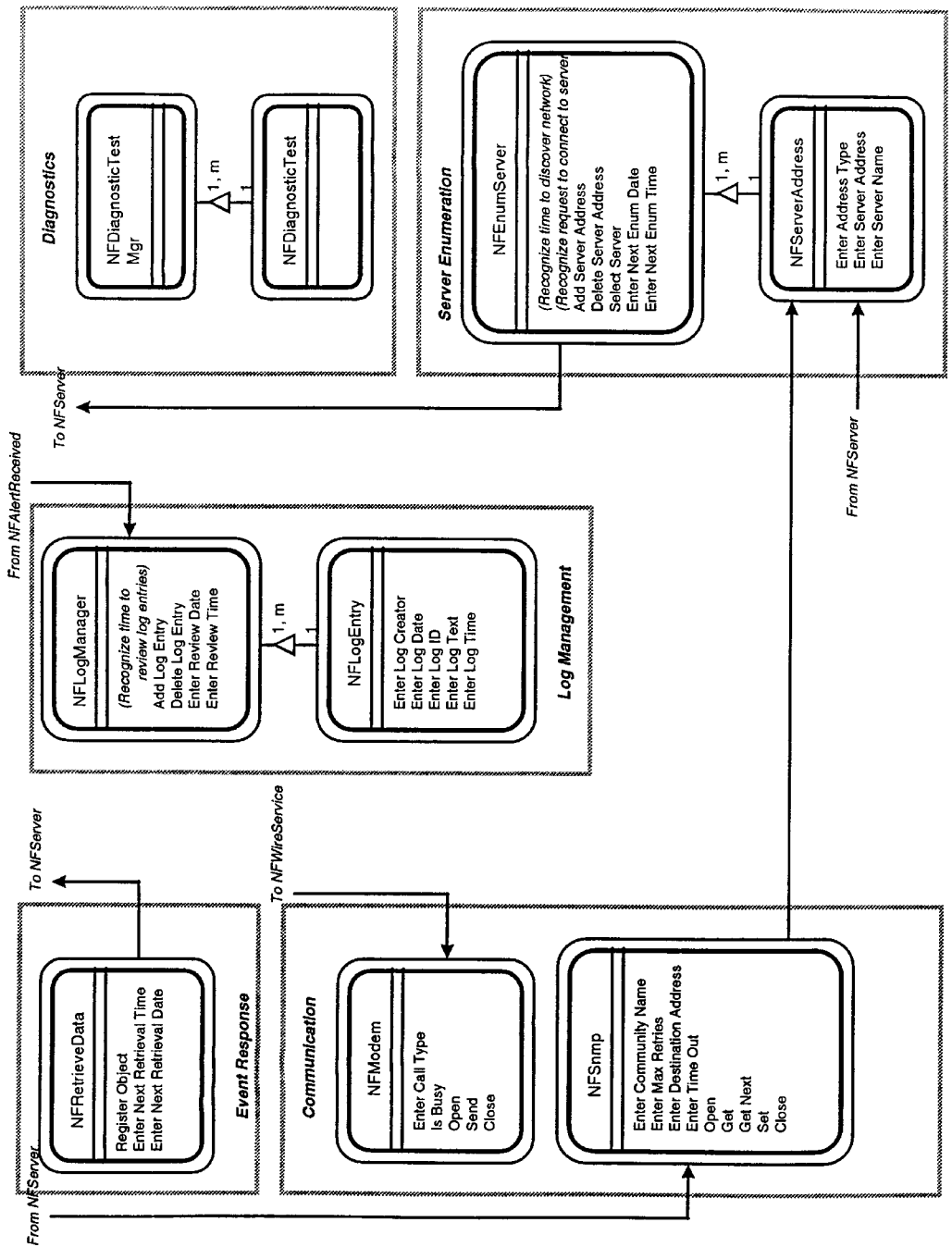

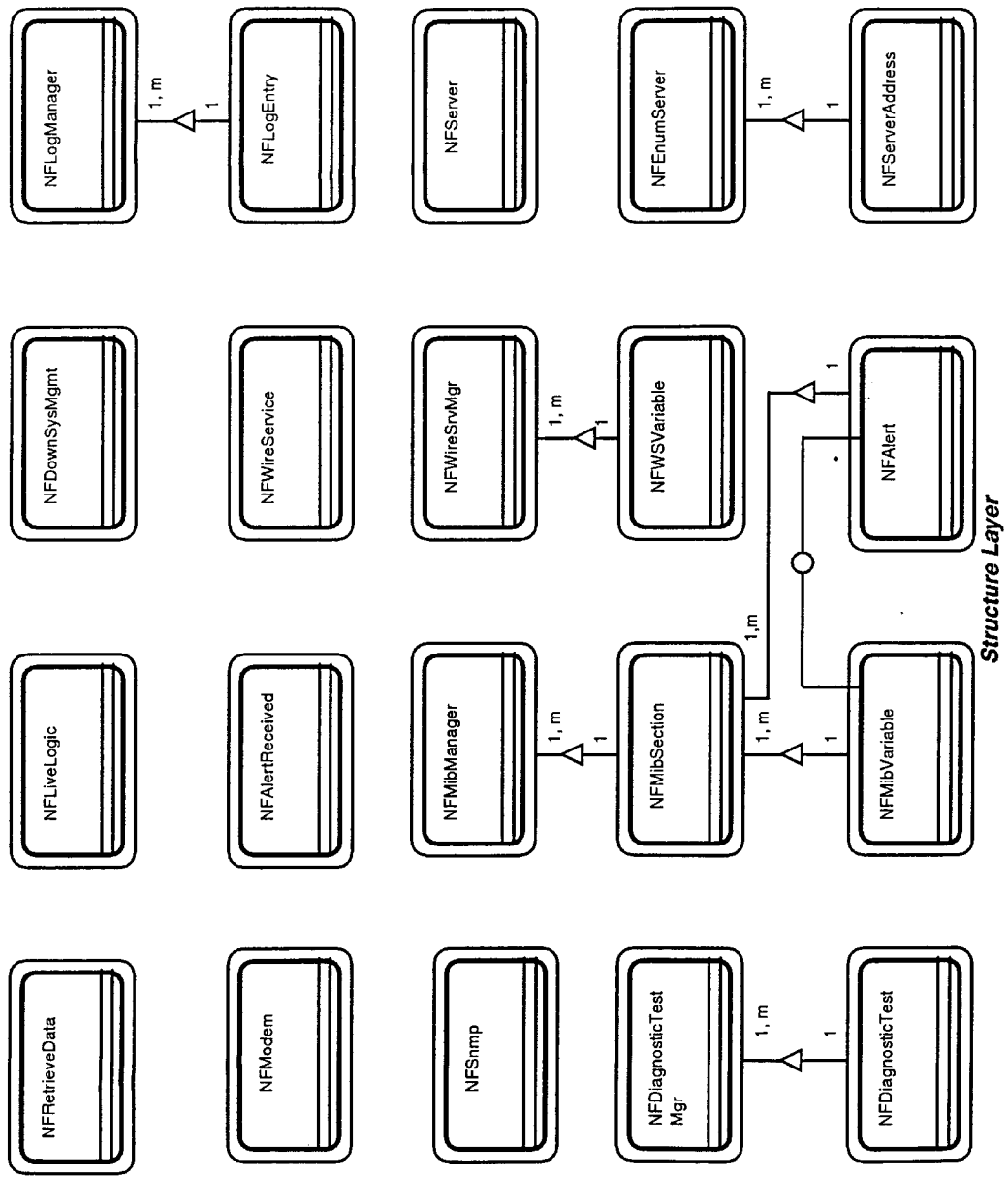

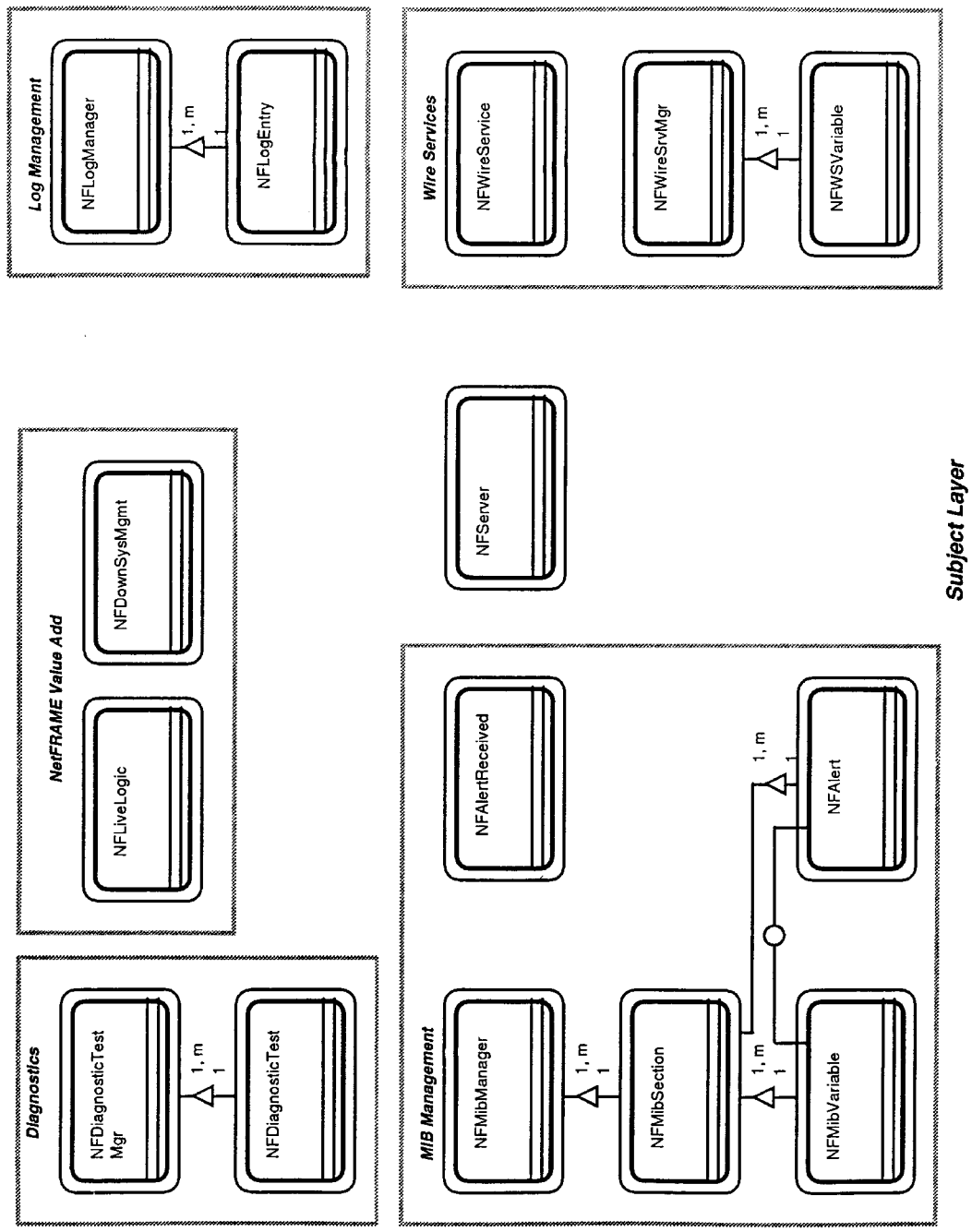

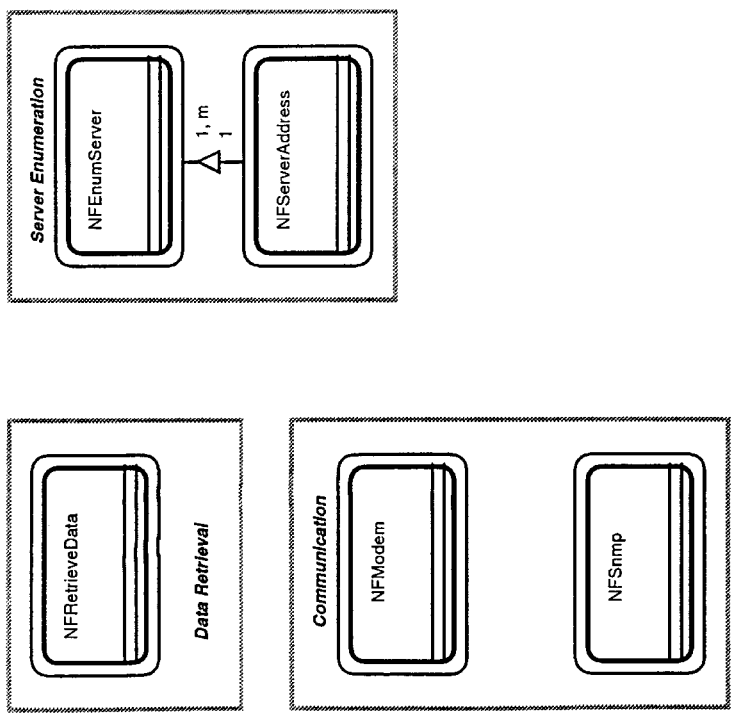

*Maestro 2.0*

*Object Oriented Analysis*

System Description

In this section we attempt to describe the system as a set of specific functional requirements. This will help in defining the object classes required.

The Maestro 2.0 application is required to:

- Use SNMP and browse the server MIB.

- Handle a dynamic SNMP MIB.

- Retrieve information from the server regardless of whether the server operating system is running.

- Receive alerts from the server.

- Use a modem and communicate with the Wire Services on the server.

- Support a dynamic set of Wire Services commands.

- Run diagnostic tests on the server through Wire Services.

- Provide means to run commands and manage the server when it's operating system in not running.

- Provide means to perform hot swap/add of LAN and SCSI cards.

- Provide means to perform hot swap/add of storage devices.

- Log alerts and results of diagnostic tests.

Event/Response List

The following are some of the external events and response to the events that affect the Maestro 2 system. Only events that substantially affect the system's data are recorded. At this point we do not acknowledge any of the implementation aspects of the application. This rules out user interface events like mouse clicks, typing, SNMP events, etc.

| Event Name | Response |
|---|---|
| Alert Received | Process received alert. |
| Request to add/swap a card | Identify the card.<br><br>Process Hot Add/Swap of LAN card, or<br><br>Process Hot Add/Swap of SCSI card. |
| Request to add a MIB | Process request to add a MIB. |
| Request to add storage device | Process Hot Add of storage device. |
| Request to add Wire Services commands | Process request to add Wire Services commands. |
| Request to open a connection to a server | Process request to open a connection to a server |
| Request to send a message to the server | Identify the type of message to be sent.<br><br>Send a Wire Services message, or<br><br>Send an SNMP message. |
| Time to discover network | Perform network discovery |
| Time to Retrieve Data | Retrieve Network Data.<br><br>Retrieve Wire Services Data. |
| Time to review log entries | Delete log entries. |

*Maestro 2.0 Object Oriented Analysis*

Object Classes

After the initial inspection of events and the functionality required, the following object classes are necessary.

| Object Class Name | Description |
|---|---|
| NFAlert | Encapsulates all data and functions relevant to an alert. |
| NFAlertReceived | This object class encapsulates recognition of the *Alert Received* event as well as any relevant data. |
| NFDiagnosticTestMgr | Encapsulates all data and functions relevant to running diagnostic tests. |
| NFDiagnosticTest | Encapsulates all data and functions that describe a diagnostic test that can be performed on the server. |
| NFEnumServer | Encapsulates recognition of *Time to Discover Servers* and *Request to open a connection to a server* events. It also encapsulates relevant data. |
| NFDownSysMgmt | Encapsulates functions and data required to perform Down System Management. |
| NFLiveLogic | Encapsulates recognition of the *Request to add Card* event. |
| ~~NFLiveStorage~~ | ~~Encapsulates recognition of the *Request to add Storage Device* and relevant data.~~ See the section *NFLiveStorage* under the *Attribute Layer* chapter. |
| NFLogEntry | Encapsulates an entry in the log. This object class will have a many-to-one relationship with the *NFLogManager* object class. |
| NFLogManager | Some insight suggests that both alerts and diagnostic tests will be logging their events or results. It is convenient for establishing an object class solely for maintaining the log. It also facilitates the having one object class providing the ability to manipulate (browse, delete, etc.) the log. This class will encapsulate this functionality. It also encapsulates recognition of the *Time to review log entries*. |
| NFMibManager | Encapsulates the manipulation of raw MIB data to a format recognized by the other object classes in the system. This will enable the system be independent of changes made to the MIB. |
| NFMibSection | The OO analysis acknowledges that an SNMP MIB is defined as a set of sections containing one or more MIB variables. This |

| Object Class Name | Description |
| --- | --- |
| | object class encapsulates all data in a single MIB section. |
| NFMibVariable | Encapsulates an SNMP object identifier. This object will share a many-to-one relationship with the *NFMibSection* object class. |
| NFModem | Encapsulates the functions and data required to communicate via a telephone line. This object class will server as an end point for all modem communications. |
| NFRetrieveData | This object encapsulates the *Time to Retrieve Data* event. It will retrieve network and the Wire Services data. It will not store any of the data retrieved, in fact, it will call services in other classes to actually retrieve the data. The analysis suggests that we create an infrastructure wherein other object classes can register with this object class for data retrieval tasks. |
| NFServer | After an initial study of the possible instance connections or "business rules" this object class becomes necessary. The MIB, Wire Services, Alert and Diagnostics managers cannot exist outside the realm of a server. Further, the server needs to be addressed as a separate entity since it is the centerpiece for actions and events in this application. This object class encapsulates all server information and also provides relevant functions. |
| NFServerAddress | This object class encapsulates all server address data. |
| NFSnmp | Encapsulates the functions and data required to communicate via the network using SNMP. The object class will server as the end point for all SNMP communications. |
| NFWireService | Encapsulates Wire Services communication specifics. Typically, it will package the command issued by *NFWireSrvMgr* to form understood by the Wire Services on the server. |
| NFWireSrvMgr | Encapsulates the manipulation of information regarding the Wire Services data and commands. It is expected that the information will be stored in a file or other appropriate media. This will enable the system be independent of changes to made the data and commands supported by the Wire Services on the server. |
| NFWSVariable | Encapsulates a Wire Services command or data retrieval command. This object will have a many-to-one relationship with the *NFWireSrvMgr* object class. |

*Maestro 2.0 Object Oriented Analysis*

Object Layer
This is a pictorial representation of the object classes defined in the previous section.
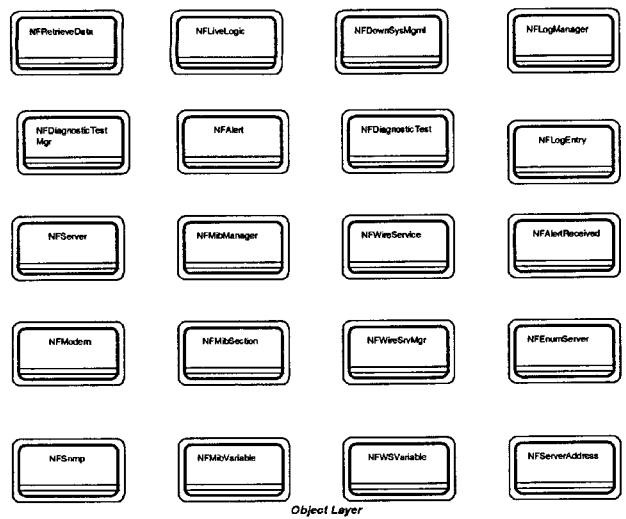
Figure 1: Object Layer

Structure Layer

This step of the analysis tries to identify relationships between objects. Two types of relationships can exist:

- Generalization-Specification
  A relationship of inheritance between the object classes

- Composition-Specification
  This type of a relationship specifies whether an object class is contained in another object class.

The object classes defined are unique in their behavior, providing little opportunity for Gen-Spec relationships. Some classes share a Comp-Spec relationship, they are captured adequately in the figure below.

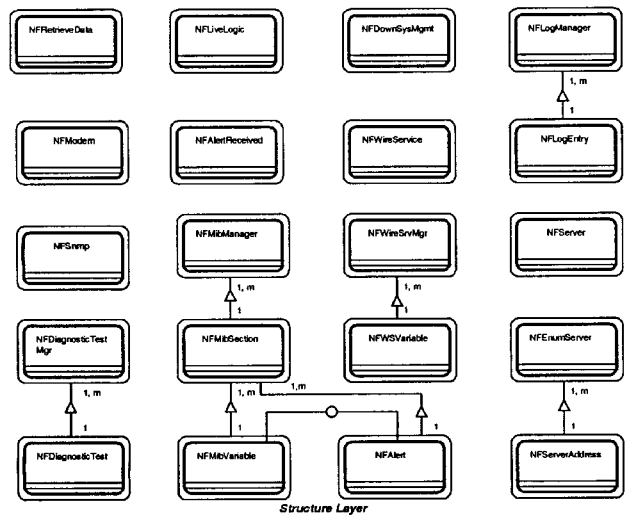

Figure 2: Structure Layer

Subject Layer

In this step, we try to identify the subsystems in Maestro 2. There are no guidelines or rules in identifying the subsystems or "subjects". Some insight into the system suggests that we should identify subsystems based on the functionality they provide. For example, *NFModem* and *NFSnmp* could together constitute the *Communications* subsystem. The following figure identifies the subsystems for Maestro 2.

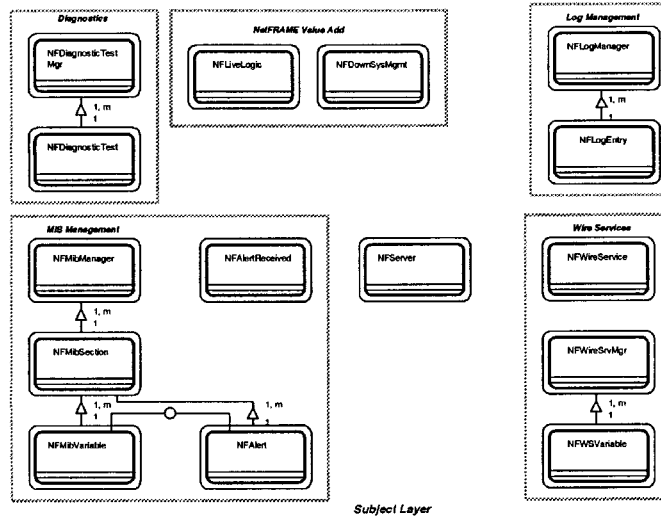

Figure 3: Subject Layer

Attribute Layer

In this section, we defined the attributes that each object class must contain to provide the functionality intended. We also identified the instance connections between the objects. Instance connection are rules for the existence of objects. For example, *NFMibManager* cannot exist outside the realm of an *NFServer*, therefore for every *NFMibManager* there must be a *NFServer* associated with it. Similarly, *NFRetrieveData* provides some generic data retrieval functions and can exist without any other object. The diagram below is the attribute layer for Maestro, a detailed text version follows the diagram.

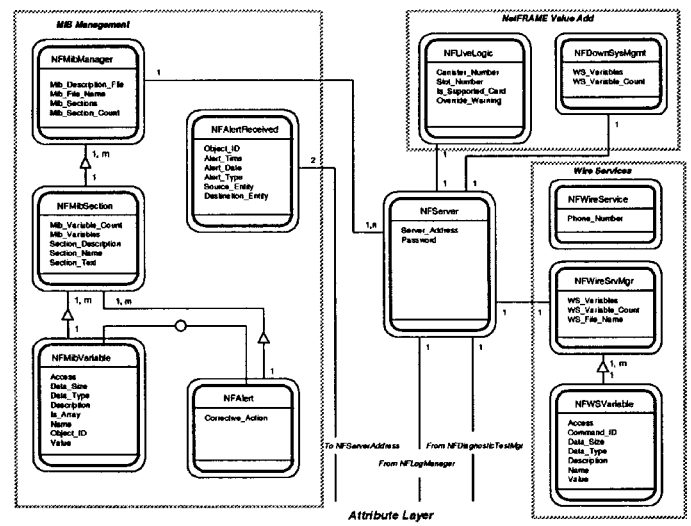

Figure 4: Attribute Layer

NFAlert

This object class encapsulates data and functions relevant to an alert. This object class shares a Comp-Spec relationship with *NFMibSection* and a Gen-Spec relationship with *NFMibVariable*. It inherits all the attributes from *NFMibVariable* and adds one more.

| Attribute Name | Description |
|---|---|
| Corrective_Action | This could be one of many predefined corrective actions for alerts. For example, disk full alert could have a corrective action of adding a disk. Due to the number of alerts and traps being large in number and their corrective actions being in multiples of this number, this feature may be supported only minimally. |

NFAlertReceived

This object class encapsulates recognition of the *Alert Received* event. While *NFAlertReceived* is required to respond any kind of alert received, the analysis uses *SNMP Traps* as a case study to develop the attributes that will be required.

| Attribute Name | Description |
|---|---|
| Alert_Date | Date when the alert was received |
| Object_ID | The ID of the alert. This ID will be consistent with *Object_ID* of the *NFAlert* object class. |
| Alert_Time | Time when the alert was received |
| Alert_Type | Specifies the type of alert. |
| Destination_Entity | The entity receiving this alert. |
| Source_Entity | The entity responsible for generating the trap for which this alert notification was received |

NFDiagnosticTestMgr

TBD

| Attribute Name | Description |
|---|---|
| TBD | |
| | |
| | |
| | |

NFDiagnosticTest

TBD

| Attribute Name | Description |
|---|---|

| Attribute Name | Description |
|---|---|
| TBD | |
| | |
| | |
| | |

NFDownSysMgmt

This object class encapsulates data and functions required to communicate with the server when it's operating system is not running. This object class will utilize the services of the *NFWireServices* object class to communicate with the server.

| Attribute Name | Description |
|---|---|
| WS_Variables | A collection of *NFWSVariable* objects that encapsulate the commands and data that can be retrieved when the server operating system is not running. |
| WS_Variable_Count | The total number of variables in attribute *WS_Variables*. |

NFEnumServer

This object class is responsible for enumerating all the NetFRAME servers on the network. It uses an instance of object class *NFServerAddress* to represent a server. It enumerates the NetFRAME servers on the network from time to time.

| Attribute Name | Description |
|---|---|
| Next_Enum_Date | The date on which this object class will enumerate the NetFRAME servers on the network. |
| Next_Enum_Time | The time at which this object class will enumerate the NetFRAME servers on the network. |
| NF_Servers | A collection of *NFServerAddress* objects. |
| Server_Count | This attribute maintain the number of NetFRAME server currently in the attribute *NF_Servers*. |

NFLiveLogic

This object class encapsulates the data and functions required to perform hot swap or hot add of LAN and SCSI cards.

| Attribute Name | Description |
| --- | --- |
| Canister_Number | The ID of the canister to which a card is going to be either added or swapped. |
| Slot_Number | The slot number within the canister specified by the attribute *Canister_Number* where the card is going to be added. |
| Is_Supported_Card | Specifies whether the card that is going to be added is supported by the server. |
| Override_Warning | This attribute is a flag which when TRUE would tell the server to override warnings and swap/add the card. When FALSE, it would tell the server to provide warning for unsupported cards. |

NFLiveStorage

After the first design iteration we realize that to hot add a storage device we need to only pass a command to the server. This functionality can be adequately addressed by a service in the *NFServer* class. Given these findings it is appropriate to eliminate this class from the object model.

NFLogEntry

This object class encapsulates a log entry. It shares a Comp-Spec relationship with the *NFLogManager* object class and therefore is created by the container class.

| Attribute Name | Description |
| --- | --- |
| Log_Creator | The entity that was responsible for making this log entry. |
| Log_Date | The date on which the event was logged. |
| Log_ID | Each log entry is distinguished by this attribute. It could also be used when storing *NFLogEntry* objects (this will addressed during the design) |
| Log_Text | A textual description of the logged event. |
| Log_Time | Time at which the event was logged. |

NFLogManager

This object class is responsible for maintaining the log entries. It will provide services to add entries and delete entries periodically. The log entries are themselves *NFLogEntry* objects.

| Attribute Name | Description |
|---|---|
| Log_Count | This attribute contains the number of entries currently in the log. |
| Log_Entries | A collection of *NFLogEntry* objects. |
| Review_Day | Contains the next date on which the log entries are to be reviewed. |
| Review_Time | Contains the next time at which the log entries are to be reviewed. |

NFMibManager

This object class is responsible for managing a compiled MIB file. It shares a Comp-Spec relationship with *NFMibSection*. This object class reads the compiled MIB file and creates instance of the *NFMibSection* object class. Each MIB file has an associated description file. This description file contains some descriptive text on each MIB variable in the MIB file. This object class is also responsible for parsing and extracting information from the description file.

| Attribute Name | Description |
|---|---|
| Mib_Description_File | The name of the file containing the description of the MIB variables and sections. |
| Mib_File_Name | The name of the compiled MIB file. |
| Mib_Name | The name of the current MIB the object class is processing. Typically, all MIB definitions have a name associated with it. This attribute will store this information. |
| Mib_Sections | A collection of *NFMibSection* objects. |
| Mib_Section_Count | The total number of MIB section in *Mib_Sections*. |

NFMibSection

This object encapsulates a MIB "section". Essentially, it is equivalent to a tree node containing one to many variables in a MIB structure. It shares a Comp-Spec relationship with *NFMibVariable* and it creates them by parsing the textual description of the MIB section.

*Maestro 2.0 Object Oriented Analysis*

| Attribute Name | Description |
| --- | --- |
| Mib_Variable_Count | The total number of *NFMibVariable* objects in attribute *Mib_Variables*. |
| Mib_Variables | A collection of *NFMibVariable* objects. |
| Section_Description | The description of this section. |
| Section_Name | The name of the MIB section. |
| Section_Text | The textual form of the MIB section. This will parsed to create MIB variables encapsulated by *NFMibVariable* objects. |

NFMibVariable

The object class shares a Comp-Spec relationship with *NFMibVariable*. The value for most of the attributes will be set from the container class.

| Attribute Name | Description |
| --- | --- |
| Access | This attribute specifies whether the SNMP object identifier pointed to by Object_ID is a read only or a read-write entity. |
| Data_Size | The maximum size of data that the SNMP object identifier pointed to by Object_ID can hold. |
| Data_Type | Specifies the data type of the SNMP object identifier pointed to by Object_ID. |
| Description | A string of text that describes the SNMP object identifier pointed to by Object_ID.<br><br>In the design phase we may change this attribute to be an offset into a file. This will allow us to address memory constraints that may arise. Also, this will allow for very informative description of the variable. |
| Is_Array | Specifies whether this element is an array of variables represented by this object. |
| Name | The name of the SNMP object identifier pointed to by Object_ID. |
| Object_ID | Contains the ID of the SNMP object identifier. |

| Attribute Name | Description |
| --- | --- |
| Value | This attribute will contain the value of the SNMP object identifier pointed to by Object_ID. In the case of read-write variables, this attribute will be used to set the new value. |

NFModem

This object encapsulates all data and functions required to facilitate modem communications with the NetFRAME server. The object class will provide services for making a call, sending and receiving data. The scope of this object class' communication is limited to outgoing data-only calls.

| Attribute Name | Description |
| --- | --- |
| Call_In_Progress | This attribute is a flag and it specifies whether a call is in progress. |
| Call_Type | This call specifies the call type which could either be incoming or outgoing calls. Although only outgoing calls are supported, it may be appropriate to create placeholders with view to extend the class. |

NFRetrieveData

This object class encapsulates data and functions required to retrieve data from the server. It will allow other objects to "register" with itself to retrieve data. Typically, the object classes that register will have services to send and receive data. The details of this infrastructure will be addressed in the *Service Layer*.

| Attribute Name | Description |
| --- | --- |
| Registered_Objects | A collection of objects (with support for some required services) that are interested in retrieving data from server. |
| Next_Retrieval_Time | The next time at which data will be retrieved. |
| Next_Retrieval_Date | The day on which the data will be retrieved. |

NFServer

This object encapsulates all server data. *NFServer* does not many attributes, but it has instances connections with many object classes.

| Attribute Name | Description |
| --- | --- |
| Server_Address | An instance of the *NFServerAddress* object class to maintain the server's address information. |
| Password | The password for the server. |

NFServerAddress

This object class shares a Comp-Spec relationship with the object class *NFEnumServer*. All instances of this class will be created by the container class.

| Attribute Name | Description |
| --- | --- |
| Address_Type | This attribute specifies the type of address stored in the *Server_Address* attribute. |
| Server_Address | The object class will deal with different kinds of network protocols. This attribute will provide storage for a network address. |
| Server_Name | This attribute will contain the name of the server in the form of a text string. The name of the address may not fit in with a traditional sense of an address. However, the reason we have encapsulated it in this object class is because the server's name by itself can be used to communicate the server. |

NFSnmp

This object encapsulates all data and functions required to facilitate SNMP conversations with a server. The object class will provide services for standard SNMP operations such as get, get next, set, etc. Currently, we plan to only support SNMP on UDP (TCP/IP). In the event other protocols have to be supported, the design/implementation need only be changed in this object class. The data and functions are sufficiently abstracted such that other classes will not be affected for any changes in the protocol.

| Attribute Name | Description |
| --- | --- |
| Community_Name | All SNMP messages require a string that specifies some access privileges. For the purposes of this application, it will always be "public". |
| Destination_Address | Specifies the address of the server this object class needs to communicate with. |

| Attribute Name | Description |
|---|---|
| Host_Address | Specifies the address of the entity from which the SNMP message originates. |
| Max_Retries | The maximum number of times this object class will try to send out a message. |
| Receive_Request_ID | Used when this object receives a message from the server. This can be used to check if this object received a duplicate message. |
| Sent_Request_ID | This attribute can be used by the SNMP Agent on the server side to perform some checks on repetitive messages. |
| Session_Handle | This attribute specifies whether we can have an SNMP conversation with a server. |
| Timeout | The minimum amount of time the object class will wait before it declares an unsuccessful attempt at communicating with the server. |

NFWireService

This object class is used to specifically communicate with the Wire Services on the server. It provides services that package a Wire Service command with the predefined protocol. The actual telephone call is made by *NFModem*.

| Attribute Name | Description |
|---|---|
| Phone_Number | The telephone number to be dialed. |

NFWireSrvMgr

This object class is responsible for managing a file that contains information about the Wire Service commands. It shares a Comp-Spec relationship with *NFWSVariable*. This object class reads the Wire Services file and create instances of the *NFWSVariable* object class.

| Attribute Name | Description |
|---|---|
| WS_Variables | A collection of *NFWSVariable* objects. |
| WS_Variable_Count | The total number of objects in *WS_Variables* |
| WS_File_Name | The name of the file whose contents this object parses to create *NFWSVariable* objects. This file will also include the name and |

| Attribute Name | Description |
|---|---|
| | description of the Wire Services commands and data items. |

NFWSVariable

This object class encapsulates all data and functions of a Wire Services command. It shares a Comp-Spec relationship with *NFWireSrvMgr* and all instances of this variable are created by the container class.

| Attribute Name | Description |
|---|---|
| Access | This attribute specifies whether the command, specified by Command_ID, accesses a read-only, read/write or write only entity. |
| Command_ID | The command to be sent to the Wire Services. This could be to read a certain value or execute a command on the server. |
| Data_Size | While the Wire Services specification has a maximum length of 256 bytes, the actual maximum of data items can be less than the maximum. For e.g., the serial number of a processor has a maximum length of the 16 bytes. This attribute will capture the actual maximum data length in bytes. |
| Data_Type | This attributes specifies type of data, which could be string, integer, etc. |
| Description | A textual description of command. This should include detailed information about the effect of a command or an interpretation of the data item. |
| Name | The name of the command. |
| Value | This attribute is buffer for value returned after executing the command specified by Command_ID. |

Service Layer

In this section, the services or functions required for each object classes are identified. The event/response list for this application is used as a starting point. At the very least, there must be a response for all of the events. The service layer also identifies functions that don't necessarily respond to events.

The services identified here do not include implementation related functions. For e.g., adding an alert could be a direct result of reading a file, but we do not include the functions to read the file. This method allow us to focus on an object class' interaction with other object classes and the flow of execution at a high level. Further, we will create a system that makes no assumption about the implementation of specific functions.

The following is the service layer for Maestro. A detailed textual description follows the figure.

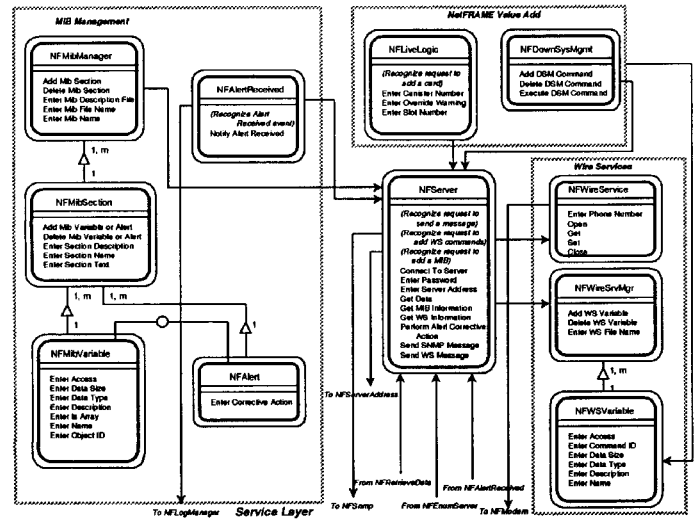

The tables below are spilt into three columns: Services, Messages and Destination Objects. Services identifies the name of the service, Messages identifies the message that will result when we invoke the service, and lastly Destination Objects identifies the objects that will respond to the message mentioned in the Messages column.

NFAlert

This object class doesn't initiate messages. All of its services or functions provide means to modify its attributes.

| Services | Messages | Destination Objects |
|---|---|---|

*Maestro 2.0 Object Oriented Analysis*

| Services | Messages | Destination Objects |
|---|---|---|
| Enter Alert ID | | |
| Enter Corrective Action | | |
| Enter Description | | |
| Enter Name | | |

NFAlertReceived

*NFAlertReceived* encapsulates recognition of the alert received event.

| Services | Messages | Destination Objects |
|---|---|---|
| (Recognize alert received event) | Notify_Alert_Received | |
| | Perform_Alert_Corrective_Action | NFServer |
| | Add_Log_Entry | NFLogManager |
| Notify Alert Received | | |

NFDiagnosticTestMgr

| Services | Messages | Destination Objects |
|---|---|---|
| TBD | | |
| | | |
| | | |

NFDiagnosticTest

| Services | Messages | Destination Objects |
|---|---|---|
| TBD | | |
| | | |
| | | |

NFDownSysMgmt

This object class encapsulates the down system management commands of the Wire Services. It provides functions to add, delete and execute the commands.

| Services | Messages | Destination Objects |
|---|---|---|
| Add DSM Command | Enter_Access | NFWSVariable |
| | Enter_Command_ID | NFWSVariable |
| | Enter_Data_Size | NFWSVariable |
| | Enter_Data_Type | NFWSVariable |
| | Enter_Description | NFWSVariable |
| | Enter_Name | NFWSVariable |
| Delete DSM Command | | |
| Execute DSM Command | (Request to send a message) | NFServer |

NFEnumServer

This object enumerates the NetFRAME Raptor servers on the network. It provides functions to add and delete the list of servers. In addition, it recognizes the *Time to discover network* and *Request to open a connection to a server* events.

| Services | Messages | Destination Objects |
|---|---|---|
| (Recognize request to open a connection to a server) | Select Server | |
| (Recognize Time to discover network) | | |
| Add Server Address | Enter_Server_Address_Type | NFServerAddress |
| | Enter_Server_Address | NFServerAddress |
| | Enter_Server_Name | NFServerAddress |
| Delete Server Address | | |

| Services | Messages | Destination Objects |
|---|---|---|
| Enter Next Enum Date | | |
| Enter Next Enum Time | | |
| Select Server (with address = one Server Address object) | Connect_To_Server | NFServer |

NFLiveLogic

This object provides services to perform hot swap/add of a LAN or SCSI card.

| Services | Messages | Destination Objects |
|---|---|---|
| (Recognize Request to add card) | (Request to send a message to the server) | NFServer |
| Enter Canister Number | | |
| Enter Override Warning | | |
| Enter Slot Number | | |

NFLogEntry

This object doesn't respond to any event nor does it send any messages to other objects. It provides services that modify its attributes.

| Services | Messages | Destination Objects |
|---|---|---|
| Enter Log Creator | | |
| Enter Log Date | | |
| Enter Log Text | | |
| Enter Log Time | | |

NFLogManager

*NetFRAME Systems Confidential*
*Srikumar Chari*

This object does not respond to any of the events. It provides functions to add, delete and view the log entries. In addition, it recognition of the *Time to review log entries* event.

| Services | Messages | Destination Objects |
|---|---|---|
| (Recognize Time to review log entries) | Delete_Log_Entry | |
| Add Log Entry | Enter_Log_Creator | NFLogEntry |
| | Enter_Log_Date | NFLogEntry |
| | Enter_Log_Text | NFLogEntry |
| | Enter_Log_Time | NFLogEntry |
| Delete Log Entry | | |
| Enter Review Day | | |
| Enter Review Time | | |

NFMibManager

This object class reads a file and creates MIB sections. It provides functions to modify its attributes.

| Services | Messages | Destination Objects |
|---|---|---|
| Add MIB Section | Enter_Section_Description | NFMibSection |
| | Enter_Section_Name | NFMibSection |
| | Enter_Section_Text | NFMibSection |
| Delete MIB Section | | |
| Enter Description File Name | | |
| Enter MIB File Name | | |
| Enter MIB Name | | |

NFMibSection

This object class parse the text form of the MIB passed to it by *NFMibManager* into *NFMibVariable* objects. It provides services add and delete MIB variables, and to modify its attributes.

| Services | Messages | Destination Objects |
|---|---|---|
| Add MIB Variable | Enter_Access | NFMibVariable |
| | Enter_Data Size | NFMibVariable |
| | Enter_Data Type | NFMibVariable |
| | Enter_Description | NFMibVariable |
| | Enter_Is Array | NFMibVariable |
| | Enter_Name | NFMibVariable |
| | Enter_Object ID | NFMibVariable |
| Delete MIB Variable | | |
| Enter MIB Section Text | | |
| Enter Section Description | | |
| Enter Section Name | | |

NFMibVariable

| Services | Messages | Destination Objects |
|---|---|---|
| Enter Access | | |
| Enter Data Size | | |
| Enter Data Type | | |
| Enter Description | | |
| Enter Is Array | | |
| Enter Name | | |
| Enter Object ID | | |

NFModem

This object class allows for making calls on the modem. It provides functions to dial a call, get and send data, and end a call.

| Services | Messages | Destination Objects |
|---|---|---|
| Close | | |
| Enter Call Type | | |
| Get | | |
| Is Busy | | |
| Open (dial a call) | | |
| Send | | |

NFRetrieveData

This object encapsulates recognition of the *Time to retrieve data*. For an object class to avail *NFRetrieveData's* functionality, it must support a called Get Data. This function is called by *NFRetrieveData* when it recognizes the *Time to retrieve data* event.

| Services | Messages | Destination Objects |
|---|---|---|
| (Recognize time to retrieve data) | Registered Object's Get_Data | Registered Object (currently, we have identified *NFServer*) |
| Enter Next Retrieval Time | | |
| Enter Next Retrieval Time | | |
| Register Object (for data retrieval) | | |

NFServer

This object class encapsulates all relevant server data and functions. It recognizes the *Request to send a message to the server*. It also responds to messages from other object classes. *NFServer* will register itself with *NFRetrieveData*, which will call the Get_Data service of this class from time to time

| Services | Messages | Destination Objects |
|---|---|---|
| (Recognize Request to send a message to the server) | Identify message type<br><br>Send_SNMP_Message (Get, GetNext, Set), or<br><br>Send_WS_Message (Get, Set) | |
| (Request to add a MIB) | Enter_Description_File_Name<br><br>Enter_MIB_File_Name<br><br>Enter_MIB_Name | NFMibManager<br><br>NFMibManager<br><br>NFMibManager |
| (Request to add Wire Services commands) | Enter_WS_File_Name | NFWireSrvMgr |
| Connect to server | | |
| Enter Password | | |
| Enter Server Address | Enter_Server_Address_Type<br><br>Enter_Server_Address<br><br>Enter_Server_Name | NFServerAddress<br><br>NFServerAddress<br><br>NFServerAddress |
| Get Data | Get_MIB_Information<br><br>Get_WS_Information | |
| Get MIB Information | Send_SNMP_Message | |
| Get WS Information | Send_WS_Message | |
| Perform Alert Corrective Action | | |
| Send SNMP Message | Open<br><br>Get/Get_Next/Set<br><br>Close | NFSnmp<br><br>NFSnmp<br><br>NFSnmp |
| Send WS Message | Open<br><br>Get or Set | NFWireService<br><br>NFWireService |

| Services | Messages | Destination Objects |
|---|---|---|
|  | Close | NFWireService |

NFServerAddress

This object class encapsulates the server's address information. It provides functions to modify its attributes.

| Services | Messages | Destination Objects |
|---|---|---|
| Enter Address |  |  |
| Enter Address Type |  |  |
| Enter Server Name |  |  |

NFSnmp

This object class encapsulates the protocol details of SNMP. It provides services to modify its attributes and to communicate via SNMP to the server.

| Services | Messages | Destination Objects |
|---|---|---|
| Close |  |  |
| Enter Community Name |  |  |
| Enter Destination Address | Enter_Server_Address_Type | NFServerAddress |
|  | Enter_Server_Address | NFServerAddress |
|  | Enter_Server_Name | NFServerAddress |
| Enter Retries |  |  |
| Enter Time Out |  |  |
| Get |  |  |
| GetNext |  |  |
| Open |  |  |
| Set |  |  |

*Maestro 2.0 Object Oriented Analysis*

NFWireService

This object class encapsulates the protocol details of Wire Services communication. It provides services to modify its attributes and to communicate to the Wire Services on the server

| Services | Messages | Destination Objects |
|---|---|---|
| Close | Close | NFModem |
| Enter Phone Number | | |
| Get | Send | NFModem |
| Open | Open | NFModem |
| Set | Send | NFModem |

NFWireSrvMgr

This object class reads a file with information on Wire Services commands and creates *NFWSVariable* objects. It provides functions to add and delete WS variables.

| Services | Messages | Destination Objects |
|---|---|---|
| Add WS Variable | Enter_Access | NFWSVariable |
| | Enter_Command_ID | NFWSVariable |
| | Enter_Data_Size | NFWSVariable |
| | Enter_Data_Type | NFWSVariable |
| | Enter_Description | NFWSVariable |
| | Enter_Name | NFWSVariable |
| Delete WS Variable | | |
| Enter File Name | | |

NFWSVariable

This object class provides functions to modify its attributes.

| Services | Messages | Destination Objects |
|---|---|---|
| Enter Access | | |
| Enter Command ID | | |
| Enter Data Size | | |
| Enter Data Type | | |
| Enter Description | | |
| Enter Name | | |

*Maestro 2.0 Object Oriented Analysis*

NF9000 MIB

Rev. 2.2

April 14, 1997

Bruno Sartirana

NetFRAME Systems, Inc.

Approved by:

| |
|---|
| Walt Wallach |
| Andras Boross |
| Hitesh Shah |
| John Hammond |
| Ron Vogel |
| Sheila Conley |
| Srikumar Chari |
| Mehrdad Khalili |
| Lawrence Tremmel |

NF9000 MIB Rev. 2.2

CONTENTS

- INTRODUCTION ..................................................................................................................................... 1
- THE NF9000 SERIES ............................................................................................................................... 2
- SNMP AND MIB BACKGROUND ......................................................................................................... 3
- NF9000 SNMP ENVIRONMENT ............................................................................................................ 5
- NF9000 MIB .............................................................................................................................................. 6
  - TRAP GROUP ............................................................................................................................................ 8
  - SYSTEM GROUP ....................................................................................................................................... 9
  - COOLING GROUP ................................................................................................................................... 12
  - POWER GROUP ....................................................................................................................................... 15
  - CPU GROUP ............................................................................................................................................ 18
  - ADAPTER GROUP ................................................................................................................................... 19
  - DRIVER GROUP ...................................................................................................................................... 23
  - SLOT GROUP .......................................................................................................................................... 24
  - CANISTER GROUP .................................................................................................................................. 27
  - SLOT FAN GROUP .................................................................................................................................. 30
- APPENDIX 1: HOT SWAP AND HOT ADD ALGORITHMS .......................................................... 32
- APPENDIX 2: NF9000 I/O BUS HIERARCHY FOR WINDOWS NT ............................................ 36
  - I/O BUS TREE ........................................................................................................................................ 36
  - MIB'S VIEW OF THE I/O BUSES ........................................................................................................... 39
- APPENDIX 3: NF9000 I/O BUS HIERARCHY FOR NETWARE .................................................. 40
  - I/O BUS TREE ........................................................................................................................................ 40
  - MIB'S VIEW OF THE I/O BUSES ........................................................................................................... 42
- APPENDIX 4: NF9000-C- AND NF9000-T-SPECIFIC MIB VARIABLES ................................... 43
- APPENDIX 5: NF9000 MIB TREE ....................................................................................................... 44
- APPENDIX 6: NF9000 MIB DEFINITIONS ....................................................................................... 47
  - TRAP GROUP .......................................................................................................................................... 48
  - SYSTEM GROUP ..................................................................................................................................... 50
  - COOLING GROUP ................................................................................................................................... 54
  - POWER GROUP ....................................................................................................................................... 59
  - CPU GROUP ............................................................................................................................................ 62
  - ADAPTER GROUP ................................................................................................................................... 64
  - DRIVER GROUP ...................................................................................................................................... 68
  - SLOT GROUP .......................................................................................................................................... 69
  - CANISTER GROUP .................................................................................................................................. 71
  - SLOT FAN GROUP .................................................................................................................................. 74
- REFERENCES ........................................................................................................................................ 76
- REVISION HISTORY ........................................................................................................................... 77
  - REV. 0.4 ................................................................................................................................................. 77
  - REV. 0.5 ................................................................................................................................................. 77
  - REV. 0.6-0.8 .......................................................................................................................................... 77
  - REV. 0.9 ................................................................................................................................................. 77
  - REV. 1.0 ................................................................................................................................................. 78
  - REV. 1.1 ................................................................................................................................................. 79

NF9000 MIB Rev. 2.2

| | |
|---|---|
| REV. 1.2 | 79 |
| REV. 1.3 | 80 |
| REV. 1.4 | 80 |
| REV. 1.5-1.9 | 80 |
| REV. 1.9.1 | 80 |
| REV. 2.0 | 80 |
| REV. 2.1 | 81 |
| REV. 2.2 | 81 |

NF9000 MIB Rev. 2.2

Introduction

This document is intended to be a guide to the MIB (Management Information Base) designed for the NetFRAME NF9000-C[1] and the NF9000-T[2] server models.

The material presented in this document is targeted to SNMP Manager/Agent designers and users. Designers need to understand how the various MIB groups and variables are correlated with each other and with the underlying hardware/firmware modules to present an integrated and consistent view of the system to the users.
Users want to clearly know the meaning of each single MIB variable, the effects indicated by the values each variable can assume, and, possibly, which actions should be taken in case of malfunctions.

This guide's first section describes the main features of the NF9000 series, with focus on the components that are relevant to the MIB.

The second section provides some background information on SNMP and MIB.

The third section contains a short description of the NF9000 SNMP environment.

The fourth section is dedicated to the analysis of the NF9000 MIB, whose variables are described one-by-one, in detail.

The first appendix presents an insight of the hot swap and hot add operations, with some details on the operating system-specific issues involved.

The second and third appendixes shed some light on the I/O bus structure of the NF9000 series and on the bus & slot numbering schemes used by Windows NT and NetWare, respectively. This is of paramount importance for both the SNMP Manager and Agent implementations.

The fourth appendix addresses the differences between the NF9000-C and the NF9000-T as reflected by MIB groups and variables.

The fifth appendix reports the summary of the NF9000 MIB structure, with the object identifiers. This is useful for getting a global idea of the MIB organization, and for browsing the MIB by means of command-line browsers.

The sixth appendix reports the formal MIB definitions that, once compiled, become a binary file used by MIB browsers.

Some references and a revision history conclude the document.

---

[1] Code-named "Raptor-16".
[2] Code-named "Raptor-8".

NF9000 MIB Rev. 2.2

The NF9000 Series

The NetFRAME ClusterServer 9000 (NF9000) series features a sophisticated system architecture that combines the advantages of a standard-based platform with NetFRAME's traditional benefits of continuous availability, scalability and high-throughput. The NF9000 is a 100% PC-compatible server that enables customers to leverage standard peripherals, PCI [SOLARI] adapters, network operating systems, and application software.

The NF9000 features NetFRAME's innovative 400MB/sec triple-peer PCI bus design. By isolating low-speed I/O traffic from high-speed memory and I/O functions, the NF9000 overcomes the I/O bottlenecks that limit the performance of traditional PC servers. Designed to be compliant with the I2O I/O standard and intelligent I/O hardware and software, the NF9000 can support a cluster of up to 29 processors in a single system. With its unique high-throughput design, the NF9000 can meet the most demanding application requirements and scale to support thousands of users.

The NF9000 features robust hardware redundancy, software fault resilience, and on-line system configuration, management, expansion and repair. With the industry's first Hot Pluggable technology, NF9000 users can hot swap and hot add PCI boards as well as disk drives, power supplies and fans, without shutting down the system. Plus, with IntraPulse™ [NGUYEN], NetFRAME's unique self-contained internal monitoring subsystem, server administrators can detect, diagnose, monitor and repair potential problems before they affect system operation.

Two servers are offered: the NF9000-C and the NF9000-T.

The NF9000-C features up to four processors and four Fault Isolation Units (FIUs, also called Canisters), that can carry up to four PCI cards each. The FIUs can be extracted and PCI cards replaced or added without affecting the rest of the system.

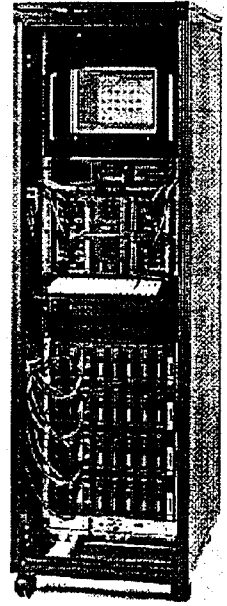

Figure 1. The NF9000-C.

The NF9000-T is a smaller server with the same number of processors as the NF9000-C, but with a different architecture for PCI card hot swapping and hot adding. The eight PCI slots available can be turned off and on individually, to allow for card replacement/addition without affecting the rest of the machine.

The MIB described in this document exports most of the variables controlled by IntraPulse, plus additional information required for hot swapping and hot adding PCI boards.

NF9000 MIB Rev. 2.2

SNMP and MIB Background

The Simple Network Management Protocol (SNMP) [HEIN, TOWNSEND] serves as a mechanism to provide and transport management information between network components. It permits interactive network administration via parameter checks and supervision of certain network conditions. SNMP uses a transport protocol stack such as UDP/IP, TCP/IP, IPX, SNX, DECnet, and others.

SNMP became an Internet Standard in 1990, when it was published as [RFC1157]. There is now the version 2 of SNMP, called SNMPv2, which enhances SNMP in many respects, especially in the security area [RFC1910]. Very few companies because of its complexity have implemented the SNMPv2. Microsoft and Novell do not support SNMPv2. The SNMPv2 is defined in [RFC1441, RFC1902, RFC1903, RFC1904, RFC1905, RFC1906, RFC1907, RFC1908].

Non-aggregate object types represent all management information transferred via the SNMP protocol. These object types are gathered in one or more Management Information Bases (MIBs) [RFC1212] and defined by the Structure and Identification of Management Information (SMI) [RFC1155]. The SMI defines the ISO[3] Standard 8824 [ISO8824] (commonly referred to as ASN.1) as the abstract syntax notation for all MIB variables. ASN.1 is a description language for the construction of complex data structures. For the sake of simplicity, SMI purposely restricts the ASN.1 constructs that may be used to describe MIB objects.

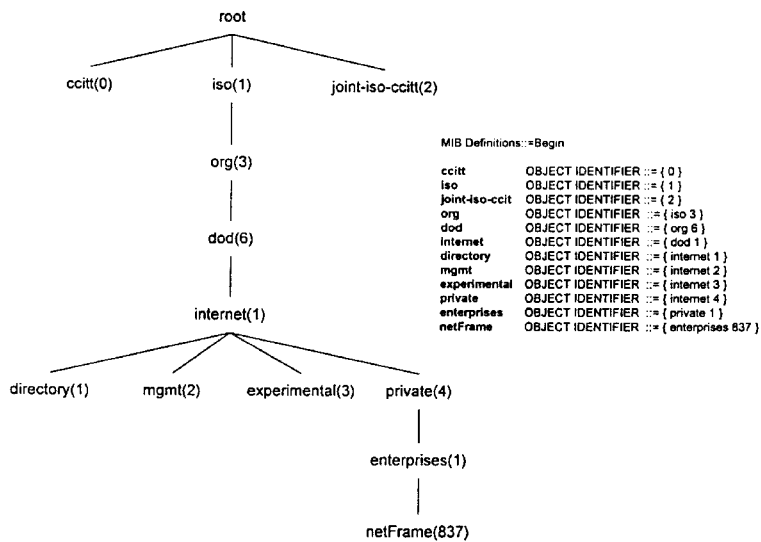

Figure 2. The OSI Management Tree.

MIB objects are identified by names. Names belong to a hierarchical name space, and are encoded as OBJECT IDENTIFIERs. An OBJECT IDENTIFIER is a sequence of integers that traverse a global tree that comes from the OSI (Open Systems Interconnect) definition. The tree is illustrated in Figure 2, which consists of a root connected to a number of labeled nodes via edges. Each node may, in turn, have children

---

[3] International Standards Organization.

NF9000 MIB Rev. 2.2 of its own, which are labeled. In this case, we may term the node a subtree. Different nodes in the tree may correspond to different administrative entities.

The root node itself is unlabeled, but has at least three children directly under it: one node is administered by the International Organization for Standardization, with label iso(1); another is administrated by the International Telegraph and Telephone Consultative Committee, with label ccitt(0); and the third is jointly administered by the ISO and the CCITT, joint-iso-ccitt(2).

Under the iso(1) node, the ISO has designated one subtree for use by other (inter)national organizations, org(3). Of the children nodes present, two have been assigned to the U.S. National Institutes of Standards and Technology. One of these subtrees has been transferred by the NIST to the U.S. Department of Defense, dod(6). The DoD allocated a node to the Internet community, to be administered by the Internet Activities Board (IAB).

Under the internet(1) node there are four subtrees: directory(1), mgmt(2), experimental(3), and private(4).

The directory(1) subtree is currently empty.

The mgmt(2) subtree is used to identify objects that are defined in IAB-approved documents. Administration of the mgmt(2) subtree is delegated by the IAB to the Internet Assigned Numbers Authority for the Internet. As RFCs which define new versions of the Internet-standard Management Information Base are approved, they are assigned an OBJECT IDENTIFIER by the Internet Assigned Numbers Authority for identifying the objects defined by that memo. For example, the RFC which defines the initial Internet standard MIB would be assigned management document number 1. This RFC would use the OBJECT IDENTIFIER { mgmt 1 } or 1.3.6.1.2.1 in defining the Internet-standard MIB.

The experimental(3) subtree is used to identify objects used in Internet experiments. Administration of the experimental(3) subtree is delegated by the IAB to the Internet Assigned Numbers Authority of the Internet. For example, an experimenter might received number 17, and would have available the OBJECT IDENTIFIER { experimental 17 } or 1.3.6.1.3.17 for use.
As a part of the assignment process, the Internet Assigned Numbers Authority may make requirements as to how that subtree is used.

The private(4) subtree is used to identify objects defined unilaterally. Administration of the private(4) subtree is delegated by the IAB to the Internet Assigned Numbers Authority for the Internet. Initially, this subtree has at least one child: "enterprises OBJECT IDENTIFIER ::= { private 1 }". The enterprises(1) subtree is used, among other things, to permit parties providing networking subsystems to register models of their products. Upon receiving a subtree, the enterprise may, for example, define new MIB objects in this subtree. In addition, it is strongly recommended that the enterprise will also register its networking subsystems under this subtree, in order to provide an unambiguous identification mechanism for use in management protocols. For example, NetFRAME requested and obtained a node under the enterprises subtree from the Internet Assigned Numbers Authority. Such a node is numbered: 1.3.6.1.4.1.837.

In this document, MIB objects and MIB variables are synonyms.

NF9000 MIB Rev. 2.2

NF9000 SNMP Environment

The Simple Network Management Protocol is used in conjunction with two basic modules: SNMP Manager and SNMP Agent.

The SNMP Manager provides the network administrator with a simple (character-oriented) or sophisticated (graphical) representation of the state of the target machine and/or devices. There are several SNMP Manager programs available. NetFRAME is shipping Maestro™ Central with the NF9000 systems. Maestro is graphical and has been specifically designed for the NF9000 MIB.

Figure 3 describes the basic components involved in an SNMP-based network management applied to the NF9000.

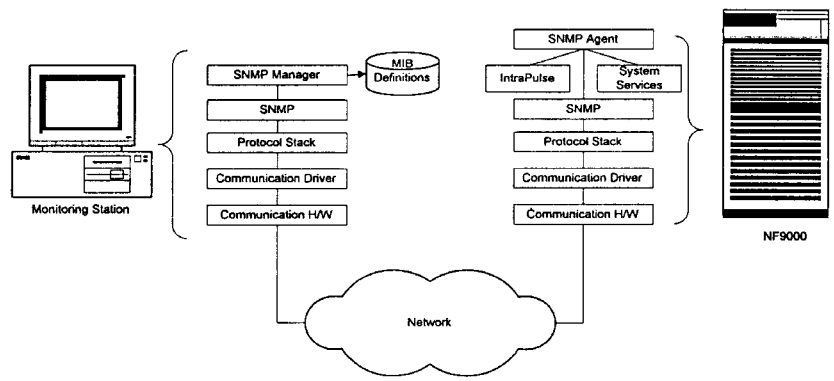

Figure 3. SNMP and the NF9000.

The network administrator uses the SNMP Manager to browse the target server's MIB. The SNMP Manager shows the current value of the MIB variables, receives SNMP traps indicating malfunction in important parts of the server, and allows the network administrator to change the value of MIB variables. Its task is driven by the MIB definition file, which contains the description of all the MIB variables.

The SNMP Manager calls the SNMP protocol layer, which usually relies on a datagram protocol like UDP.

The SNMP packets reach the SNMP Agent on the target server through the network drivers, adapters, and medium.

The SNMP Agent waits for incoming requests and responds to them using information retrieved from system services such as device drivers, the IntraPulse firmware, and other components of the operating system.

The SNMP Manager can be generic or ad-hoc (like NetFRAME Maestro), while the SNMP Agent must be designed for the specific MIB it has to work with.

NF9000 MIB Rev. 2.2

NF9000 MIB

The NF9000 MIB is organized in 11 groups, each representing a logical or physical portion of the target machine.

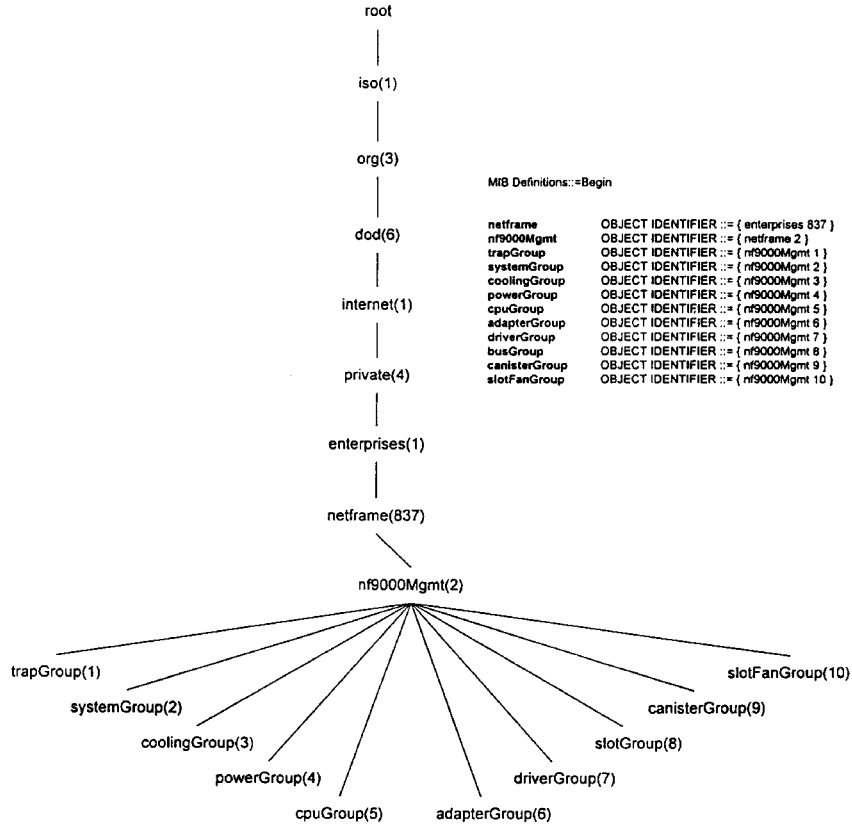

Figure 4. The NF9000 Management Tree.

The groups are defined as follows (see Figure 4):

1. Trap Group. This includes trap-type objects representing alerts to the operator. Various types of alerts are implemented, such as CPU failure, fan failure, temperature warning, power supply failure, insertion/extraction of power supplies and canisters, adapters malfunction, and I/O slot power changes.

NF9000 MIB Rev. 2.2

2.  System Group. This includes objects representing information on the system as a whole. For examples, the serial numbers, description, and revision data for all the major H/W components are part of this group, as well as information about the main memory, system time and date.

3.  Cooling Group. This includes objects representing the devices used to ensure proper cooling of the machine's core components. Devices like system board fans and temperature sensors are part of this group.

4.  Power Group. This includes objects representing the power supplies, the physical power switch, and the reset button. The power supplies are described in terms of their serial number, DC state, AC state, and location. The voltage values measured on the system board are also included.

5.  CPU Group. This includes objects representing the system CPUs. The CPU Group provides information on the CPU clock frequency, the bus-to-core ratio, and the CPUs state.

6.  Adapter Group. This includes objects representing the adapters in the system. Each single I/O card may have one or more adapters (multifunction cards). Adapters that support hot-swap are of central importance on the NF9000. For such adapters, this group provides control on their state, to permit their hot-replacement/addition during the normal system operations. All the PCI configuration information relevant for the identification of each adapter is also provided. Links to the Bus, Slot, and Driver groups are included.

7.  Driver Group. This includes objects representing the device drivers associated with the adapters in the Adapter Group. Drivers' Name and Version are provided.

8.  Slot Group. This includes objects representing all the I/O expansion slots in the system. On the NF9000-C, the expansion slots are located in the canisters, and can be powered on or off on a per-canister basis. On the NF9000-T systems, the I/O expansion slots can be individually powered on or off. Information on card presence and slot power state is also provided.

9.  Canister Group. This includes objects representing the NF9000-C canisters and their components. Each canister features four PCI slots. Adapters residing in canister slots can be replaced after extracting the containing canister, provided that their drivers support hot-swap. Similarly, adapters can be hot added into canisters without powering the system off. The Canister Group provides information on each canister's name, serial number, revision number, type, power state, location, and fans.

10. Slot Fan Group. This includes objects representing the I/O expansion slot cooling fans of the NF9000-T.

NF9000 MIB Rev. 2.2

Trap Group

The Trap Group provides information on system alerts, as follows:

trapCpu reports the number of a failed CPU. This number can be used to index the cpuTable and retrieve more information on the failed CPU.
    This trap's identifier is 1.

trapSystemBoardFan reports the number of a failed System Board fan, indicating that a fan speed dropped below the minimum limit allowed. The fan number provided by this trap can be used to index the coolingFanTable to retrieve more information on the failed fan.
    This trap's identifier is 2.

trapTemperature reports the number of a temperature sensor that detected a "normal" to "warning" transition (i.e., the temperature raised above the "warning" level defined by the variable coolingAlertTemperature in the Cooling Group).
    This trap's identifier is 3.

trapPowerSupply reports the number of a power supply that has been extracted/inserted or that has detected an AC/DC failure. This number can be used to index the powerSupplyTable to retrieve more information on the power supply that caused this trap. Note that AC state information and insertion/extraction events are not available on the NF9000-T. On this machine, a change in the DC state may indicate a failure or power supply insertion/extraction.
    This trap's identifier is 4.

trapCanister reports the number of a canister that has been either extracted or inserted. This number can be used to index the canisterTable to retrieve more information on the canister that caused this trap. This trap is available on the NF9000-C only.
    This trap's identifier is 5.

trapAdapter reports the number of an adapter that is malfunctioning. This number can be used to index the adapterTable to retrieve more information on the related adapter.
    This trap's identifier is 6.

trapSlotFan reports the number of an I/O slot fan that failed. That fan's speed dropped below the minimum limit allowed. The fan number provided by this trap can be used to index the slotFanTable to retrieve more information on the failed fan. This trap is available on the NF9000-T only.
    This trap's identifier is 7.

trapCanisterFan reports the number of a canister whose cooling system failed. This trap indicates that the speed of at least one of the canister's fans dropped below the minimum limit allowed. The canister number provided by this trap can be used to index the canisterTable to retrieve more information on the failed fan(s). This trap is available on the NF9000-C only.
    This trap's identifier is 8.

NF9000 MIB Rev. 2.2

System Group

The System Group provides information on system-wide parameters, as follows:

systemModel indicates the target server model as follows:

| Integer Value | Meaning |
|---|---|
| 1 | NF9000-C (the Canister version) |
| 2 | NF9000-T (the Tower version) |

This variable is read-only. Its identifier is 1.3.6.1.4.1.837.2.2.1.0.

systemBoardSerialNumber is an ASCII string indicating the serial number of the System Board. If no
serial number recorded on the System Board, the string is empty (its length is zero).
This variable is read-only. Its identifier is 1.3.6.1.4.1.837.2.2.2.0.

systemBackPlaneSerialNumber is an ASCII string indicating the serial number of the System Back
Plane. If no serial number is recorded on the System Back Plane, the string is empty (its length is
zero).
This variable is read-only. Its identifier is 1.3.6.1.4.1.837.2.2.3.0.

systemBackPlaneControllerRevisionInfo is an ASCII string containing the revision number and date of
the System Back Plane Controller. If no information is recorded in the System Back Plane
Controller, the string is empty (its length is zero).
This variable is read-only. Its identifier is 1.3.6.1.4.1.837.2.2.4.0.

systemBackPlaneControllerDescription is an ASCII string containing a short description of the System
Back Plane Controller. If no description is recorded in the System Back Plane Controller, the
string is empty (its length is zero).
This variable is read-only. Its identifier is 1.3.6.1.4.1.837.2.2.5.0.

systemControllerARevisionInfo is an ASCII string containing the revision number and date of System
Controller A. Controller A is in charge of the DIMM's (Dual In-line Memory Module) detection,
the system reset, the System Board fans, and the LCD. If no information is recorded in Controller
A, the string is empty (its length is zero).
This variable is read-only. Its identifier is 1.3.6.1.4.1.837.2.2.6.0.

systemControllerADescription is an ASCII string containing a short description of System Controller A.
If no description is recorded in Controller A, the string is empty (its length is zero).
This variable is read-only. Its identifier is 1.3.6.1.4.1.837.2.2.7.0.

systemControllerBRevisionInfo is an ASCII string containing the revision number and date of System
Controller B. Controller B is in charge of detecting the CPUs presence and monitoring the CPUs
state. If no information is recorded in Controller B, the string is empty (its length is zero).
This variable is read-only. Its identifier is 1.3.6.1.4.1.837.2.2.8.0.

systemControllerBDescription is an ASCII string containing a short description of System Controller B.
If no description is recorded in Controller B, the string is empty (its length is zero).
This variable is read-only. Its identifier is 1.3.6.1.4.1.837.2.2.9.0.

systemLogControllerRevisionInfo is an ASCII string containing the revision number and date of the
System Log Controller. The Log Controller is in charge of the IntraPulse Log, where important
diagnostic information is recorded in case of system malfunction. If no information is recorded in
the Log Controller, the string is empty (its length is zero).
This variable is read-only. Its identifier is 1.3.6.1.4.1.837.2.2.10.0.

NF9000 MIB Rev. 2.2 systemLogControllerDescription is an ASCII string containing a short description of the System Log
Controller. If no description is recorded in the Log Controller, the string is empty (its length is
zero).
This variable is read-only. Its identifier is 1.3.6.1.4.1.837.2.2.11.0.

systemLocalInterfaceControllerRevisionInfo is an ASCII string containing the revision number and date
of the Local Interface Controller. This controller manages the Local Interface between the
operating system and the IntraPulse. The operating system communicates with IntraPulse through
messages sent to and received from the Local Interface. If no information is recorded in the Local
Interface Controller, the string is empty (its length is zero).
This variable is read-only. Its identifier is 1.3.6.1.4.1.837.2.2.12.0.

systemLocalInterfaceControllerDescription is an ASCII string containing a short description of the
Local Interface Controller. If no description is recorded in the controller, the string is empty (its
length is zero).
This variable is read-only. Its identifier is 1.3.6.1.4.1.837.2.2.13.0.

systemRemoteInterfaceControllerRevisionInfo is an ASCII string containing the revision number and
date of the Remote Interface Controller. The controller is in charge of the interface between
IntraPulse and a modem through which a remote operator can manage the server when the
operating system is down. This may happen because of an operating system crash or power
failure. If no revision information is recorded in the controller, the string is empty (its length is
zero).
This variable is read-only. Its identifier is 1.3.6.1.4.1.837.2.2.14.0.

systemRemoteInterfaceControllerDescription is an ASCII string containing a short description of the
Remote Interface Controller. If no description is recorded in the controller, the string is empty (its
length is zero).
This variable is read-only. Its identifier is 1.3.6.1.4.1.837.2.2.15.0.

systemState indicates the general system state as follows:

| Integer Value | Meaning |
|---|---|
| 1 | OK |
| 2 | A fault occurred |

Failed fans,[4] and power fluctuations can cause faults. Not all faults are fatal to the system.
This variable is read-only. Its identifier is 1.3.6.1.4.1.837.2.2.16.0.

systemDateAndTime indicates the system date and time encoded in octets, as follows:

| Field | Octet | Content | Range |
|---|---|---|---|
| 1 | 1-2 | Year | 0-2100 |
| 2 | 3 | Month | 1-12 |
| 3 | 4 | Day | 1-31 |
| 4 | 5 | Hour | 0-23 |
| 5 | 6 | Minutes | 0-59 |
| 6 | 7 | Seconds | 0-60[5] |
| 7 | 8 | Tenths of seconds | 0-9 |
| 8 | 9 | Direction from UTC | '+' or '-' |

---

[4] The failure of any fan, regardless of its location (System Board, canisters, I/O slot), is reported through this variable.
[5] Use 60 for leap-second.

NF9000 MIB Rev. 2.2

| Field | Octet | Content | Range |
|---|---|---|---|
| 9 | 10 | Hours from UTC | 0-11 |
| 10 | 11 | Minutes from UTC | 0-59 |

Note that if only the local time is known, then the time zone information (fields 8-10) is not present.
This variable is read-write. Its identifier is 1.3.6.1.4.1.837.2.2.17.0.

systemMemorySize indicates the total main memory size (up to 4 GB) present in the system.
This variable is read-only. Its identifier is 1.3.6.1.4.1.837.2.2.18.0.

systemDimmTable describes the system's main memory DIMMs.
This variable is not accessible. Its identifier is 1.3.6.1.4.1.837.2.2.19.

systemDimmTableEntry describes a DIMM in terms of logical DIMM number, capacity, speed, and data access mode.
This variable is not accessible. Its identifier is 1.3.6.1.4.1.837.2.2.19.1.

systemDimmNumber is the unique logical number $n$ of a DIMM. It is an index into the systemDimmTable. It has no relationship with this DIMM's physical position.
This variable is read-only. Its identifier is 1.3.6.1.4.1.837.2.2.19.1.1.$n$, where $1 \leq n \leq 16$.

systemDimmCapacity indicates the DIMM #$n$'s capacity in megabytes.
This variable is read-only. Its identifier is 1.3.6.1.4.1.837.2.2.19.1.2.$n$, where $1 \leq n \leq 16$.

systemDimmSpeed indicates the data access speed in nanoseconds of DIMM #$n$..
This variable is read-only. Its identifier is 1.3.6.1.4.1.837.2.2.19.1.3.$n$, where $1 \leq n \leq 16$.

systemDimmDataAccessMode indicates the data access mode of DIMM #$n$ as follows:

| Integer Value | Meaning |
|---|---|
| 1 | Fast Page |
| 2 | EDO |

This variable is read-only. Its identifier is 1.3.6.1.4.1.837.2.2.19.1.4.$n$, where $1 \leq n \leq 16$.

systemOsName indicates the name of the server operating system, as follows:

| Integer Value | Meaning |
|---|---|
| 1 | Windows NT |
| 2 | NetWare |

This variable is read-only. Its identifier is 1.3.6.1.4.1.837.2.2.20.0.

systemLicense indicates the type of license currently active, as follows:

| Octet No. | Value | Meaning |
|---|---|---|
| 1 | 0 | Hot swap and hot add are disabled |
| | 1 | Hot swap and hot add are enabled |

This variable is read-only. Its identifier is 1.3.6.1.4.1.837.2.2.21.0.

NF9000 MIB Rev. 2.2

Cooling Group

The Cooling Group provides information on the System Board devices that control the machine temperature.

The following variables are part of the Cooling Group:

coolingFansGeneralFaultLed represents the state of the System Board fans. If it is on, it means that one or more System Board fans are missing or spinning below the minimum limit (see coolingFanMinSpeed). When this LED is on, IntraPulse raises the speed of the working fans to compensate for the faulty ones. IntraPulse periodically monitors the speed of each fan. As soon as a faulty fan is replaced, IntraPulse turns off this LED (assuming no other fan is malfunctioning or missing) and lowers the speed of the fans.

This variable can assume the following values:

| Integer Value | Meaning |
|---|---|
| 1 | On |
| 2 | Off |

This variable is read-only. Its identifier is 1.3.6.1.4.1.837.2.3.1.0.

coolingFanMinSpeed indicates the minimum speed below which a System Board fan is considered malfunctioning. It is expressed in RPS (Revolutions Per Second). When any System Board fan's speed drops below this limit, IntraPulse raises the speed of all the other System Board fans and turns the General Fault LED on. In this situation, the coolingFanSpeed variable reflects the higher speed, and the coolingFanFault variable reports the faulty state of the broken fan(s). Also, the coolingFansGeneralFaultLed is on. Note that changes to coolingFanMinSpeed affect all the System Board fans.

This variable is read-write and can assume any value in the 0-255 range. Its identifier is 1.3.6.1.4.1.837.2.3.2.0.

coolingFanSpeedSetting indicates which of the two possible speed settings is current for the System Board fans.
The speed settings are as follows:

| Integer Value | Meaning |
|---|---|
| 1 | Low speed |
| 2 | High speed |

Note that changing the speed setting from High to Low after IntraPulse has detected a fan failure is of no benefit. IntraPulse would change it back to High in the next cycle of fan speed check. Note that changes to this variable affect all the System Board fans.

This variable is read-write. Its identifier is 1.3.6.1.4.1.837.2.3.3.0.

coolingMaximumNumberOfSystemFans indicates the maximum number of System Board fans supported by the system. This number may vary depending on the computer model.
This variable is read-only. Its identifier is 1.3.6.1.4.1.837.2.3.4.0.

coolingFanTable contains information about the System Board fans. Such information applies to each individual fan.
This variable is not accessible. Its identifier is 1.3.6.1.4.1.837.2.3.5.

coolingFanTableEntry describes the attributes of a System Board fan.

NF9000 MIB Rev. 2.2

This variable is not accessible. Its identifier is 1.3.6.1.4.1.837.2.3.5.1.

coolingFanNumber is the unique logical number *n* for a System Board fan. It is an index into the coolingFanTable.
This variable is read-only. Its identifier is 1.3.6.1.4.1.837.2.3.5.1.1.*n*,
where $1 \leq n \leq$ coolingMaximumNumberOfSystemFans.

coolingFanSpeed indicates the current speed in RPS (Revolutions Per Second) of fan #*n*. The reported speed is in the 0-255 RPS range.
This variable is read-only. Its identifier is 1.3.6.1.4.1.837.2.3.5.1.2.*n*,
where $1 \leq n \leq$ coolingMaximumNumberOfSystemFans.

coolingFanFault indicates the current state of fan #*n*, as follows:

| Integer Value | Meaning |
|---|---|
| 1 | Fan faulted |
| 2 | Fan OK |

This variable is read-only. Its identifier is 1.3.6.1.4.1.837.2.3.5.1.3.*n*,
where $1 \leq n \leq$ coolingMaximumNumberOfSystemFans.

coolingFanLocation describes the location of fan #*n*. This is useful for locating a faulted fan to replace.
Fan locations on the NF9000-C:

| coolingFanNumber | coolingFanLocation (string) |
|---|---|
| 1 | "First from the right, rear view" |
| 2 | "Second from the right, rear view" |
| 3 | "Third from the right, rear view" |
| 4 | "Fourth from the right, rear view" |
| 5 | "Fifth from the right, rear view" |
| 6 | "Sixth from the right, rear view" |

Fan locations on the NF9000-T:

| coolingFanNumber | coolingFanLocation (string) |
|---|---|
| 1 | "First from the top, front view" |
| 2 | "Second from the top, front view" |
| 3 | "Third from the top, front view" |
| 4 | "Fourth from the top, front view" |
| 5 | "First from the top, rear view" |
| 6 | "Second from the top, rear view" |

Note that, on the NF9000-T, fans #5 and #6 are located in the mass storage compartment, and are accessible from the back of the cabinet.

This variable is read-only. Its identifier is 1.3.6.1.4.1.837.2.3.5.1.4.*n*,
where $1 \leq n \leq$ coolingMaximumNumberOfSystemFans.

coolingAlertTemperature indicates at which temperature Celsius the system should generate an alert. Any temperature sensor reaching or passing this threshold would trigger the alert. Values are in the 0-255°C range, although only a subset is practically meaningful.
This variable is read-write. Its identifier is 1.3.6.1.4.1.837.2.3.6.0.

NF9000 MIB Rev. 2.2 coolingShutdownTemperature indicates at which temperature Celsius the system should shutdown. Any temperature sensor reaching or passing this threshold would trigger the shutdown. Values are in the 0-255°C range, although only a subset is practically meaningful.
This variable is read-write. Its identifier is 1.3.6.1.4.1.837.2.3.7.0.

coolingMaximumNumberOfTemperatureSensors indicates the maximum number of temperature sensors supported by the system. This number may vary depending on the computer model.
This variable is read-only. Its identifier is 1.3.6.1.4.1.837.2.3.8.0.

coolingTemperatureSensorTable contains information about the temperature sensors.
This variable is not accessible. Its identifier is 1.3.6.1.4.1.837.2.3.9.

coolingTemperatureSensorTableEntry describes the attributes of a temperature sensor.
This variable is not accessible. Its identifier is 1.3.6.1.4.1.837.2.3.9.1.

coolingSensorNumber is the unique logical number $n$ of a temperature sensor. It is an index into the coolingTemperatureSensorTable.
This variable is read-only. Its identifier is 1.3.6.1.4.1.837.2.3.9.1.1.$n$,
where $1 \leq n \leq$ coolingMaximumNumberOfTemperatureSensors coolingSensorTemperature reports the temperature Celsius measured by sensor #$n$.
This variable is read-only. Its identifier is 1.3.6.1.4.1.837.2.3.9.1.2.$n$,
where $1 \leq n \leq$ coolingMaximumNumberOfTemperatureSensors.

coolingSensorLocation describes the location of the temperature sensor #$n$. This is useful for locating the area of some overheating components.
The sensor locations on the NF9000-C are as follows:

| coolingSensorNumber | coolingSensorLocation (string) |
|---|---|
| 1 | "Component No. U15 on back plane" |
| 2 | "Component No. U16 on back plane" |
| 3 | "Component No. U69 on system board" |
| 4 | "Component No. U68 on system board" |
| 5 | "Component No. U67 on system board" |

The sensor locations on the NF9000-T are as follows:

| coolingSensorNumber | coolingSensorLocation (string) |
|---|---|
| 1 | "Component No. U15 on I/O board" |
| 2 | "Component No. U16 on I/O board" |
| 3 | "Component No. U69 on system board" |
| 4 | "Component No. U68 on system board" |
| 5 | "Component No. U67 on system board" |

This variable is read-only. Its identifier is 1.3.6.1.4.1.837.2.3.9.1.3.$n$,
where $1 \leq n \leq$ coolingMaximumNumberOfTemperatureSensors.

NF9000 MIB Rev. 2.2

*Power Group*

The Power Group provides the following information on the power supplies:

powerSystemBoard5VoltLine indicates the current voltage of the +5V power line measured on the
System Board. This value is expressed in $100^{th}$ of a volt.
This variable is read-only. Its identifier is 1.3.6.1.4.1.837.2.4.1.0.

powerSystemBoard3_3VoltLine indicates the current voltage of the +3.3V power line measured on the
System Board. This value is expressed in $100^{th}$ of a volt.
This variable is read-only. Its identifier is 1.3.6.1.4.1.837.2.4.2.0.

powerSystemBoard12VoltLine indicates the current voltage of the +12V power line measured on the
System Board. This value is expressed in $100^{th}$ of a volt.
This variable is read-only. Its identifier is 1.3.6.1.4.1.837.2.4.3.0.

powerSystemBoardNeg12VoltLine indicates the current voltage of the -12V power line measured on the
System Board. This value is expressed in $100^{th}$ of a volt.
This variable is read-only. Its identifier is 1.3.6.1.4.1.837.2.4.4.0.

powerSwitch indicates the state of the main output from the power supplies. Setting this switch to "off"
turns off the power of the entire system, except for IntraPulse. No graceful shut down of the
operating system is performed. Possible values:

| Integer Value | Meaning |
|---|---|
| 1 | Power On |
| 2 | Power Off |

This variable is read-write. Its identifier is 1.3.6.1.4.1.837.2.4.5.0.

powerSystemResetSwitch. This command resets the system. As soon as it gets executed, the system re-
starts from the diagnostic phase.
Possible values:

| Integer Value | Meaning |
|---|---|
| 3 | Reset |

This variable is write-only. Its identifier is 1.3.6.1.4.1.837.2.4.6.0.

powerSupplyMaximumNumberOfPowerSupplies indicates the maximum number of power supplies
supported by the system. Note that this number varies depending on the computer model, as
follows:

| Server Model | powerSupplyMaximumNumberOfPowerSupplies |
|---|---|
| NF9000-C | 2 |
| NF9000-T | 3 |

This variable is read-only. Its identifier is 1.3.6.1.4.1.837.2.4.7.0 powerSupplyTable reports information on all the power supplies in the system. This variable is not
accessible. Its identifier is 1.3.6.1.4.1.837.2.4.8.

powerSupplyTableEntry describes the attributes of a power supply. This variable is not accessible. Its
identifier is 1.3.6.1.4.1.837.2.4.8.1.

NF9000 MIB Rev. 2.2 powerSupplyNumber is the unique number $n$ of a power supply in the system. It is an index into the powerSupplyTable.
This variable is read-only. Its identifier is 1.3.6.1.4.1.837.2.4.8.1.1.$n$,
where $1 \leq n \leq$ powerSupplyMaximumNumberOfPowerSupplies.

powerSupplySerialNumber indicates the serial number of power supply #$n$. If no serial number is recorded in the power supply, the string length is zero.
This variable is read-only. Its identifier is 1.3.6.1.4.1.837.2.4.8.1.2.$n$,
where $1 \leq n \leq$ powerSupplyMaximumNumberOfPowerSupplies.

powerSupplyDcState indicates the direct current power state of power supply #$n$, as follows:

| Integer Value | Meaning |
| --- | --- |
| 1 | OK |
| 2 | Out of range (NF9000-C only) |
| 3 | Out of range or absent power supply (NF9000-T only) |

A value of 3 can be returned by the NF9000-T only. It indicates that the related power supply is either not present or that it is present and the DC is out of range.
This variable is read-only. Its identifier is 1.3.6.1.4.1.837.2.4.8.1.3.$n$,
where $1 \leq n \leq$ powerSupplyMaximumNumberOfPowerSupplies.

powerSupplyAcState indicates the alternate current state of power supply #$n$, as follows:

| Integer Value | Meaning |
| --- | --- |
| 1 | OK (NF9000-C only) |
| 2 | Out of range (NF9000-C only) |
| 3 | Not available (NF9000-T only) |

The AC state is not available on the NF9000-T. Reading this variable on the NF9000-T will return the value 3 ("Unavailable").
This variable is read-only. Its identifier is 1.3.6.1.4.1.837.2.4.8.1.4.$n$,
where $1 \leq n \leq$ powerSupplyMaximumNumberOfPowerSupplies.

powerSupplyLocation describes the location of power supply #$n$.
Power supplies locations on the NF9000-C (see also Figure 5):

| powerSupplyNumber | powerSupplyLocation (string) |
| --- | --- |
| 1 | "Top receptacle" |
| 2 | "Bottom receptacle" |

Power supplies locations on the NF9000-T:

| powerSupplyNumber | powerSupplyLocation (string) |
| --- | --- |
| 1 | "Bottom receptacle" |
| 2 | "Middle receptacle" |
| 3 | "Top receptacle" |

This variable is read-only. Its identifier is 1.3.6.1.4.1.837.2.4.8.1.5.$n$,
where $1 \leq n \leq$ powerSupplyMaximumNumberOfPowerSupplies.

NF9000 MIB Rev. 2.2
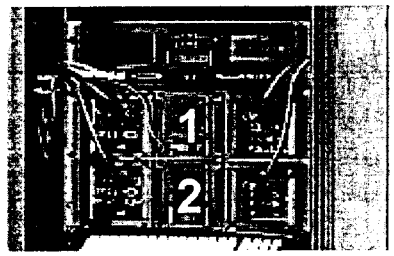
Figure 5. NF9000-C Power Supply Locations.

NF9000 MIB Rev. 2.2

CPU Group

The CPU Group provides information on the system CPUs, as follows:

cpuBusToCoreRatio indicates the Bus-to-CPU frequency ratio, as follows:

| String Value | Ratio | CPU Speed (MHz) |
|---|---|---|
| "1/2" | 1/2 | 133 |
| "1/3" | 1/3 | 200 |
| "1/4" | 1/4 | 266 |
| "2/5" | 2/5 | 166 |
| "2/7" | 2/7 | 233 |

This variable is read-only. Its identifier is 1.3.6.1.41.837.2.5.1.0.

cpuClockFrequency indicates the CPUs clock frequency in MHz. The frequency is in the range 133-266 MHz.
This variable is read-only. Its identifier is 1.3.6.1.41.837.2.5.2.0.

cpuMaximumNumberOfCpus indicates the maximum number of CPUs supported by the system. This value may vary depending on the computer model.
This variable is read-only. Its identifier is 1.3.6.1.41.837.2.5.3.0.

cpuTable describes the CPUs state.
This variable is not accessible. Its identifier is 1.3.6.1.41.837.2.5.4.

cpuTableEntry describes a CPU state.
This variable is not accessible. Its identifier is 1.3.6.1.41.837.2.5.4.1.

cpuNumber is the unique logical number $n$ of a CPU. It is an index into the cpuTable.
This variable is read-only. Its identifier is 1.3.6.1.41.837.2.5.4.1.1.$n$,
where $1 \leq n \leq$ cpuMaximumNumberOfCpus.

cpuState reports the state of CPU #$n$, as follows:

| Integer Value | Meaning |
|---|---|
| 1 | Unknown failure |
| 2 | Normal |
| 3 | Temperature failure |
| 4 | Power failure |

Note that, in case of a CPU failure, the operating system may crash before the SNMP agent can report this information.

This variable is read-only. Its identifier is 1.3.6.1.41.837.2.5.4.1.2.$n$,
where $1 \leq n \leq$ cpuMaximumNumberOfCpus.

NF9000 MIB Rev. 2.2

Adapter Group

The Adapter Group provides the following information on the adapters installed in the system:

adapterTable describes the attributes of all the adapters in the system.
This variable is read-only. Its identifier is 1.3.6.1.4.1.837.2.6.1.

adapterTableEntry describes the attributes of an adapter.
This variable is read-only. Its identifier is 1.3.6.1.4.1.837.2.6.1.1.

adapterNumber is the unique logical number $n$ of an adapter. This number is an index into the adapterTable.
This variable is read-only. Its identifier is 1.3.6.1.4.1.837.2.6.1.1.1.$n$, where $n \geq 1$.

adapterName is an ASCII string containing the unique name of adapter #$n$. If the name is not available, the string is empty (its length is zero).
This variable is read-only. Its identifier is 1.3.6.1.4.1.837.2.6.1.1.2.$n$, where $n \geq 1$.

adapterSupportsHotSwapHotAdd indicates whether the adapter is NetFRAME-certified to support hot-swap and hot-add, as follows:

| Integer Value | Meaning |
|---|---|
| 1 | Yes |
| 2 | No |

Only NetFRAME-certified adapters can be safely hot-swapped or hot added.
This variable is read-only. Its identifier is 1.3.6.1.4.1.837.2.6.1.1.3.$n$, where $n \geq 1$.

adapterState indicates the current state of adapter #$n$. The possible states are as follows:

| Integer Value | State | Meaning |
|---|---|---|
| 1 | Unclaimed | No driver is loaded for the adapter. |
| 2 | Unknown | Two cases are possible:<br>1) The adapter supports hot-swap, and it is not responding to commands. No action can be performed on the adapter while in this state.<br>2) The adapter does not support hot-swap. Its actual state cannot be determined. No commands should be sent to the adapter. |
| 3 | Failed | The driver or adapter is malfunctioning. |
| 4 | Active | The adapter and its driver are working normally. |
| 5 | Suspended | A SuspendOperations or ForceSuspendOperations command has suspended the operations on the adapter. |

This variable is read-only. Its identifier is 1.3.6.1.4.1.837.2.6.1.1.4.$n$, where $n \geq 1$.

adapterCommand indicates a command to be sent to adapter #$n$. Commands can only be sent to adapters that support hot-swap. Adapters that support hot-swap have the variable adapterSupportsHotSwapHotAdd set to 1 ("Yes").

NF9000 MIB Rev. 2.2

The following commands are supported:

| Integer Value | Mnemonic | Meaning |
|---|---|---|
| 3 | Reset | Causes the adapter to re-initialize and resume the operations. |
| 4 | SuspendOperations | Suspends all the operations on the adapter in preparation for card swapping or adding.<br><br>NF9000-C: It is necessary to suspend the operations of all the adapters in a canister before actually swapping or adding a single card. This may imply issuing this command for each adapter in the canister.<br><br>NF9000-T: It is necessary to suspend the operations of all the adapters in a slot before actually swapping the card in the slot. This may imply issuing this command for each adapter in the slot. |
| 5 | ForceSuspendOperations | Forcefully suspends all operations on the adapter in preparation for card swapping or adding.<br><br>NF9000-C: It must be used instead of SuspendOperations when a canister contains one or more adapters that do not support hot swap.<br><br>NF9000-T: This command is identical to SuspendOperations. |
| 6 | ResumeOperations | Resumes the operations on the adapter. It implies a re-initialization of the adapter. |

On the NF9000-C, the smallest unit involved in a card swap is the canister. A canister can have up to four PCI cards. When a card needs to be replaced in or added into a canister, it is necessary to suspend the operations on all the cards in that canister, and eventually restart them. The commands provided by the MIB for this purpose act upon a specific adapter[6] at a time.

To make things more complicated, a canister may contain adapters that support hot-swap along with others that do not. No action can be performed on the second type of adapters, but their presence requires a different handling of the first type of adapters for hot-swap operations (see flowchart in Appendix 1: Hot Swap and Hot Add Algorithm).

On the NF9000-T, card swapping is simpler, because each PCI slot can be individually shut down, without affecting other slots.

For more information on hot swap and hot add, see Appendix 1: Hot Swap and Hot Add Algorithms.

The state diagram in Figure 6 reports the adapter state transitions.

In the adapter state transition diagram, the state Unclaimed is not reported because there is no support in the MIB for loading device drivers. It should also be noted that there is no way out of the state Unknown. The state Unknown is an indication of a severe error condition that prevents the associated driver from responding to commands. To recover from this situation, it may be necessary to reboot the system.

The adapterCommand variable is write-only. Its identifier is $1.3.6.1.4.1.837.2.6.1.1.5.n$, where $n \geq 1$.

---

[6] Note that there could be multiple adapters on a single card.

NF9000 MIB Rev. 2.2

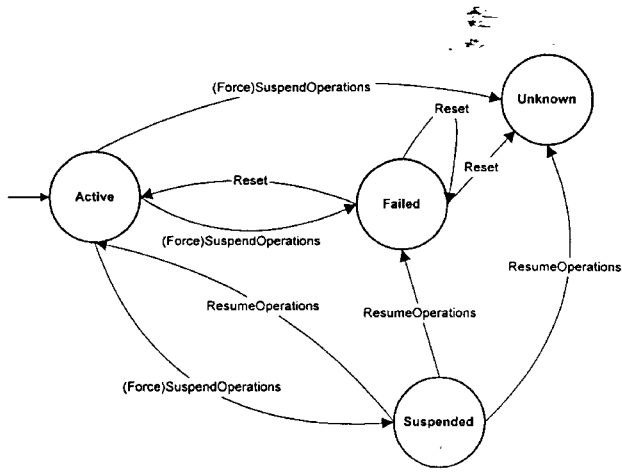

Figure 6. Adapter State Transitions.

adapterDriverNumber indicates the logical number of the driver that handles adapter #$n$. It can be used to index the driverTable, in order to retrieve the adapter $n$ driver's attributes.
    This variable is read-only. Its identifier is 1.3.6.1.4.1.837.2.6.1.1.6.$n$, where $n \geq 1$.

adapterBusNumber indicates the physical PCI number of the bus on which adapter #$n$ is located. This variable can assume values in the 0-255 range.
    This variable is read-only. Its identifier is 1.3.6.1.4.1.837.2.6.1.1.7.$n$, where $n \geq 1$.

adapterDeviceNumber indicates the physical PCI number of the device represented by adapter #$n$. This variable can assume values in the 0-31 range.
    This variable is read-only. Its identifier is 1.3.6.1.4.1.837.2.6.1.1.8.$n$, where $n \geq 1$.

adapterFunctionNumber indicates the physical PCI function number for adapter #$n$. This variable can assume values in the 0-7 range.
    This variable is read-only. Its identifier is 1.3.6.1.4.1.837.2.6.1.1.9.$n$, where $n \geq 1$.

adapterVendorId indicates the PCI VendorID code of adapter #$n$. This variable can assume values in the range 0-65535.
    This variable is read-only. Its identifier is 1.3.6.1.4.1.837.2.6.1.1.10.$n$, where $n \geq 1$.

adapterDeviceId indicates the PCI DeviceID code of adapter #$n$. This variable can assume values in the range 0-65535.
    This variable is read-only. Its identifier is 1.3.6.1.4.1.837.2.6.1.1.11.$n$, where $n \geq 1$.

adapterRevisionId indicates the PCI RevisionID code of adapter #$n$. This variable can assume values in the range 0-65535.
    This variable is read-only. Its identifier is 1.3.6.1.4.1.837.2.6.1.1.12.$n$, where $n \geq 1$.

adapterBaseClass indicates the PCI Base Class code of adapter #$n$. This variable can assume values in the range 0-255.

NF9000 MIB Rev. 2.2

This variable is read-only. Its identifier is 1.3.6.1.4.1.837.2.6.1.1.13.*n*, where $n \geq 1$.

adapterSubClass indicates the PCI Sub Class code of adapter #*n*. This variable can assume values in the range 0-255.
This variable is read-only. Its identifier is 1.3.6.1.4.1.837.2.6.1.1.14.*n*, where $n \geq 1$.

adapterProgrammingInterface indicates the PCI Programming Interface code of adapter #*n*. This variable can assume values in the range 0-255.
This variable is read-only. Its identifier is 1.3.6.1.4.1.837.2.6.1.1.15.*n*, where $n \geq 1$.

NF9000 MIB Rev. 2.2

Driver Group

The Driver Group provides the following information on the device drivers associated with the adapters in the Adapter Group:

driverTable describes the attributes of the device drivers in the system. This table is populated differently depending on the operating system, as follows:

| Windows NT | NetWare |
|---|---|
| Only the drivers for NetFRAME-certified adapters are reported. | All drivers are reported. |

This variable is not accessible. Its identifier is 1.3.6.1.4.1.837.2.7.1 driverTableEntry describes the attributes of a device driver.
This variable is not accessible. Its identifier is 1.3.6.1.4.1.837.2.7.1.1.

driverNumber is the unique logical number $n$ of a driver. This number is an index into the driverTable.
This variable is read-only. Its identifier is 1.3.6.1.4.1.837.2.7.1.1.1.$n$, where $n \geq 1$.

driverName is an ASCII string indicating the unique name of driver #$n$.
This variable is read-only. Its identifier is 1.3.6.1.4.1.837.2.7.1.1.2.$n$, where $n \geq 1$.

driverVersion indicates the version of driver #$n$. The version information is provided as an ASCII string. A zero-length string indicates that no version information on the driver is available.
This variable is read-only. Its identifier is 1.3.6.1.4.1.837.2.7.1.1.3.$n$, where $n \geq 1$.

NF9000 MIB Rev. 2.2

*Slot Group*

The Slot Group provides information on all I/O expansion slots in the system, as follows:

slotTable describes the attributes of all the I/O expansion slots in the system.
 This variable is not accessible. Its identifier is 1.3.6.1.4.1.837.2.8.1.

slotTableEntry describes the attributes of an I/O expansion slot.
 This variable is not accessible. Its identifier is 1.3.6.1.4.1.837.2.8.1.1.

slotGroupNumber indicates the number of the group that slot #$s$ is part of. It is the first component of the slotTable index pair (slotGroupNumber, slotNumber). On the NF9000-C, the I/O expansion slots are physically grouped into canisters. The values of slotGroupNumber are identical to those of canisterNumber (see the Canister Group). The following correspondence exists between canisterNumber, canisterName, slotGroupNumber, and slotNumber on the NF9000-C:

| canisterNumber | canisterName | slotGroupNumber | slotNumber |
|---|---|---|---|
| 1 | A | 1 | 1-4 |
| 2 | B | 2 | 1-4 |
| 3 | C | 3 | 1-4 |
| 4 | D | 4 | 1-4 |

Note that slotGroupNumber can be used as an index into the canisterTable, Canister Group.

The following correspondence exists between slotGroupNumber and slotNumber on the NF9000-T:

| slotGroupNumber | slotNumber |
|---|---|
| 1 | 1-8 |

On the NF9000-T, there is only one group of slots.
 This variable is read-only. Its identifier is 1.3.6.1.4.1.837.2.8.1.1.1.$g.s$, where $1 \le g \le 4$, $1 \le s \le 8$.

slotNumber indicates a logical slot number in group #$g$. It is the second component of the slotTable index pair (slotGroupNumber, slotNumber). See Figure 7 for I/O expansion slot numbers on the NF9000-C. I/O slots are numbered 1-4 in each group on the NF9000-C, while they are numbered 1-8 on the NF9000-T.
 This variable is read-only. Its identifier is 1.3.6.1.4.1.837.2.8.1.1.2.$g.s$, where $1 \le g \le 4$, $1 \le s \le 8$.

slotBusNumber indicates the physical PCI number of the bus on which slot #$s$ in group #$g$ resides.
 This variable is read-only. Its identifier is 1.3.6.1.4.1.837.2.8.1.1.3.$g.s$, where $1 \le g \le 4$, $1 \le s \le 8$.

slotDeviceNumber indicates the physical PCI device number associated with slot #$s$ in group #$g$.
 This variable is read-only. Its identifier is 1.3.6.1.4.1.837.2.8.1.1.4.$g.s$, where $1 \le g \le 4$, $1 \le s \le 8$.

slotAdapterPresence indicates the presence or absence of a card in the slot identified by (group #$g$, slot #$s$), as follows:

| Integer Value | Meaning |
|---|---|
| 1 | Present |
| 2 | Absent |

This variable is read-only. Its identifier is 1.3.6.1.4.1.837.2.8.1.1.5.$g.s$, where $1 \le g \le 4$, $1 \le s \le 8$.

NF9000 MIB Rev. 2.2

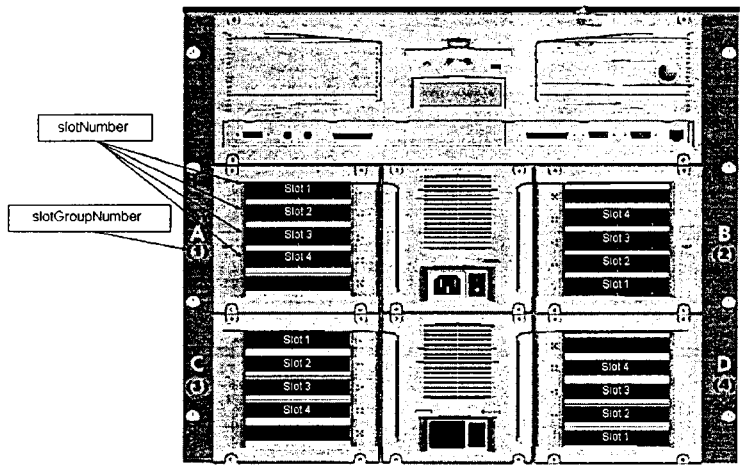

Figure 7. NF9000-C I/O Expansion Slots.

slotPowerState indicates the power state for the I/O expansion slot identified by (group #g, slot #s), as follows:

| Integer Value | Meaning |
|---|---|
| 1 | On (NF9000-T only) |
| 2 | Off (NF9000-T only) |
| 3 | Unavailable (NF9000-C only) |

On the NF9000-T systems, the I/O slots can be powered on and off individually to perform card swapping and adding. On the NF9000-C system, instead, the power control is at the canister level, therefore affecting four slots at a time. The power state of I/O slots is not available on the NF9000-C, and an attempt to read it will return the value 3 ("Unavailable"). Attempts to write this variable on the NF9000-C will have no effect, and will cause the PDU error 3 ("Bad Value").
This variable is read-write. Its identifier is 1.3.6.1.4.1.837.2.8.1.1.6.$g.s$, where $1 \leq g \leq 4$, $1 \leq s \leq 8$.

slotLocation indicates the physical location of the I/O expansion slot identified by the pair (group #g, slot #s), as follows:

NF9000-C (see also Figure 7):

| slotGroupNumber | slotNumber | slotLocation (string) |
|---|---|---|
| 1 or 3 | 1 | "First slot from the top" |
| | 2 | "Second slot from the top" |
| | 3 | "Third slot from the top" |
| | 4 | "Fourth slot from the top" |
| 2 or 4 | 1 | "First slot from the bottom" |
| | 2 | "Second slot from the bottom" |
| | 3 | "Third slot from the bottom" |
| | 4 | "Fourth slot from the bottom" |

NF9000-T:

NF9000 MIB Rev. 2.2

| slotGroupNumber | slotNumber | slotLocation (string) |
|---|---|---|
| 1 | 1 | "First slot from the left, front view" |
|   | 2 | "Second slot from the left, front view" |
|   | 3 | "Third slot from the left, front view" |
|   | 4 | "Fourth slot from the left, front view" |
|   | 5 | "Fifth slot from the left, front view" |
|   | 6 | "Sixth slot from the left, front view" |
|   | 7 | "Seventh slot from the left, front view" |
|   | 8 | "Eighth slot from the left, front view" |

This variable is read-only. Its identifier is 1.3.6.1.4.1.837.2.8.1.1.7.$g.s$, where $1 \leq g \leq 4$, $1 \leq s \leq 8$.

NF9000 MIB Rev. 2.2

Canister Group

The Canister Group provides information on the canisters of the NF9000-C, as follows:

canisterMaximumNumberOfCanisters indicates the maximum number of canisters supported by the
system. Not to be confused with the total number of canisters *present* in the system at any time.
This variable ranges from 0 to 4. On the NF9000-T, this variable is always 0 and the Canister
Table empty.
This variable is read-only. Its identifier is 1.3.6.1.4.1.837.2.10.1.0 canisterTable describes the attributes of all the canisters in the system.
This variable is not accessible. Its identifier is 1.3.6.1.4.1.837.2.10.2.

canisterTableEntry describes the attributes of a canister.
This variable is not accessible. Its identifier is 1.3.6.1.4.1.837.2.10.2.1.

canisterNumber is the unique number $n$ of a canister. It is used as an index into the canisterTable.
This variable is read-only. Its identifier is 1.3.6.1.4.1.837.2 .10.2.1.1.$n$,
where $1 \leq n \leq$ canisterMaximumNumberOfCanisters.

canisterName is an ASCII string representing the name of canister #$n$ as it appears on the front of the
NF9000-C. This variable can assume the following values: "A", "B", "C", and so forth.
This variable is read-only. Its identifier is 1.3.6.1.4.1.837.2.10.2.1.2.$n$,
where $1 \leq n \leq$ canisterMaximumNumberOfCanisters.

canisterSerialNumber is an ASCII string containing the serial number of canister #$n$. If the string length
is zero, it means that no serial number is recorded in the canister.
This variable is read-only. Its identifier is 1.3.6.1.4.1.837.2.10.2.1.3.$n$,
where $1 \leq n \leq$ canisterMaximumNumberOfCanisters.

canisterRevisionInfo is an ASCII string containing the revision number and date of canister #$n$. If no
information is recorded in the canister, the string is empty (its length is zero).
This variable is read-only. Its identifier is 1.3.6.1.4.1.837.2.10.2.1.4.$n$,
where $1 \leq n \leq$ canisterMaximumNumberOfCanisters.

canisterDescription is an ASCII string containing a short description of canister #$n$. If no description is
recorded in the canister, the string is empty (its length is zero).
This variable is read-only. Its identifier is 1.3.6.1.4.1.837.2.10.2.1.5.$n$,
where $1 \leq n \leq$ canisterMaximumNumberOfCanisters.

canisterPowerState indicates the power state of canister #$n$, as follows:

| Integer Value | Meaning |
|---|---|
| 1 | On |
| 2 | Off |

This state can be changed to accomplish hot-swap/hot-add operations.
This variable is read-write. Its identifier is 1.3.6.1.4.1.837.2.10.2.1.6.$n$,
where $1 \leq n \leq$ canisterMaximumNumberOfCanisters.

NF9000 MIB Rev. 2.2 canisterLocation describes the location of canister #n, as illustrated in Figure 8.

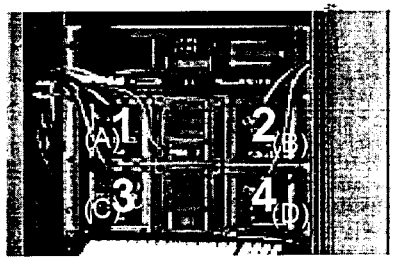

Figure 8. NF9000-C Canister Locations.

In Figure 8 the numbers indicate the canister indexes into the canisterTable, while the letters represent the canister names.

The values of canisterLocation are reported in the following table:

| canisterNumber | canisterName | canisterLocation (string) |
|---|---|---|
| 1 | A | "Top left" |
| 2 | B | "Top right" |
| 3 | C | "Bottom left" |
| 4 | D | "Bottom right" |

This variable is read-only. Its identifier is 1.3.6.1.4.1.837.2.10.2.1.7.$n$,
where $1 \le n \le$ canisterMaximumNumberOfCanisters.

canisterFanMinSpeed indicates the minimum speed below which a fan in canister #n is considered malfunctioning. It is expressed in RPS (Revolutions Per Second). When a canister fan's speed drops below this limit, IntraPulse raises the speed of the other fan in the same canister and turns the General Fault LED on. In this situation, the canisterFan$x$Speed ($x$ can be either 1 or 2) variable reflects the higher speed, and the canisterFan$x$Fault variable reports the faulty state of the affected fan.
This variable is read-write and can assume any value in the 0-255 range. Its identifier is 1.3.6.1.4.1.837.2.10.2.1.8.$n$, where $1 \le n \le$ canisterMaximumNumberOfCanisters.

canisterFanSpeedSetting indicates which of the two possible speed settings is current for the fans of canister #n.
The speed settings are as follows:

| Integer Value | Meaning |
|---|---|
| 1 | Low speed |
| 2 | High speed |

Note that changing the speed setting from High to Low after IntraPulse has detected a fan failure is of no benefit. IntraPulse would change it back to High in the next cycle of fan speed check. Changing the speed setting is not recommended.
This variable is read-write. Its identifier is 1.3.6.1.4.1.837.2.10.2.1.9.$n$,
where $1 \le n \le$ canisterMaximumNumberOfCanisters.

NF9000 MIB Rev. 2.2 canisterFan1Speed indicates the current speed in RPS (Revolutions Per Second) of fan #1 in canister #n.
The reported speed is in the 0-255 RPS range.
This variable is read-only. Its identifier is 1.3.6.1.4.1.837.2.10.2.1.10.$n$,
where $1 \le n \le$ canisterMaximumNumberOfCanisters.

canisterFan1Fault indicates the current state of fan #1 in canister #n, as follows:

| Integer Value | Meaning |
| --- | --- |
| 1 | Fan Faulted |
| 2 | Fan OK |

This variable is read-only. Its identifier is 1.3.6.1.4.1.837.2.10.2.1.11.$n$,
where $1 \le n \le$ canisterMaximumNumberOfCanisters.

canisterFan2Speed. Same as canisterFan1Speed applied to fan #2 in canister #n.
This variable is read-only. Its identifier is 1.3.6.1.4.1.837.2.10.2.1.12.$n$,
where $1 \le n \le$ canisterMaximumNumberOfCanisters.

canisterFan2Fault. Same as canisterFan1Fault applied to fan #2 in canister #n.
This variable is read-only. Its identifier is 1.3.6.1.4.1.837.2.10.2.1.13.$n$,
where $1 \le n \le$ canisterMaximumNumberOfCanisters.

NF9000 MIB Rev. 2.2

Slot Fan Group

The Slot Fan Group provides information on the I/O expansion slot cooling fans of the NF9000-T, as follows:

slotFanMaximumNumberOfFans indicates the maximum number of I/O slot fans supported by the system. It is zero for the NF9000-C.
  This variable is read-only. Its identifier is 1.3.6.1.4.1.837.2.11.1.0 slotFanTable describes the attributes of all the I/O slot fans in the system. This table is empty on the NF9000-C systems.
  This variable is not accessible. Its identifier is 1.3.6.1.4.1.837.2.11.2.

slotFanTableEntry describes the attributes of an I/O slot fan.
  This variable is not accessible. Its identifier is 1.3.6.1.4.1.837.2.11.2.1.

slotFanNumber is the unique number $n$ of an I/O slot fan. It is an index into the slotFanTable.
  This variable is read-only. Its identifier is 1.3.6.1.4.1.837.2.11.2.1.1.$n$, where $n \geq 1$.

slotFanMinSpeed indicates the minimum speed below which I/O slot fan #$n$ is considered malfunctioning. It is expressed in RPS (Revolutions Per Second). When the fan #$n$'s speed drops below this limit, IntraPulse raises the speed of fan #$n+1$ and turns the General Fault LED on. In this situation, the slotFanSpeed variable of fan #$n+1$ reflects the higher speed, and the slotFanFault variable for fan #$n$ reports the fan's faulty state.
  This variable is read-write and can assume any value in the 0-255 range. Its identifier is 1.3.6.1.4.1.837.2.11.2.1.1.2.$n$, where $1 \leq n \leq$ slotFanMaximumNumberOfFans.

slotFanSpeedSetting indicates which of the two possible speed settings is current for fan #$n$.
  The speed settings are as follows:

| Integer Value | Meaning |
|---|---|
| 1 | Low speed |
| 2 | High speed |

Note that changing the speed setting from High to Low after IntraPulse has detected a fan failure is of no benefit. IntraPulse would change it back to High in the next cycle of fan speed check.
  This variable is read-write. Its identifier is 1.3.6.1.4.1.837.2.11.2.1.1.3.$n$,
  where $1 \leq n \leq$ slotFanMaximumNumberOfFans.

slotFanSpeed indicates the current speed in RPS (Revolutions Per Second) of fan #$n$. The reported speed is in the 0-255 RPS range.
  This variable is read-only. Its identifier is 1.3.6.1.4.1.837.2.11.2.1.1.4.$n$,
  where $1 \leq n \leq$ slotFanMaximumNumberOfFans.

slotFanFault indicates the current state of fan $n$, as follows:

| Integer Value | Meaning |
|---|---|
| 1 | Fan Faulted |
| 2 | Fan OK |

This variable is read-only. Its identifier is 1.3.6.1.4.1.837.2.11.2.1.1.5.$n$,
  where $1 \leq n \leq$ slotFanMaximumNumberOfFans.

slotFanLocation indicates the location of fan #$n$, so as to allow the operator to physically reach it in case of malfunction.

NF9000 MIB Rev. 2.2

The values of slotFanLocation are as follows:

| slotFanNumber | slotFanLocation (string) |
|---|---|
| 1 | "Front view of I/O board, first from the left" |
| 2 | "Front view of I/O board, second from the left" |

This variable is read-only. Its identifier is 1.3.6.1.4.1.837.2.11.2.1.1.6.$n$, where $1 \leq n \leq$ slotFanMaximumNumberOfFans.

NF9000 MIB Rev. 2.2

Appendix 1: Hot Swap and Hot Add Algorithms

Hot swap can be performed on the NF9000-C and NF9000-T in a very similar way. The only difference is in the use of canisters (groups of 4 slots) vs. individually powered slots, respectively. Mechanically, on the NF9000-C it is necessary to extract a canister to change an I/O board inside it, therefore all the other boards in the canister get shut down. On the NF9000-T each I/O board can be replaced independently of the others.

Some boards on the market support multiple PCI functions and/or secondary buses. While multifunction cards are handled correctly by the NF9000 MIB and related S/W components, those with secondary buses are not supported because of the restriction imposed by Windows NT on bus numbering.[7]

To better understand the reason for this limitation, it is necessary to remember that secondary buses are driven by bridges. In the PCI world, bridges have several registers that the BIOS programs at power-on time. Those registers contain information indispensable to the functioning of the buses behind the bridges.

Operations like hot swap and hot add of cards with bridges, cause non-programmed bridges to be powered on in the system. Since the BIOS will not program them, the operating system must do it. Windows NT does not do it. Support should be implemented in an add-on driver, for example.

Hot swap requires saving the PCI configuration of all the bridges on the card to be swapped, and then restoring that information into the new card's bridges.

Hot add requires an even more complex course of action. Among the information recorded in a PCI bridge, there are three numbers: the Primary Bus Number, the Secondary Bus Number, and the Subordinate Bus Number (see "Appendix 2: NF9000 I/O Bus Hierarchy" for some graphical information on bridges and buses).

The Primary Bus Number is the number of the bus that is immediately before the bridge.[8]

The Secondary Bus Number is the number of the bus immediately behind the bridge.

The Subordinate Bus Number is the highest Secondary Bus Number assigned to any bus behind the bridge. If behind the bridge there are no other bridges, the Subordinate Bus Number is identical to the Secondary Bus Number.

The bus numbers are programmed into the bridges by the BIOS at power-on time. Window NT requires those numbers to be strictly sequential, from 0 up. This means that adding a bridge at run-time requires reprogramming all the bridges numerically located after the new one (including the new bridge itself). This operation is quite complex and delicate, since all the I/O activities through those bridges need to be suspended and then resumed. This burden would not exist if buses could be numbered sparsely, like under NetWare. In this case, adding bridges would require to fill in "holes" in the bus numbering sequence, without affecting the existing bridges and the activities on the related buses.[9]

Because of the above reasons, hot swap and hot add of boards with bridges is not supported under Windows NT at this time.

---

[7] There is another important reason: the NF9000 BIOS does not support extra bridges because of limited memory resources dedicated to the PCI expansion slots. This may change in future versions of the BIOS.
[8] In general, the bus hierarchy is rooted in the host bus, to which one or more bridges are directly connected.
[9] This is true if the "holes" are large enough to accommodate all the hot-added bridges.

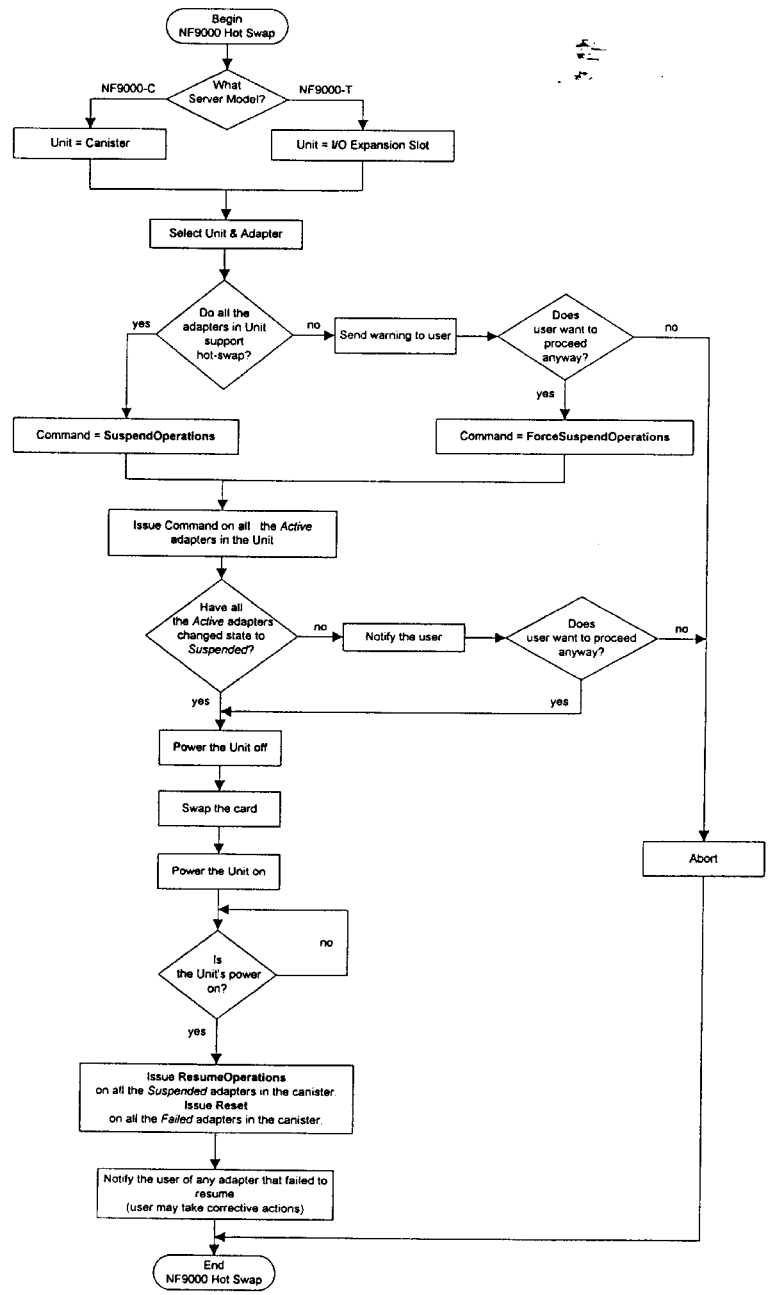
Figure 9. NF9000 Hot Swap Procedure.

NF9000 MIB Rev. 2.2
The flowchart in Figure 9 describes the main steps necessary for hot swap. It applies to both NF9000-C and NF9000-T server models.
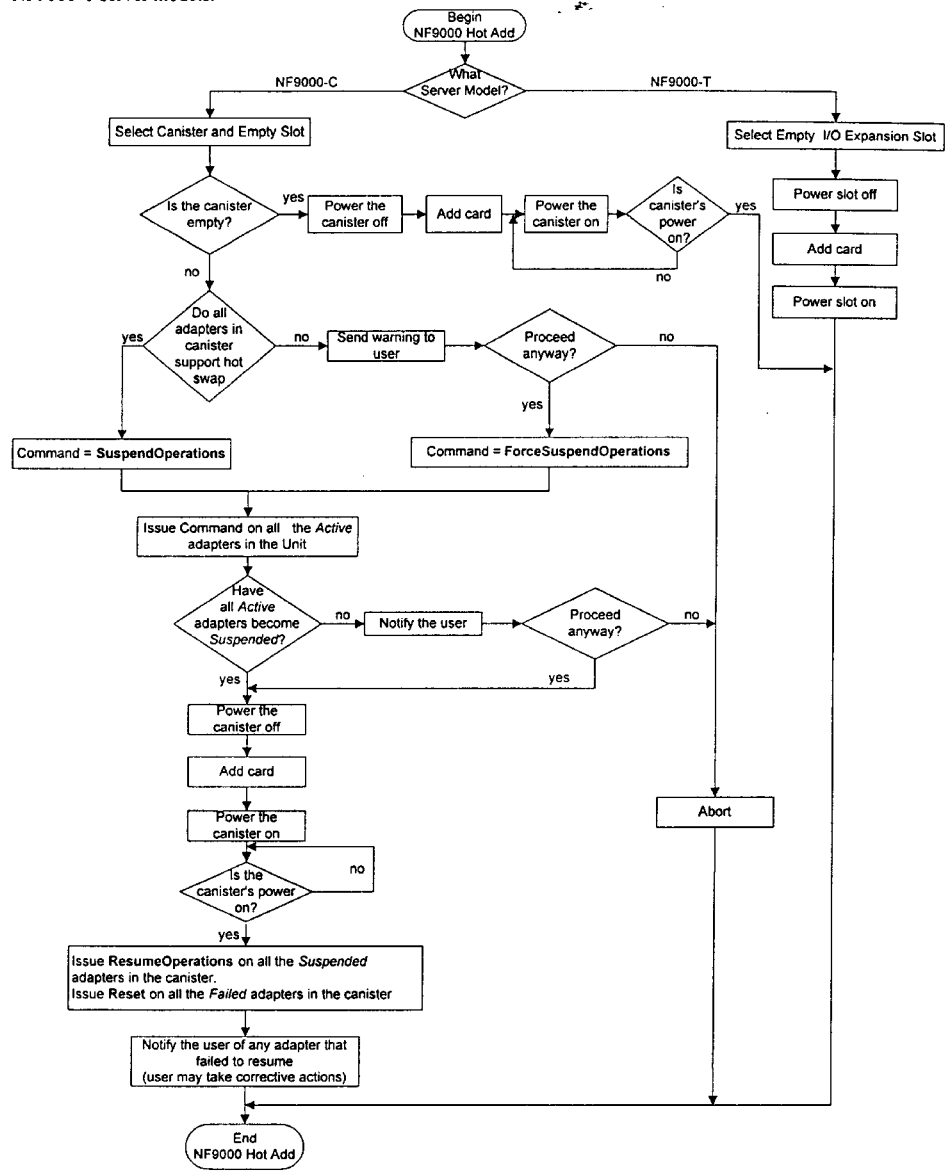
Figure 10. NF9000 Hot Add Procedure.

NF9000 MIB Rev. 2.2

The flowchart in
describes the main steps necessary for hot add. It applies to both the NF9000-C and NF9000-T server models. Note that hot add involves some extra steps not included in the flow chart, such as loading and/or starting the appropriate driver for the adapter just added. Those steps are performed by a utility outside the MIB scope.

NF9000 MIB Rev. 2.2

Appendix 2: NF9000 I/O Bus Hierarchy for Windows NT

The NF9000 series implements a sophisticated I/O PCI bus scheme aimed at providing higher throughput than simpler conventional architectures. The use of a large number of PCI bridges makes it necessary to clearly document the I/O bus tree and the view provided by the SNMP Agent through the MIB.

The Windows NT bus numbering scheme is strictly sequential because of a Windows NT requirement. A sparse numbering scheme is implemented for NetWare.

In this appendix, two bus trees are presented: the first shows the entire bus tree of the NF9000-C and NF9000-T, while the second shows the subtree visible through the MIB.

I/O Bus Tree

PCI bridges control PCI buses. PCI bridges have, among others, three registers that are most relevant for understanding the bus tree structure: the Primary Bus Number, the Secondary Bus Number, and the Subordinate Bus Number. These registers are programmed by the BIOS.

The Primary Bus Number is the number of the parent bus, which is the bus where the bridge itself resides.

The Secondary Bus Number is the number of the bus immediately below the bridge.

The Subordinate Bus Number is the highest Secondary Bus Number assigned to any bus below the bridge. If below the bridge there are no other bridges, the Subordinate Bus Number is identical to the Secondary Bus Number.

Figure 11 and Figure 12 show the use of PCI bridges on the NF9000-C and NF9000-T, along with the bus numbering scheme required by Windows NT.

On the NF9000-C, the "root" bus is the Host Bus, whose number is 0. The most important components on the Host Bus are the CPUs, the Memory Controller, and three PCI bridges: Bridge1 Bridge2, and Bridge3.

Bridge1 controls the internal PCI bus, where there are built-in adapters such as SCSI and VGA. On the internal PCI bus there is also an ISA bridge. On the ISA bus there are legacy controllers (floppy, keyboard, mouse, etc.) and the IntraPulse Local Interface Processor.
For Bridge1, the Primary, Secondary, and Subordinate Buses are all numbered 0.

Bridge2 controls a pair of bridges connected to two of the four canisters. Bridge2's Primary Bus number is 0, and its Secondary Bus number is always 1. Its Subordinate Bus number, however, is $k+m+3$, where $k \geq 0$, $m \geq 0$. The number $k$ represents the number of PCI buses present on I/O cards in Canister A, while the number $m$ represents the number of PCI buses on I/O cards in Canister C.

Bridge2.1 controls the Canister A's (i.e., Canister #1's) PCI bus. On PCI Bus #2 there are four expansion slots, like on the other three Canister buses. If no PCI bus is present on cards in slots 1-4, $k$ is equal to 0 and the Subordinate Bus number for Bridge2.1 is 2.
Bridge2.2 controls the Canister C's (i.e., Canister #3's) PCI bus. If no PCI bus is present on cards in slot 1-4, $m$ is equal to 0. Bridge2.2's Secondary Bus number is calculated by adding Bridge2.2's Primary Bus number to Bridge2.1's Subordinate Bus number. The Subordinate Bus number for Bridge2.2 is $k+m+3$.

Bridge3 controls a pair of bridges connected to two of the four canisters. Bridge3's Primary Bus number is 0, while its Secondary Bus number is $k+m+4$, equivalent to Bridge2's Subordinate Bus number plus 1. Bridge3's Subordinate Bus number is $k+m+n+p+6$, where $k \geq 0$, $m \geq 0$, $n \geq 0$, $p \geq 0$. The numbers $k$ and $m$ have been already defined. The number $n$ represents the number of PCI buses present on I/O cards in Canister B, while the number $p$ represents the number of PCI buses on I/O cards in Canister D.

NF9000 MIB Rev. 2.2

Bridge3.1 controls the Canister B's (i.e., Canister #2's) PCI bus. It is on PCI Bus #$k+m+4$, which is its Primary Bus. Bridge3.1's Secondary Bus number is $k+m+5$, equivalent to its Primary Bus number plus 1. Its Subordinate Bus number is $k+m+n+5$.

Bridge3.2 controls the Canister D's (i.e., Canister #4's) PCI bus. It is on PCI Bus #$k+m+4$, which is its Primary Bus. Bridge3.2's Secondary Bus number is $k+m+n+6$, equivalent to Bridge3.1's Subordinate Bus number plus 1. Bridge3.2's Subordinate Bus number is $k+m+n+p+6$.

Note that, if there are no PCI bridges on I/O cards in canisters, the bus numbering under Windows NT is very simple: the variables $k$, $m$, $n$, and $p$ are all 0. Currently, the BIOS does not support PCI bridges on add-on cards, therefore $k$, $m$, $n$, and $p$ are always 0.

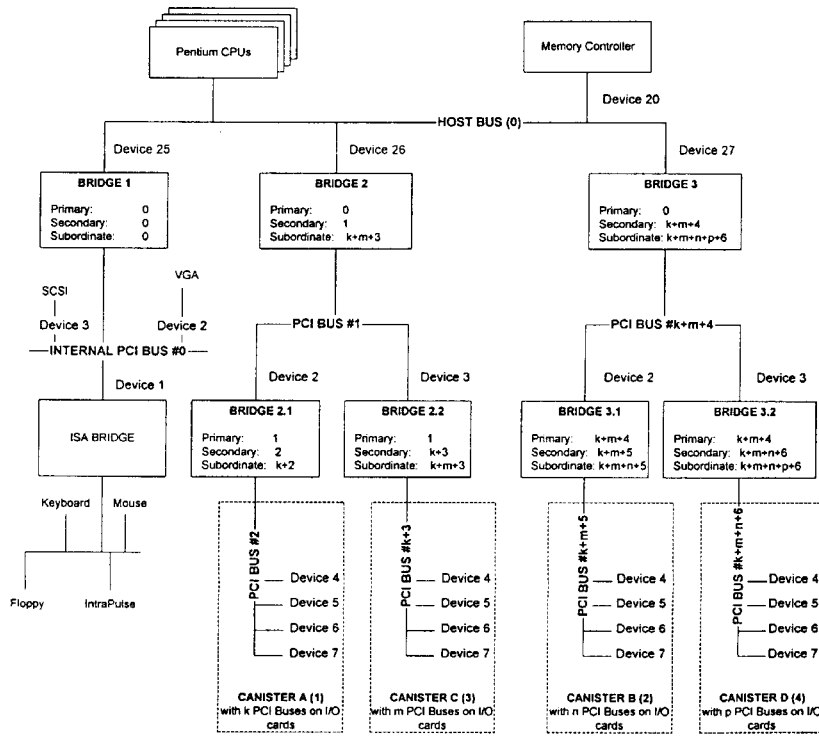

Figure 11. NF9000-C I/O Bus and Device Numbering on Windows NT.

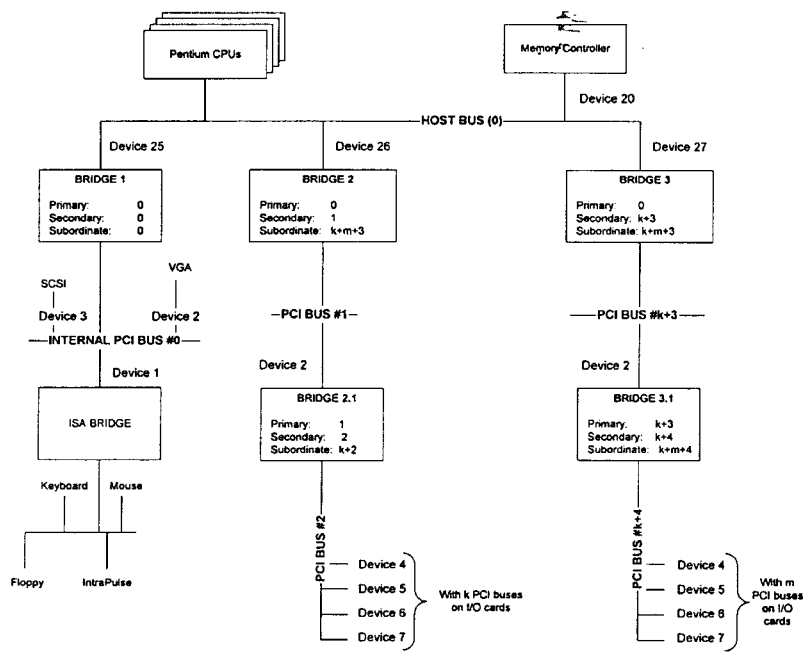
Figure 12. NF9000-T I/O Bus and Device Numbering on Windows NT.

NF9000 MIB Rev. 2.2

MIB's View of the I/O Buses

The MIB reports only a subset of the buses in Figure 11. The only buses relevant to users are the expandable ones. They are illustrated in Figure 13 and Figure 14. Note that on the NF9000-C the canister I/O expansion slots are logically numbered from 1 to 4, while on the NF9000-T they are numbered from 1 to 8.

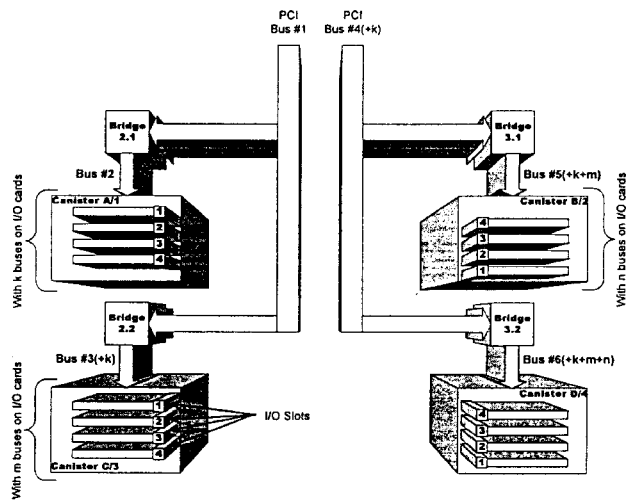

Figure 13. NF9000-C I/O Buses and Slots as Reported by the MIB on Windows NT.

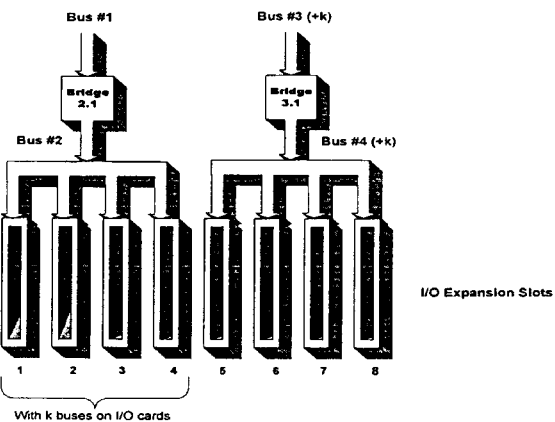

Figure 14. NF9000-T I/O Buses and Slots as Reported by the MIB on Windows NT.

NF9000 MIB Rev. 2.2

Appendix 3: NF9000 I/O Bus Hierarchy for NetWare

NetWare supports a sparse I/O bus numbering. This facilitates hot adding I/O cards with on-board PCI bridges. However, some restrictions on PCI memory resources do not allow the current BIOS to program additional bridges implemented on add-on cards.

Please refer to the previous appendix (or, much better, to [SOLARI]) for information on bridges.

I/O Bus Tree

The NF9000-C and NF9000-T I/O bus tree for NetWare is reported in Figure 15 and Figure 16, respectively.

It can be noticed that all the lowest-level PCI bridges (Bridge2.1, Bridge2.2, Bridge3.1, and Bridge3.2) have "room" for additional bridges/buses residing on PCI add-on cards.

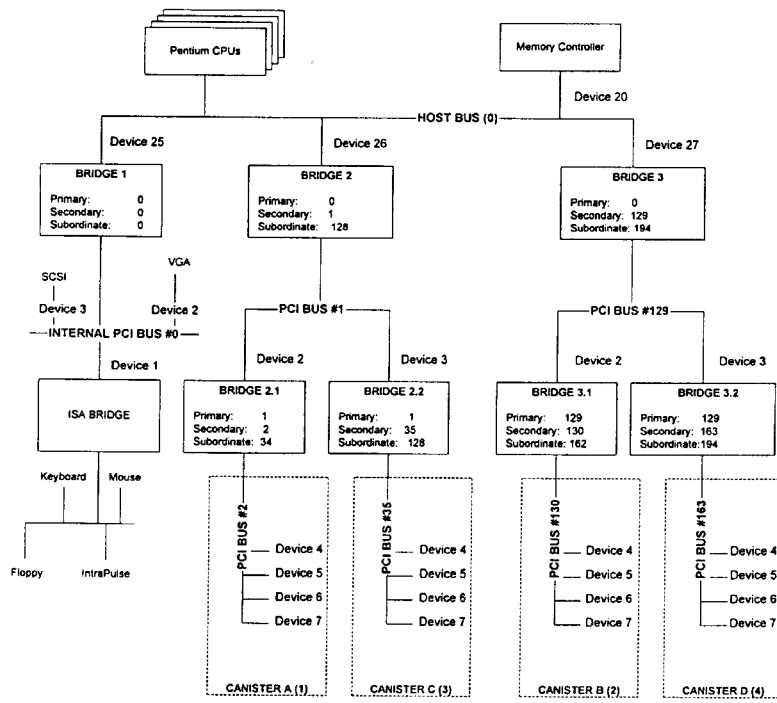

Figure 15. NF9000-C I/O Bus and Device Numbering on NetWare.

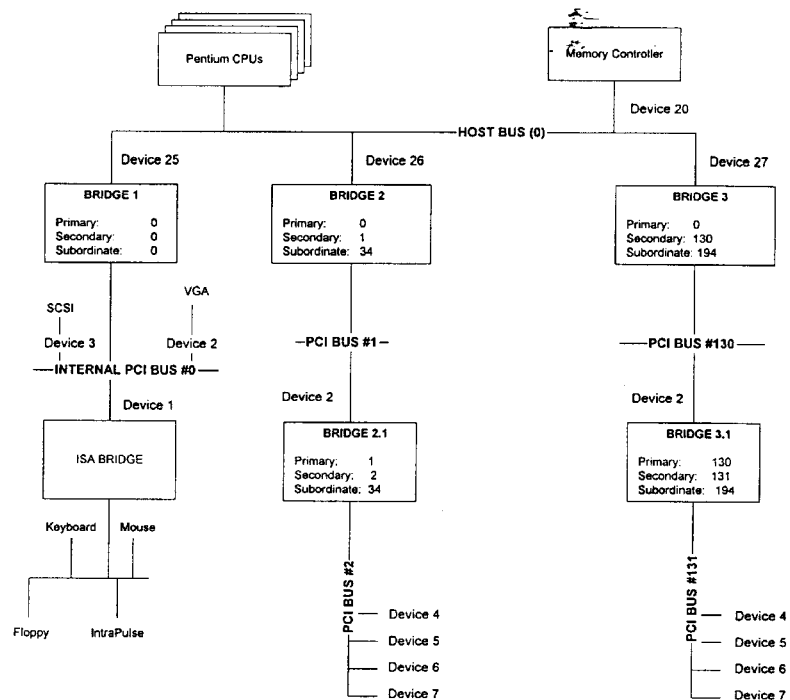
Figure 16. NF9000-T Bus and Device Numbering on NetWare.

NF9000 MIB Rev. 2.2
MIB's View of the I/O Buses
The NF9000 SNMP Agent for NetWare reports information on the NF9000-C and NF9000-T buses, I/O slots, and canisters according to the diagrams in Figure 17 and Figure 18, respectively.
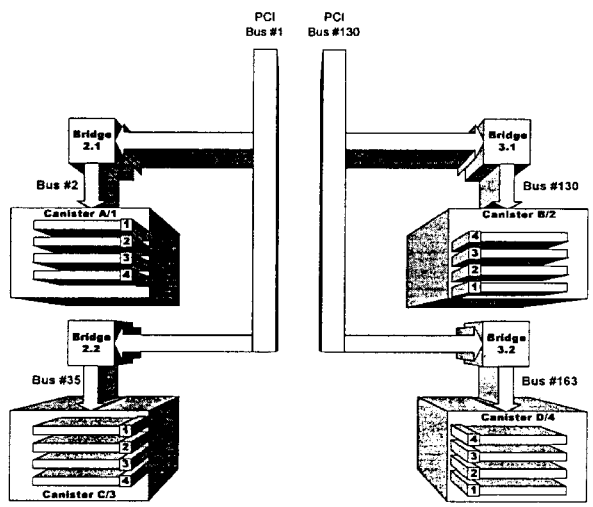
Figure 17. NF9000-C I/O Buses and Slots as Reported by the MIB on NetWare.
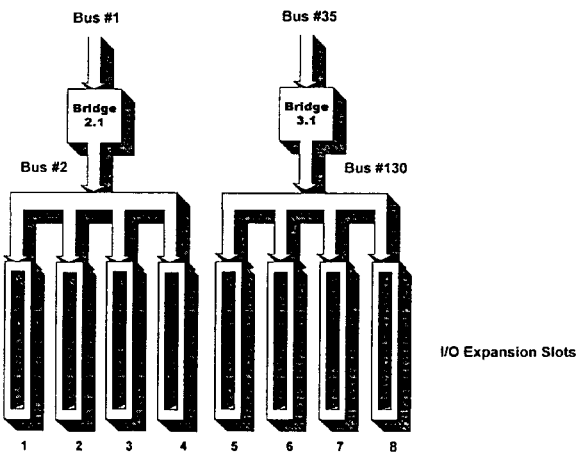
Figure 18. NF9000-T I/O Buses and Slots as Reported by the MIB on NetWare.

NF9000 MIB Rev. 2.2

Appendix 4: NF9000-C- and NF9000-T-Specific MIB Variables

The following table shows which groups and variables are computer model-specific:

| GROUP | VARIABLE | NF9000-C | NF9000-T |
|---|---|---|---|
| Trap Group | trapCanister | ✓ | N/A |
| | trapCanisterFan | ✓ | N/A |
| | trapSlotFan | N/A | ✓ |
| Power Group | powerSupplyDcState | either 1 or 2 | either 1 or 3 |
| | powerSupplyAcState | ✓ | always 3—"Unavailable" |
| Slot Group | slotPowerState | always 3—"Unavailable" | ✓ |
| Canister Group | All | ✓ | N/A |
| Slot Fan Group | All | N/A | ✓ |

The locations of devices like fans, temperature sensors, power supplies, etc., vary.

All the other variables and groups apply to both computer models.

NF9000 MIB Rev. 2.2

Appendix 5: NF9000 MIB Tree

```
1 iso
  3 org
    6 dod
      1 internet
        1 directory
        2 mgmt
        3 experimental
        4 private
          1 enterprises
            837 netframe
              2 nf9000Mgmt
                1 trapGroup
                  1 trapCpu
                  2 trapSystemBoardFan
                  3 trapTemperature
                  4 trapPowerSupply
                  5 trapCanister
                  6 trapAdapter
                  7 trapSlotFan
                  8 trapCanisterFan
                2 systemGroup
                  1 systemModel
                  2 systemBoardSerialNumber
                  3 systemBackPlaneSerialNumber
                  4 systemBackPlaneControllerRevisionInfo
                  5 systemBackPlaneControllerDescription
                  6 systemControllerARevisionInfo
                  7 systemControllerADescription
                  8 systemControllerBRevisionInfo
                  9 systemControllerBDescription
                  10 systemLogControllerRevisionInfo
                  11 systemLogControllerDescription
                  12 systemLocalInterfaceControllerRevisionInfo
                  13 systemLocalInterfaceControllerDescription
                  14 systemRemoteInterfaceControllerRevisionInfo
                  15 systemRemoteInterfaceControllerDescription
                  16 systemState
                  17 systemDateAndTime
                  18 systemMemorySize
                  19 systemDimmTable
                    1 systemDimmTableEntry
                      1 systemDimmNumber
                      2 systemDimmCapacity
                      3 systemDimmSpeed
                      4 systemDimmDataAccessMode
                  20 systemOsName
                  21 systemLicense
                3 coolingGroup
                  1 coolingFansGeneralFaultLed
                  2 coolingFanMinSpeed
                  3 coolingFanSpeedSetting
                  4 coolingMaximumNumberOfSystemFans
                  5 coolingFanTable
                    1 coolingFanTableEntry
                      1 coolingFanNumber
                      2 coolingFanSpeed
                      3 coolingFanFault
                      4 coolingFanLocation
                  6 coolingAlertTemperature
                  7 coolingShutdownTemperature
                  8 coolingMaximumNumberOfTemperatureSensors
                  9 coolingTemperatureSensorTable
                    1 coolingTemperatureSensorTableEntry
                      1 coolingSensorNumber
                      2 coolingSensorTemperature
                      3 coolingSensorLocation
```

NF9000 MIB Rev. 2.2

```
4  powerGroup
   1  powerSystemBoard5VoltLine
   2  powerSystemBoard3_3VoltLine
   3  powerSystemBoard12VoltLine
   4  powerSystemBoardNeg12VoltLine
   5  powerSwitch
   6  powerSystemResetSwitch
   7  powerSupplyMaximumNumberOfPowerSupplies
   8  powerSupplyTable
      1  powerSupplyTableEntry
         1  powerSupplyNumber
         2  powerSupplySerialNumber
         3  powerSupplyDcState
         4  powerSupplyAcState
         5  powerSupplyLocation
5  cpuGroup
   1  cpuBusToCoreRatio
   2  cpuClockFrequency
   3  cpuMaximumNumberOfCpus
   4  cpuTable
      1  cpuTableEntry
         1  cpuNumber
         2  cpuState
6  adapterGroup
   1  adapterTable
      1  adapterTableEntry
         1  adapterNumber
         2  adapterName
         3  adapterSupportsHotSwapHotAdd
         4  adapterState
         5  adapterCommand
         6  adapterDriverNumber
         7  adapterBusNumber
         8  adapterDeviceNumber
         9  adapterFunctionNumber
         10 adapterVendorId
         11 adapterDeviceId
         12 adapterRevisionId
         13 adapterBaseClass
         14 adapterSubClass
         15 adapterProgrammingInterface
7  driverGroup
   1  driverTable
      1  driverTableEntry
         1  driverNumber
         2  driverName
         3  driverVersion
8  slotGroup
   1  slotTable
      1  slotTableEntry
         1  slotGroupNumber
         2  slotNumber
         3  slotBusNumber
         4  slotDeviceNumber
         5  slotAdapterPresence
         6  slotPowerState
         7  slotLocation
9  canisterGroup
   1  canisterMaximumNumberOfCanisters
   2  canisterTable
      1  canisterTableEntry
         1  canisterNumber
         2  canisterName
         3  canisterSerialNumber
         4  canisterRevisionInfo
         5  canisterDescription
         6  canisterPowerState
         7  canisterLocation
         8  canisterFanMinSpeed
         9  canisterFanSpeedSetting
         10 canisterFan1Speed
```

NF9000 MIB Rev. 2.2

```
        11  canisterFan1Fault
        12  canisterFan2Speed
        13  canisterFan2Fault
 10  slotFanGroup
   1  slotFanMaximumNumberOfFans
   2  slotFanTable
     1  slotFanTableEntry
       1  slotFanNumber
       2  slotFanMinSpeed
       3  slotFanSpeedSetting
       4  slotFanSpeed
       5  slotFanFault
       6  slotFanLocation
```

NF9000 MIB Rev. 2.2

Appendix 6: NF9000 MIB Definitions

```
-- NF9000 MIB
--
-- Version: 2.2
--
-- 14-April-1997
--
-- Models Supported: NetFRAME NF9000-C, NF9000-T.
--
-- Conventions:
--
--      Enumerated Type Values: Identical names must have identical values.
--
--      Table Columns Names: Columns of different tables must have different names.
--

NETFRAMEMIB DEFINITIONS ::= BEGIN

IMPORTS
        enterprises,
        Gauge,
        Counter,
        TimeTicks
            FROM RFC1155-SMI
        OBJECT-TYPE
            FROM RFC1212
        DisplayString
            FROM RFC1213-MIB;

--
-- Object Identifiers
-- netframe        OBJECT IDENTIFIER ::= { enterprises 837 }
    nf9000Mgmt      OBJECT IDENTIFIER ::= { netframe 2 } trapGroup       OBJECT IDENTIFIER ::= { nf9000Mgmt 1 }
    systemGroup     OBJECT IDENTIFIER ::= { nf9000Mgmt 2 }
    coolingGroup    OBJECT IDENTIFIER ::= { nf9000Mgmt 3 }
    powerGroup      OBJECT IDENTIFIER ::= { nf9000Mgmt 4 }
    cpuGroup        OBJECT IDENTIFIER ::= { nf9000Mgmt 5 }
    adapterGroup    OBJECT IDENTIFIER ::= { nf9000Mgmt 6 }
    driverGroup     OBJECT IDENTIFIER ::= { nf9000Mgmt 7 }
    slotGroup       OBJECT IDENTIFIER ::= { nf9000Mgmt 8 }
    canisterGroup   OBJECT IDENTIFIER ::= { nf9000Mgmt 9 }
    slotFanGroup    OBJECT IDENTIFIER ::= { nf9000Mgmt 10 }
```

NF9000 MIB Rev. 2.2

Trap Group

```
-------------------------------THE TRAP GROUP-----------------------------
--
-- The Trap Group defines the NF9000's traps.
-- trapCpu TRAP-TYPE
        ENTERPRISE trapGroup
        VARIABLES {
                cpuNumber
        }
        DESCRIPTION
            "Indicates that the CPU identified by cpuNumber failed because of
            high temperature and/or low power."
        ::= 1 trapSystemBoardFan TRAP-TYPE
        ENTERPRISE trapGroup
        VARIABLES {
                coolingFanNumber
        }
        DESCRIPTION
            "Indicates that the speed of the system board fan identified by
            coolingFanNumber dropped below the minimum limit (see coolingFanMinSpeed)."
        ::= 2 trapTemperature TRAP-TYPE
        ENTERPRISE trapGroup
        VARIABLES {
                coolingSensorNumber
        }
        DESCRIPTION
            "Indicates that the temperature sensor identified by coolingSensorNumber reported
                a 'normal' to 'warning' transition (i.e., temperature raised above the
                warning level).
            "
        ::= 3 trapPowerSupply TRAP-TYPE
        ENTERPRISE trapGroup
        VARIABLES {
                powerSupplyNumber
        }
        DESCRIPTION
            "Indicates one of the following conditions:

1.  The power supply identified by powerSupplyNumber has been extracted
                (NF9000-C only).

2.  The power supply identified by powerSupplyNumber has been inserted
                (NF9000-C only). Check powerSupplyDcState and powerSupplyAcState
                (if applicable) for abnormal conditions.

3.  The AC state of the power supply identified by powerSupplyNumber
                is out of tolerance range (NF9000-C only).

4.  The DC state of the power supply identified by powerSupplyNumber
                is out of tolerance range.

5.  The DC state of the power supply identified by powerSupplyNumber
                is reported as out of tolerance range because the power supply is
                not present (NF9000-T only).
            "
        ::= 4
```

NF9000 MIB Rev. 2.2

```
trapCanister TRAP-TYPE
    ENTERPRISE trapGroup
    VARIABLES {
            canisterNumber
    }
    DESCRIPTION
        "Indicates that the canister identified by canisterNumber has been either
        extracted or inserted."
    ::= 5 trapAdapter TRAP-TYPE
    ENTERPRISE trapGroup
    VARIABLES {
            adapterNumber
    }
    DESCRIPTION
        "Indicates that the adapter identified by adapterNumber or its driver
        is malfunctioning."
    ::= 6 trapSlotFan TRAP-TYPE
    ENTERPRISE trapGroup
    VARIABLES {
            slotFanNumber
    }
    DESCRIPTION
        "Indicates that the speed of the I/O slot fan identified by slotFanNumber
        dropped below the minimum limit (slotFanMinSpeed)."
    ::= 7 trapCanisterFan TRAP-TYPE
    ENTERPRISE trapGroup
    VARIABLES {
            canisterNumber
    }
    DESCRIPTION
        "Indicates that the speed of a fan in
        the canister identified by canisterNumber has dropped below the
        minimum limit (see canisterFanMinSpeed).
        "
    ::= 8
```

NF9000 MIB Rev. 2.2

System Group

```
----------------------------THE SYSTEM GROUP-----------------------------
--
-- The System Group of objects provides general information on the system.
-- systemModel OBJECT-TYPE
        SYNTAX INTEGER (
                    NF9000C(1),
                    NF9000T(2)
        )
        ACCESS read-only
        STATUS mandatory
        DESCRIPTION
            "Indicates the current NetFRAME product. NF9000C is the Canister version,
            NF9000T is the Tower version."
        ::= ( systemGroup 1 )

systemBoardSerialNumber OBJECT-TYPE
        SYNTAX DisplayString (SIZE(0..255))
        ACCESS read-only
        STATUS mandatory
        DESCRIPTION
            "The serial number of the system board."
        ::= ( systemGroup 2 )

systemBackPlaneSerialNumber OBJECT-TYPE
        SYNTAX DisplayString (SIZE(0..255))
        ACCESS read-only
        STATUS mandatory
        DESCRIPTION
            "The serial number of the system back plane."
        ::= ( systemGroup 3 )

systemBackPlaneControllerRevisionInfo OBJECT-TYPE
        SYNTAX DisplayString (SIZE(0..255))
        ACCESS read-only
        STATUS mandatory
        DESCRIPTION
            "The revision number and date of the system back plane controller."
        ::= ( systemGroup 4 )

systemBackPlaneControllerDescription OBJECT-TYPE
        SYNTAX DisplayString (SIZE(0..255))
        ACCESS read-only
        STATUS mandatory
        DESCRIPTION
            "Describes the system back plane controller."
        ::= ( systemGroup 5 )

systemControllerARevisionInfo OBJECT-TYPE
        SYNTAX DisplayString (SIZE(0..255))
        ACCESS read-only
        STATUS mandatory
        DESCRIPTION
            "The revision number and date of Wire Service's Controller A, which
            controls the DIMM detection, the system reset, the system board fans,
            and the LCD."
        ::= ( systemGroup 6 )

systemControllerADescription OBJECT-TYPE
        SYNTAX DisplayString (SIZE(0..255))
        ACCESS read-only
        STATUS mandatory
        DESCRIPTION
            "Describes the Wire Service's Controller A, which controls the DIMM
            detection, the system reset, the system board fans, and the LCD."
        ::= ( systemGroup 7 )
```

NF9000 MIB Rev. 2.2

```
systemControllerBRevisionInfo OBJECT-TYPE
    SYNTAX DisplayString (SIZE(0..255))
    ACCESS read-only
    STATUS mandatory
    DESCRIPTION
        "The revision number and date of Wire Service's Controller B, which
        controls the H/W interface between Wire Service and the
        Operating System."
    ::= ( systemGroup 8 )

systemControllerBDescription OBJECT-TYPE
    SYNTAX DisplayString (SIZE(0..255))
    ACCESS read-only
    STATUS mandatory
    DESCRIPTION
        "Describes Wire Service's Controller B, which controls the
        the H/W interface between Wire Service and the Operating System."
    ::= ( systemGroup 9 )

systemLogControllerRevisionInfo OBJECT-TYPE
    SYNTAX DisplayString (SIZE(0..255))
    ACCESS read-only
    STATUS mandatory
    DESCRIPTION
        "The revision number and date of the Wire Service's System Log Controller."
    ::= ( systemGroup 10 )

systemLogControllerDescription OBJECT-TYPE
    SYNTAX DisplayString (SIZE(0..255))
    ACCESS read-only
    STATUS mandatory
    DESCRIPTION
        "Describes the Wire Service's System Log Controller."
    ::= ( systemGroup 11 )

systemLocalInterfaceControllerRevisionInfo OBJECT-TYPE
    SYNTAX DisplayString (SIZE(0..255))
    ACCESS read-only
    STATUS mandatory
    DESCRIPTION
        "The revision number and date of the Wire Service's Local Interface
        Controller."
    ::= ( systemGroup 12 )

systemLocalInterfaceControllerDescription OBJECT-TYPE
    SYNTAX DisplayString (SIZE(0..255))
    ACCESS read-only
    STATUS mandatory
    DESCRIPTION
        "Describes the Wire Service's Local Interface Controller."
    ::= ( systemGroup 13 )

systemRemoteInterfaceControllerRevisionInfo OBJECT-TYPE
    SYNTAX DisplayString (SIZE(0..255))
    ACCESS read-only
    STATUS mandatory
    DESCRIPTION
        "The revision number and date of the Wire Service's Remote Interface
        Controller."
    ::= ( systemGroup 14 )

systemRemoteInterfaceControllerDescription OBJECT-TYPE
    SYNTAX DisplayString (SIZE(0..255))
    ACCESS read-only
    STATUS mandatory
    DESCRIPTION
        "Describes the Wire Service's Remote Interface Controller."
    ::= ( systemGroup 15 )
```

NF9000 MIB Rev. 2.2

```
systemState OBJECT-TYPE
    SYNTAX INTEGER (
        OK(1),
        Faulted(2)
    )
    ACCESS read-only
    STATUS mandatory
    DESCRIPTION
        "Indicates the general system state. If any fault is detected in the
        system, it reports 'Faulted'. Note that this does not necessarily mean
        a fatal fault."
    ::= ( systemGroup 16 )

systemDateAndTime OBJECT-TYPE

--
    -- The syntax "...SIZE(8..11)" is used instead of the
    -- correct "...SIZE(8|11)" because of a problem with the Microsoft
    -- MIB compiler. The octet string size is either 8 or 11.
    --

SYNTAX OCTET STRING (SIZE(8..11))
    ACCESS read-write
    STATUS mandatory
    DESCRIPTION
        "Indicates the date and time on this system.

Field  Octets  Contents                    Range 1      1-2     year                        0..2100
        2      3       month                       1..12
        3      4       day                         1..31
        4      5       hour                        0..23
        5      6       minutes                     0..59
        6      7       seconds                     0..60
                       (use 60 for leap-second)
        7      8       deci-seconds                0..9
        8      9       direction from UTC          '+' / '-'
        9      10      hours from UTC              0..11
        10     11      minutes from UTC            0..59

Note that if only local time is known, then
        timezone information (fields 8-10) is not
        present."
    ::= ( systemGroup 17 )

systemMemorySize OBJECT-TYPE
    SYNTAX INTEGER (0..4294967295)
    ACCESS read-only
    STATUS mandatory
    DESCRIPTION
        "Indicates the total main memory size."
    ::= ( systemGroup 18 )

systemDimmTable OBJECT-TYPE
    SYNTAX SEQUENCE OF SystemDimmTableEntry
    ACCESS not-accessible
    STATUS mandatory
    DESCRIPTION
        "Describes the type of DIMMs (Dual In-line Memory Module) in the system."
    ::= ( systemGroup 19 )

systemDimmTableEntry OBJECT-TYPE
        SYNTAX SystemDimmTableEntry
        ACCESS not-accessible
        STATUS mandatory
        DESCRIPTION
            "Describes a DIMM."
        INDEX ( systemDimmNumber )
        ::= ( systemDimmTable 1 )
```

NF9000 MIB Rev. 2.2

```
SystemDimmTableEntry ::= SEQUENCE {
                            systemDimmNumber INTEGER,
                            systemDimmCapacity INTEGER,
                            systemDimmSpeed INTEGER,
                            systemDimmDataAccessMode INTEGER
} systemDimmNumber OBJECT-TYPE
    SYNTAX INTEGER (1..16)
    ACCESS read-only
    STATUS mandatory
    DESCRIPTION
        "Indicates the logical number of this DIMM."
    ::= { systemDimmTableEntry 1 } systemDimmCapacity OBJECT-TYPE
    SYNTAX INTEGER (0..4294967295)
    ACCESS read-only
    STATUS mandatory
    DESCRIPTION
        "Indicates the DIMM capacity in megabytes."
    ::= { systemDimmTableEntry 2 } systemDimmSpeed OBJECT-TYPE
    SYNTAX INTEGER (0..70)
    ACCESS read-only
    STATUS mandatory
    DESCRIPTION
        "Indicates the DIMM speed in nanoseconds."
    ::= { systemDimmTableEntry 3 } systemDimmDataAccessMode OBJECT-TYPE
    SYNTAX INTEGER {
                    FastPage(1),
                    FastPageWithEDO(2)
    }
    ACCESS read-only
    STATUS mandatory
    DESCRIPTION
        "Indicates the DIMM data access mode."
    ::= { systemDimmTableEntry 4 } systemOsName OBJECT-TYPE
    SYNTAX INTEGER {
                WindowsNT(1),
                NetWare(2)
    }
    ACCESS read-only
    STATUS mandatory
    DESCRIPTION
        "Indicates the name of the server operating system."
    ::= { systemGroup 20 } systemLicense OBJECT-TYPE
    SYNTAX OCTET STRING (SIZE(1))
    ACCESS read-only
    STATUS mandatory
    DESCRIPTION
        "Indicates the type of license currently active.
```

| Octet No. | Value | Meaning |
|---|---|---|
| 1 | 0 | Hot swap and hot add are not supported. |
| 1 | 1 | Hot swap and hot add are supported. |

```
    "
    ::= { systemGroup 21 }
```

NF9000 MIB Rev. 2.2

Cooling Group

---------------------------------THE COOLING GROUP ----------------------------
--
-- The Cooling Group provides information on system board fans and temperature sensors.
--

```
    coolingFansGeneralFaultLed OBJECT-TYPE
        SYNTAX INTEGER {
                        On(1),
                        Off(2)
        }
        ACCESS read-only
        STATUS mandatory
        DESCRIPTION
            "Indicates whether any one system board fan has failed."
        ::= { coolingGroup 1 } coolingFanMinSpeed OBJECT-TYPE
        SYNTAX INTEGER (0..255)
        ACCESS read-write
        STATUS mandatory
        DESCRIPTION
            "Indicates the minimum fan speed (in RPS-Revolutions Per
            Second) that causes a fault. Note that changing this value
            causes all the system board fans to be identically affected."
        ::= { coolingGroup 2 } coolingFanSpeedSetting OBJECT-TYPE
        SYNTAX INTEGER {
                        Low(1),
                        High(2)
        }
        ACCESS read-write
        STATUS mandatory
        DESCRIPTION
            "Indicates the current fan speed setting. Normally it is Low.
            If High, it means that the speed of one or more fans dropped below the low limit.
            In this case, Wire Service automatically sets the speed of all the system board fans
            to High.  Changing it to Low through the SNMP agent may sort a temporary
            effect only, because Wire Service would change it back to High to ensure
            proper cooling.
            Note that changing this variable causes all the system board fans to be
            identically affected."
        ::= { coolingGroup 3 } coolingMaximumNumberOfSystemFans OBJECT-TYPE
        SYNTAX INTEGER (1..6)
        ACCESS read-only
        STATUS mandatory
        DESCRIPTION
            "Indicates the maximum number of system fans in this
            product."
        ::= { coolingGroup 4 } coolingFanTable OBJECT-TYPE
        SYNTAX SEQUENCE OF CoolingFanTableEntry
        ACCESS not-accessible
        STATUS mandatory
        DESCRIPTION
            "Describes the programmable fans on the system board."
        ::= { coolingGroup 5 }
```

NF9000 MIB Rev. 2.2

```
coolingFanTableEntry OBJECT-TYPE
    SYNTAX CoolingFanTableEntry
    ACCESS not-accessible
    STATUS mandatory
    DESCRIPTION
        "Describes a programmable fan."
    INDEX { coolingFanNumber }
    ::= { coolingFanTable 1 }

CoolingFanTableEntry ::= SEQUENCE {
                                    coolingFanNumber INTEGER,
                                    coolingFanSpeed Gauge,
                                    coolingFanFault INTEGER,
                                    coolingFanLocation DisplayString
} coolingFanNumber OBJECT-TYPE
    SYNTAX INTEGER  (1..6)
    ACCESS read-only
    STATUS mandatory
    DESCRIPTION
        "Unique logical fan number within this system."
    ::= { coolingFanTableEntry 1 } coolingFanSpeed OBJECT-TYPE
    SYNTAX Gauge
    ACCESS read-only
    STATUS mandatory
    DESCRIPTION
        "Measured fan speed in RPS (Revolutions Per Second)."
    ::= { coolingFanTableEntry 2 } coolingFanFault OBJECT-TYPE
    SYNTAX INTEGER {
                    Yes(1),
                    No(2)
    }
    ACCESS read-only
    STATUS mandatory
    DESCRIPTION
        "Indicates the current state of this fan."
    ::= { coolingFanTableEntry 3 } coolingFanLocation OBJECT-TYPE
    SYNTAX DisplayString (SIZE(0..255))
    ACCESS read-only
    STATUS mandatory
    DESCRIPTION
        "Indicates where this fan is located to allow the user to
        physically reach it in case of malfunction.

The fan locations for the NF9000-C are as follows:

+----NF9000-C Rear Panel/Rear View----+
        |                                     |
        | Fan6 Fan5    Fan4 Fan3    Fan2 Fan1 |
        |                                     |
        +-------------------------------------+ coolingFanNumber    coolingFanLocation
        _____

1       'First from the right, rear view'
                    2       'Second from the right, rear view'
                    3       'Third from the right, rear view'
                    4       'Fourth from the right, rear view'
                    5       'Fifth from the right, rear view'
                    6       'Sixth from the right, rear view'
```

NF9000 MIB Rev. 2.2

The fan locations for the NF9000-T are as follows:

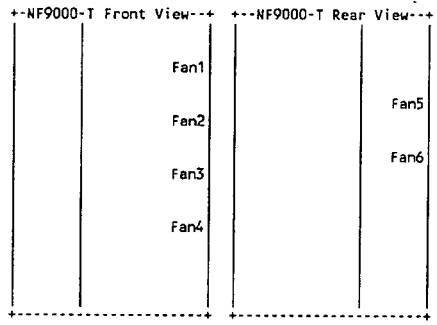

| coolingFanNumber | coolingFanLocation |
|---|---|
| 1 | 'First from the top, front view' |
| 2 | 'Second from the top, front view' |
| 3 | 'Third from the top, front view' |
| 4 | 'Fourth from the top, front view' |
| 5 | 'First from the top, rear view' |
| 6 | 'Second from the top, rear view' |

```
        "
    ::= { coolingFanTableEntry 4 } coolingAlertTemperature OBJECT-TYPE
    SYNTAX INTEGER (0..255)
    ACCESS read-write
    STATUS mandatory
    DESCRIPTION
        "Indicates at which temperature Celsius the system should generate an
        alert. Note that the alert is generated if any sensor detects
        this temperature or higher, regardless of its location."
    ::= { coolingGroup 6 } coolingShutdownTemperature OBJECT-TYPE
    SYNTAX INTEGER (0..255)
    ACCESS read-write
    STATUS mandatory
    DESCRIPTION
        "Indicates at which temperature Celsius the Wire Service should shut the
        system down. Note that the shutdown is performed if any sensor
        detects this temperature, regardless of its location."
    ::= { coolingGroup 7 } coolingMaximumNumberOfTemperatureSensors OBJECT-TYPE
    SYNTAX INTEGER (1..5)
    ACCESS read-only
    STATUS mandatory
    DESCRIPTION
        "Indicates the maximum number of system temperature sensors
        in this product."
    ::= { coolingGroup 8 }
```

NF9000 MIB Rev. 2.2

```
coolingTemperatureSensorTable OBJECT-TYPE
    SYNTAX SEQUENCE OF CoolingTemperatureSensorTableEntry
    ACCESS not-accessible
    STATUS mandatory
    DESCRIPTION
        "Describes the state of the temperature sensors in the system."
    ::= { coolingGroup 9 } coolingTemperatureSensorTableEntry OBJECT-TYPE
        SYNTAX CoolingTemperatureSensorTableEntry
        ACCESS not-accessible
        STATUS mandatory
        DESCRIPTION
            "Describes the state of a temperature sensor."
        INDEX { coolingSensorNumber }
        ::= { coolingTemperatureSensorTable 1 }

CoolingTemperatureSensorTableEntry ::= SEQUENCE {
                                    coolingSensorNumber INTEGER,
                                    coolingSensorTemperature Gauge,
                                    coolingSensorLocation DisplayString
    } coolingSensorNumber OBJECT-TYPE
            SYNTAX INTEGER (1..5)
            ACCESS read-only
            STATUS mandatory
            DESCRIPTION
                "Unique logical temperature sensor number within this
                system."
            ::= { coolingTemperatureSensorTableEntry 1 } coolingSensorTemperature OBJECT-TYPE
            SYNTAX Gauge
            ACCESS read-only
            STATUS mandatory
            DESCRIPTION
                "Indicates the temperature Celsius measured by this sensor."
            ::= { coolingTemperatureSensorTableEntry 2 } coolingSensorLocation OBJECT-TYPE
            SYNTAX DisplayString (SIZE(0..255))
            ACCESS read-only
            STATUS mandatory
            DESCRIPTION
                "Indicates where this sensor is located to allow the user
                to identify the physical area showing a temperature
                problem. The sensor locations are as follows:

Sensor
                Number     Location on the NF9000-C

1          'Component No. U15, on back plane'

2          'Component No. U16, on back plane'

3          'Component No. U69, on system board'

4          'Component No. U68, on system board'

5          'Component No. U67, on system board'
```

NF9000 MIB Rev. 2.2

```
Sensor
Number    Location on the NF9000-T

1         'Component No. U15, on I/O board'
2         'Component No. U16, on I/O board'
3         'Component No. U69, on system board'
4         'Component No. U68, on system board'
5         'Component No. U67, on system board'
"

::= { coolingTemperatureSensorTableEntry 3 }
```

NF9000 MIB Rev. 2.2

Power Group

```
------------------------------THE POWER GROUP ------------------------------
--
-- The Power Group provides information on the power supplies.
-- powerSystemBoard5VoltLine OBJECT-TYPE
       SYNTAX INTEGER
       ACCESS read-only
       STATUS mandatory
       DESCRIPTION
           "Indicates the current voltage of the +5V power line multiplied
           by 100."
       ::= { powerGroup 1 } powerSystemBoard3_3VoltLine OBJECT-TYPE
       SYNTAX INTEGER
       ACCESS read-only
       STATUS mandatory
       DESCRIPTION
           "Indicates the current voltage of the +3.3V power line multiplied
           by 100."
       ::= { powerGroup 2 } powerSystemBoard12VoltLine OBJECT-TYPE
       SYNTAX INTEGER
       ACCESS read-only
       STATUS mandatory
       DESCRIPTION
           "Indicates the current voltage of the +12V power line multiplied
           by 100."
       ::= { powerGroup 3 } powerSystemBoardNeg12VoltLine OBJECT-TYPE
       SYNTAX INTEGER
       ACCESS read-only
       STATUS mandatory
       DESCRIPTION
           "Indicates the current voltage of the -12V power line multiplied
           by 100."
       ::= { powerGroup 4 } powerSwitch OBJECT-TYPE
       SYNTAX INTEGER {
                       On(1),
                       Off(2)
       }
       ACCESS read-write
       STATUS mandatory
       DESCRIPTION
           "Indicates the state of the main output from the power supplies.
           Setting this switch to Off turns off the power to the entire system,
           except for the Wire Service."
       ::= { powerGroup 5 } powerSystemResetSwitch OBJECT-TYPE
       SYNTAX INTEGER {
                       Reset(3)
       }
       ACCESS write-only
       STATUS mandatory
       DESCRIPTION
           "Requests a system reset."
       ::= { powerGroup 6 }
```

NF9000 MIB Rev. 2.2

```
powerSupplyMaximumNumberOfPowerSupplies OBJECT-TYPE
    SYNTAX INTEGER (1..3)
    ACCESS read-only
    STATUS mandatory
    DESCRIPTION
        "Indicates the maximum number of power supplies supported by this
        system."
    ::= { powerGroup 7 } powerSupplyTable OBJECT-TYPE
    SYNTAX SEQUENCE OF PowerSupplyTableEntry
    ACCESS not-accessible
    STATUS mandatory
    DESCRIPTION
        "This table contains information on all the power supplies in the
        system."
    ::= { powerGroup 8 } powerSupplyTableEntry OBJECT-TYPE
        SYNTAX PowerSupplyTableEntry
        ACCESS not-accessible
        STATUS mandatory
        DESCRIPTION
            "Describes a power supply."
        INDEX { powerSupplyNumber }
        ::= { powerSupplyTable 1 }

PowerSupplyTableEntry ::= SEQUENCE {
                                powerSupplyNumber INTEGER,
                                powerSupplySerialNumber DisplayString,
                                powerSupplyDcState INTEGER,
                                powerSupplyAcState INTEGER,
                                powerSupplyLocation DisplayString
    } powerSupplyNumber OBJECT-TYPE
            SYNTAX INTEGER (1..4)
            ACCESS read-only
            STATUS mandatory
            DESCRIPTION
                "Uniquely identifies this power supply within the system."
            ::= { powerSupplyTableEntry 1 } powerSupplySerialNumber OBJECT-TYPE
            SYNTAX DisplayString (SIZE(0..255))
            ACCESS read-only
            STATUS mandatory
            DESCRIPTION
                "Indicates the serial number of this power supply."
            ::= { powerSupplyTableEntry 2 } powerSupplyDcState OBJECT-TYPE
            SYNTAX INTEGER {
                            OK(1),
                            OutOfRange(2),
                            OutOfRangeOrAbsent(3)
            }
            ACCESS read-only
            STATUS mandatory
            DESCRIPTION
                "Indicates the state of the D/C power from this power supply.
                The NF9000-C returns OK or OutOfRange, while the NF9000-T returns
                OK or OutOfRangeOrAbsent. The latter value may indicate a failure
                or an absent power supply."
            ::= { powerSupplyTableEntry 3 }
```

NF9000 MIB Rev. 2.2

```
powerSupplyAcState OBJECT-TYPE
    SYNTAX INTEGER (
                        OK(1),
                        OutOfRange(2),
                        Unavailable(3)
    }
    ACCESS read-only
    STATUS mandatory
    DESCRIPTION
        "Indicates the state of the A/C power to this power supply.
        On the NF9000-T this information is not available and it is
        reported as 'Unavailable'."
    ::= { powerSupplyTableEntry 4 } powerSupplyLocation OBJECT-TYPE
    SYNTAX DisplayString (SIZE(0..255))
    ACCESS read-only
    STATUS mandatory
    DESCRIPTION
        "Describes the location of this power supply.
        The power supply locations on the NF9000-C are as follows:

Power Supply
        Number          Location
        _____

1               'Top receptacle'

2               'Bottom receptacle'

The power supply locations on the NF9000-T are as follows:

Power Supply
        Number          Location
        _____

1               'Bottom receptacle'

2               'Middle receptacle'

3               'Top receptacle'
        "
    ::= { powerSupplyTableEntry 5 }
```

61

NF9000 MIB Rev. 2.2

CPU Group

```
----------------------------THE CPU GROUP--------------------------------
--
-- The CPU Group of objects provides information on the system CPUs.
-- cpuBusToCoreRatio OBJECT-TYPE
        SYNTAX DisplayString (SIZE(1..6))
        ACCESS read-only
        STATUS mandatory
        DESCRIPTION
            "Indicates the Bus-to-CPU frequency ratio. These are the values
            currently supported:

Ratio   CPU Speed (MHz)
            _____

1/2     133
            1/3     200
            1/4     266
            2/5     166
            2/7     233
            "
        ::= { cpuGroup 1 } cpuClockFrequency OBJECT-TYPE
        SYNTAX INTEGER (133..266)
        ACCESS read-only
        STATUS mandatory
        DESCRIPTION
            "Indicates the CPU's clock frequency in MHz."
        ::= { cpuGroup 2 } cpuMaximumNumberOfCpus OBJECT-TYPE
        SYNTAX INTEGER (1..4)
        ACCESS read-only
        STATUS mandatory
        DESCRIPTION
            "Indicates the maximum number of CPUs supported by this system."
        ::= { cpuGroup 3 } cpuTable OBJECT-TYPE
        SYNTAX SEQUENCE OF CpuTableEntry
        ACCESS not-accessible
        STATUS mandatory
        DESCRIPTION
            "This table describes the CPU's attributes and state."
        ::= { cpuGroup 4 } cpuTableEntry OBJECT-TYPE
            SYNTAX CpuTableEntry
            ACCESS not-accessible
            STATUS mandatory
            DESCRIPTION
                "Describes a CPU."
            INDEX { cpuNumber }
            ::= { cpuTable 1 }

CpuTableEntry ::= SEQUENCE {
                                    cpuNumber INTEGER,
                                    cpuState INTEGER
            }
```

NF9000 MIB Rev. 2.2

```
cpuNumber OBJECT-TYPE
    SYNTAX INTEGER  (1..4)
    ACCESS read-only
    STATUS mandatory
    DESCRIPTION
        "Indicates a unique CPU number that reflects its socket location."
    ::= { cpuTableEntry 1 } cpuState OBJECT-TYPE
    SYNTAX INTEGER  {
                        UnknownFailure(1),
                        Normal(2),
                        TemperatureFailure(3),
                        PowerFailure(4)
    }
    ACCESS read-only
    STATUS mandatory
    DESCRIPTION
        "Indicates whether this CPU has failed, and the
        cause of the failure."
    ::= { cpuTableEntry 2 }
```

NF9000 MIB Rev. 2.2

Adapter Group

```
-------------------------------THE ADAPTER GROUP-----------------------------
--
-- The Adapter Group of objects provides information on the adapters in the system.
-- An adapter is equivalent to the object identified by the PCI
-- triplet (bus#, device#, function#).
--
    adapterTable OBJECT-TYPE
        SYNTAX SEQUENCE OF AdapterTableEntry
        ACCESS not-accessible
        STATUS mandatory
        DESCRIPTION
            "This table contains the description of all the adapters in the system."
        ::= { adapterGroup 1 } adapterTableEntry OBJECT-TYPE
        SYNTAX AdapterTableEntry
        ACCESS not-accessible
        STATUS mandatory
        DESCRIPTION
            "This entry contains the description of a hot-swappable
            adapter."
        INDEX { adapterNumber }
        ::= { adapterTable 1 }

AdapterTableEntry ::= SEQUENCE {
                            adapterNumber INTEGER,
                            adapterName DisplayString,
                            adapterSupportsHotSwapHotAdd INTEGER,
                            adapterState INTEGER,
                            adapterCommand INTEGER,
                            adapterDriverNumber INTEGER,
                            adapterBusNumber INTEGER,
                            adapterDeviceNumber INTEGER,
                            adapterFunctionNumber INTEGER,
                            adapterVendorId INTEGER,
                            adapterDeviceId INTEGER,
                            adapterRevisionId INTEGER,
                            adapterBaseClass INTEGER,
                            adapterSubClass INTEGER,
                            adapterProgrammingInterface INTEGER
    } adapterNumber OBJECT-TYPE
            SYNTAX INTEGER (1..4294967295)
            ACCESS read-only
            STATUS mandatory
            DESCRIPTION
                "Indicates the number of this adapter."
            ::= { adapterTableEntry 1 } adapterName OBJECT-TYPE
            SYNTAX DisplayString (SIZE(0..255))
            ACCESS read-only
            STATUS mandatory
            DESCRIPTION
                "Indicates the unique name of this adapter. On Windows NT, it is
                available only for hot-swappable adapters."
            ::= { adapterTableEntry 2 }
```

NF9000 MIB Rev. 2.2

```
adapterSupportsHotSwapHotAdd OBJECT-TYPE
    SYNTAX INTEGER (
                    Yes(1),
                    No(2)
    )
    ACCESS read-only
    STATUS mandatory
    DESCRIPTION
        "Indicates whether this adapter is a NetFRAME-certified to
        support hot swap/hot add.
        "
    ::= ( adapterTableEntry 3 )

adapterState OBJECT-TYPE
    SYNTAX INTEGER (
                    Unclaimed(1),
                    Unknown(2),
                    Failed(3),
                    Active(4),
                    Suspended(5)
    )
    ACCESS read-only
    STATUS mandatory
    DESCRIPTION
        "Indicates the current state of this adapter and/or its
        driver.
```

| State | Meaning |
|---|---|
| Unclaimed | No driver is loaded for this adapter. |
| Unknown | Two cases are possible:<br>1) The adapter supports hot swap, and is not responding to commands. No action can be performed on the adapter while in this state.<br>2) The adapter does not support hot swap. Its actual state cannot be determined. No commands should be sent to the adapter. |
| Failed | The driver or adapter is malfunctioning. |
| Active | The adapter and its driver are working normally. |
| Suspended | The operations on the adapter have been suspended by a SuspendOperations or ForceSuspendOperations command." |

```
    ::= ( adapterTableEntry 4 )

adapterCommand OBJECT-TYPE
    SYNTAX INTEGER (
                    Reset(3),
                    SuspendOperations(4),
                    ForceSuspendOperations(5),
                    ResumeOperations(6)
    )
    ACCESS write-only
    STATUS mandatory
    DESCRIPTION
        "Indicates a command to be sent to the adapter. In most
        cases, it is used for hot-swapping or hot-adding a card.
        A special case is that of resetting a failed adapter.
```

| Command | Meaning |
|---|---|
| Reset | Causes the adapter to re-initialize and resume the operations. |
| SuspendOperations | Suspends all operations on this adapter in preparation for card swapping. |

NF9000 MIB Rev. 2.2

```
        ForceSuspendOperations  Forcefully suspends all operations
                                on this adapter in preparation for card
                                swap/add. Must be used on the NF9000-C
                                when the canister containing the adapter
                                to swap (or receiving the adapter to add)
                                contains also adapters that do not support
                                hot swap. On the NF9000-T it is identical
                                to SuspendOperations.

ResumeOperations        Resumes the operations on this adapter.
                                Implies the re-initialization of the card.
        "
    ::= { adapterTableEntry 5 } adapterDriverNumber OBJECT-TYPE
    SYNTAX INTEGER
    ACCESS read-only
    STATUS mandatory
    DESCRIPTION
        "Indicates the number of the driver handling this adapter.
        Can be used to index the driverTable."
    ::= { adapterTableEntry 6 } adapterBusNumber OBJECT-TYPE
    SYNTAX INTEGER (0..255)
    ACCESS read-only
    STATUS mandatory
    DESCRIPTION
        "Indicates the PCI bus number of this adapter."
    ::= { adapterTableEntry 7 } adapterDeviceNumber OBJECT-TYPE
    SYNTAX INTEGER (0..31)
    ACCESS read-only
    STATUS mandatory
    DESCRIPTION
        "Indicates the PCI device number of this adapter."
    ::= { adapterTableEntry 8 } adapterFunctionNumber OBJECT-TYPE
    SYNTAX INTEGER (0..7)
    ACCESS read-only
    STATUS mandatory
    DESCRIPTION
        "Indicates the PCI Function number of this adapter."
    ::= { adapterTableEntry 9 } adapterVendorId OBJECT-TYPE
    SYNTAX INTEGER (0..65535)
    ACCESS read-only
    STATUS mandatory
    DESCRIPTION
        "Indicates the PCI VendorID code for this adapter."
    ::= { adapterTableEntry 10 } adapterDeviceId OBJECT-TYPE
    SYNTAX INTEGER (0..65535)
    ACCESS read-only
    STATUS mandatory
    DESCRIPTION
        "Indicates the PCI DeviceID code for this adapter."
    ::= { adapterTableEntry 11 }
```

NF9000 MIB Rev. 2.2

```
adapterRevisionId OBJECT-TYPE
    SYNTAX INTEGER (0..65535)
    ACCESS read-only
    STATUS mandatory
    DESCRIPTION
        "Indicates the PCI RevisionID code for this adapter."
    ::= { adapterTableEntry 12 } adapterBaseClass OBJECT-TYPE
    SYNTAX INTEGER (0..255)
    ACCESS read-only
    STATUS mandatory
    DESCRIPTION
        "Indicates the PCI Base Class code for this adapter."
    ::= { adapterTableEntry 13 } adapterSubClass OBJECT-TYPE
    SYNTAX INTEGER (0..255)
    ACCESS read-only
    STATUS mandatory
    DESCRIPTION
        "Indicates the PCI Sub Class code for this adapter."
    ::= { adapterTableEntry 14 } adapterProgrammingInterface OBJECT-TYPE
    SYNTAX INTEGER (0..255)
    ACCESS read-only
    STATUS mandatory
    DESCRIPTION
        "Indicates the PCI Programming Interface code for this adapter."
    ::= { adapterTableEntry 15 }
```

NF9000 MIB Rev. 2.2

Driver Group

```
--------------------------------THE DRIVER GROUP--------------------------------
--
-- The Driver Group of objects provides information on the drivers in the system.
-- driverTable OBJECT-TYPE
        SYNTAX SEQUENCE OF DriverTableEntry
        ACCESS not-accessible
        STATUS mandatory
        DESCRIPTION
            "Under Windows NT, this table contains information on
            hot-swappable adapters drivers only. Under NetWare,
            this table contains information on all drivers in the system."
        ::= { driverGroup 1 } driverTableEntry OBJECT-TYPE
        SYNTAX DriverTableEntry
        ACCESS not-accessible
        STATUS mandatory
        DESCRIPTION
            "This entry contains the description of a driver."
        INDEX { driverNumber }
        ::= { driverTable 1 }

DriverTableEntry ::= SEQUENCE {
                        driverNumber INTEGER,
                        driverName DisplayString,
                        driverVersion DisplayString
    } driverNumber OBJECT-TYPE
            SYNTAX INTEGER (1..4294967295)
            ACCESS read-only
            STATUS mandatory
            DESCRIPTION
                "Indicates the number of this driver."
            ::= { driverTableEntry 1 } driverName OBJECT-TYPE
            SYNTAX DisplayString (SIZE(0..255))
            ACCESS read-only
            STATUS mandatory
            DESCRIPTION
                "Indicates the unique name of this driver."
            ::= { driverTableEntry 2 } driverVersion OBJECT-TYPE
            SYNTAX DisplayString (SIZE(0..255))
            ACCESS read-only
            STATUS mandatory
            DESCRIPTION
                "Indicates the version of this driver. It may not be
                available for some drivers."
            ::= { driverTableEntry 3 }
```

NF9000 MIB Rev. 2.2

*Slot Group*

```
---------------------------THE SLOT GROUP----------------------------
--
-- The Slot Group of objects provides information on the I/O expansion slots.
--
    slotTable OBJECT-TYPE
        SYNTAX SEQUENCE OF SlotTableEntry
        ACCESS not-accessible
        STATUS mandatory
        DESCRIPTION
            "This table describes the PCI I/O expansion slots in the system.
            It is indexed by (bus#, device#) pairs."
        ::= { slotGroup 1 } slotTableEntry OBJECT-TYPE
        SYNTAX SlotTableEntry
        ACCESS not-accessible
        STATUS mandatory
        DESCRIPTION
            "This entry describes a PCI I/O expansion slot. A PCI slot is
            identified by the pair (bus#, device#). Note that it is necessary
            to specify both the indexes (in the order they are declared)
            defined below each time the table is searched."
        INDEX { slotGroupNumber, slotNumber }
        ::= { slotTable 1 }

SlotTableEntry ::= SEQUENCE {
                            slotGroupNumber INTEGER,
                            slotNumber INTEGER,
                            slotBusNumber INTEGER,
                            slotDeviceNumber INTEGER,
                            slotAdapterPresence INTEGER,
                            slotPowerState INTEGER,
                            slotLocation DisplayString
    } slotGroupNumber OBJECT-TYPE
            SYNTAX INTEGER (1..4)
            ACCESS read-only
            STATUS mandatory
            DESCRIPTION
                "Indicates the number of the slot group this slot belongs to. On
                the NF9000-C, slotGroupNumber coincides with canisterNumber and
                can be used as an index into the Canister Table. There are four
                slots in each group/canister on the NF9000-C.
                On the NF9000-T, slotGroupNumber is always 1, in that there is only
                one group of eight I/O slots."
            ::= { slotTableEntry 1 } slotNumber OBJECT-TYPE
            SYNTAX INTEGER (1..8)
            ACCESS read-only
            STATUS mandatory
            DESCRIPTION
                "Indicates the unique logical number of a PCI I/O expansion slot
                in the group identified by slotGroupNumber. It has no relationship
                with the PCI device number. See the description of slotLocation for
                the slot numbering scheme on the NF9000-C and NF9000-T machines."
            ::= { slotTableEntry 2 } slotBusNumber OBJECT-TYPE
            SYNTAX INTEGER (0..255)
            ACCESS read-only
            STATUS mandatory
            DESCRIPTION
                "Indicates a PCI I/O expansion bus. This number coincides with the
                corresponding physical PCI bus number."
            ::= { slotTableEntry 3 }
```

```
                        1           7           'Seventh slot from the left, front view'
                        1           8           'Eighth slot from the left, front view'

NF9000-C:
            slotGroupNumber  slotNumber  slotLocation
            ---------------------------------------------------
                        1 or 3          1           'First slot from the top'
                        1 or 3          2           'Second slot from the top'
                        1 or 3          3           'Third slot from the top'
                        1 or 3          4           'Fourth slot from the top'
                        2 or 4          1           'First slot from the bottom'
                        2 or 4          2           'Second slot from the bottom'
                        2 or 4          3           'Third slot from the bottom'
                        2 or 4          4           'Fourth slot from the bottom'

"
        ::= { slotTableEntry 7 }
```

NF9000 MIB Rev. 2.2

```
slotDeviceNumber OBJECT-TYPE
    SYNTAX INTEGER (0..31)
    ACCESS read-only
    STATUS mandatory
    DESCRIPTION
        "Indicates a physical PCI device number on the bus
        identified by slotBusNumber."
    ::= { slotTableEntry 4 } slotAdapterPresence OBJECT-TYPE
    SYNTAX INTEGER {
                    Present(1),
                    Absent(2)
    }
    ACCESS read-only
    STATUS mandatory
    DESCRIPTION
        "Indicates whether a card is present in this slot."
    ::= { slotTableEntry 5 } slotPowerState OBJECT-TYPE
    SYNTAX INTEGER {
                    On(1),
                    Off(2),
                    Unavailable(3)
    }
    ACCESS read-write
    STATUS mandatory
    DESCRIPTION
        "Indicates the PCI slot power state. It is meaningful
        on the NF9000-T only. On the NF9000-C, reading this
        variable returns 'Unavailable', while writing
        to it has no effect.
        "
    ::= { slotTableEntry 6 } slotLocation OBJECT-TYPE
    SYNTAX DisplayString (SIZE(0..255))
    ACCESS read-only
    STATUS mandatory
    DESCRIPTION
        "Indicates the location of a PCI I/O expansion slot, as follows:
                        NF9000-T:
        slotGroupNumber slotNumber  slotLocation 1           1       'First slot from the left, front view'
                1           2       'Second slot from the left, front view'
                1           3       'Third slot from the left, front view'
                1           4       'Fourth slot from the left, front view'
                1           5       'Fifth slot from the left, front view'
                1           6       'Sixth slot from the left, front view'
                1           7       'Seventh slot from the left, front view'
                1           8       'Eighth slot from the left, front view'

NF9000-C:
        slotGroupNumber slotNumber  slotLocation 1 or 3         1       'First slot from the top'
             1 or 3         2       'Second slot from the top'
             1 or 3         3       'Third slot from the top'
             1 or 3         4       'Fourth slot from the top'
             2 or 4         1       'First slot from the bottom'
             2 or 4         2       'Second slot from the bottom'
             2 or 4         3       'Third slot from the bottom'
             2 or 4         4       'Fourth slot from the bottom'

"
    ::= { slotTableEntry 7 }
```

NF9000 MIB Rev. 2.2

Canister Group

```
-------------------------------THE CANISTER GROUP-----------------------------
--
-- The Canister Group of objects provides information on the NF9000-C canisters
-- (swappable buses) in the system. The canisterTable is empty for the NF9000-C.
-- canisterMaximumNumberOfCanisters OBJECT-TYPE
        SYNTAX INTEGER (0..4)
        ACCESS read-only
        STATUS mandatory
        DESCRIPTION
            "Indicates the maximum number of canisters supported by this system.
            The NF9000-T supports 0 canisters."
        ::= ( canisterGroup 1 )

canisterTable OBJECT-TYPE
        SYNTAX SEQUENCE OF CanisterTableEntry
        ACCESS not-accessible
        STATUS mandatory
        DESCRIPTION
            "This table describes the attributes of all the canisters in the
            system."
        ::= ( canisterGroup 2 )

canisterTableEntry OBJECT-TYPE
        SYNTAX CanisterTableEntry
        ACCESS not-accessible
        STATUS mandatory
        DESCRIPTION
            "Describes the attributes of a canister."
        INDEX ( canisterNumber )
        ::= ( canisterTable 1 )

CanisterTableEntry ::= SEQUENCE (
                                canisterNumber INTEGER,
                                canisterName DisplayString,
                                canisterSerialNumber DisplayString,
                                canisterRevisionInfo DisplayString,
                                canisterDescription DisplayString,
                                canisterPowerState INTEGER,
                                canisterLocation DisplayString,
                                canisterFanMinSpeed INTEGER,
                                canisterFanSpeedSetting INTEGER,
                                canisterFan1Speed Gauge,
                                canisterFan1Fault INTEGER,
                                canisterFan2Speed Gauge,
                                canisterFan2Fault INTEGER
        )

canisterNumber OBJECT-TYPE
            SYNTAX INTEGER (1..4)
            ACCESS read-only
            STATUS mandatory
            DESCRIPTION
                "This canister number."
            ::= ( canisterTableEntry 1 )

canisterName OBJECT-TYPE
            SYNTAX DisplayString (SIZE(1))
            ACCESS read-only
            STATUS mandatory
            DESCRIPTION
                "This canister name. Can be A, B, C, or D."
            ::= ( canisterTableEntry 2 )
```

NF9000 MIB Rev. 2.2

```
canisterSerialNumber OBJECT-TYPE
    SYNTAX DisplayString (SIZE(0..255))
    ACCESS read-only
    STATUS mandatory
    DESCRIPTION
        "Indicates this canister's serial number."
    ::= { canisterTableEntry 3 } canisterRevisionInfo OBJECT-TYPE
    SYNTAX DisplayString (SIZE(0..255))
    ACCESS read-only
    STATUS mandatory
    DESCRIPTION
        "Indicates the revision number and date of this canister's
        controller."
    ::= { canisterTableEntry 4 } canisterDescription OBJECT-TYPE
    SYNTAX DisplayString (SIZE(0..255))
    ACCESS read-only
    STATUS mandatory
    DESCRIPTION
        "Describes this canister."
    ::= { canisterTableEntry 5 } canisterPowerState OBJECT-TYPE
    SYNTAX INTEGER {
                On(1),
                Off(2)
    }
    ACCESS read-write
    STATUS mandatory
    DESCRIPTION
        "Indicates the state of this canister's power. This state
        can be changed to drive card or canister hot-swapping, and
        card hot-adding."
    ::= { canisterTableEntry 6 } canisterLocation OBJECT-TYPE
    SYNTAX DisplayString (SIZE(0..255))
    ACCESS read-only
    STATUS mandatory
    DESCRIPTION
        "Describes the location of this canister.
        The canister locations are as follows:

canisterNumber    canisterName    canisterLocation (front view)

1             A            'Top left'

2             B            'Top right'

3             C            'Bottom left'

4             D            'Bottom right'
        "
    ::= { canisterTableEntry 7 } canisterFanMinSpeed OBJECT-TYPE
    SYNTAX INTEGER (0..255)
    ACCESS read-write
    STATUS mandatory
    DESCRIPTION
        "Indicates the minimum fan speed (in RPS-Revolutions Per
        Second) that causes a fault. It applies to both fans."
    ::= { canisterTableEntry 8 }
```

NF9000 MIB Rev. 2.2

```
canisterFanSpeedSetting OBJECT-TYPE
    SYNTAX INTEGER (
                    Low(1),
                    High(2)
    )
    ACCESS read-write
    STATUS mandatory
    DESCRIPTION
        "Indicates the current fan speed setting. Normally it is Low.
        If High, it means that the speed of one or both fans dropped below the
        low limit. In this case, Wire Service automatically sets the
        canister fans speed to High. Changing it to Low through the SNMP
        agent may sort a temporary effect only, because Wire Service would
        change it back to High to ensure proper canister cooling. It applies to
        both fans."
    ::= ( canisterTableEntry 9 )

canisterFan1Speed OBJECT-TYPE
    SYNTAX Gauge
    ACCESS read-only
    STATUS mandatory
    DESCRIPTION
        "Measured fan #1 speed in RPS (Revolutions Per Second)."
    ::= ( canisterTableEntry 10 )

canisterFan1Fault OBJECT-TYPE
    SYNTAX INTEGER (
                    Yes(1),
                    No(2)
    )
    ACCESS read-only
    STATUS mandatory
    DESCRIPTION
        "Indicates the current state of fan #1."
    ::= ( canisterTableEntry 11 )

canisterFan2Speed OBJECT-TYPE
    SYNTAX Gauge
    ACCESS read-only
    STATUS mandatory
    DESCRIPTION
        "Measured fan #2 speed in RPS (Revolutions Per Second)."
    ::= ( canisterTableEntry 12 )

canisterFan2Fault OBJECT-TYPE
    SYNTAX INTEGER (
                    Yes(1),
                    No(2)
    )
    ACCESS read-only
    STATUS mandatory
    DESCRIPTION
        "Indicates the current state of fan #2."
    ::= ( canisterTableEntry 13 )
```

NF9000 MIB Rev. 2.2

*Slot Fan Group*

```
-------------------------------THE SLOT FAN GROUP-----------------------------
--
-- The Slot Fan Group of objects provides information on the NF9000-T I/O slot fans.
-- The slotFanTable is empty for the NF9000-C.
-- slotFanMaximumNumberOfFans OBJECT-TYPE
        SYNTAX INTEGER (0..2)
        ACCESS read-only
        STATUS mandatory
        DESCRIPTION
            "Indicates the maximum number of I/O slot fans supported by this system.
            The NF9000-C supports 0 I/O slot fans."
        ::= { slotFanGroup 1 } slotFanTable OBJECT-TYPE
        SYNTAX SEQUENCE OF SlotFanTableEntry
        ACCESS not-accessible
        STATUS mandatory
        DESCRIPTION
            "Describes the programmable fans on the system board."
        ::= { slotFanGroup 2 } slotFanTableEntry OBJECT-TYPE
            SYNTAX SlotFanTableEntry
            ACCESS not-accessible
            STATUS mandatory
            DESCRIPTION
                "Describes a programmable fan."
            INDEX { slotFanNumber }
            ::= { slotFanTable 1 }

SlotFanTableEntry ::= SEQUENCE {
                                        slotFanNumber INTEGER,
                                        slotFanMinSpeed INTEGER,
                                        slotFanSpeedSetting INTEGER,
                                        slotFanSpeed Gauge,
                                        slotFanFault INTEGER,
                                        slotFanLocation DisplayString
        }
            slotFanNumber OBJECT-TYPE
                SYNTAX INTEGER (1..2)
                ACCESS read-only
                STATUS mandatory
                DESCRIPTION
                    "Indicates the number of this fan."
                ::= { slotFanTableEntry 1 } slotFanMinSpeed OBJECT-TYPE
                SYNTAX INTEGER (0..255)
                ACCESS read-write
                STATUS mandatory
                DESCRIPTION
                    "Indicates the minimum fan 2 speed (in RPS-Revolutions Per
                    Second) that causes a fault."
                ::= { slotFanTableEntry 2 }
```

NF9000 MIB Rev. 2.2

```
slotFanSpeedSetting OBJECT-TYPE
    SYNTAX INTEGER (
                    Low(1),
                    High(2)
    )
    ACCESS read-write
    STATUS mandatory
    DESCRIPTION
        "Indicates the current fan speed setting. Normally it is Low.
        If High, it means that one of the other I/O slot fans speed is below
        the minimum limit.  In this case, Wire Service automatically sets the
        I/O slot fans speed to High."
    ::= ( slotFanTableEntry 3 )

slotFanSpeed OBJECT-TYPE
    SYNTAX Gauge
    ACCESS read-only
    STATUS mandatory
    DESCRIPTION
        "Measured this fan speed in RPS (Revolutions Per Second)."
    ::= ( slotFanTableEntry 4 )

slotFanFault OBJECT-TYPE
    SYNTAX INTEGER (
                    Yes(1),
                    No(2)
    )
    ACCESS read-only
    STATUS mandatory
    DESCRIPTION
        "Indicates the current state of this fan."
    ::= ( slotFanTableEntry 5 )

slotFanLocation OBJECT-TYPE
    SYNTAX DisplayString (SIZE(0..255))
    ACCESS read-only
    STATUS mandatory
    DESCRIPTION
        "Indicates where this fan is located to allow the user to
        physically reach it in case of malfunction.
        The fan locations are as follows (unchecked):

+------------------------+
        |                        |
        |                        |
        |      Top View          |
        |                        |
        |    Fan1   Fan2         |
        |                        |
        +------------------------+
             Front slotFanNumber      slotFanLocation 1              'Front view of I/O board, first from the left'

2              'Front view of I/O board, second from the left'
        "
    ::= ( slotFanTableEntry 6 )

END
```

NF9000 MIB Rev. 2.2

References

| | |
|---|---|
| HEIN | Mathias Hein, David Griffiths, *SNMP Versions 1 & 2—Simple Network Management Protocol—Theory and Practice*, International Thomson Computer Press, 1995. |
| ISO8824 | *Specification of Abstract Syntax Notation One (ASN.1)*. International Organization for Standardization. International Standard 8824. December 1987. |
| NGUYEN | Ken Nguyen, Gary Liu, *Wire Service Implementation*, Version 1.0, December 1996. |
| RFC1155 | K. McCloghrie, M. Rose, *Structure and Identification of Management Information for TCP/IP-based Internets*, May 1990. Updates RFC1065. |
| RFC1157 | *A Simple Network Management Protocol (SNMP)*. May 1990. Replaces RFC1098. |
| RFC1212 | K. McCloghrie, M. Rose, *Concise MIB Definitions*, March 1991. |
| RFC1441 | *Introduction to Version 2 of the Internet-standard Network Management Framework*. April 1993. |
| RFC1902 | *Structure of Management Information for Version 2 of the Simple Network Management Protocol (SNMPv2)*. January 1996. |
| RFC1903 | *Textual Conventions for Version 2 of the Simple Network Management Protocol (SNMPv2)*. January 1996. |
| RFC1904 | *Conformance Statements for Version 2 of the Simple Network Management Protocol (SNMPv2)*. January 1996. |
| RFC1905 | *Protocol Operations for Version 2 of the Simple Network Management Protocol (SNMPv2)*. January 1996. |
| RFC1906 | *Transport Mappings for Version 2 of the Simple Network Management Protocol (SNMPv2)*. January 1996. |
| RFC1907 | *Management Information Base for Version 2 of the Simple Network Management Protocol (SNMPv2)*. January 1996. |
| RFC1908 | *Coexistence between Version 1 and Version 2 of the Internet-standard Network Management Framework*. January 1996. |
| RFC1910 | G. Waters, *"User-based Security Model for SNMPv2"*, February 1996. |
| SOLARI | Edward Solari & George Willse, *PCI Hardware and Software—Architecture & Design*, Annabooks, 1995. |
| TOWNSEND | Robert L. Townsend, *SNMP Application Developer's Guide*, Van Nostrand Reinhold, 1995. |

NF9000 MIB Rev. 2.2

Revision History

Rev. 0.4

- Corrected the ACCESS definition of some objects to reflect the corresponding Administrator's privileges defined by Wire Service.
- Specified the length of some DisplayString-type objects and the ranges for some INTEGER-type objects.
- Made all table column names different, to allow the Novell's MIB compiler to generate correct C files.
- Added objects that describe fan and sensor locations.
- Expanded the adapter state definition and the adapter command list to include the adapter/driver reset.
- Added description of the hot-swap procedure.
- Added support for hot-swap on Raptor-8 machines, which have no canisters. On Raptor-8, the action of powering a bus down is performed on the target bus directly, while on Raptor-16 it is performed on the canister that bus belongs to.

Rev. 0.5

- Added trap definitions.
- Merged systemBiosTime and systemBiosDate into systemDateAndTime in the System Group. The new object format complies with corresponding definition in RFC1443.
- Made all the objects in the Canister Group optional to accommodate the reduced architecture of Raptor-8, which does not have canisters.
- Removed the object canisterNumberOfCanisters from the Canister Group.
- Added two new objects in the S/W And F/W Control Group: swFwControlSystemLogFirstEntryOffset and swFwControlSystemLogLastEntryOffset, to allow the user to read the System Log from the last entry backward or from the first entry forward. (Some clarification on the log entry format is still needed).
- Modified all the table indexes used as offset in memory areas to start from zero instead of one.

Rev. 0.6-0.8

- Changed the name "Raptor" with the official "NF9000".
- Rolled back the definition of optional objects to mandatory, as one of our MIB compilers can't understand optional objects correctly.
- Renamed some objects that had repeated names.
- Changed some enumerated type values to guarantee that same enumerated symbolic names have the same value across the MIB. This to support the automatic generation of SNMP agents' data structures.
- Changed all the string-type table indexes to others of type integer.

Rev. 0.9

- Changed the description of the variable coolingFansGeneralFaultLed to reflect the state of just the system board fans, instead of all the fans in the system.
- Removed the variable coolingFanPresence in the coolingFanTable, Cooling Group, because there is no deterministic way to distinguish between a present but failed fan and a missing fan based on information from Wire Service.
- Extended the description of the variables coolingFanMinSpeed and coolingFanSpeedSetting to explain the scope of the action of changing their values in case of a system board fan vs. a canister fan.
- Removed canisterState and canisterFaultLedState from the Canister Table. The former is not provided from Wire Service, while the latter actually refers to the canister fan fault LED, which is already defined in the Cooling Group.

NF9000 MIB Rev. 2.2

- Removed canisterState from the information reported by the trapCanister trap.
- Changed coolingFanFaultLed to coolingFanFault in the following objects: trapFan, coolingFanTableEntry. This to overcome a limitation of the system board fans, which do not have individual fault LED's. The coolingFanFault variable can now assume the value of True or False.
- Removed cpuNumberOfCpus, which was redundant.
- Added a comment to swFwControlNvramOffset and swFwControlVramOffset, to clarify that those variables can go from 0 up, even if they formally are table indexes.
- Added extra comments to variables in the S/W & F/W Control Group. Added detailed structure description of the System Log messages.
- Changed "ACCESS" of slotAdapterConfigurationPart1&2 to read-only (from read-write). This means that it is no longer possible to change the PCI configuration of boards. This feature did not make much sense for network administration.
- Removed driverName and adapterName from trapAdapter to make the trap values fit into a PDU.
- Due to a change in the Wire Service System Log access mechanism, the variables swFwControlSystemLogFirstEntryOffset and swFwControlSystemLogLastEntryOffset do not exist any more. The variable swFwControlSystemLogOffset is now defined differently.
- Changed the name of several enumerated type values, to allow the SNMP Manager to display those same names to the user in a meaningful fashion.
- Specified range values for all the table index variables.

Rev. 1.0

- Removed swFwControlGroup and wireServiceGroup. They apply to the Down System Management, which is supported by non-MIB-related application.
- Removed systemDescription, which could not be retrieved from the H/W of F/W. Applications must rely on specific components descriptions to ascertain the system model.
- Removed systemTemperatureUnit, because could lead to inconsistent results if more than one application tried to set different unit values. All the temperatures are reported in Celsius degrees.
- Changed systemFaultLed to systemState, which reflects the system fault LED.
- Added systemADescription, systemBDescription, systemBackPlaneDescription, systemARevisionInfo, systemBRevisionInfo, systemBackPlaneRevisionInfo to the System Group.
- Added powerSupplyRevisionInfo and powerSupplyDescription to the Power Supply Table.
- Added canisterRevisionInfo and canisterDescription to the Canister Table.
- Added systemDimmTable to the System Group.
- Removed cpuPowerSate and merged its values into cpuState.
- Removed cpuNmiEnable and cpuNmiRequest, useless to Operating Systems at run time.
- For each type or removable devices, added the maximum number supported by the system, as follows:
  - Added cpuMaximumNumberOfCpus to the CPU Group.
  - Added canisterMaximumNumberOfCanisters to the Canister Group.
  - Added powerSupplyMaximumNumberOfPowerSupplies to the Power Supply Group.
- Removed some device presence information, since device information tables will contain information for present devices only. Removed the following variables:
  - canisterPresence from the Canister Group.
  - cpuPresence from the CPU Table.
  - powerSupplyPresence from the Power Supply Table.
- Removed the systemLcd variable from the System Group. There was no purpose in writing to a display that could be overwritten by other modules.
- Expanded the description of cpuBusToCoreRatio, coolingSensorLocation, and powerSupply.
- Added location information to some tables as follows:
  - canisterLocation in the Canister Table.
  - powerSupplyLocation in the Power Supply Table.
- Removed all the variables returned by traps except for the table index necessary for retrieving all the relevant variable values.

NF9000 MIB Rev. 2.2

- Changed the name of trapFan to trapSystemBoardFan, to reflect some changes in the fan grouping in the MIB.
- Separated the system board fans from the canister fans. The system board fans are now described in the Cooling Group, while the canister fans in the Canister Group.
- Moved coolingFanSpeedSetting and coolingFanMinSpeed outside the coolingFanTable.
- Added canisterFanMinSpeed, canisterFanFault, canisterFanSpeed, canisterFanSpeedSetting, canisterFanFaultReset to the canisterTable.
- Added coolingFanFaultReset, to the coolingFanTable and canisterTable to allow the user to reset the fan fault condition after replacing a failed fan. The reset can only be performed manually.
- Added canisterName to the canisterTable.
- Added cpuClockFrequency to the CPU Group.
- Changed some integer ranges to reflect the actual H/W-provided values.

Rev. 1.1

- Added support for the NF9000-T (Raptor-8), as follows:
    - Added slotPowerState in the Slot Table, to allow for powering I/O slots on and off on the NF9000-T.
    - Added the I/O Slot Fan Group, which describes the I/O slot fans of the NF9000-T.
- Depreciated the following variables:
    - powerSwitch (suicidal command for the agent).
    - powerUpMode (will be removed from Wire Service).
    - slotAdapterConfigurationPart1 (PCI configuration information with little meaning unless decoded).
    - slotAdapterConfigurationPart2 (PCI configuration information with little meaning unless decoded).
    - busPower (legacy of an old NF9000-C design aimed at controlling the power on a bus basis—now it is controlled on a PCI slot basis).
    - canisterType (can only be "dumb", since I/O Processors have been canned).
    - canisterIopSerialNumber (no more I/O Processors).
    - canisterFan1FaultReset (done by Wire Service automatically).
- Added the following variables:
    - Support for the second fan in canisters (canisterFan2MinSpeed, canisterFan2SpeedSetting, etc.).
    - Support for PCI function numbers (adapterFunctionNumber).
    - Support for better adapter identification (adapterVendorId, adapterDeviceId, adapterRevisionId, adapterBaseClass, adapterSubClass, and adapterProgrammingInterface).
    - System model identification (systemModel).
    - Information on the maximum number of specific devices (coolingMaximumNumberOfSystemFans, coolingMaximumNumberOfTemperatureSensors).
- Removed LoadDriver and UnloadDriver from adapterCommand.
- Updated and fixed some variable descriptions.

Rev. 1.2

- Added new sections that describe the target systems, the MIB and SNMP standards, and the various MIB groups. Moved the MIB definitions to the Appendix. Added a References section.
- Added trapCanisterFan to report failed canister fan events separately from canister extraction/insertion.
- Removed all the depreciated variables.
- Added the enumerated value 3 (Unavailable) to powerSupplyAcState and slotPowerState, since those variables are not available on some system models.
- Corrected the range of some variables (cpuMaximumNumberOfCpus, cpuNumber, and powerSupplyMaximumNumberOfPowerSupplies).

NF9000 MIB Rev. 2.2

- Added adapterSupportsHotSwapHotAdd variable to the Adapter Group, to permit the SNMP Manager to determine whether a hot-swap operation is possible for a given adapter.
- Changed the name of busSupportsHotSwap to busSupportsHotSwapHotAdd to better reflect the possibility of the two operations on certain buses.
- Removed slotAdapterNumber from the slotTable, since with the introduction of PCI function numbers, a many-to-one relationship is established between adapter and slots (more adapters can coexist in the same slot). This cannot be implemented in the MIB.
- Changed the identifiers of some variables, to remove holes in OID sequences.

Rev. 1.3

- Fixed and merged the two hot swap flowcharts into one. Moved it into an appendix.
- Added an appendix that describes the I/O bus hierarchy and bus numbering scheme used by Windows NT.
- Clarified, in the "NF9000 MIB" section, the difference between "slot" for built-in controllers on the system board, and "expansion slots" for add-on cards.

Rev. 1.4

- Added appendix on bus numbering for NetWare.
- In the Trap Group section, clarified which traps are server model-specific.
- Added a range definition to coolingAlertTemperature.
- Made the hot swap flowchart more readable.

Rev. 1.5-1.9

- Removed the Bus Group.
- Changed the name of the Slot Group to I/O Slot Group.
- Added some information on I/O slots numbering and location.
- Removed information on all buses, devices, and function numbers that do not support hot-swap/hot-add.
- Changed the use of the term "slot" to reflect a physical I/O expansion slot. PCI adapters are now identified by the triple (bus#, device#, function#), and are located in I/O expansion slots. Slots and device numbers are now used as different unrelated concepts.

Rev. 1.9.1

- Corrected the bus numbering for NetWare.
- Corrected the range of ioSlotCanisterNumber and ioSlotBusNumber.
- Corrected the description of adapterBusNumber.
- Updated the list of references.

Rev. 2.0

- Changed the name of the ioSlotGroup to slotGroup, and that of ioSlotFanGroup to slotFanGroup.
- Added an enumerated value to powerSupplyDcState, to reflect the ambiguity of the signal DCOK from the power supplies on the NF9000-T. Such signal may indicate that a power supply is absent or is present and faulted.
- Added more comments to trapPowerSupply.
- Corrected the powerSupplyLocation information for the NF9000-T.
- Added hot add algorithm to Appendix 1.
- Added systemLicense variable.

NF9000 MIB Rev. 2.2

- Expanded description of devices (temperature sensors, fans, etc.) locations.

Rev. 2.1

- Changed the definition of the following variables: slotBusNumber, slotDeviceNumber, adapterBusNumber, adapterDeviceNumber, adapterFunctionNumber. They can now assume physical PCI values, instead of the physical ones plus 1. Changed their description accordingly. Also, removed the indication of the possibility to use adapterBusNumber and adapterDeviceNumber to index the Slot Table.
- Changed the index variable for the slotTable from (slotBusNumber, slotDeviceNumber) to (slotGroupNumber, slotNumber).
- Removed slotCanisterNumber from the slotTable.

Rev. 2.2

- Perfected the Hot Swap and Hot Add flow charts.
- Removed placeholders of NF9000-T pictures (which are not available yet).
- Expanded the trapGroup in Appendix 5.
- Corrected some typos.

What is claimed is:

1. A system for managing an addition of a component to a computer, comprising:
   a computer having an expansion slot for connecting to a component;
   a component which can be connected to said computer;
   an extended management information base, including a plurality of variables, said variables selected to support adding said component to said computer while said computer runs, said management information base stored on a computer readable medium;
   a component add software module stored in executable form on said computer, said component add software module including at least some of said plurality of variables, said component add software module directing instructions to said slot to permit adding said component to said computer while said computer runs;
   a power state variable for determining and regulating a power state of said expansion slot of said computer, said expansion slot capable of being powered down individually; and
   hot plug software running on said computer, said hot plug software responsively recognizing a power state command to stop power to said expansion slot or to start power to said expansion slot, said power state command related to said power state variable.

2. The system as described in claim 1, further comprising:
   a component command variable for configuring or changing an operational state of said component, said component command variable included in said variables; and
   a component command related to said component command variable, said hot plug software responsively recognizing said component command to configure or change the operating state of said component.

3. A system for managing an exchange of components of a computer, comprising:
   a computer having an expansion slot for connecting to a component;
   a first component connected to said expansion slot;
   an extended management information base, including a plurality of variables, said variables selected to support exchanging said first component with another component while said computer runs, said management information base stored on a computer readable medium;
   a component exchange software module stored in executable form on said computer, said component exchange software module including at least some of said plurality of variables, said component exchange software module directing instructions to said slot to permit exchanging said first component with another component while said computer runs;
   a component state variable for suspending or resuming a device driver, said component state variable included in said plurality of variables;
   a device driver running on said computer and servicing said first component; and
   hot plug software running on said computer, said hot plug software responsively recognizing said component state command to suspend or resume the operation of said device driver, said component state command formatted to include a representation of said component state variable.

4. The system as described in claim 3, further comprising:
   a power state variable for determining the power state of said expansion slot, said power state variable included in said plurality of variables; and
   a power state command related to said power state variable, said hot plug software responsively recognizing said power state command to determine the power state of said expansion slot, to shut off power to said expansion slot, or to start power to said expansion slot.

5. The system as described in claim 4, further comprising:
   a compiled management information base stored on a computer readable medium, said power state variable and said component state variable defined in said compiled management information base.

6. A system for managing hot plug data to hot add or hot swap components of a computer, comprising:
   a computer having an expansion slot;
   a component capable of connecting to said expansion slot;
   hot plug variable data stored on a computer readable medium, said hot plug variable data corresponding to hot plug variables selected to support adding said component to said computer while said computer runs, removing said component from said expansion slot while said computer runs, and replacing said component connected to said expansion slot with another component while said computer runs;
   a component add software module stored in executable form on said computer, said component add software module including or accessing at least some of said hot plug variable data, said component add software module directing instructions to said slot to permit adding said component to said computer while said computer runs;
   a power state variable for examining or regulating the power state of said expansion slot, said power state variable included in said hot plug variables; and
   hot plug software running on said computer, the hot plug software polling said expansion slot to obtain power state variable data, the hot plug software storing said obtained power state variable data with said hot plug variable data on said computer readable medium.

7. The system as described in claim 6, further comprising:
   agent software running on said computer, said agent software responsively recognizing said power state command to determine the power state of said expansion slot, to shut off power to said expansion slot, or to start power to said expansion slot, the power state command including a representation of said power state variable data.

8. The system as described in claim 7, further comprising:
   a device driver running on said computer and servicing said component;
   a component state variable included in said hot plug variables; and
   a component state command for suspending or resuming operation of a device driver, said agent software responsively recognizing said component state command to suspend or resume operation of said device driver, said component state command related to said component state variable.

9. The system as described in claim 8, further comprising:
   a compiled management information base stored on computer storage media accessible to said computer, said compiled management information base defining said hot plug variables.

10. A system for controlling hot plug operations on a server computer, comprising:

a server computer having server-based hot plug management information base variables stored on a computer readable medium;

agent software running on said server computer, said agent software responsive to hot plug-related requests to perform hot plug operations on said server computer, said hot plug commands formatted to include a representation of at least one of said hot plug management information base variables, said requests including a request to shut off power to a component of said server computer and a request to start power to a component of said server computer; and a compiled management information base stored on a computer readable medium, said compiled management information base defining for said agent software a structure for each of said hot plug management information base variables, said agent software collecting said hot plug management information base variables by polling components of said computer for characteristic, capability and state information corresponding to said respective structures for each management information base variable.

11. A system for controlling hot plug operations on a server computer, comprising:

a server computer having server-based hot plug management information base variables stored on a computer readable medium;

agent software running on said server computer, said agent software responsive to hot plug-related requests to perform hot plug operations on said server computer, said hot plug commands formatted to include a representation of at least one of said hot plug management information base variables, said requests including a request to shut off power to a component of said server computer and a request to start power to a component of said server computer;

a compiled management information base stored on a computer readable medium, said compiled management information base defining for said agent software a structure for each of said hot plug management information base variables, said agent software collecting said hot plug management information base variables by polling components of said computer for characteristic, capability and state information corresponding to said respective structures for each management information base variable;

a client computer having client-based hot plug management information base variables stored on a computer readable medium, said client-based hot plug management information base variables corresponding to characteristics, capabilities or states of components of said server computer;

management software running on said client computer, said management software generating hot plug-related requests, said requests including a request to shut off power to a component and a request to start power to a component; and a network permitting said client computer and said server computer to communicate, said management software sending said requests to said agent software over said network.

12. A system for refreshing hot plug variables, comprising:

a server computer;

a client computer;

a network permitting said client computer and said server computer to communicate;

hot plug variable data stored on a computer readable medium local to said server computer, said hot plug variable data including existing component variable data identifying at least one component of said server computer;

agent software running on said server computer, said agent software polling at least one component of said server computer for new component variable data identifying said at least one component of said server computer, said agent software storing said new component variable data on said computer readable medium to supersede said existing component variable data; and a retrieve data routine running on said client computer at a predetermined time interval, said retrieve data routine generating requests for said hot plug variable data and sending said requests to said agent software over said network, said agent software responding by sending over said network said hot plug variable data which supersedes hot plug variable data stored on a computer readable medium of said client computer.

13. The system as described in claim 12, further comprising:

a power state variable corresponding to the power state of at least one component of said first computer, said agent software polling at least one component of said server computer for new power state variable data and storing obtained new power state variable data to supersede existing power state variable data, said requests generated by said retrieve data routine including requests for power state variable data, said agent software polling at least one component of said server computer for new power state variable data and sending said new power state variable data over said network to supersede power state variable data stored on a computer readable medium of said client computer.

14. A system for broadcasting hot plug variables, comprising:

a server computer;

a client computer;

a network permitting said client computer and said server computer to communicate;

hot plug variable data stored on a computer readable medium local to said server computer, said hot plug variable data including existing component variable data identifying at least one component of said server computer;

agent software running on said server computer, said agent software polling at least one component of said server computer for new component variable data identifying said at least one component of said server computer, said agent software storing said new component variable data on said computer readable medium to supersede said existing component variable data; and a broadcast routine running on said server computer, said broadcast routine sending said hot plug variable data over said network to said client computer.

15. The system described in claim 14, further comprising:

a software timer for producing a timer event at a predetermined time interval, said broadcast routine responsive to said timer event to execute at said predetermined time intervals.

16. The system described in claim 15, further comprising:

a compiled management information base defining said hot plug variables, said compiled management information base stored on a computer readable medium of said server computer.

17. A system for managing hot plug operations, comprising:

a binary hot plug management information base stored on computer readable media accessible to a server computer, said binary hot plug management information base generated by compiling with a management information base compiler a hot plug management information base module, said hot plug management information base module defining hot plug variables selected to support adding a component to said server computer while said server computer runs, removing a component from said server computer while said server computer runs, and exchanging components of said server computer while said server computer runs, said hot plug variables including a power state variable for regulating the power state of at least one component of said server computer and also including a component state variable for suspending or resuming the operation of at least one component of said server computer;

hot plug software running on said server computer and responsive to commands related to variables defined in said binary hot plug management information base;

a client computer linked to said server computer by a network, said binary hot plug management information base stored on computer readable medium of said client computer; and hot plug management software running on said client computer, said hot plug management software generating requests to perform hot plug operations, said requests including a request to shut down power to a component of said server computer and a request to start power to a component of said server computer, said requests also including a request to suspend the operation of a component of said server computer and a request to resume the operation of a component of said server computer, each of said requests related to a hot plug variable defined in said binary hot plug management information base, said hot plug management software sending said requests over said network to said hot plug software.

18. A computer system for controlling, from a client computer, hot plug operations on a server computer, comprising:

a client computer;

hot plug management software running on said client computer;

a server computer having an expansion slot and a component removably connected to said expansion slot;

a device driver running on said server computer and servicing said component;

hot plug agent software running on said server computer;

a compiled management information base defining hot plug variables, said compiled management information base stored on a computer readable medium of said server computer, and a copy of said compiled management information base stored on a computer readable medium of said client computer;

server-based hot plug management information base variables stored on a computer readable medium of said server computer;

client-based hot plug management information base variables stored on a computer readable medium of said server computer;

a suspend component state command generated by said hot plug management software to suspend the operation of said device driver, said suspend component state command related to a component state hot plug variable defined in said compiled management information base, said hot plug management software sending said suspend component state command to said hot plug agent, said hot plug agent responsively recognizing said suspend component state command to suspend operation of said device driver;

a power off command generated by said hot plug management software to stop power to said expansion slot, said power off command related to a power state hot plug variable defined in said compiled management information base, said hot plug management software sending said power off command to said hot plug agent, said hot plug agent responsively recognizing said power off command to stop power to said expansion slot;

a power on command generated by said hot plug management software to start power to said expansion slot, said power off command related to a power state hot plug variable defined in said compiled management information base, said hot plug management software sending said power on command to said hot plug agent, said hot plug agent responsively recognizing said power on command to start power to said expansion slot; and a resume component state command generated by said hot plug management software to resume the operation of said device driver, said resume component state command related to a component state hot plug variable defined in said compiled management information base, said hot plug management software sending said resume component state command to said hot plug agent, said hot plug agent responsively recognizing said resume component state command to resume operation of said device driver.

19. A system for controlling hot plug operations, comprising:

a server computer having an expansion slot and a component removably connected to said expansion slot;

a device driver running on said server computer and servicing said component;

a database of hot plug commands, said database defining the structure of power state commands for determining or regulating the power state of said expansion slot, said database defining the structure of component state commands for suspending or resuming the operation of said device driver, and said database defining the structure of component commands for configuring or changing the operating condition of said component; and hot plug software running on said server computer, said hot plug software responsively recognizing said power state commands to determine or regulate the power state of said expansion slot, said hot plug software responsively recognizing said component state commands to suspend or resume the operation of said device driver, and said hot plug software responsively recognizing said component commands to configure or change the operating condition of said component.

20. A system for controlling hot plug operations, comprising:

a server computer having an expansion slot and a component removably connected to said expansion slot;

a device driver running on said server computer and servicing said component;

a database of hot plug commands, said database defining the structure of power state commands for determining or regulating the power state of said expansion slot, said database defining the structure of component state commands for suspending or resuming the operation of said device driver, and said database defining the structure of component commands for configuring or changing the operating condition of said component;

hot plug software running on said server computer, said hot plug software responsively recognizing said power state commands to determine or regulate the power state of said expansion slot, said hot plug software responsively recognizing said component state commands to suspend or resume the operation of said device driver, and said hot plug software responsively recognizing said component commands to configure or change the operating condition of said component;

a client computer;

a network permitting said client computer and said server computer to communicate;

a copy of said database of hot plug commands stored on a computer readable medium of said client computer; and hot plug management software running on said client computer, said hot plug management software generating said power state commands, said component state commands, and said component commands, each of said commands related to respective structure definitions in said database of hot plug commands, said hot plug management software sending said commands over the network to said hot plug software.

* * * * *